(12) United States Patent
Cox

(10) Patent No.: US 6,212,785 B1
(45) Date of Patent: Apr. 10, 2001

(54) OMNIDIRECTIONAL ANGLE INDICATOR

(76) Inventor: Craig A. Cox, 11101 Blue Ridge Blvd., Kansas City, MO (US) 64134

( * ) Notice: Subject to any disclaimer, the term of this patent is extended or adjusted under 35 U.S.C. 154(b) by 0 days.

(21) Appl. No.: 09/352,105

(22) Filed: Jul. 14, 1999

(51) Int. Cl.[7] ............................................... G01C 9/36
(52) U.S. Cl. ........................................... 33/390; 33/333
(58) Field of Search .................... 33/333, 335, 379, 33/390, 600

(56) References Cited

U.S. PATENT DOCUMENTS

| | | | | |
|---|---|---|---|---|
| D. 110,980 | * | 8/1938 | Reardon | 33/379 |
| 2,250,771 | * | 7/1941 | Lannen | 33/390 |
| 3,486,239 | * | 12/1969 | De Forrest | 33/379 |
| 3,564,531 | * | 2/1971 | Burgin | 33/333 |
| 4,559,714 | * | 12/1985 | Wright | 33/379 |
| 5,596,826 | * | 1/1997 | Barden | 33/333 |
| 5,746,000 | * | 5/1998 | Schmitt | 33/335 |
| 6,095,933 | * | 8/2000 | Smith | 33/379 |

* cited by examiner

Primary Examiner—G. Bradley Bennett
(74) Attorney, Agent, or Firm—Chase & Yakimo, L.C.

(57) ABSTRACT

A vehicle warning device presents a visual display of unsafe inclinations of the vehicle. A bubble level has a map thereon which presents a plurality of safety vehicle inclinations within its confines. The appearance of a bubble level adjacent the map perimeter the map readily indicates to the vehicle occupant that an unsafe inclination of the vehicle is about to occur so that corrective action can be taken. The map is constructed to reflect various angles of inclination of a vehicle depending on the slope of the underlying vehicle support surface and the angle of approach/departure of the vehicle up or down the surface.

12 Claims, 65 Drawing Sheets

|   |   | Angle of approach |   |   |   |   |   |   |   |   |   |   |   |   |   |   |
|---|---|---|---|---|---|---|---|---|---|---|---|---|---|---|---|---|
|   |   | 1 | 2 | 3 | 4 | 5 | 6 | 7 | 8 | 9 | 10 | 11 | 12 | 13 | 14 | 15 |
| A | 15 | 15 | 15 | 15 | 15 | 15 | 15 | 15 | 15 | 15 | 15 | 15 | 15 | 15 | 15 | 15 |
| n | 16 | 16 | 16 | 16 | 16 | 16 | 16 | 16 | 16 | 16 | 16 | 16 | 16 | 16 | 16 | 15 |
| g | 17 | 17 | 17 | 17 | 17 | 17 | 17 | 17 | 17 | 17 | 17 | 17 | 17 | 17 | 17 | 16 |
| l | 18 | 18 | 18 | 18 | 18 | 18 | 18 | 18 | 18 | 18 | 18 | 18 | 18 | 18 | 17 | 17 |
| e | 19 | 19 | 19 | 19 | 19 | 19 | 19 | 19 | 19 | 19 | 19 | 19 | 19 | 19 | 18 | 18 |
|   | 20 | 20 | 20 | 20 | 20 | 20 | 20 | 20 | 20 | 20 | 20 | 20 | 20 | 20 | 19 | 19 |
| o | 21 | 21 | 21 | 21 | 21 | 21 | 21 | 21 | 21 | 21 | 21 | 21 | 21 | 21 | 20 | 20 |
| f | 22 | 22 | 22 | 22 | 22 | 22 | 22 | 22 | 22 | 22 | 22 | 22 | 22 | 21 | 21 | 21 |
|   | 23 | 23 | 23 | 23 | 23 | 23 | 23 | 23 | 23 | 23 | 23 | 23 | 23 | 22 | 22 | 22 |
| s | 24 | 24 | 24 | 24 | 24 | 24 | 24 | 24 | 24 | 24 | 24 | 24 | 24 | 23 | 23 | 23 |
| l | 25 | 25 | 25 | 25 | 25 | 25 | 25 | 25 | 25 | 25 | 25 | 25 | 25 | 24 | 24 | 24 |
| o | 26 | 26 | 26 | 26 | 26 | 26 | 26 | 26 | 26 | 26 | 26 | 26 | 26 | 25 | 25 | 25 |
| p | 27 | 27 | 27 | 27 | 27 | 27 | 27 | 27 | 27 | 27 | 27 | 27 | 26 | 26 | 26 | 26 |
| e | 28 | 28 | 28 | 28 | 28 | 28 | 28 | 28 | 28 | 28 | 28 | 28 | 27 | 27 | 27 | 27 |
|   | 29 | 29 | 29 | 29 | 29 | 29 | 29 | 29 | 29 | 29 | 29 | 29 | 28 | 28 | 28 | 28 |
|   | 30 | 30 | 30 | 30 | 30 | 30 | 30 | 30 | 30 | 30 | 30 | 30 | 29 | 29 | 29 | 29 |
|   | 31 | 31 | 31 | 31 | 31 | 31 | 31 | 31 | 31 | 31 | 31 | 31 | 30 | 30 | 30 | 30 |
|   | 32 | 32 | 32 | 32 | 32 | 32 | 32 | 32 | 32 | 32 | 32 | 32 | 31 | 31 | 31 | 31 |
|   | 33 | 33 | 33 | 33 | 33 | 33 | 33 | 33 | 33 | 33 | 33 | 33 | 32 | 32 | 32 | 32 |
|   | 34 | 34 | 34 | 34 | 34 | 34 | 34 | 34 | 34 | 34 | 34 | 34 | 33 | 33 | 33 | 33 |
|   | 35 | 35 | 35 | 35 | 35 | 35 | 35 | 35 | 35 | 35 | 35 | 35 | 34 | 34 | 34 | 34 |
|   | 36 | 36 | 36 | 36 | 36 | 36 | 36 | 36 | 36 | 36 | 36 | 35 | 35 | 35 | 35 | 35 |
|   | 37 | 37 | 37 | 37 | 37 | 37 | 37 | 37 | 37 | 37 | 37 | 36 | 36 | 36 | 36 | 36 |
|   | 38 | 38 | 38 | 38 | 38 | 38 | 38 | 38 | 38 | 38 | 38 | 37 | 37 | 37 | 37 | 37 |
|   | 39 | 39 | 39 | 39 | 39 | 39 | 39 | 39 | 39 | 39 | 39 | 38 | 38 | 38 | 38 | 38 |
|   | 40 | 40 | 40 | 40 | 40 | 40 | 40 | 40 | 40 | 40 | 40 | 39 | 39 | 39 | 39 | 39 |
|   | 41 | 41 | 41 | 41 | 41 | 41 | 41 | 41 | 41 | 41 | 41 | 40 | 40 | 40 | 40 | 40 |
|   | 42 | 42 | 42 | 42 | 42 | 42 | 42 | 42 | 42 | 42 | 42 | 41 | 41 | 41 | 41 | 41 |
|   | 43 | 43 | 43 | 43 | 43 | 43 | 43 | 43 | 43 | 43 | 43 | 42 | 42 | 42 | 42 | 42 |
|   | 44 | 44 | 44 | 44 | 44 | 44 | 44 | 44 | 44 | 44 | 44 | 43 | 43 | 43 | 43 | 43 |
|   | 45 | 45 | 45 | 45 | 45 | 45 | 45 | 45 | 45 | 45 | 45 | 44 | 44 | 44 | 44 | 44 |
|   | 46 | 46 | 46 | 46 | 46 | 46 | 46 | 46 | 46 | 46 | 46 | 45 | 45 | 45 | 45 | 45 |
|   | 47 | 47 | 47 | 47 | 47 | 47 | 47 | 47 | 47 | 47 | 47 | 46 | 46 | 46 | 46 | 46 |
|   | 48 | 48 | 48 | 48 | 48 | 48 | 48 | 48 | 48 | 48 | 48 | 47 | 47 | 47 | 47 | 47 |
|   | 49 | 49 | 49 | 49 | 49 | 49 | 49 | 49 | 49 | 49 | 49 | 48 | 48 | 48 | 48 | 48 |
|   | 50 | 50 | 50 | 50 | 50 | 50 | 50 | 50 | 50 | 50 | 50 | 49 | 49 | 49 | 49 | 49 |
|   | 51 | 51 | 51 | 51 | 51 | 51 | 51 | 51 | 51 | 51 | 51 | 50 | 50 | 50 | 50 | 50 |
|   | 52 | 52 | 52 | 52 | 52 | 52 | 52 | 52 | 52 | 52 | 52 | 51 | 51 | 51 | 51 | 51 |
|   | 53 | 53 | 53 | 53 | 53 | 53 | 53 | 53 | 53 | 53 | 53 | 52 | 52 | 52 | 52 | 52 |
|   | 54 | 54 | 54 | 54 | 54 | 54 | 54 | 54 | 54 | 54 | 54 | 53 | 53 | 53 | 53 | 53 |
|   | 55 | 55 | 55 | 55 | 55 | 55 | 55 | 55 | 55 | 55 | 55 | 54 | 54 | 54 | 54 | 54 |

FIG. 8a1

| | | Angle of approach | | | | | | | | | | | | | | |
|---|---|---|---|---|---|---|---|---|---|---|---|---|---|---|---|---|
| | | | 16 | 17 | 18 | 19 | 20 | 21 | 22 | 23 | 24 | 25 | 26 | 27 | 28 | 29 | 30 |
| A | 15 | | 14 | 14 | 14 | 14 | 14 | 14 | 14 | 14 | 14 | 14 | 14 | 13 | 13 | 13 | 13 |
| n | 16 | | 15 | 15 | 15 | 15 | 15 | 15 | 15 | 15 | 15 | 15 | 14 | 14 | 14 | 14 | 14 |
| g | 17 | | 16 | 16 | 16 | 16 | 16 | 16 | 16 | 16 | 16 | 15 | 15 | 15 | 15 | 15 | 15 |
| l | 18 | | 17 | 17 | 17 | 17 | 17 | 17 | 17 | 17 | 17 | 16 | 16 | 16 | 16 | 16 | 16 |
| e | 19 | | 18 | 18 | 18 | 18 | 18 | 18 | 18 | 18 | 17 | 17 | 17 | 17 | 17 | 17 | 17 |
| | 20 | | 19 | 19 | 19 | 19 | 19 | 19 | 19 | 19 | 18 | 18 | 18 | 18 | 18 | 18 | 17 |
| o | 21 | | 20 | 20 | 20 | 20 | 20 | 20 | 20 | 19 | 19 | 19 | 19 | 19 | 19 | 19 | 18 |
| f | 22 | | 21 | 21 | 21 | 21 | 21 | 21 | 21 | 20 | 20 | 20 | 20 | 20 | 20 | 19 | 19 |
| | 23 | | 22 | 22 | 22 | 22 | 22 | 22 | 21 | 21 | 21 | 21 | 21 | 21 | 21 | 20 | 20 |
| s | 24 | | 23 | 23 | 23 | 23 | 23 | 23 | 22 | 22 | 22 | 22 | 22 | 22 | 21 | 21 | 21 |
| l | 25 | | 24 | 24 | 24 | 24 | 24 | 24 | 23 | 23 | 23 | 23 | 23 | 23 | 22 | 22 | 22 |
| o | 26 | | 25 | 25 | 25 | 25 | 25 | 24 | 24 | 24 | 24 | 24 | 24 | 23 | 23 | 23 | 23 |
| p | 27 | | 26 | 26 | 26 | 26 | 26 | 25 | 25 | 25 | 25 | 25 | 25 | 24 | 24 | 24 | 24 |
| e | 28 | | 27 | 27 | 27 | 27 | 27 | 26 | 26 | 26 | 26 | 26 | 26 | 25 | 25 | 25 | 25 |
| | 29 | | 28 | 28 | 28 | 28 | 28 | 27 | 27 | 27 | 27 | 27 | 26 | 26 | 26 | 26 | 26 |
| | 30 | | 29 | 29 | 29 | 29 | 28 | 28 | 28 | 28 | 28 | 28 | 27 | 27 | 27 | 27 | 27 |
| | 31 | | 30 | 30 | 30 | 30 | 29 | 29 | 29 | 29 | 29 | 29 | 28 | 28 | 28 | 28 | 27 |
| | 32 | | 31 | 31 | 31 | 31 | 30 | 30 | 30 | 30 | 30 | 30 | 29 | 29 | 29 | 29 | 28 |
| | 33 | | 32 | 32 | 32 | 32 | 31 | 31 | 31 | 31 | 31 | 30 | 30 | 30 | 30 | 30 | 29 |
| | 34 | | 33 | 33 | 33 | 33 | 32 | 32 | 32 | 32 | 32 | 31 | 31 | 31 | 31 | 31 | 30 |
| | 35 | | 34 | 34 | 34 | 34 | 33 | 33 | 33 | 33 | 33 | 32 | 32 | 32 | 32 | 31 | 31 |
| | 36 | | 35 | 35 | 35 | 34 | 34 | 34 | 34 | 34 | 34 | 33 | 33 | 33 | 33 | 32 | 32 |
| | 37 | | 36 | 36 | 36 | 35 | 35 | 35 | 35 | 35 | 35 | 34 | 34 | 34 | 34 | 33 | 33 |
| | 38 | | 37 | 37 | 37 | 36 | 36 | 36 | 36 | 36 | 36 | 35 | 35 | 35 | 35 | 34 | 34 |
| | 39 | | 38 | 38 | 38 | 37 | 37 | 37 | 37 | 37 | 36 | 36 | 36 | 36 | 36 | 35 | 35 |
| | 40 | | 39 | 39 | 39 | 38 | 38 | 38 | 38 | 38 | 37 | 37 | 37 | 37 | 37 | 36 | 36 |
| | 41 | | 40 | 40 | 40 | 39 | 39 | 39 | 39 | 39 | 38 | 38 | 38 | 38 | 38 | 37 | 37 |
| | 42 | | 41 | 41 | 41 | 40 | 40 | 40 | 40 | 40 | 39 | 39 | 39 | 39 | 38 | 38 | 38 |
| | 43 | | 42 | 42 | 42 | 41 | 41 | 41 | 41 | 41 | 40 | 40 | 40 | 40 | 39 | 39 | 39 |
| | 44 | | 43 | 43 | 43 | 42 | 42 | 42 | 42 | 42 | 41 | 41 | 41 | 41 | 40 | 40 | 40 |
| | 45 | | 44 | 44 | 44 | 43 | 43 | 43 | 43 | 43 | 42 | 42 | 42 | 42 | 41 | 41 | 41 |
| | 46 | | 45 | 45 | 45 | 44 | 44 | 44 | 44 | 43 | 43 | 43 | 43 | 43 | 42 | 42 | 42 |
| | 47 | | 46 | 46 | 46 | 45 | 45 | 45 | 45 | 44 | 44 | 44 | 44 | 43 | 43 | 43 | 43 |
| | 48 | | 47 | 47 | 47 | 46 | 46 | 46 | 46 | 45 | 45 | 45 | 45 | 44 | 44 | 44 | 44 |
| | 49 | | 48 | 48 | 48 | 47 | 47 | 47 | 47 | 46 | 46 | 46 | 46 | 45 | 45 | 45 | 45 |
| | 50 | | 49 | 49 | 49 | 48 | 48 | 48 | 48 | 47 | 47 | 47 | 47 | 46 | 46 | 46 | 46 |
| | 51 | | 50 | 50 | 50 | 49 | 49 | 49 | 49 | 48 | 48 | 48 | 48 | 47 | 47 | 47 | 47 |
| | 52 | | 51 | 51 | 51 | 50 | 50 | 50 | 50 | 50 | 49 | 49 | 49 | 49 | 48 | 48 | 48 |
| | 53 | | 52 | 52 | 52 | 51 | 51 | 51 | 51 | 50 | 50 | 50 | 50 | 50 | 49 | 49 | 49 |
| | 54 | | 53 | 53 | 53 | 52 | 52 | 52 | 52 | 52 | 51 | 51 | 51 | 51 | 50 | 50 | 50 |
| | 55 | | 54 | 54 | 54 | 53 | 53 | 53 | 53 | 53 | 52 | 52 | 52 | 52 | 51 | 51 | 51 |

FIG. 8a2

|   | Angle of approach | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|
| A | 15 | 13 | 13 | 13 | 13 | 12 | 12 | 12 | 12 | 12 | 12 | 11 | 11 | 11 | 11 | 11 |
| n | 16 | 14 | 14 | 14 | 13 | 13 | 13 | 13 | 13 | 13 | 12 | 12 | 12 | 12 | 12 | 11 |
| g | 17 | 15 | 15 | 14 | 14 | 14 | 14 | 14 | 14 | 13 | 13 | 13 | 13 | 13 | 12 | 12 |
| l | 18 | 16 | 15 | 15 | 15 | 15 | 15 | 15 | 14 | 14 | 14 | 14 | 14 | 13 | 13 | 13 |
| e | 19 | 16 | 16 | 16 | 16 | 16 | 16 | 15 | 15 | 15 | 15 | 15 | 14 | 14 | 14 | 14 |
|   | 20 | 17 | 17 | 17 | 17 | 17 | 16 | 16 | 16 | 16 | 16 | 15 | 15 | 15 | 15 | 14 |
| o | 21 | 18 | 18 | 18 | 18 | 17 | 17 | 17 | 17 | 17 | 16 | 16 | 16 | 16 | 15 | 15 |
| f | 22 | 19 | 19 | 19 | 19 | 18 | 18 | 18 | 18 | 17 | 17 | 17 | 17 | 16 | 16 | 16 |
|   | 23 | 20 | 20 | 20 | 19 | 19 | 19 | 19 | 18 | 18 | 18 | 18 | 18 | 17 | 17 | 17 |
| s | 24 | 21 | 21 | 20 | 20 | 20 | 20 | 20 | 19 | 19 | 19 | 19 | 18 | 18 | 18 | 17 |
| l | 25 | 22 | 22 | 21 | 21 | 21 | 21 | 20 | 20 | 20 | 20 | 19 | 19 | 19 | 19 | 18 |
| o | 26 | 23 | 22 | 22 | 22 | 22 | 22 | 21 | 21 | 21 | 20 | 20 | 20 | 20 | 19 | 19 |
| p | 27 | 24 | 23 | 23 | 23 | 23 | 22 | 22 | 22 | 22 | 21 | 21 | 21 | 20 | 20 | 20 |
| e | 28 | 25 | 24 | 24 | 24 | 24 | 23 | 23 | 23 | 22 | 22 | 22 | 22 | 21 | 21 | 21 |
|   | 29 | 25 | 25 | 25 | 25 | 24 | 24 | 24 | 24 | 23 | 23 | 23 | 22 | 22 | 22 | 21 |
|   | 30 | 26 | 26 | 26 | 26 | 25 | 25 | 25 | 24 | 24 | 24 | 24 | 23 | 23 | 23 | 22 |
|   | 31 | 27 | 27 | 27 | 26 | 26 | 26 | 26 | 25 | 25 | 25 | 24 | 24 | 24 | 23 | 23 |
|   | 32 | 28 | 28 | 28 | 27 | 27 | 27 | 27 | 26 | 26 | 26 | 25 | 25 | 25 | 24 | 24 |
|   | 33 | 29 | 29 | 29 | 28 | 28 | 28 | 27 | 27 | 27 | 26 | 26 | 26 | 25 | 25 | 25 |
|   | 34 | 30 | 30 | 29 | 29 | 29 | 29 | 28 | 28 | 28 | 27 | 27 | 27 | 26 | 26 | 25 |
|   | 35 | 31 | 31 | 30 | 30 | 30 | 30 | 29 | 29 | 29 | 28 | 28 | 27 | 27 | 27 | 26 |
|   | 36 | 32 | 32 | 31 | 31 | 31 | 30 | 30 | 30 | 29 | 29 | 29 | 28 | 28 | 28 | 27 |
|   | 37 | 33 | 33 | 32 | 32 | 32 | 31 | 31 | 31 | 30 | 30 | 30 | 29 | 29 | 28 | 28 |
|   | 38 | 34 | 34 | 33 | 33 | 33 | 32 | 32 | 32 | 31 | 31 | 31 | 30 | 30 | 29 | 29 |
|   | 39 | 35 | 34 | 34 | 34 | 34 | 33 | 33 | 33 | 32 | 32 | 31 | 31 | 31 | 30 | 30 |
|   | 40 | 36 | 35 | 35 | 35 | 35 | 34 | 34 | 33 | 33 | 33 | 32 | 32 | 32 | 31 | 31 |
|   | 41 | 37 | 36 | 36 | 36 | 35 | 35 | 35 | 34 | 34 | 34 | 33 | 33 | 32 | 32 | 32 |
|   | 42 | 38 | 37 | 37 | 37 | 36 | 36 | 36 | 35 | 35 | 35 | 34 | 34 | 33 | 33 | 32 |
|   | 43 | 39 | 38 | 38 | 38 | 37 | 37 | 37 | 36 | 36 | 36 | 35 | 35 | 34 | 34 | 33 |
|   | 44 | 40 | 39 | 39 | 39 | 38 | 38 | 38 | 37 | 37 | 36 | 36 | 36 | 35 | 35 | 34 |
|   | 45 | 41 | 40 | 40 | 40 | 39 | 39 | 39 | 38 | 38 | 37 | 37 | 37 | 36 | 36 | 35 |
|   | 46 | 42 | 41 | 41 | 41 | 40 | 40 | 40 | 39 | 39 | 38 | 38 | 38 | 37 | 37 | 36 |
|   | 47 | 43 | 42 | 42 | 42 | 41 | 41 | 41 | 40 | 40 | 39 | 39 | 39 | 38 | 38 | 37 |
|   | 48 | 44 | 43 | 43 | 43 | 42 | 42 | 42 | 41 | 41 | 40 | 40 | 40 | 39 | 39 | 38 |
|   | 49 | 45 | 44 | 44 | 44 | 43 | 43 | 43 | 42 | 42 | 41 | 41 | 41 | 40 | 40 | 39 |
|   | 50 | 46 | 45 | 45 | 45 | 44 | 44 | 44 | 43 | 43 | 42 | 42 | 42 | 41 | 41 | 40 |
|   | 51 | 47 | 46 | 46 | 46 | 45 | 45 | 45 | 44 | 44 | 43 | 43 | 43 | 42 | 42 | 41 |
|   | 52 | 48 | 47 | 47 | 47 | 46 | 46 | 46 | 45 | 45 | 44 | 44 | 44 | 43 | 43 | 42 |
|   | 53 | 49 | 48 | 48 | 48 | 47 | 47 | 47 | 46 | 46 | 45 | 45 | 45 | 44 | 44 | 43 |
|   | 54 | 50 | 49 | 49 | 49 | 48 | 48 | 48 | 47 | 47 | 47 | 46 | 46 | 45 | 45 | 44 |
|   | 55 | 51 | 50 | 50 | 50 | 49 | 49 | 49 | 48 | 48 | 48 | 47 | 47 | 46 | 46 | 45 |

FIG. 8a3

|   | Angle of approach | | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|
| A | 15 | | 11 | 10 | 10 | 10 | 10 | 10 | 9 | 9 | 9 | 9 | 9 | 8 | 8 | 8 | 8 |
| n | 16 | | 11 | 11 | 11 | 11 | 10 | 10 | 10 | 10 | 10 | 9 | 9 | 9 | 9 | 8 | 8 |
| g | 17 | | 12 | 12 | 12 | 11 | 11 | 11 | 11 | 10 | 10 | 10 | 10 | 9 | 9 | 9 | 9 |
| l | 18 | | 13 | 12 | 12 | 12 | 12 | 12 | 11 | 11 | 11 | 11 | 10 | 10 | 10 | 10 | 9 |
| e | 19 | | 13 | 13 | 13 | 13 | 12 | 12 | 12 | 12 | 11 | 11 | 11 | 11 | 10 | 10 | 10 |
|   | 20 | | 14 | 14 | 14 | 13 | 13 | 13 | 13 | 12 | 12 | 12 | 12 | 11 | 11 | 11 | 10 |
| o | 21 | | 15 | 15 | 14 | 14 | 14 | 14 | 13 | 13 | 13 | 12 | 12 | 12 | 11 | 11 | 11 |
| f | 22 | | 16 | 15 | 15 | 15 | 15 | 14 | 14 | 14 | 13 | 13 | 13 | 12 | 12 | 12 | 11 |
|   | 23 | | 16 | 16 | 16 | 16 | 15 | 15 | 15 | 14 | 14 | 14 | 13 | 13 | 13 | 12 | 12 |
| s | 24 | | 17 | 17 | 17 | 16 | 16 | 16 | 15 | 15 | 15 | 14 | 14 | 14 | 13 | 13 | 13 |
| l | 25 | | 18 | 18 | 17 | 17 | 17 | 16 | 16 | 16 | 15 | 15 | 15 | 14 | 14 | 14 | 13 |
| o | 26 | | 19 | 18 | 18 | 18 | 17 | 17 | 17 | 16 | 16 | 16 | 15 | 15 | 14 | 14 | 14 |
| p | 27 | | 19 | 19 | 19 | 18 | 18 | 18 | 17 | 17 | 17 | 16 | 16 | 16 | 15 | 15 | 14 |
| e | 28 | | 20 | 20 | 20 | 19 | 19 | 19 | 18 | 18 | 17 | 17 | 17 | 16 | 16 | 15 | 15 |
|   | 29 | | 21 | 21 | 20 | 20 | 20 | 19 | 19 | 18 | 18 | 18 | 17 | 17 | 16 | 16 | 15 |
|   | 30 | | 22 | 21 | 21 | 21 | 20 | 20 | 20 | 19 | 19 | 18 | 18 | 17 | 17 | 17 | 16 |
|   | 31 | | 23 | 22 | 22 | 22 | 21 | 21 | 20 | 20 | 19 | 19 | 19 | 18 | 18 | 17 | 17 |
|   | 32 | | 23 | 23 | 23 | 22 | 22 | 21 | 21 | 21 | 20 | 20 | 19 | 19 | 18 | 18 | 17 |
|   | 33 | | 24 | 24 | 23 | 23 | 23 | 22 | 22 | 21 | 21 | 20 | 20 | 19 | 19 | 18 | 18 |
|   | 34 | | 25 | 25 | 24 | 24 | 23 | 23 | 23 | 22 | 22 | 21 | 21 | 20 | 20 | 19 | 19 |
|   | 35 | | 26 | 26 | 25 | 25 | 24 | 24 | 23 | 23 | 22 | 22 | 21 | 21 | 20 | 20 | 19 |
|   | 36 | | 27 | 26 | 26 | 25 | 25 | 25 | 24 | 24 | 23 | 23 | 22 | 22 | 21 | 21 | 20 |
|   | 37 | | 28 | 27 | 27 | 26 | 26 | 25 | 25 | 24 | 24 | 23 | 23 | 22 | 22 | 21 | 21 |
|   | 38 | | 28 | 28 | 28 | 27 | 27 | 26 | 26 | 25 | 25 | 24 | 24 | 23 | 22 | 22 | 21 |
|   | 39 | | 29 | 29 | 28 | 28 | 27 | 27 | 26 | 26 | 25 | 25 | 24 | 24 | 23 | 23 | 22 |
|   | 40 | | 30 | 30 | 29 | 29 | 28 | 28 | 27 | 27 | 26 | 26 | 25 | 25 | 24 | 23 | 23 |
|   | 41 | | 31 | 31 | 30 | 30 | 29 | 29 | 28 | 28 | 27 | 27 | 26 | 25 | 25 | 24 | 23 |
|   | 42 | | 32 | 32 | 31 | 31 | 30 | 30 | 29 | 28 | 28 | 27 | 27 | 26 | 26 | 25 | 24 |
|   | 43 | | 33 | 32 | 32 | 31 | 31 | 30 | 30 | 29 | 29 | 28 | 28 | 27 | 26 | 26 | 25 |
|   | 44 | | 34 | 33 | 33 | 32 | 32 | 31 | 31 | 30 | 30 | 29 | 28 | 28 | 27 | 26 | 26 |
|   | 45 | | 35 | 34 | 34 | 33 | 33 | 32 | 32 | 31 | 30 | 30 | 29 | 29 | 28 | 27 | 27 |
|   | 46 | | 36 | 35 | 35 | 34 | 34 | 33 | 33 | 32 | 31 | 31 | 30 | 29 | 29 | 28 | 27 |
|   | 47 | | 37 | 36 | 36 | 35 | 35 | 34 | 33 | 33 | 32 | 32 | 31 | 30 | 30 | 29 | 28 |
|   | 48 | | 38 | 37 | 37 | 36 | 36 | 35 | 34 | 34 | 33 | 32 | 32 | 31 | 30 | 30 | 29 |
|   | 49 | | 39 | 38 | 38 | 37 | 36 | 36 | 35 | 35 | 34 | 33 | 33 | 32 | 31 | 31 | 30 |
|   | 50 | | 40 | 39 | 39 | 38 | 37 | 37 | 36 | 36 | 35 | 34 | 34 | 33 | 32 | 32 | 31 |
|   | 51 | | 41 | 40 | 40 | 39 | 38 | 38 | 37 | 37 | 36 | 35 | 35 | 34 | 33 | 32 | 32 |
|   | 52 | | 42 | 41 | 41 | 40 | 39 | 39 | 38 | 38 | 37 | 36 | 36 | 35 | 34 | 33 | 33 |
|   | 53 | | 43 | 42 | 42 | 41 | 40 | 40 | 39 | 39 | 38 | 37 | 37 | 36 | 35 | 34 | 34 |
|   | 54 | | 44 | 43 | 43 | 42 | 41 | 41 | 40 | 40 | 39 | 38 | 38 | 37 | 36 | 35 | 35 |
|   | 55 | | 45 | 44 | 44 | 43 | 43 | 42 | 41 | 41 | 40 | 39 | 39 | 38 | 37 | 36 | 36 |

FIG. 8a4

| | Angle of approach | | | | | | | | | | | | | | | |
|---|---|---|---|---|---|---|---|---|---|---|---|---|---|---|---|---|
| | | 61 | 62 | 63 | 64 | 65 | 66 | 67 | 68 | 69 | 70 | 71 | 72 | 73 | 74 | 75 |
| A | 15 | 7 | 7 | 7 | 7 | 6 | 6 | 6 | 6 | 5 | 5 | 5 | 5 | 4 | 4 | 4 |
| n | 16 | 8 | 8 | 7 | 7 | 7 | 7 | 6 | 6 | 6 | 6 | 5 | 5 | 5 | 5 | 4 |
| g | 17 | 8 | 8 | 8 | 8 | 7 | 7 | 7 | 7 | 6 | 6 | 6 | 5 | 5 | 5 | 5 |
| l | 18 | 9 | 9 | 8 | 8 | 8 | 8 | 7 | 7 | 7 | 6 | 6 | 6 | 5 | 5 | 5 |
| e | 19 | 9 | 9 | 9 | 9 | 8 | 8 | 8 | 7 | 7 | 7 | 6 | 6 | 6 | 5 | 5 |
| | 20 | 10 | 10 | 9 | 9 | 9 | 8 | 8 | 8 | 7 | 7 | 7 | 6 | 6 | 6 | 5 |
| o | 21 | 11 | 10 | 10 | 10 | 9 | 9 | 9 | 8 | 8 | 7 | 7 | 7 | 6 | 6 | 6 |
| f | 22 | 11 | 11 | 10 | 10 | 10 | 9 | 9 | 9 | 8 | 8 | 7 | 7 | 7 | 6 | 6 |
| | 23 | 12 | 11 | 11 | 11 | 10 | 10 | 9 | 9 | 9 | 8 | 8 | 7 | 7 | 7 | 6 |
| s | 24 | 12 | 12 | 11 | 11 | 11 | 10 | 10 | 9 | 9 | 9 | 8 | 8 | 7 | 7 | 7 |
| l | 25 | 13 | 12 | 12 | 12 | 11 | 11 | 10 | 10 | 9 | 9 | 9 | 8 | 8 | 7 | 7 |
| o | 26 | 13 | 13 | 12 | 12 | 12 | 11 | 11 | 10 | 10 | 9 | 9 | 9 | 8 | 8 | 7 |
| p | 27 | 14 | 13 | 13 | 13 | 12 | 12 | 11 | 11 | 10 | 10 | 9 | 9 | 8 | 8 | 8 |
| e | 28 | 14 | 14 | 14 | 13 | 13 | 12 | 12 | 11 | 11 | 10 | 10 | 9 | 9 | 8 | 8 |
| | 29 | 15 | 15 | 14 | 14 | 13 | 13 | 12 | 12 | 11 | 11 | 10 | 10 | 9 | 9 | 8 |
| | 30 | 16 | 15 | 15 | 14 | 14 | 13 | 13 | 12 | 12 | 11 | 11 | 10 | 10 | 9 | 8 |
| | 31 | 16 | 16 | 15 | 15 | 14 | 14 | 13 | 13 | 12 | 12 | 11 | 11 | 10 | 9 | 9 |
| | 32 | 17 | 16 | 16 | 15 | 15 | 14 | 14 | 13 | 13 | 12 | 11 | 11 | 10 | 10 | 9 |
| | 33 | 17 | 17 | 16 | 16 | 15 | 15 | 14 | 14 | 13 | 13 | 12 | 11 | 11 | 10 | 10 |
| | 34 | 18 | 18 | 17 | 16 | 16 | 15 | 15 | 14 | 14 | 13 | 12 | 12 | 11 | 11 | 10 |
| | 35 | 19 | 18 | 18 | 17 | 16 | 16 | 15 | 15 | 14 | 13 | 13 | 12 | 12 | 11 | 10 |
| | 36 | 19 | 19 | 18 | 18 | 17 | 16 | 16 | 15 | 15 | 14 | 13 | 13 | 12 | 11 | 11 |
| | 37 | 20 | 19 | 19 | 18 | 18 | 17 | 16 | 16 | 15 | 14 | 14 | 13 | 12 | 12 | 11 |
| | 38 | 21 | 20 | 20 | 19 | 18 | 18 | 17 | 16 | 16 | 15 | 14 | 14 | 13 | 12 | 11 |
| | 39 | 21 | 21 | 20 | 20 | 19 | 18 | 18 | 17 | 16 | 15 | 15 | 14 | 13 | 13 | 12 |
| | 40 | 22 | 22 | 21 | 20 | 20 | 19 | 18 | 17 | 17 | 16 | 15 | 15 | 14 | 13 | 12 |
| | 41 | 23 | 22 | 22 | 21 | 20 | 19 | 19 | 18 | 17 | 17 | 16 | 15 | 14 | 13 | 13 |
| | 42 | 24 | 23 | 22 | 22 | 21 | 20 | 19 | 19 | 18 | 17 | 16 | 16 | 15 | 14 | 13 |
| | 43 | 24 | 24 | 23 | 22 | 22 | 21 | 20 | 19 | 18 | 18 | 17 | 16 | 15 | 14 | 14 |
| | 44 | 25 | 24 | 24 | 23 | 22 | 21 | 21 | 20 | 19 | 18 | 17 | 17 | 16 | 15 | 14 |
| | 45 | 26 | 25 | 24 | 24 | 23 | 22 | 21 | 21 | 20 | 19 | 18 | 17 | 16 | 15 | 15 |
| | 46 | 27 | 26 | 25 | 24 | 24 | 23 | 22 | 21 | 20 | 20 | 19 | 18 | 17 | 16 | 15 |
| | 47 | 27 | 27 | 26 | 25 | 24 | 24 | 23 | 22 | 21 | 20 | 19 | 18 | 17 | 16 | 16 |
| | 48 | 28 | 28 | 27 | 26 | 25 | 24 | 23 | 23 | 22 | 21 | 20 | 19 | 18 | 17 | 16 |
| | 49 | 29 | 28 | 28 | 27 | 26 | 25 | 24 | 23 | 22 | 21 | 21 | 20 | 19 | 18 | 17 |
| | 50 | 30 | 29 | 28 | 28 | 27 | 26 | 25 | 24 | 23 | 22 | 21 | 20 | 19 | 18 | 17 |
| | 51 | 31 | 30 | 29 | 28 | 28 | 27 | 26 | 25 | 24 | 23 | 22 | 21 | 20 | 19 | 18 |
| | 52 | 32 | 31 | 30 | 29 | 28 | 28 | 27 | 26 | 25 | 24 | 23 | 22 | 21 | 19 | 18 |
| | 53 | 33 | 32 | 31 | 30 | 29 | 28 | 27 | 26 | 25 | 24 | 23 | 22 | 21 | 20 | 19 |
| | 54 | 34 | 33 | 32 | 31 | 30 | 29 | 28 | 27 | 26 | 25 | 24 | 23 | 22 | 21 | 20 |
| | 55 | 35 | 34 | 33 | 32 | 31 | 30 | 29 | 28 | 27 | 26 | 25 | 24 | 23 | 21 | 20 |

FIG. 8a5

|   |   | Angle of approach |   |   |   |   |   |   |   |   |   |   |   |   |   |
|---|---|---|---|---|---|---|---|---|---|---|---|---|---|---|---|
|   |   |   | 76 | 77 | 78 | 79 | 80 | 81 | 82 | 83 | 84 | 85 | 86 | 87 | 88 | 89 |
| A | 15 |   | 4 | 3 | 3 | 3 | 3 | 2 | 2 | 2 | 2 | 1 | 1 | 1 | 1 | 0 |
| n | 16 |   | 4 | 4 | 3 | 3 | 3 | 3 | 2 | 2 | 2 | 1 | 1 | 1 | 1 | 0 |
| g | 17 |   | 4 | 4 | 4 | 3 | 3 | 3 | 2 | 2 | 2 | 2 | 1 | 1 | 1 | 0 |
| l | 18 |   | 4 | 4 | 4 | 4 | 3 | 3 | 3 | 2 | 2 | 2 | 1 | 1 | 1 | 0 |
| e | 19 |   | 5 | 4 | 4 | 4 | 3 | 3 | 3 | 2 | 2 | 2 | 1 | 1 | 1 | 0 |
|   | 20 |   | 5 | 5 | 4 | 4 | 4 | 3 | 3 | 3 | 2 | 2 | 1 | 1 | 1 | 0 |
| o | 21 |   | 5 | 5 | 5 | 4 | 4 | 3 | 3 | 3 | 2 | 2 | 2 | 1 | 1 | 0 |
| f | 22 |   | 6 | 5 | 5 | 4 | 4 | 4 | 3 | 3 | 2 | 2 | 2 | 1 | 1 | 0 |
|   | 23 |   | 6 | 5 | 5 | 5 | 4 | 4 | 3 | 3 | 3 | 2 | 2 | 1 | 1 | 0 |
| s | 24 |   | 6 | 6 | 5 | 5 | 4 | 4 | 4 | 3 | 3 | 2 | 2 | 1 | 1 | 0 |
| l | 25 |   | 6 | 6 | 6 | 5 | 5 | 4 | 4 | 3 | 3 | 2 | 2 | 1 | 1 | 0 |
| o | 26 |   | 7 | 6 | 6 | 5 | 5 | 4 | 4 | 3 | 3 | 2 | 2 | 1 | 1 | 0 |
| p | 27 |   | 7 | 7 | 6 | 6 | 5 | 5 | 4 | 4 | 3 | 3 | 2 | 2 | 1 | 1 |
| e | 28 |   | 7 | 7 | 6 | 6 | 5 | 5 | 4 | 4 | 3 | 3 | 2 | 2 | 1 | 1 |
|   | 29 |   | 8 | 7 | 7 | 6 | 5 | 5 | 4 | 4 | 3 | 3 | 2 | 2 | 1 | 1 |
|   | 30 |   | 8 | 7 | 7 | 6 | 6 | 5 | 5 | 4 | 3 | 3 | 2 | 2 | 1 | 1 |
|   | 31 |   | 8 | 8 | 7 | 7 | 6 | 5 | 5 | 4 | 4 | 3 | 2 | 2 | 1 | 1 |
|   | 32 |   | 9 | 8 | 7 | 7 | 6 | 6 | 5 | 4 | 4 | 3 | 2 | 2 | 1 | 1 |
|   | 33 |   | 9 | 8 | 8 | 7 | 6 | 6 | 5 | 5 | 4 | 3 | 3 | 2 | 1 | 1 |
|   | 34 |   | 9 | 9 | 8 | 7 | 7 | 6 | 5 | 5 | 4 | 3 | 3 | 2 | 1 | 1 |
|   | 35 |   | 10 | 9 | 8 | 8 | 7 | 6 | 6 | 5 | 4 | 3 | 3 | 2 | 1 | 1 |
|   | 36 |   | 10 | 9 | 9 | 8 | 7 | 6 | 6 | 5 | 4 | 4 | 3 | 2 | 1 | 1 |
|   | 37 |   | 10 | 10 | 9 | 8 | 7 | 7 | 6 | 5 | 5 | 4 | 3 | 2 | 2 | 1 |
|   | 38 |   | 11 | 10 | 9 | 8 | 8 | 7 | 6 | 5 | 5 | 4 | 3 | 2 | 2 | 1 |
|   | 39 |   | 11 | 10 | 10 | 9 | 8 | 7 | 6 | 6 | 5 | 4 | 3 | 2 | 2 | 1 |
|   | 40 |   | 11 | 11 | 10 | 9 | 8 | 7 | 7 | 6 | 5 | 4 | 3 | 3 | 2 | 1 |
|   | 41 |   | 12 | 11 | 10 | 9 | 9 | 8 | 7 | 6 | 5 | 4 | 3 | 3 | 2 | 1 |
|   | 42 |   | 12 | 11 | 11 | 10 | 9 | 8 | 7 | 6 | 5 | 4 | 4 | 3 | 2 | 1 |
|   | 43 |   | 13 | 12 | 11 | 10 | 9 | 8 | 7 | 6 | 6 | 5 | 4 | 3 | 2 | 1 |
|   | 44 |   | 13 | 12 | 11 | 10 | 10 | 9 | 8 | 7 | 6 | 5 | 4 | 3 | 2 | 1 |
|   | 45 |   | 14 | 13 | 12 | 11 | 10 | 9 | 8 | 7 | 6 | 5 | 4 | 3 | 2 | 1 |
|   | 46 |   | 14 | 13 | 12 | 11 | 10 | 9 | 8 | 7 | 6 | 5 | 4 | 3 | 2 | 1 |
|   | 47 |   | 15 | 14 | 13 | 12 | 11 | 10 | 8 | 7 | 6 | 5 | 4 | 3 | 2 | 1 |
|   | 48 |   | 15 | 14 | 13 | 12 | 11 | 10 | 9 | 8 | 7 | 6 | 4 | 3 | 2 | 1 |
|   | 49 |   | 16 | 15 | 13 | 12 | 11 | 10 | 9 | 8 | 7 | 6 | 5 | 3 | 2 | 1 |
|   | 50 |   | 16 | 15 | 14 | 13 | 12 | 11 | 9 | 8 | 7 | 6 | 5 | 4 | 2 | 1 |
|   | 51 |   | 17 | 16 | 14 | 13 | 12 | 11 | 10 | 9 | 7 | 6 | 5 | 4 | 2 | 1 |
|   | 52 |   | 17 | 16 | 15 | 14 | 13 | 11 | 10 | 9 | 8 | 6 | 5 | 4 | 3 | 1 |
|   | 53 |   | 18 | 17 | 15 | 14 | 13 | 12 | 10 | 9 | 8 | 7 | 5 | 4 | 3 | 1 |
|   | 54 |   | 18 | 17 | 16 | 15 | 13 | 12 | 11 | 10 | 8 | 7 | 5 | 4 | 3 | 1 |
|   | 55 |   | 19 | 18 | 17 | 15 | 14 | 13 | 11 | 10 | 8 | 7 | 6 | 4 | 3 | 1 |

FIG. 8a6

|   | Angle of approach | | | | | | | | | | | | | | |
|---|---|---|---|---|---|---|---|---|---|---|---|---|---|---|---|
|   |   | 91 | 92 | 93 | 94 | 95 | 96 | 97 | 98 | 99 | 100 | 101 | 102 | 103 | 104 | 105 |
| A | 15 | 0 | 1 | 1 | 1 | 1 | 2 | 2 | 2 | 2 | 3 | 3 | 3 | 3 | 4 | 4 |
| n | 16 | 0 | 1 | 1 | 1 | 1 | 2 | 2 | 2 | 3 | 3 | 3 | 3 | 4 | 4 | 4 |
| g | 17 | 0 | 1 | 1 | 1 | 2 | 2 | 2 | 2 | 3 | 3 | 3 | 4 | 4 | 4 | 5 |
| l | 18 | 0 | 1 | 1 | 1 | 2 | 2 | 2 | 3 | 3 | 3 | 4 | 4 | 4 | 4 | 5 |
| e | 19 | 0 | 1 | 1 | 1 | 2 | 2 | 2 | 3 | 3 | 3 | 4 | 4 | 4 | 5 | 5 |
|   | 20 | 0 | 1 | 1 | 1 | 2 | 2 | 3 | 3 | 3 | 4 | 4 | 4 | 5 | 5 | 5 |
| o | 21 | 0 | 1 | 1 | 2 | 2 | 2 | 3 | 3 | 3 | 4 | 4 | 5 | 5 | 5 | 6 |
| f | 22 | 0 | 1 | 1 | 2 | 2 | 2 | 3 | 3 | 4 | 4 | 4 | 5 | 5 | 6 | 6 |
|   | 23 | 0 | 1 | 1 | 2 | 2 | 3 | 3 | 3 | 4 | 4 | 5 | 5 | 5 | 6 | 6 |
| s | 24 | 0 | 1 | 1 | 2 | 2 | 3 | 3 | 4 | 4 | 4 | 5 | 5 | 6 | 6 | 7 |
| l | 25 | 0 | 1 | 1 | 2 | 2 | 3 | 3 | 4 | 4 | 5 | 5 | 6 | 6 | 6 | 7 |
| o | 26 | 0 | 1 | 1 | 2 | 2 | 3 | 3 | 4 | 4 | 5 | 5 | 6 | 6 | 7 | 7 |
| p | 27 | 1 | 1 | 2 | 2 | 3 | 3 | 4 | 4 | 5 | 5 | 6 | 6 | 7 | 7 | 8 |
| e | 28 | 1 | 1 | 2 | 2 | 3 | 3 | 4 | 4 | 5 | 5 | 6 | 6 | 7 | 7 | 8 |
|   | 29 | 1 | 1 | 2 | 2 | 3 | 3 | 4 | 4 | 5 | 5 | 6 | 7 | 7 | 8 | 8 |
|   | 30 | 1 | 1 | 2 | 2 | 3 | 3 | 4 | 5 | 5 | 6 | 6 | 7 | 7 | 8 | 8 |
|   | 31 | 1 | 1 | 2 | 2 | 3 | 4 | 4 | 5 | 5 | 6 | 7 | 7 | 8 | 8 | 9 |
|   | 32 | 1 | 1 | 2 | 2 | 3 | 4 | 4 | 5 | 6 | 6 | 7 | 7 | 8 | 9 | 9 |
|   | 33 | 1 | 1 | 2 | 3 | 3 | 4 | 5 | 5 | 6 | 6 | 7 | 8 | 8 | 9 | 10 |
|   | 34 | 1 | 1 | 2 | 3 | 3 | 4 | 5 | 5 | 6 | 7 | 7 | 8 | 9 | 9 | 10 |
|   | 35 | 1 | 1 | 2 | 3 | 3 | 4 | 5 | 6 | 6 | 7 | 8 | 8 | 9 | 10 | 10 |
|   | 36 | 1 | 1 | 2 | 3 | 4 | 4 | 5 | 6 | 6 | 7 | 8 | 9 | 9 | 10 | 11 |
|   | 37 | 1 | 2 | 2 | 3 | 4 | 5 | 5 | 6 | 7 | 7 | 8 | 9 | 10 | 10 | 11 |
|   | 38 | 1 | 2 | 2 | 3 | 4 | 5 | 5 | 6 | 7 | 8 | 8 | 9 | 10 | 11 | 11 |
|   | 39 | 1 | 2 | 2 | 3 | 4 | 5 | 6 | 6 | 7 | 8 | 9 | 10 | 10 | 11 | 12 |
|   | 40 | 1 | 2 | 3 | 3 | 4 | 5 | 6 | 7 | 7 | 8 | 9 | 10 | 11 | 11 | 12 |
|   | 41 | 1 | 2 | 3 | 3 | 4 | 5 | 6 | 7 | 8 | 9 | 9 | 10 | 11 | 12 | 13 |
|   | 42 | 1 | 2 | 3 | 4 | 4 | 5 | 6 | 7 | 8 | 9 | 10 | 11 | 11 | 12 | 13 |
|   | 43 | 1 | 2 | 3 | 4 | 5 | 6 | 6 | 7 | 8 | 9 | 10 | 11 | 12 | 13 | 14 |
|   | 44 | 1 | 2 | 3 | 4 | 5 | 6 | 7 | 8 | 9 | 10 | 10 | 11 | 12 | 13 | 14 |
|   | 45 | 1 | 2 | 3 | 4 | 5 | 6 | 7 | 8 | 9 | 10 | 11 | 12 | 13 | 14 | 15 |
|   | 46 | 1 | 2 | 3 | 4 | 5 | 6 | 7 | 8 | 9 | 10 | 11 | 12 | 13 | 14 | 15 |
|   | 47 | 1 | 2 | 3 | 4 | 5 | 6 | 7 | 8 | 10 | 11 | 12 | 13 | 14 | 15 | 16 |
|   | 48 | 1 | 2 | 3 | 4 | 6 | 7 | 8 | 9 | 10 | 11 | 12 | 13 | 14 | 15 | 16 |
|   | 49 | 1 | 2 | 3 | 5 | 6 | 7 | 8 | 9 | 10 | 11 | 12 | 13 | 15 | 16 | 17 |
|   | 50 | 1 | 2 | 4 | 5 | 6 | 7 | 8 | 9 | 11 | 12 | 13 | 14 | 15 | 16 | 17 |
|   | 51 | 1 | 2 | 4 | 5 | 6 | 7 | 9 | 10 | 11 | 12 | 13 | 14 | 16 | 17 | 18 |
|   | 52 | 1 | 3 | 4 | 5 | 6 | 8 | 9 | 10 | 11 | 13 | 14 | 15 | 16 | 17 | 18 |
|   | 53 | 1 | 3 | 4 | 5 | 7 | 8 | 9 | 10 | 12 | 13 | 14 | 15 | 17 | 18 | 19 |
|   | 54 | 1 | 3 | 4 | 5 | 7 | 8 | 10 | 11 | 12 | 13 | 15 | 16 | 17 | 18 | 20 |
|   | 55 | 1 | 3 | 4 | 6 | 7 | 8 | 10 | 11 | 13 | 14 | 15 | 17 | 18 | 19 | 20 |

FIG.8b1

|   |   | Angle of approach | | | | | | | | | | | | | | |
|---|---|---|---|---|---|---|---|---|---|---|---|---|---|---|---|
|   |   | 106 | 107 | 108 | 109 | 110 | 111 | 112 | 113 | 114 | 115 | 116 | 117 | 118 | 119 | 120 |
| A | 15 | 4 | 4 | 5 | 5 | 5 | 5 | 6 | 6 | 6 | 6 | 7 | 7 | 7 | 7 | 8 |
| n | 16 | 5 | 5 | 5 | 5 | 6 | 6 | 6 | 6 | 7 | 7 | 7 | 7 | 8 | 8 | 8 |
| g | 17 | 5 | 5 | 5 | 6 | 6 | 6 | 7 | 7 | 7 | 7 | 8 | 8 | 8 | 8 | 9 |
| l | 18 | 5 | 5 | 6 | 6 | 6 | 7 | 7 | 7 | 8 | 8 | 8 | 8 | 9 | 9 | 9 |
| e | 19 | 5 | 6 | 6 | 6 | 7 | 7 | 7 | 8 | 8 | 8 | 9 | 9 | 9 | 9 | 10 |
|   | 20 | 6 | 6 | 6 | 7 | 7 | 7 | 8 | 8 | 8 | 9 | 9 | 9 | 10 | 10 | 10 |
| o | 21 | 6 | 6 | 7 | 7 | 7 | 8 | 8 | 9 | 9 | 9 | 10 | 10 | 10 | 11 | 11 |
| f | 22 | 6 | 7 | 7 | 7 | 8 | 8 | 9 | 9 | 9 | 10 | 10 | 10 | 11 | 11 | 11 |
|   | 23 | 7 | 7 | 7 | 8 | 8 | 9 | 9 | 9 | 10 | 10 | 11 | 11 | 11 | 12 | 12 |
| s | 24 | 7 | 7 | 8 | 8 | 9 | 9 | 9 | 10 | 10 | 11 | 11 | 11 | 12 | 12 | 13 |
| l | 25 | 7 | 8 | 8 | 9 | 9 | 9 | 10 | 10 | 11 | 11 | 12 | 12 | 12 | 13 | 13 |
| o | 26 | 8 | 8 | 9 | 9 | 9 | 10 | 10 | 11 | 11 | 12 | 12 | 12 | 13 | 13 | 14 |
| p | 27 | 8 | 8 | 9 | 9 | 10 | 10 | 11 | 11 | 12 | 12 | 13 | 13 | 13 | 14 | 14 |
| e | 28 | 8 | 9 | 9 | 10 | 10 | 11 | 11 | 12 | 12 | 13 | 13 | 14 | 14 | 14 | 15 |
|   | 29 | 9 | 9 | 10 | 10 | 11 | 11 | 12 | 12 | 13 | 13 | 14 | 14 | 15 | 15 | 15 |
|   | 30 | 9 | 10 | 10 | 11 | 11 | 12 | 12 | 13 | 13 | 14 | 14 | 15 | 15 | 16 | 16 |
|   | 31 | 9 | 10 | 11 | 11 | 12 | 12 | 13 | 13 | 14 | 14 | 15 | 15 | 16 | 16 | 17 |
|   | 32 | 10 | 10 | 11 | 11 | 12 | 13 | 13 | 14 | 14 | 15 | 15 | 16 | 16 | 17 | 17 |
|   | 33 | 10 | 11 | 11 | 12 | 13 | 13 | 14 | 14 | 15 | 15 | 16 | 16 | 17 | 17 | 18 |
|   | 34 | 11 | 11 | 12 | 12 | 13 | 14 | 14 | 15 | 15 | 16 | 16 | 17 | 18 | 18 | 19 |
|   | 35 | 11 | 12 | 12 | 13 | 13 | 14 | 15 | 15 | 16 | 16 | 17 | 18 | 18 | 19 | 19 |
|   | 36 | 11 | 12 | 13 | 13 | 14 | 15 | 15 | 16 | 16 | 17 | 18 | 18 | 19 | 19 | 20 |
|   | 37 | 12 | 12 | 13 | 14 | 14 | 15 | 16 | 16 | 17 | 18 | 18 | 19 | 19 | 20 | 21 |
|   | 38 | 12 | 13 | 14 | 14 | 15 | 16 | 16 | 17 | 18 | 18 | 19 | 20 | 20 | 21 | 21 |
|   | 39 | 13 | 13 | 14 | 15 | 15 | 16 | 17 | 18 | 18 | 19 | 20 | 20 | 21 | 21 | 22 |
|   | 40 | 13 | 14 | 15 | 15 | 16 | 17 | 17 | 18 | 19 | 20 | 20 | 21 | 22 | 22 | 23 |
|   | 41 | 13 | 14 | 15 | 16 | 17 | 17 | 18 | 19 | 19 | 20 | 21 | 22 | 22 | 23 | 23 |
|   | 42 | 14 | 15 | 16 | 16 | 17 | 18 | 19 | 19 | 20 | 21 | 22 | 22 | 23 | 24 | 24 |
|   | 43 | 14 | 15 | 16 | 17 | 18 | 18 | 19 | 20 | 21 | 22 | 22 | 23 | 24 | 24 | 25 |
|   | 44 | 15 | 16 | 17 | 17 | 18 | 19 | 20 | 21 | 21 | 22 | 23 | 24 | 24 | 25 | 26 |
|   | 45 | 15 | 16 | 17 | 18 | 19 | 20 | 21 | 21 | 22 | 23 | 24 | 24 | 25 | 26 | 27 |
|   | 46 | 16 | 17 | 18 | 19 | 20 | 20 | 21 | 22 | 23 | 24 | 24 | 25 | 26 | 27 | 27 |
|   | 47 | 16 | 17 | 18 | 19 | 20 | 21 | 22 | 23 | 24 | 24 | 25 | 26 | 27 | 27 | 28 |
|   | 48 | 17 | 18 | 19 | 20 | 21 | 22 | 23 | 23 | 24 | 25 | 26 | 27 | 28 | 28 | 29 |
|   | 49 | 18 | 19 | 20 | 21 | 21 | 22 | 23 | 24 | 25 | 26 | 27 | 28 | 28 | 29 | 30 |
|   | 50 | 18 | 19 | 20 | 21 | 22 | 23 | 24 | 25 | 26 | 27 | 28 | 28 | 29 | 30 | 31 |
|   | 51 | 19 | 20 | 21 | 22 | 23 | 24 | 25 | 26 | 27 | 28 | 28 | 29 | 30 | 31 | 32 |
|   | 52 | 19 | 21 | 22 | 23 | 24 | 25 | 26 | 27 | 28 | 28 | 29 | 30 | 31 | 32 | 33 |
|   | 53 | 20 | 21 | 22 | 23 | 24 | 25 | 26 | 27 | 28 | 29 | 30 | 31 | 32 | 33 | 34 |
|   | 54 | 21 | 22 | 23 | 24 | 25 | 26 | 27 | 28 | 29 | 30 | 31 | 32 | 33 | 34 | 35 |
|   | 55 | 21 | 23 | 24 | 25 | 26 | 27 | 28 | 29 | 30 | 31 | 32 | 33 | 34 | 35 | 36 |

FIG. 8b2

|   | Angle of approach | 121 | 122 | 123 | 124 | 125 | 126 | 127 | 128 | 129 | 130 | 131 | 132 | 133 | 134 | 135 |
|---|---|---|---|---|---|---|---|---|---|---|---|---|---|---|---|---|
| A | 15 | 8 | 8 | 8 | 9 | 9 | 9 | 9 | 9 | 10 | 10 | 10 | 10 | 10 | 11 | 11 |
| n | 16 | 8 | 9 | 9 | 9 | 9 | 10 | 10 | 10 | 10 | 10 | 11 | 11 | 11 | 11 | 11 |
| g | 17 | 9 | 9 | 9 | 10 | 10 | 10 | 10 | 11 | 11 | 11 | 11 | 12 | 12 | 12 | 12 |
| l | 18 | 10 | 10 | 10 | 10 | 11 | 11 | 11 | 11 | 12 | 12 | 12 | 12 | 12 | 13 | 13 |
| e | 19 | 10 | 10 | 11 | 11 | 11 | 11 | 12 | 12 | 12 | 12 | 13 | 13 | 13 | 13 | 14 |
|   | 20 | 11 | 11 | 11 | 12 | 12 | 12 | 12 | 13 | 13 | 13 | 13 | 14 | 14 | 14 | 14 |
| o | 21 | 11 | 11 | 12 | 12 | 12 | 13 | 13 | 13 | 14 | 14 | 14 | 14 | 15 | 15 | 15 |
| f | 22 | 12 | 12 | 12 | 13 | 13 | 13 | 14 | 14 | 14 | 15 | 15 | 15 | 15 | 16 | 16 |
|   | 23 | 12 | 13 | 13 | 13 | 14 | 14 | 14 | 15 | 15 | 15 | 16 | 16 | 16 | 16 | 17 |
| s | 24 | 13 | 13 | 14 | 14 | 14 | 15 | 15 | 15 | 16 | 16 | 16 | 17 | 17 | 17 | 17 |
| l | 25 | 14 | 14 | 14 | 15 | 15 | 15 | 16 | 16 | 16 | 17 | 17 | 17 | 18 | 18 | 18 |
| o | 26 | 14 | 14 | 15 | 15 | 16 | 16 | 16 | 17 | 17 | 17 | 18 | 18 | 18 | 19 | 19 |
| p | 27 | 15 | 15 | 16 | 16 | 16 | 17 | 17 | 17 | 18 | 18 | 18 | 19 | 19 | 19 | 20 |
| e | 28 | 15 | 16 | 16 | 17 | 17 | 17 | 18 | 18 | 19 | 19 | 19 | 20 | 20 | 20 | 21 |
|   | 29 | 16 | 16 | 17 | 17 | 18 | 18 | 18 | 19 | 19 | 20 | 20 | 20 | 21 | 21 | 21 |
|   | 30 | 17 | 17 | 17 | 18 | 18 | 19 | 19 | 20 | 20 | 20 | 21 | 21 | 21 | 22 | 22 |
|   | 31 | 17 | 18 | 18 | 19 | 19 | 19 | 20 | 20 | 21 | 21 | 22 | 22 | 22 | 23 | 23 |
|   | 32 | 18 | 18 | 19 | 19 | 20 | 20 | 21 | 21 | 21 | 22 | 22 | 23 | 23 | 23 | 24 |
|   | 33 | 18 | 19 | 19 | 20 | 20 | 21 | 21 | 22 | 22 | 23 | 23 | 23 | 24 | 24 | 25 |
|   | 34 | 19 | 20 | 20 | 21 | 21 | 22 | 22 | 23 | 23 | 23 | 24 | 24 | 25 | 25 | 25 |
|   | 35 | 20 | 20 | 21 | 21 | 22 | 22 | 23 | 23 | 24 | 24 | 25 | 25 | 26 | 26 | 26 |
|   | 36 | 21 | 21 | 22 | 22 | 23 | 23 | 24 | 24 | 25 | 25 | 25 | 26 | 26 | 27 | 27 |
|   | 37 | 21 | 22 | 22 | 23 | 23 | 24 | 24 | 25 | 25 | 26 | 26 | 27 | 27 | 28 | 28 |
|   | 38 | 22 | 22 | 23 | 24 | 24 | 25 | 25 | 26 | 26 | 27 | 27 | 28 | 28 | 28 | 29 |
|   | 39 | 23 | 23 | 24 | 24 | 25 | 25 | 26 | 26 | 27 | 27 | 28 | 28 | 29 | 29 | 30 |
|   | 40 | 23 | 24 | 25 | 25 | 26 | 26 | 27 | 27 | 28 | 28 | 29 | 29 | 30 | 30 | 31 |
|   | 41 | 24 | 25 | 25 | 26 | 27 | 27 | 28 | 28 | 29 | 29 | 30 | 30 | 31 | 31 | 32 |
|   | 42 | 25 | 26 | 26 | 27 | 27 | 28 | 28 | 29 | 30 | 30 | 31 | 31 | 32 | 32 | 32 |
|   | 43 | 26 | 26 | 27 | 28 | 28 | 29 | 29 | 30 | 30 | 31 | 31 | 32 | 32 | 33 | 33 |
|   | 44 | 26 | 27 | 28 | 28 | 29 | 30 | 30 | 31 | 31 | 32 | 32 | 33 | 33 | 34 | 34 |
|   | 45 | 27 | 28 | 29 | 29 | 30 | 30 | 31 | 32 | 32 | 33 | 33 | 34 | 34 | 35 | 35 |
|   | 46 | 28 | 29 | 29 | 30 | 31 | 31 | 32 | 33 | 33 | 34 | 34 | 35 | 35 | 36 | 36 |
|   | 47 | 29 | 30 | 30 | 31 | 32 | 32 | 33 | 33 | 34 | 35 | 35 | 36 | 36 | 37 | 37 |
|   | 48 | 30 | 30 | 31 | 32 | 32 | 33 | 34 | 34 | 35 | 36 | 36 | 37 | 37 | 38 | 38 |
|   | 49 | 31 | 31 | 32 | 33 | 33 | 34 | 35 | 35 | 36 | 36 | 37 | 38 | 38 | 39 | 39 |
|   | 50 | 32 | 32 | 33 | 34 | 34 | 35 | 36 | 36 | 37 | 37 | 38 | 39 | 39 | 40 | 40 |
|   | 51 | 32 | 33 | 34 | 35 | 35 | 36 | 37 | 37 | 38 | 38 | 39 | 40 | 40 | 41 | 41 |
|   | 52 | 33 | 34 | 35 | 36 | 36 | 37 | 38 | 38 | 39 | 39 | 40 | 41 | 41 | 42 | 42 |
|   | 53 | 34 | 35 | 36 | 37 | 37 | 38 | 39 | 39 | 40 | 40 | 41 | 42 | 42 | 43 | 43 |
|   | 54 | 35 | 36 | 37 | 38 | 38 | 39 | 40 | 40 | 41 | 41 | 42 | 43 | 43 | 44 | 44 |
|   | 55 | 36 | 37 | 38 | 39 | 39 | 40 | 41 | 41 | 42 | 43 | 43 | 44 | 44 | 45 | 45 |

FIG. 8b3

| | Angle of approach | | | | | | | | | | | | | | | |
|---|---|---|---|---|---|---|---|---|---|---|---|---|---|---|---|---|
| | | 136 | 137 | 138 | 139 | 140 | 141 | 142 | 143 | 144 | 145 | 146 | 147 | 148 | 149 | 150 |
| A | 15 | 11 | 11 | 11 | 11 | 12 | 12 | 12 | 12 | 12 | 12 | 13 | 13 | 13 | 13 | 13 |
| n | 16 | 12 | 12 | 12 | 12 | 12 | 13 | 13 | 13 | 13 | 13 | 13 | 14 | 14 | 14 | 14 |
| g | 17 | 12 | 13 | 13 | 13 | 13 | 13 | 14 | 14 | 14 | 14 | 14 | 15 | 15 | 15 | 15 |
| l | 18 | 13 | 13 | 14 | 14 | 14 | 14 | 14 | 15 | 15 | 15 | 15 | 15 | 15 | 16 | 16 |
| e | 19 | 14 | 14 | 14 | 15 | 15 | 15 | 15 | 15 | 16 | 16 | 16 | 16 | 16 | 16 | 17 |
| | 20 | 15 | 15 | 15 | 15 | 16 | 16 | 16 | 16 | 16 | 17 | 17 | 17 | 17 | 17 | 17 |
| o | 21 | 15 | 16 | 16 | 16 | 16 | 17 | 17 | 17 | 17 | 17 | 18 | 18 | 18 | 18 | 18 |
| f | 22 | 16 | 16 | 17 | 17 | 17 | 17 | 18 | 18 | 18 | 18 | 19 | 19 | 19 | 19 | 19 |
| | 23 | 17 | 17 | 18 | 18 | 18 | 18 | 18 | 19 | 19 | 19 | 19 | 20 | 20 | 20 | 20 |
| s | 24 | 18 | 18 | 18 | 19 | 19 | 19 | 19 | 20 | 20 | 20 | 20 | 20 | 21 | 21 | 21 |
| l | 25 | 19 | 19 | 19 | 19 | 20 | 20 | 20 | 20 | 21 | 21 | 21 | 21 | 22 | 22 | 22 |
| o | 26 | 19 | 20 | 20 | 20 | 20 | 21 | 21 | 21 | 22 | 22 | 22 | 22 | 22 | 23 | 23 |
| p | 27 | 20 | 20 | 21 | 21 | 21 | 22 | 22 | 22 | 22 | 23 | 23 | 23 | 23 | 24 | 24 |
| e | 28 | 21 | 21 | 22 | 22 | 22 | 22 | 23 | 23 | 23 | 24 | 24 | 24 | 24 | 25 | 25 |
| | 29 | 22 | 22 | 22 | 23 | 23 | 23 | 24 | 24 | 24 | 24 | 25 | 25 | 25 | 25 | 26 |
| | 30 | 23 | 23 | 23 | 24 | 24 | 24 | 25 | 25 | 25 | 26 | 26 | 26 | 26 | 27 |
| | 31 | 23 | 24 | 24 | 24 | 25 | 25 | 25 | 26 | 26 | 26 | 26 | 27 | 27 | 27 | 27 |
| | 32 | 24 | 25 | 25 | 25 | 26 | 26 | 26 | 27 | 27 | 27 | 27 | 28 | 28 | 28 | 28 |
| | 33 | 25 | 25 | 26 | 26 | 26 | 27 | 27 | 27 | 28 | 28 | 28 | 29 | 29 | 29 | 29 |
| | 34 | 26 | 26 | 27 | 27 | 27 | 28 | 28 | 28 | 29 | 29 | 29 | 29 | 30 | 30 | 30 |
| | 35 | 27 | 27 | 27 | 28 | 28 | 29 | 29 | 29 | 30 | 30 | 30 | 30 | 31 | 31 | 31 |
| | 36 | 28 | 28 | 28 | 29 | 29 | 29 | 30 | 30 | 30 | 31 | 31 | 31 | 32 | 32 | 32 |
| | 37 | 28 | 29 | 29 | 30 | 30 | 30 | 31 | 31 | 31 | 32 | 32 | 32 | 33 | 33 | 33 |
| | 38 | 29 | 30 | 30 | 31 | 31 | 31 | 32 | 32 | 32 | 33 | 33 | 33 | 34 | 34 | 34 |
| | 39 | 30 | 31 | 31 | 31 | 32 | 32 | 33 | 33 | 33 | 34 | 34 | 34 | 34 | 35 | 35 |
| | 40 | 31 | 32 | 32 | 32 | 33 | 33 | 33 | 34 | 34 | 35 | 35 | 35 | 35 | 36 | 36 |
| | 41 | 32 | 32 | 33 | 33 | 34 | 34 | 34 | 35 | 35 | 35 | 36 | 36 | 36 | 37 | 37 |
| | 42 | 33 | 33 | 34 | 34 | 35 | 35 | 35 | 36 | 36 | 36 | 37 | 37 | 37 | 38 | 38 |
| | 43 | 34 | 34 | 35 | 35 | 36 | 36 | 36 | 37 | 37 | 37 | 38 | 38 | 38 | 39 | 39 |
| | 44 | 35 | 35 | 36 | 36 | 36 | 37 | 37 | 38 | 38 | 38 | 39 | 39 | 39 | 40 | 40 |
| | 45 | 36 | 36 | 37 | 37 | 37 | 38 | 38 | 39 | 39 | 39 | 40 | 40 | 40 | 41 | 41 |
| | 46 | 37 | 37 | 38 | 38 | 38 | 39 | 39 | 40 | 40 | 40 | 41 | 41 | 41 | 42 | 42 |
| | 47 | 38 | 38 | 39 | 39 | 39 | 40 | 40 | 41 | 41 | 41 | 42 | 42 | 42 | 43 | 43 |
| | 48 | 39 | 39 | 40 | 40 | 40 | 41 | 41 | 42 | 42 | 42 | 43 | 43 | 43 | 44 | 44 |
| | 49 | 40 | 40 | 41 | 41 | 41 | 42 | 42 | 43 | 43 | 43 | 44 | 44 | 44 | 45 | 45 |
| | 50 | 41 | 41 | 42 | 42 | 42 | 43 | 43 | 44 | 44 | 44 | 45 | 45 | 45 | 46 | 46 |
| | 51 | 42 | 42 | 43 | 43 | 43 | 44 | 44 | 45 | 45 | 45 | 46 | 46 | 46 | 47 | 47 |
| | 52 | 43 | 43 | 44 | 44 | 44 | 45 | 45 | 46 | 46 | 46 | 47 | 47 | 47 | 48 | 48 |
| | 53 | 44 | 44 | 45 | 45 | 45 | 46 | 46 | 47 | 47 | 47 | 48 | 48 | 48 | 49 | 49 |
| | 54 | 45 | 45 | 46 | 46 | 47 | 47 | 47 | 48 | 48 | 48 | 49 | 49 | 49 | 50 | 50 |
| | 55 | 46 | 46 | 47 | 47 | 48 | 48 | 48 | 49 | 49 | 49 | 50 | 50 | 50 | 51 | 51 |

FIG. 8b4

|   | Angle of approach | 151 | 152 | 153 | 154 | 155 | 156 | 157 | 158 | 159 | 160 | 161 | 162 | 163 | 164 | 165 |
|---|---|---|---|---|---|---|---|---|---|---|---|---|---|---|---|---|
| A | 15 | 13 | 13 | 13 | 14 | 14 | 14 | 14 | 14 | 14 | 14 | 14 | 14 | 14 | 14 | 15 |
| n | 16 | 14 | 14 | 14 | 14 | 15 | 15 | 15 | 15 | 15 | 15 | 15 | 15 | 15 | 15 | 15 |
| g | 17 | 15 | 15 | 15 | 15 | 15 | 16 | 16 | 16 | 16 | 16 | 16 | 16 | 16 | 16 | 16 |
| l | 18 | 16 | 16 | 16 | 16 | 16 | 17 | 17 | 17 | 17 | 17 | 17 | 17 | 17 | 17 | 17 |
| e | 19 | 17 | 17 | 17 | 17 | 17 | 17 | 18 | 18 | 18 | 18 | 18 | 18 | 18 | 18 | 18 |
|   | 20 | 18 | 18 | 18 | 18 | 18 | 18 | 19 | 19 | 19 | 19 | 19 | 19 | 19 | 19 | 19 |
| o | 21 | 19 | 19 | 19 | 19 | 19 | 19 | 19 | 20 | 20 | 20 | 20 | 20 | 20 | 20 | 20 |
| f | 22 | 19 | 20 | 20 | 20 | 20 | 20 | 20 | 21 | 21 | 21 | 21 | 21 | 21 | 21 | 21 |
|   | 23 | 20 | 21 | 21 | 21 | 21 | 21 | 21 | 21 | 22 | 22 | 22 | 22 | 22 | 22 | 22 |
| s | 24 | 21 | 21 | 22 | 22 | 22 | 22 | 22 | 22 | 23 | 23 | 23 | 23 | 23 | 23 | 23 |
| l | 25 | 22 | 22 | 23 | 23 | 23 | 23 | 23 | 23 | 24 | 24 | 24 | 24 | 24 | 24 | 24 |
| o | 26 | 23 | 23 | 23 | 24 | 24 | 24 | 24 | 24 | 24 | 25 | 25 | 25 | 25 | 25 | 25 |
| p | 27 | 24 | 24 | 24 | 25 | 25 | 25 | 25 | 25 | 25 | 26 | 26 | 26 | 26 | 26 | 26 |
| e | 28 | 25 | 25 | 25 | 26 | 26 | 26 | 26 | 26 | 26 | 27 | 27 | 27 | 27 | 27 | 27 |
|   | 29 | 26 | 26 | 26 | 26 | 27 | 27 | 27 | 27 | 27 | 28 | 28 | 28 | 28 | 28 | 28 |
|   | 30 | 27 | 27 | 27 | 27 | 28 | 28 | 28 | 28 | 28 | 28 | 29 | 29 | 29 | 29 | 29 |
|   | 31 | 28 | 28 | 28 | 28 | 29 | 29 | 29 | 29 | 29 | 29 | 30 | 30 | 30 | 30 | 30 |
|   | 32 | 29 | 29 | 29 | 29 | 30 | 30 | 30 | 30 | 30 | 30 | 31 | 31 | 31 | 31 | 31 |
|   | 33 | 30 | 30 | 30 | 30 | 30 | 31 | 31 | 31 | 31 | 31 | 32 | 32 | 32 | 32 | 32 |
|   | 34 | 31 | 31 | 31 | 31 | 31 | 32 | 32 | 32 | 32 | 32 | 33 | 33 | 33 | 33 | 33 |
|   | 35 | 31 | 32 | 32 | 32 | 32 | 33 | 33 | 33 | 33 | 33 | 34 | 34 | 34 | 34 | 34 |
|   | 36 | 32 | 33 | 33 | 33 | 33 | 34 | 34 | 34 | 34 | 34 | 35 | 35 | 35 | 35 | 35 |
|   | 37 | 33 | 34 | 34 | 34 | 34 | 35 | 35 | 35 | 35 | 35 | 35 | 36 | 36 | 36 | 36 |
|   | 38 | 34 | 35 | 35 | 35 | 35 | 36 | 36 | 36 | 36 | 36 | 36 | 37 | 37 | 37 | 37 |
|   | 39 | 35 | 36 | 36 | 36 | 36 | 36 | 37 | 37 | 37 | 37 | 37 | 38 | 38 | 38 | 38 |
|   | 40 | 36 | 37 | 37 | 37 | 37 | 37 | 38 | 38 | 38 | 38 | 38 | 39 | 39 | 39 | 39 |
|   | 41 | 37 | 38 | 38 | 38 | 38 | 38 | 39 | 39 | 39 | 39 | 39 | 40 | 40 | 40 | 40 |
|   | 42 | 38 | 38 | 39 | 39 | 39 | 39 | 40 | 40 | 40 | 40 | 40 | 41 | 41 | 41 | 41 |
|   | 43 | 39 | 39 | 40 | 40 | 40 | 40 | 41 | 41 | 41 | 41 | 41 | 42 | 42 | 42 | 42 |
|   | 44 | 40 | 40 | 41 | 41 | 41 | 41 | 42 | 42 | 42 | 42 | 42 | 43 | 43 | 43 | 43 |
|   | 45 | 41 | 41 | 42 | 42 | 42 | 42 | 43 | 43 | 43 | 43 | 43 | 44 | 44 | 44 | 44 |
|   | 46 | 42 | 42 | 43 | 43 | 43 | 43 | 44 | 44 | 44 | 44 | 45 | 45 | 45 | 45 | 45 |
|   | 47 | 43 | 43 | 44 | 44 | 44 | 44 | 45 | 45 | 45 | 45 | 46 | 46 | 46 | 46 | 46 |
|   | 48 | 44 | 44 | 45 | 45 | 45 | 45 | 46 | 46 | 46 | 46 | 47 | 47 | 47 | 47 | 47 |
|   | 49 | 45 | 45 | 46 | 46 | 46 | 46 | 47 | 47 | 47 | 47 | 48 | 48 | 48 | 48 | 48 |
|   | 50 | 46 | 46 | 47 | 47 | 47 | 47 | 48 | 48 | 48 | 48 | 49 | 49 | 49 | 49 | 49 |
|   | 51 | 47 | 47 | 48 | 48 | 48 | 48 | 49 | 49 | 49 | 49 | 50 | 50 | 50 | 50 | 50 |
|   | 52 | 48 | 48 | 49 | 49 | 49 | 49 | 50 | 50 | 50 | 50 | 50 | 51 | 51 | 51 | 51 |
|   | 53 | 49 | 50 | 50 | 50 | 50 | 50 | 51 | 51 | 51 | 51 | 51 | 52 | 52 | 52 | 52 |
|   | 54 | 50 | 51 | 51 | 51 | 51 | 52 | 52 | 52 | 52 | 52 | 52 | 53 | 53 | 53 | 53 |
|   | 55 | 51 | 52 | 52 | 52 | 52 | 53 | 53 | 53 | 53 | 53 | 53 | 54 | 54 | 54 | 54 |

FIG. 8b5

|   |   | Angle of approach |   |   |   |   |   |   |   |   |   |   |   |   |
|---|---|---|---|---|---|---|---|---|---|---|---|---|---|---|
|   |   | 166 | 167 | 168 | 169 | 170 | 171 | 172 | 173 | 174 | 175 | 176 | 177 | 178 | 179 |
| A | 15 | 15 | 15 | 15 | 15 | 15 | 15 | 15 | 15 | 15 | 15 | 15 | 15 | 15 | 15 |
| n | 16 | 16 | 16 | 16 | 16 | 16 | 16 | 16 | 16 | 16 | 16 | 16 | 16 | 16 | 16 |
| g | 17 | 17 | 17 | 17 | 17 | 17 | 17 | 17 | 17 | 17 | 17 | 17 | 17 | 17 | 17 |
| l | 18 | 17 | 18 | 18 | 18 | 18 | 18 | 18 | 18 | 18 | 18 | 18 | 18 | 18 | 18 |
| e | 19 | 18 | 19 | 19 | 19 | 19 | 19 | 19 | 19 | 19 | 19 | 19 | 19 | 19 | 19 |
|   | 20 | 19 | 20 | 20 | 20 | 20 | 20 | 20 | 20 | 20 | 20 | 20 | 20 | 20 | 20 |
| o | 21 | 20 | 21 | 21 | 21 | 21 | 21 | 21 | 21 | 21 | 21 | 21 | 21 | 21 | 21 |
| f | 22 | 21 | 21 | 22 | 22 | 22 | 22 | 22 | 22 | 22 | 22 | 22 | 22 | 22 | 22 |
|   | 23 | 22 | 22 | 23 | 23 | 23 | 23 | 23 | 23 | 23 | 23 | 23 | 23 | 23 | 23 |
| s | 24 | 23 | 23 | 24 | 24 | 24 | 24 | 24 | 24 | 24 | 24 | 24 | 24 | 24 | 24 |
| l | 25 | 24 | 24 | 25 | 25 | 25 | 25 | 25 | 25 | 25 | 25 | 25 | 25 | 25 | 25 |
| o | 26 | 25 | 25 | 26 | 26 | 26 | 26 | 26 | 26 | 26 | 26 | 26 | 26 | 26 | 26 |
| p | 27 | 26 | 26 | 26 | 27 | 27 | 27 | 27 | 27 | 27 | 27 | 27 | 27 | 27 | 27 |
| e | 28 | 27 | 27 | 27 | 28 | 28 | 28 | 28 | 28 | 28 | 28 | 28 | 28 | 28 | 28 |
|   | 29 | 28 | 28 | 28 | 29 | 29 | 29 | 29 | 29 | 29 | 29 | 29 | 29 | 29 | 29 |
|   | 30 | 29 | 29 | 29 | 30 | 30 | 30 | 30 | 30 | 30 | 30 | 30 | 30 | 30 | 30 |
|   | 31 | 30 | 30 | 30 | 31 | 31 | 31 | 31 | 31 | 31 | 31 | 31 | 31 | 31 | 31 |
|   | 32 | 31 | 31 | 31 | 32 | 32 | 32 | 32 | 32 | 32 | 32 | 32 | 32 | 32 | 32 |
|   | 33 | 32 | 32 | 32 | 33 | 33 | 33 | 33 | 33 | 33 | 33 | 33 | 33 | 33 | 33 |
|   | 34 | 33 | 33 | 33 | 34 | 34 | 34 | 34 | 34 | 34 | 34 | 34 | 34 | 34 | 34 |
|   | 35 | 34 | 34 | 34 | 35 | 35 | 35 | 35 | 35 | 35 | 35 | 35 | 35 | 35 | 35 |
|   | 36 | 35 | 35 | 35 | 35 | 36 | 36 | 36 | 36 | 36 | 36 | 36 | 36 | 36 | 36 |
|   | 37 | 36 | 36 | 36 | 36 | 37 | 37 | 37 | 37 | 37 | 37 | 37 | 37 | 37 | 37 |
|   | 38 | 37 | 37 | 37 | 37 | 38 | 38 | 38 | 38 | 38 | 38 | 38 | 38 | 38 | 38 |
|   | 39 | 38 | 38 | 38 | 38 | 39 | 39 | 39 | 39 | 39 | 39 | 39 | 39 | 39 | 39 |
|   | 40 | 39 | 39 | 39 | 39 | 40 | 40 | 40 | 40 | 40 | 40 | 40 | 40 | 40 | 40 |
|   | 41 | 40 | 40 | 40 | 40 | 41 | 41 | 41 | 41 | 41 | 41 | 41 | 41 | 41 | 41 |
|   | 42 | 41 | 41 | 41 | 41 | 42 | 42 | 42 | 42 | 42 | 42 | 42 | 42 | 42 | 42 |
|   | 43 | 42 | 42 | 42 | 42 | 43 | 43 | 43 | 43 | 43 | 43 | 43 | 43 | 43 | 43 |
|   | 44 | 43 | 43 | 43 | 43 | 44 | 44 | 44 | 44 | 44 | 44 | 44 | 44 | 44 | 44 |
|   | 45 | 44 | 44 | 44 | 44 | 45 | 45 | 45 | 45 | 45 | 45 | 45 | 45 | 45 | 45 |
|   | 46 | 45 | 45 | 45 | 45 | 46 | 46 | 46 | 46 | 46 | 46 | 46 | 46 | 46 | 46 |
|   | 47 | 46 | 46 | 46 | 46 | 47 | 47 | 47 | 47 | 47 | 47 | 47 | 47 | 47 | 47 |
|   | 48 | 47 | 47 | 47 | 47 | 48 | 48 | 48 | 48 | 48 | 48 | 48 | 48 | 48 | 48 |
|   | 49 | 48 | 48 | 48 | 48 | 49 | 49 | 49 | 49 | 49 | 49 | 49 | 49 | 49 | 49 |
|   | 50 | 49 | 49 | 49 | 49 | 50 | 50 | 50 | 50 | 50 | 50 | 50 | 50 | 50 | 50 |
|   | 51 | 50 | 50 | 50 | 50 | 51 | 51 | 51 | 51 | 51 | 51 | 51 | 51 | 51 | 51 |
|   | 52 | 51 | 51 | 51 | 51 | 52 | 52 | 52 | 52 | 52 | 52 | 52 | 52 | 52 | 52 |
|   | 53 | 52 | 52 | 52 | 52 | 53 | 53 | 53 | 53 | 53 | 53 | 53 | 53 | 53 | 53 |
|   | 54 | 53 | 53 | 53 | 53 | 54 | 54 | 54 | 54 | 54 | 54 | 54 | 54 | 54 | 54 |
|   | 55 | 54 | 54 | 54 | 54 | 55 | 55 | 55 | 55 | 55 | 55 | 55 | 55 | 55 | 55 |

FIG. 8b6

| | Angle of approach | | | | | | | | | | | | | | | |
|---|---|---|---|---|---|---|---|---|---|---|---|---|---|---|---|---|
| | | | 181 | 182 | 183 | 184 | 185 | 186 | 187 | 188 | 189 | 190 | 191 | 192 | 193 | 194 | 195 |
| A | 15 | | 15 | 15 | 15 | 15 | 15 | 15 | 15 | 15 | 15 | 15 | 15 | 15 | 15 | 15 | 15 |
| n | 16 | | 16 | 16 | 16 | 16 | 16 | 16 | 16 | 16 | 16 | 16 | 16 | 16 | 16 | 16 | 15 |
| g | 17 | | 17 | 17 | 17 | 17 | 17 | 17 | 17 | 17 | 17 | 17 | 17 | 17 | 17 | 17 | 16 |
| l | 18 | | 18 | 18 | 18 | 18 | 18 | 18 | 18 | 18 | 18 | 18 | 18 | 18 | 18 | 17 | 17 |
| e | 19 | | 19 | 19 | 19 | 19 | 19 | 19 | 19 | 19 | 19 | 19 | 19 | 19 | 19 | 18 | 18 |
| | 20 | | 20 | 20 | 20 | 20 | 20 | 20 | 20 | 20 | 20 | 20 | 20 | 20 | 20 | 19 | 19 |
| o | 21 | | 21 | 21 | 21 | 21 | 21 | 21 | 21 | 21 | 21 | 21 | 21 | 21 | 21 | 20 | 20 |
| f | 22 | | 22 | 22 | 22 | 22 | 22 | 22 | 22 | 22 | 22 | 22 | 22 | 22 | 21 | 21 | 21 |
| | 23 | | 23 | 23 | 23 | 23 | 23 | 23 | 23 | 23 | 23 | 23 | 23 | 23 | 22 | 22 | 22 |
| s | 24 | | 24 | 24 | 24 | 24 | 24 | 24 | 24 | 24 | 24 | 24 | 24 | 24 | 23 | 23 | 23 |
| l | 25 | | 25 | 25 | 25 | 25 | 25 | 25 | 25 | 25 | 25 | 25 | 25 | 25 | 24 | 24 | 24 |
| o | 26 | | 26 | 26 | 26 | 26 | 26 | 26 | 26 | 26 | 26 | 26 | 26 | 26 | 25 | 25 | 25 |
| p | 27 | | 27 | 27 | 27 | 27 | 27 | 27 | 27 | 27 | 27 | 27 | 27 | 26 | 26 | 26 | 26 |
| e | 28 | | 28 | 28 | 28 | 28 | 28 | 28 | 28 | 28 | 28 | 28 | 28 | 27 | 27 | 27 | 27 |
| | 29 | | 29 | 29 | 29 | 29 | 29 | 29 | 29 | 29 | 29 | 29 | 29 | 28 | 28 | 28 | 28 |
| | 30 | | 30 | 30 | 30 | 30 | 30 | 30 | 30 | 30 | 30 | 30 | 30 | 29 | 29 | 29 | 29 |
| | 31 | | 31 | 31 | 31 | 31 | 31 | 31 | 31 | 31 | 31 | 31 | 31 | 30 | 30 | 30 | 30 |
| | 32 | | 32 | 32 | 32 | 32 | 32 | 32 | 32 | 32 | 32 | 32 | 32 | 31 | 31 | 31 | 31 |
| | 33 | | 33 | 33 | 33 | 33 | 33 | 33 | 33 | 33 | 33 | 33 | 33 | 32 | 32 | 32 | 32 |
| | 34 | | 34 | 34 | 34 | 34 | 34 | 34 | 34 | 34 | 34 | 34 | 34 | 33 | 33 | 33 | 33 |
| | 35 | | 35 | 35 | 35 | 35 | 35 | 35 | 35 | 35 | 35 | 35 | 35 | 34 | 34 | 34 | 34 |
| | 36 | | 36 | 36 | 36 | 36 | 36 | 36 | 36 | 36 | 36 | 36 | 35 | 35 | 35 | 35 | 35 |
| | 37 | | 37 | 37 | 37 | 37 | 37 | 37 | 37 | 37 | 37 | 37 | 36 | 36 | 36 | 36 | 36 |
| | 38 | | 38 | 38 | 38 | 38 | 38 | 38 | 38 | 38 | 38 | 38 | 37 | 37 | 37 | 37 | 37 |
| | 39 | | 39 | 39 | 39 | 39 | 39 | 39 | 39 | 39 | 39 | 39 | 38 | 38 | 38 | 38 | 38 |
| | 40 | | 40 | 40 | 40 | 40 | 40 | 40 | 40 | 40 | 40 | 40 | 39 | 39 | 39 | 39 | 39 |
| | 41 | | 41 | 41 | 41 | 41 | 41 | 41 | 41 | 41 | 41 | 41 | 40 | 40 | 40 | 40 | 40 |
| | 42 | | 42 | 42 | 42 | 42 | 42 | 42 | 42 | 42 | 42 | 42 | 41 | 41 | 41 | 41 | 41 |
| | 43 | | 43 | 43 | 43 | 43 | 43 | 43 | 43 | 43 | 43 | 43 | 42 | 42 | 42 | 42 | 42 |
| | 44 | | 44 | 44 | 44 | 44 | 44 | 44 | 44 | 44 | 44 | 44 | 43 | 43 | 43 | 43 | 43 |
| | 45 | | 45 | 45 | 45 | 45 | 45 | 45 | 45 | 45 | 45 | 45 | 44 | 44 | 44 | 44 | 44 |
| | 46 | | 46 | 46 | 46 | 46 | 46 | 46 | 46 | 46 | 46 | 46 | 45 | 45 | 45 | 45 | 45 |
| | 47 | | 47 | 47 | 47 | 47 | 47 | 47 | 47 | 47 | 47 | 47 | 46 | 46 | 46 | 46 | 46 |
| | 48 | | 48 | 48 | 48 | 48 | 48 | 48 | 48 | 48 | 48 | 48 | 47 | 47 | 47 | 47 | 47 |
| | 49 | | 49 | 49 | 49 | 49 | 49 | 49 | 49 | 49 | 49 | 49 | 48 | 48 | 48 | 48 | 48 |
| | 50 | | 50 | 50 | 50 | 50 | 50 | 50 | 50 | 50 | 50 | 50 | 49 | 49 | 49 | 49 | 49 |
| | 51 | | 51 | 51 | 51 | 51 | 51 | 51 | 51 | 51 | 51 | 51 | 50 | 50 | 50 | 50 | 50 |
| | 52 | | 52 | 52 | 52 | 52 | 52 | 52 | 52 | 52 | 52 | 52 | 51 | 51 | 51 | 51 | 51 |
| | 53 | | 53 | 53 | 53 | 53 | 53 | 53 | 53 | 53 | 53 | 53 | 52 | 52 | 52 | 52 | 52 |
| | 54 | | 54 | 54 | 54 | 54 | 54 | 54 | 54 | 54 | 54 | 54 | 53 | 53 | 53 | 53 | 53 |
| | 55 | | 55 | 55 | 55 | 55 | 55 | 55 | 55 | 55 | 55 | 55 | 54 | 54 | 54 | 54 | 54 |

FIG. 8c1

|   | Angle of approach | 196 | 197 | 198 | 199 | 200 | 201 | 202 | 203 | 204 | 205 | 206 | 207 | 208 | 209 | 210 |
|---|---|---|---|---|---|---|---|---|---|---|---|---|---|---|---|---|
| A | 15 | 14 | 14 | 14 | 14 | 14 | 14 | 14 | 14 | 14 | 14 | 14 | 13 | 13 | 13 | 13 |
| n | 16 | 15 | 15 | 15 | 15 | 15 | 15 | 15 | 15 | 15 | 15 | 14 | 14 | 14 | 14 | 14 |
| g | 17 | 16 | 16 | 16 | 16 | 16 | 16 | 16 | 16 | 16 | 15 | 15 | 15 | 15 | 15 | 15 |
| l | 18 | 17 | 17 | 17 | 17 | 17 | 17 | 17 | 17 | 17 | 16 | 16 | 16 | 16 | 16 | 16 |
| e | 19 | 18 | 18 | 18 | 18 | 18 | 18 | 18 | 18 | 17 | 17 | 17 | 17 | 17 | 17 | 17 |
|   | 20 | 19 | 19 | 19 | 19 | 19 | 19 | 19 | 19 | 18 | 18 | 18 | 18 | 18 | 18 | 17 |
| o | 21 | 20 | 20 | 20 | 20 | 20 | 20 | 20 | 19 | 19 | 19 | 19 | 19 | 19 | 19 | 18 |
| f | 22 | 21 | 21 | 21 | 21 | 21 | 21 | 21 | 20 | 20 | 20 | 20 | 20 | 20 | 19 | 19 |
|   | 23 | 22 | 22 | 22 | 22 | 22 | 22 | 21 | 21 | 21 | 21 | 21 | 21 | 21 | 20 | 20 |
| s | 24 | 23 | 23 | 23 | 23 | 23 | 23 | 22 | 22 | 22 | 22 | 22 | 22 | 21 | 21 | 21 |
| l | 25 | 24 | 24 | 24 | 24 | 24 | 24 | 23 | 23 | 23 | 23 | 23 | 23 | 22 | 22 | 22 |
| o | 26 | 25 | 25 | 25 | 25 | 25 | 24 | 24 | 24 | 24 | 24 | 24 | 23 | 23 | 23 | 23 |
| p | 27 | 26 | 26 | 26 | 26 | 26 | 25 | 25 | 25 | 25 | 25 | 25 | 24 | 24 | 24 | 24 |
| e | 28 | 27 | 27 | 27 | 27 | 27 | 26 | 26 | 26 | 26 | 26 | 26 | 25 | 25 | 25 | 25 |
|   | 29 | 28 | 28 | 28 | 28 | 28 | 27 | 27 | 27 | 27 | 27 | 26 | 26 | 26 | 26 | 26 |
|   | 30 | 29 | 29 | 29 | 29 | 28 | 28 | 28 | 28 | 28 | 28 | 27 | 27 | 27 | 27 | 27 |
|   | 31 | 30 | 30 | 30 | 30 | 29 | 29 | 29 | 29 | 29 | 29 | 28 | 28 | 28 | 28 | 27 |
|   | 32 | 31 | 31 | 31 | 31 | 30 | 30 | 30 | 30 | 30 | 30 | 29 | 29 | 29 | 29 | 28 |
|   | 33 | 32 | 32 | 32 | 32 | 31 | 31 | 31 | 31 | 31 | 30 | 30 | 30 | 30 | 30 | 29 |
|   | 34 | 33 | 33 | 33 | 33 | 32 | 32 | 32 | 32 | 32 | 31 | 31 | 31 | 31 | 31 | 30 |
|   | 35 | 34 | 34 | 34 | 34 | 33 | 33 | 33 | 33 | 33 | 32 | 32 | 32 | 32 | 31 | 31 |
|   | 36 | 35 | 35 | 35 | 34 | 34 | 34 | 34 | 34 | 34 | 33 | 33 | 33 | 33 | 32 | 32 |
|   | 37 | 36 | 36 | 36 | 35 | 35 | 35 | 35 | 35 | 35 | 34 | 34 | 34 | 34 | 33 | 33 |
|   | 38 | 37 | 37 | 37 | 36 | 36 | 36 | 36 | 36 | 36 | 35 | 35 | 35 | 35 | 34 | 34 |
|   | 39 | 38 | 38 | 38 | 37 | 37 | 37 | 37 | 37 | 36 | 36 | 36 | 36 | 36 | 35 | 35 |
|   | 40 | 39 | 39 | 39 | 38 | 38 | 38 | 38 | 38 | 37 | 37 | 37 | 37 | 37 | 36 | 36 |
|   | 41 | 40 | 40 | 40 | 39 | 39 | 39 | 39 | 39 | 38 | 38 | 38 | 38 | 38 | 37 | 37 |
|   | 42 | 41 | 41 | 41 | 40 | 40 | 40 | 40 | 40 | 39 | 39 | 39 | 39 | 38 | 38 | 38 |
|   | 43 | 42 | 42 | 42 | 41 | 41 | 41 | 41 | 41 | 40 | 40 | 40 | 40 | 39 | 39 | 39 |
|   | 44 | 43 | 43 | 43 | 42 | 42 | 42 | 42 | 42 | 41 | 41 | 41 | 41 | 40 | 40 | 40 |
|   | 45 | 44 | 44 | 44 | 43 | 43 | 43 | 43 | 43 | 42 | 42 | 42 | 42 | 41 | 41 | 41 |
|   | 46 | 45 | 45 | 45 | 44 | 44 | 44 | 44 | 44 | 43 | 43 | 43 | 43 | 42 | 42 | 42 |
|   | 47 | 46 | 46 | 46 | 45 | 45 | 45 | 45 | 45 | 44 | 44 | 44 | 44 | 43 | 43 | 43 |
|   | 48 | 47 | 47 | 47 | 46 | 46 | 46 | 46 | 46 | 45 | 45 | 45 | 45 | 44 | 44 | 44 |
|   | 49 | 48 | 48 | 48 | 47 | 47 | 47 | 47 | 47 | 46 | 46 | 46 | 46 | 45 | 45 | 45 |
|   | 50 | 49 | 49 | 49 | 48 | 48 | 48 | 48 | 48 | 47 | 47 | 47 | 47 | 46 | 46 | 46 |
|   | 51 | 50 | 50 | 50 | 49 | 49 | 49 | 49 | 49 | 48 | 48 | 48 | 48 | 47 | 47 | 47 |
|   | 52 | 51 | 51 | 51 | 50 | 50 | 50 | 50 | 50 | 49 | 49 | 49 | 49 | 48 | 48 | 48 |
|   | 53 | 52 | 52 | 52 | 51 | 51 | 51 | 51 | 51 | 50 | 50 | 50 | 50 | 50 | 49 | 49 |
|   | 54 | 53 | 53 | 53 | 52 | 52 | 52 | 52 | 52 | 51 | 51 | 51 | 51 | 50 | 50 | 50 |
|   | 55 | 54 | 54 | 54 | 53 | 53 | 53 | 53 | 53 | 52 | 52 | 52 | 52 | 51 | 51 | 51 |

FIG. 8c2

| | Angle of approach | | | | | | | | | | | | | | |
|---|---|---|---|---|---|---|---|---|---|---|---|---|---|---|---|
| | | 211 | 212 | 213 | 214 | 215 | 216 | 217 | 218 | 219 | 220 | 221 | 222 | 223 | 224 | 225 |
| A | 15 | 13 | 13 | 13 | 13 | 12 | 12 | 12 | 12 | 12 | 12 | 11 | 11 | 11 | 11 | 11 |
| n | 16 | 14 | 14 | 14 | 13 | 13 | 13 | 13 | 13 | 13 | 12 | 12 | 12 | 12 | 12 | 11 |
| g | 17 | 15 | 15 | 14 | 14 | 14 | 14 | 14 | 13 | 13 | 13 | 13 | 13 | 13 | 12 | 12 |
| l | 18 | 16 | 15 | 15 | 15 | 15 | 15 | 15 | 14 | 14 | 14 | 14 | 14 | 13 | 13 | 13 |
| e | 19 | 16 | 16 | 16 | 16 | 16 | 16 | 15 | 15 | 15 | 15 | 15 | 14 | 14 | 14 | 14 |
| | 20 | 17 | 17 | 17 | 17 | 17 | 16 | 16 | 16 | 16 | 16 | 15 | 15 | 15 | 15 | 14 |
| o | 21 | 18 | 18 | 18 | 18 | 17 | 17 | 17 | 17 | 17 | 16 | 16 | 16 | 16 | 15 | 15 |
| f | 22 | 19 | 19 | 19 | 19 | 18 | 18 | 18 | 18 | 17 | 17 | 17 | 17 | 16 | 16 | 16 |
| | 23 | 20 | 20 | 20 | 19 | 19 | 19 | 19 | 18 | 18 | 18 | 18 | 18 | 17 | 17 | 17 |
| s | 24 | 21 | 21 | 20 | 20 | 20 | 20 | 20 | 19 | 19 | 19 | 19 | 18 | 18 | 18 | 17 |
| l | 25 | 22 | 22 | 21 | 21 | 21 | 21 | 20 | 20 | 20 | 20 | 19 | 19 | 19 | 19 | 18 |
| o | 26 | 23 | 22 | 22 | 22 | 22 | 22 | 21 | 21 | 21 | 20 | 20 | 20 | 20 | 19 | 19 |
| p | 27 | 24 | 23 | 23 | 23 | 23 | 22 | 22 | 22 | 22 | 21 | 21 | 21 | 20 | 20 | 20 |
| e | 28 | 25 | 24 | 24 | 24 | 24 | 23 | 23 | 23 | 22 | 22 | 22 | 22 | 21 | 21 | 21 |
| | 29 | 25 | 25 | 25 | 25 | 24 | 24 | 24 | 24 | 23 | 23 | 23 | 22 | 22 | 22 | 21 |
| | 30 | 26 | 26 | 26 | 26 | 25 | 25 | 25 | 24 | 24 | 24 | 24 | 23 | 23 | 23 | 22 |
| | 31 | 27 | 27 | 27 | 26 | 26 | 26 | 26 | 25 | 25 | 25 | 24 | 24 | 24 | 23 | 23 |
| | 32 | 28 | 28 | 28 | 27 | 27 | 27 | 27 | 26 | 26 | 26 | 25 | 25 | 25 | 24 | 24 |
| | 33 | 29 | 29 | 29 | 28 | 28 | 28 | 27 | 27 | 27 | 26 | 26 | 26 | 25 | 25 | 25 |
| | 34 | 30 | 30 | 29 | 29 | 29 | 29 | 28 | 28 | 28 | 27 | 27 | 27 | 26 | 26 | 25 |
| | 35 | 31 | 31 | 30 | 30 | 30 | 30 | 29 | 29 | 29 | 28 | 28 | 27 | 27 | 27 | 26 |
| | 36 | 32 | 32 | 31 | 31 | 31 | 30 | 30 | 30 | 29 | 29 | 29 | 28 | 28 | 28 | 27 |
| | 37 | 33 | 33 | 32 | 32 | 32 | 31 | 31 | 31 | 30 | 30 | 30 | 29 | 29 | 28 | 28 |
| | 38 | 34 | 34 | 33 | 33 | 33 | 32 | 32 | 32 | 31 | 31 | 31 | 30 | 30 | 29 | 29 |
| | 39 | 35 | 34 | 34 | 34 | 34 | 33 | 33 | 33 | 32 | 32 | 31 | 31 | 31 | 30 | 30 |
| | 40 | 36 | 35 | 35 | 35 | 35 | 34 | 34 | 33 | 33 | 33 | 32 | 32 | 32 | 31 | 31 |
| | 41 | 37 | 36 | 36 | 36 | 35 | 35 | 35 | 34 | 34 | 34 | 33 | 33 | 32 | 32 | 32 |
| | 42 | 38 | 37 | 37 | 37 | 36 | 36 | 36 | 35 | 35 | 35 | 34 | 34 | 33 | 33 | 32 |
| | 43 | 39 | 38 | 38 | 38 | 37 | 37 | 37 | 36 | 36 | 36 | 35 | 35 | 34 | 34 | 33 |
| | 44 | 40 | 39 | 39 | 39 | 38 | 38 | 38 | 37 | 37 | 36 | 36 | 36 | 35 | 35 | 34 |
| | 45 | 41 | 40 | 40 | 40 | 39 | 39 | 39 | 38 | 38 | 37 | 37 | 37 | 36 | 36 | 35 |
| | 46 | 42 | 41 | 41 | 41 | 40 | 40 | 40 | 39 | 39 | 38 | 38 | 38 | 37 | 37 | 36 |
| | 47 | 43 | 42 | 42 | 42 | 41 | 41 | 41 | 40 | 40 | 39 | 39 | 39 | 38 | 38 | 37 |
| | 48 | 44 | 43 | 43 | 43 | 42 | 42 | 42 | 41 | 41 | 40 | 40 | 40 | 39 | 39 | 38 |
| | 49 | 45 | 44 | 44 | 44 | 43 | 43 | 43 | 42 | 42 | 41 | 41 | 41 | 40 | 40 | 39 |
| | 50 | 46 | 45 | 45 | 45 | 44 | 44 | 44 | 43 | 43 | 42 | 42 | 42 | 41 | 41 | 40 |
| | 51 | 47 | 46 | 46 | 46 | 45 | 45 | 45 | 44 | 44 | 43 | 43 | 43 | 42 | 42 | 41 |
| | 52 | 48 | 47 | 47 | 47 | 46 | 46 | 46 | 45 | 45 | 44 | 44 | 44 | 43 | 43 | 42 |
| | 53 | 49 | 48 | 48 | 48 | 47 | 47 | 47 | 46 | 46 | 45 | 45 | 45 | 44 | 44 | 43 |
| | 54 | 50 | 49 | 49 | 49 | 48 | 48 | 48 | 47 | 47 | 47 | 46 | 46 | 45 | 45 | 44 |
| | 55 | 51 | 50 | 50 | 50 | 49 | 49 | 49 | 48 | 48 | 48 | 47 | 47 | 46 | 46 | 45 |

FIG. 8c3

|   | Angle of approach | 226 | 227 | 228 | 229 | 230 | 231 | 232 | 233 | 234 | 235 | 236 | 237 | 238 | 239 | 240 |
|---|---|---|---|---|---|---|---|---|---|---|---|---|---|---|---|---|
| A | 15 | 11 | 10 | 10 | 10 | 10 | 10 | 9 | 9 | 9 | 9 | 9 | 8 | 8 | 8 | 8 |
| n | 16 | 11 | 11 | 11 | 11 | 10 | 10 | 10 | 10 | 10 | 9 | 9 | 9 | 9 | 8 | 8 |
| g | 17 | 12 | 12 | 12 | 11 | 11 | 11 | 11 | 10 | 10 | 10 | 9 | 9 | 9 | 9 |
| l | 18 | 13 | 12 | 12 | 12 | 12 | 12 | 11 | 11 | 11 | 10 | 10 | 10 | 10 | 9 |
| e | 19 | 13 | 13 | 13 | 13 | 12 | 12 | 12 | 12 | 11 | 11 | 11 | 11 | 10 | 10 | 10 |
|   | 20 | 14 | 14 | 14 | 13 | 13 | 13 | 13 | 12 | 12 | 12 | 11 | 11 | 11 | 10 |
| o | 21 | 15 | 15 | 14 | 14 | 14 | 14 | 13 | 13 | 13 | 12 | 12 | 12 | 11 | 11 | 11 |
| f | 22 | 16 | 15 | 15 | 15 | 15 | 14 | 14 | 14 | 13 | 13 | 13 | 12 | 12 | 12 | 11 |
|   | 23 | 16 | 16 | 16 | 16 | 15 | 15 | 15 | 14 | 14 | 14 | 13 | 13 | 13 | 12 | 12 |
| s | 24 | 17 | 17 | 17 | 16 | 16 | 16 | 15 | 15 | 15 | 14 | 14 | 14 | 13 | 13 | 13 |
| l | 25 | 18 | 18 | 17 | 17 | 17 | 16 | 16 | 16 | 15 | 15 | 15 | 14 | 14 | 14 | 13 |
| o | 26 | 19 | 18 | 18 | 18 | 17 | 17 | 17 | 16 | 16 | 16 | 15 | 15 | 14 | 14 | 14 |
| p | 27 | 19 | 19 | 19 | 18 | 18 | 18 | 17 | 17 | 17 | 16 | 16 | 16 | 15 | 15 | 14 |
| e | 28 | 20 | 20 | 20 | 19 | 19 | 19 | 18 | 18 | 17 | 17 | 17 | 16 | 16 | 15 | 15 |
|   | 29 | 21 | 21 | 20 | 20 | 20 | 19 | 19 | 18 | 18 | 18 | 17 | 17 | 16 | 16 | 15 |
|   | 30 | 22 | 21 | 21 | 21 | 20 | 20 | 20 | 19 | 19 | 18 | 18 | 17 | 17 | 17 | 16 |
|   | 31 | 23 | 22 | 22 | 22 | 21 | 21 | 20 | 20 | 19 | 19 | 19 | 18 | 18 | 17 | 17 |
|   | 32 | 23 | 23 | 23 | 22 | 22 | 21 | 21 | 21 | 20 | 20 | 19 | 19 | 18 | 18 | 17 |
|   | 33 | 24 | 24 | 23 | 23 | 23 | 22 | 22 | 21 | 21 | 20 | 20 | 19 | 19 | 18 | 18 |
|   | 34 | 25 | 25 | 24 | 24 | 23 | 23 | 23 | 22 | 22 | 21 | 21 | 20 | 20 | 19 | 19 |
|   | 35 | 26 | 26 | 25 | 25 | 24 | 24 | 23 | 23 | 22 | 22 | 21 | 21 | 20 | 20 | 19 |
|   | 36 | 27 | 26 | 26 | 25 | 25 | 25 | 24 | 24 | 23 | 23 | 22 | 22 | 21 | 21 | 20 |
|   | 37 | 28 | 27 | 27 | 26 | 26 | 25 | 25 | 24 | 24 | 23 | 23 | 22 | 22 | 21 | 21 |
|   | 38 | 28 | 28 | 28 | 27 | 27 | 26 | 26 | 25 | 25 | 24 | 24 | 23 | 22 | 22 | 21 |
|   | 39 | 29 | 29 | 28 | 28 | 27 | 27 | 26 | 26 | 25 | 25 | 24 | 24 | 23 | 23 | 22 |
|   | 40 | 30 | 30 | 29 | 29 | 28 | 28 | 27 | 27 | 26 | 26 | 25 | 25 | 24 | 23 | 23 |
|   | 41 | 31 | 31 | 30 | 30 | 29 | 29 | 28 | 28 | 27 | 27 | 26 | 25 | 25 | 24 | 23 |
|   | 42 | 32 | 32 | 31 | 31 | 30 | 30 | 29 | 28 | 28 | 27 | 27 | 26 | 26 | 25 | 24 |
|   | 43 | 33 | 32 | 32 | 31 | 31 | 30 | 30 | 29 | 29 | 28 | 28 | 27 | 26 | 26 | 25 |
|   | 44 | 34 | 33 | 33 | 32 | 32 | 31 | 31 | 30 | 30 | 29 | 28 | 28 | 27 | 26 | 26 |
|   | 45 | 35 | 34 | 34 | 33 | 33 | 32 | 32 | 31 | 30 | 30 | 29 | 29 | 28 | 27 | 27 |
|   | 46 | 36 | 35 | 35 | 34 | 34 | 33 | 33 | 32 | 31 | 31 | 30 | 29 | 29 | 28 | 27 |
|   | 47 | 37 | 36 | 36 | 35 | 35 | 34 | 33 | 33 | 32 | 32 | 31 | 30 | 30 | 29 | 28 |
|   | 48 | 38 | 37 | 37 | 36 | 36 | 35 | 34 | 34 | 33 | 32 | 32 | 31 | 30 | 30 | 29 |
|   | 49 | 39 | 38 | 38 | 37 | 36 | 36 | 35 | 35 | 34 | 33 | 33 | 32 | 31 | 31 | 30 |
|   | 50 | 40 | 39 | 39 | 38 | 37 | 37 | 36 | 36 | 35 | 34 | 34 | 33 | 32 | 32 | 31 |
|   | 51 | 41 | 40 | 40 | 39 | 38 | 38 | 37 | 37 | 36 | 35 | 35 | 34 | 33 | 32 | 32 |
|   | 52 | 42 | 41 | 41 | 40 | 39 | 39 | 38 | 38 | 37 | 36 | 36 | 35 | 34 | 33 | 33 |
|   | 53 | 43 | 42 | 42 | 41 | 40 | 40 | 39 | 39 | 38 | 37 | 37 | 36 | 35 | 34 | 34 |
|   | 54 | 44 | 43 | 43 | 42 | 41 | 41 | 40 | 40 | 39 | 38 | 38 | 37 | 36 | 35 | 35 |
|   | 55 | 45 | 44 | 44 | 43 | 43 | 42 | 41 | 41 | 40 | 39 | 39 | 38 | 37 | 36 | 36 |

FIG. 8c4

|   | Angle of approach | 241 | 242 | 243 | 244 | 245 | 246 | 247 | 248 | 249 | 250 | 251 | 252 | 253 | 254 | 255 |
|---|---|---|---|---|---|---|---|---|---|---|---|---|---|---|---|---|
| A | 15 | 7 | 7 | 7 | 7 | 6 | 6 | 6 | 6 | 5 | 5 | 5 | 5 | 4 | 4 | 4 |
| n | 16 | 8 | 8 | 7 | 7 | 7 | 7 | 6 | 6 | 6 | 6 | 5 | 5 | 5 | 5 | 4 |
| g | 17 | 8 | 8 | 8 | 8 | 7 | 7 | 7 | 7 | 6 | 6 | 6 | 5 | 5 | 5 | 5 |
| l | 18 | 9 | 9 | 8 | 8 | 8 | 8 | 7 | 7 | 7 | 6 | 6 | 6 | 5 | 5 | 5 |
| e | 19 | 9 | 9 | 9 | 9 | 8 | 8 | 8 | 7 | 7 | 7 | 6 | 6 | 6 | 5 | 5 |
|   | 20 | 10 | 10 | 9 | 9 | 9 | 8 | 8 | 8 | 7 | 7 | 7 | 6 | 6 | 6 | 5 |
| o | 21 | 11 | 10 | 10 | 10 | 9 | 9 | 9 | 8 | 8 | 7 | 7 | 7 | 6 | 6 | 6 |
| f | 22 | 11 | 11 | 10 | 10 | 10 | 9 | 9 | 9 | 8 | 8 | 7 | 7 | 7 | 6 | 6 |
|   | 23 | 12 | 11 | 11 | 11 | 10 | 10 | 9 | 9 | 9 | 8 | 8 | 7 | 7 | 7 | 6 |
| s | 24 | 12 | 12 | 11 | 11 | 11 | 10 | 10 | 9 | 9 | 9 | 8 | 8 | 7 | 7 | 7 |
| l | 25 | 13 | 12 | 12 | 12 | 11 | 11 | 10 | 10 | 9 | 9 | 9 | 8 | 8 | 7 | 7 |
| o | 26 | 13 | 13 | 12 | 12 | 12 | 11 | 11 | 10 | 10 | 9 | 9 | 9 | 8 | 8 | 7 |
| p | 27 | 14 | 13 | 13 | 13 | 12 | 12 | 11 | 11 | 10 | 10 | 9 | 9 | 8 | 8 | 8 |
| e | 28 | 14 | 14 | 14 | 13 | 13 | 12 | 12 | 11 | 11 | 10 | 10 | 9 | 9 | 8 | 8 |
|   | 29 | 15 | 15 | 14 | 14 | 13 | 13 | 12 | 12 | 11 | 11 | 10 | 10 | 9 | 9 | 8 |
|   | 30 | 16 | 15 | 15 | 14 | 14 | 13 | 13 | 12 | 12 | 11 | 11 | 10 | 10 | 9 | 8 |
|   | 31 | 16 | 16 | 15 | 15 | 14 | 14 | 13 | 13 | 12 | 12 | 11 | 11 | 10 | 9 | 9 |
|   | 32 | 17 | 16 | 16 | 15 | 15 | 14 | 14 | 13 | 13 | 12 | 11 | 11 | 10 | 10 | 9 |
|   | 33 | 17 | 17 | 16 | 16 | 15 | 15 | 14 | 14 | 13 | 13 | 12 | 11 | 11 | 10 | 10 |
|   | 34 | 18 | 18 | 17 | 16 | 16 | 15 | 15 | 14 | 14 | 13 | 12 | 12 | 11 | 11 | 10 |
|   | 35 | 19 | 18 | 18 | 17 | 16 | 16 | 15 | 15 | 14 | 13 | 13 | 12 | 12 | 11 | 10 |
|   | 36 | 19 | 19 | 18 | 18 | 17 | 16 | 16 | 15 | 15 | 14 | 13 | 13 | 12 | 11 | 11 |
|   | 37 | 20 | 19 | 19 | 18 | 18 | 17 | 16 | 16 | 15 | 14 | 14 | 13 | 12 | 12 | 11 |
|   | 38 | 21 | 20 | 20 | 19 | 18 | 18 | 17 | 16 | 16 | 15 | 14 | 14 | 13 | 12 | 11 |
|   | 39 | 21 | 21 | 20 | 20 | 19 | 18 | 18 | 17 | 16 | 15 | 15 | 14 | 13 | 13 | 12 |
|   | 40 | 22 | 22 | 21 | 20 | 20 | 19 | 18 | 17 | 17 | 16 | 15 | 15 | 14 | 13 | 12 |
|   | 41 | 23 | 22 | 22 | 21 | 20 | 19 | 19 | 18 | 17 | 17 | 16 | 15 | 14 | 13 | 13 |
|   | 42 | 24 | 23 | 22 | 22 | 21 | 20 | 19 | 19 | 18 | 17 | 16 | 16 | 15 | 14 | 13 |
|   | 43 | 24 | 24 | 23 | 22 | 22 | 21 | 20 | 19 | 18 | 18 | 17 | 16 | 15 | 14 | 14 |
|   | 44 | 25 | 24 | 24 | 23 | 22 | 21 | 21 | 20 | 19 | 18 | 17 | 17 | 16 | 15 | 14 |
|   | 45 | 26 | 25 | 24 | 24 | 23 | 22 | 21 | 21 | 20 | 19 | 18 | 17 | 16 | 15 | 15 |
|   | 46 | 27 | 26 | 25 | 24 | 24 | 23 | 22 | 21 | 20 | 20 | 19 | 18 | 17 | 16 | 15 |
|   | 47 | 27 | 27 | 26 | 25 | 24 | 24 | 23 | 22 | 21 | 20 | 19 | 18 | 17 | 16 | 16 |
|   | 48 | 28 | 28 | 27 | 26 | 25 | 24 | 23 | 23 | 22 | 21 | 20 | 19 | 18 | 17 | 16 |
|   | 49 | 29 | 28 | 28 | 27 | 26 | 25 | 24 | 23 | 22 | 21 | 21 | 20 | 19 | 18 | 17 |
|   | 50 | 30 | 29 | 28 | 28 | 27 | 26 | 25 | 24 | 23 | 22 | 21 | 20 | 19 | 18 | 17 |
|   | 51 | 31 | 30 | 29 | 28 | 28 | 27 | 26 | 25 | 24 | 23 | 22 | 21 | 20 | 19 | 18 |
|   | 52 | 32 | 31 | 30 | 29 | 28 | 28 | 27 | 26 | 25 | 24 | 23 | 22 | 21 | 19 | 18 |
|   | 53 | 33 | 32 | 31 | 30 | 29 | 28 | 27 | 26 | 25 | 24 | 23 | 22 | 21 | 20 | 19 |
|   | 54 | 34 | 33 | 32 | 31 | 30 | 29 | 28 | 27 | 26 | 25 | 24 | 23 | 22 | 21 | 20 |
|   | 55 | 35 | 34 | 33 | 32 | 31 | 30 | 29 | 28 | 27 | 26 | 25 | 24 | 23 | 21 | 20 |

FIG. 8c5

|   | Angle of approach | | | | | | | | | | | | | | |
|---|---|---|---|---|---|---|---|---|---|---|---|---|---|---|---|
|   |   | 256 | 257 | 258 | 259 | 260 | 261 | 262 | 263 | 264 | 265 | 266 | 267 | 268 | 269 |
| A | 15 | 4 | 3 | 3 | 3 | 3 | 2 | 2 | 2 | 2 | 1 | 1 | 1 | 1 | 0 |
| n | 16 | 4 | 4 | 3 | 3 | 3 | 3 | 2 | 2 | 2 | 1 | 1 | 1 | 1 | 0 |
| g | 17 | 4 | 4 | 4 | 3 | 3 | 3 | 2 | 2 | 2 | 2 | 1 | 1 | 1 | 0 |
| l | 18 | 4 | 4 | 4 | 4 | 3 | 3 | 3 | 2 | 2 | 2 | 1 | 1 | 1 | 0 |
| e | 19 | 5 | 4 | 4 | 4 | 3 | 3 | 3 | 2 | 2 | 2 | 1 | 1 | 1 | 0 |
|   | 20 | 5 | 5 | 4 | 4 | 4 | 3 | 3 | 3 | 2 | 2 | 1 | 1 | 1 | 0 |
| o | 21 | 5 | 5 | 5 | 4 | 4 | 3 | 3 | 3 | 2 | 2 | 2 | 1 | 1 | 0 |
| f | 22 | 6 | 5 | 5 | 4 | 4 | 4 | 3 | 3 | 2 | 2 | 2 | 1 | 1 | 0 |
|   | 23 | 6 | 5 | 5 | 5 | 4 | 4 | 3 | 3 | 3 | 2 | 2 | 1 | 1 | 0 |
| s | 24 | 6 | 6 | 5 | 5 | 4 | 4 | 4 | 3 | 3 | 2 | 2 | 1 | 1 | 0 |
| l | 25 | 6 | 6 | 6 | 5 | 5 | 4 | 4 | 3 | 3 | 2 | 2 | 1 | 1 | 0 |
| o | 26 | 7 | 6 | 6 | 5 | 5 | 4 | 4 | 3 | 3 | 2 | 2 | 1 | 1 | 0 |
| p | 27 | 7 | 7 | 6 | 6 | 5 | 5 | 4 | 4 | 3 | 3 | 2 | 2 | 1 | 1 |
| e | 28 | 7 | 7 | 6 | 6 | 5 | 5 | 4 | 4 | 3 | 3 | 2 | 2 | 1 | 1 |
|   | 29 | 8 | 7 | 7 | 6 | 5 | 5 | 4 | 4 | 3 | 3 | 2 | 2 | 1 | 1 |
|   | 30 | 8 | 7 | 7 | 6 | 6 | 5 | 5 | 4 | 3 | 3 | 2 | 2 | 1 | 1 |
|   | 31 | 8 | 8 | 7 | 7 | 6 | 5 | 5 | 4 | 4 | 3 | 2 | 2 | 1 | 1 |
|   | 32 | 9 | 8 | 7 | 7 | 6 | 6 | 5 | 4 | 4 | 3 | 2 | 2 | 1 | 1 |
|   | 33 | 9 | 8 | 8 | 7 | 6 | 6 | 5 | 5 | 4 | 3 | 3 | 2 | 1 | 1 |
|   | 34 | 9 | 9 | 8 | 7 | 7 | 6 | 5 | 5 | 4 | 3 | 3 | 2 | 1 | 1 |
|   | 35 | 10 | 9 | 8 | 8 | 7 | 6 | 6 | 5 | 4 | 3 | 3 | 2 | 1 | 1 |
|   | 36 | 10 | 9 | 9 | 8 | 7 | 6 | 6 | 5 | 4 | 4 | 3 | 2 | 1 | 1 |
|   | 37 | 10 | 10 | 9 | 8 | 7 | 7 | 6 | 5 | 5 | 4 | 3 | 2 | 2 | 1 |
|   | 38 | 11 | 10 | 9 | 8 | 8 | 7 | 6 | 5 | 5 | 4 | 3 | 2 | 2 | 1 |
|   | 39 | 11 | 10 | 10 | 9 | 8 | 7 | 6 | 6 | 5 | 4 | 3 | 2 | 2 | 1 |
|   | 40 | 11 | 11 | 10 | 9 | 8 | 7 | 7 | 6 | 5 | 4 | 3 | 3 | 2 | 1 |
|   | 41 | 12 | 11 | 10 | 9 | 9 | 8 | 7 | 6 | 5 | 4 | 3 | 3 | 2 | 1 |
|   | 42 | 12 | 11 | 11 | 10 | 9 | 8 | 7 | 6 | 5 | 4 | 4 | 3 | 2 | 1 |
|   | 43 | 13 | 12 | 11 | 10 | 9 | 8 | 7 | 6 | 6 | 5 | 4 | 3 | 2 | 1 |
|   | 44 | 13 | 12 | 11 | 10 | 10 | 9 | 8 | 7 | 6 | 5 | 4 | 3 | 2 | 1 |
|   | 45 | 14 | 13 | 12 | 11 | 10 | 9 | 8 | 7 | 6 | 5 | 4 | 3 | 2 | 1 |
|   | 46 | 14 | 13 | 12 | 11 | 10 | 9 | 8 | 7 | 6 | 5 | 4 | 3 | 2 | 1 |
|   | 47 | 15 | 14 | 13 | 12 | 11 | 10 | 8 | 7 | 6 | 5 | 4 | 3 | 2 | 1 |
|   | 48 | 15 | 14 | 13 | 12 | 11 | 10 | 9 | 8 | 7 | 6 | 4 | 3 | 2 | 1 |
|   | 49 | 16 | 15 | 13 | 12 | 11 | 10 | 9 | 8 | 7 | 6 | 5 | 3 | 2 | 1 |
|   | 50 | 16 | 15 | 14 | 13 | 12 | 11 | 9 | 8 | 7 | 6 | 5 | 4 | 2 | 1 |
|   | 51 | 17 | 16 | 14 | 13 | 12 | 11 | 10 | 9 | 7 | 6 | 5 | 4 | 2 | 1 |
|   | 52 | 17 | 16 | 15 | 14 | 13 | 11 | 10 | 9 | 8 | 6 | 5 | 4 | 3 | 1 |
|   | 53 | 18 | 17 | 15 | 14 | 13 | 12 | 10 | 9 | 8 | 7 | 5 | 4 | 3 | 1 |
|   | 54 | 18 | 17 | 16 | 15 | 13 | 12 | 11 | 10 | 8 | 7 | 5 | 4 | 3 | 1 |
|   | 55 | 19 | 18 | 17 | 15 | 14 | 13 | 11 | 10 | 8 | 7 | 6 | 4 | 3 | 1 |

FIG. 8c6

|   | Angle of approach | 271 | 272 | 273 | 274 | 275 | 276 | 277 | 278 | 279 | 280 | 281 | 282 | 283 | 284 | 285 |
|---|---|---|---|---|---|---|---|---|---|---|---|---|---|---|---|---|
| A | 15 | 0 | 1 | 1 | 1 | 1 | 2 | 2 | 2 | 2 | 3 | 3 | 3 | 3 | 4 | 4 |
| n | 16 | 0 | 1 | 1 | 1 | 1 | 2 | 2 | 2 | 3 | 3 | 3 | 3 | 4 | 4 | 4 |
| g | 17 | 0 | 1 | 1 | 1 | 2 | 2 | 2 | 2 | 3 | 3 | 3 | 4 | 4 | 4 | 5 |
| l | 18 | 0 | 1 | 1 | 1 | 2 | 2 | 2 | 3 | 3 | 3 | 4 | 4 | 4 | 4 | 5 |
| e | 19 | 0 | 1 | 1 | 1 | 2 | 2 | 2 | 3 | 3 | 3 | 4 | 4 | 4 | 5 | 5 |
|   | 20 | 0 | 1 | 1 | 1 | 2 | 2 | 3 | 3 | 3 | 4 | 4 | 4 | 5 | 5 | 5 |
| o | 21 | 0 | 1 | 1 | 2 | 2 | 2 | 3 | 3 | 3 | 4 | 4 | 5 | 5 | 5 | 6 |
| f | 22 | 0 | 1 | 1 | 2 | 2 | 2 | 3 | 3 | 4 | 4 | 4 | 5 | 5 | 6 | 6 |
|   | 23 | 0 | 1 | 1 | 2 | 2 | 3 | 3 | 3 | 4 | 4 | 5 | 5 | 5 | 6 | 6 |
| s | 24 | 0 | 1 | 1 | 2 | 2 | 3 | 3 | 4 | 4 | 4 | 5 | 5 | 6 | 6 | 7 |
| l | 25 | 0 | 1 | 1 | 2 | 2 | 3 | 3 | 4 | 4 | 5 | 5 | 6 | 6 | 6 | 7 |
| o | 26 | 0 | 1 | 1 | 2 | 2 | 3 | 3 | 4 | 4 | 5 | 5 | 6 | 6 | 7 | 7 |
| p | 27 | 1 | 1 | 2 | 2 | 3 | 3 | 4 | 4 | 5 | 5 | 6 | 6 | 7 | 7 | 8 |
| e | 28 | 1 | 1 | 2 | 2 | 3 | 3 | 4 | 4 | 5 | 5 | 6 | 6 | 7 | 7 | 8 |
|   | 29 | 1 | 1 | 2 | 2 | 3 | 3 | 4 | 4 | 5 | 5 | 6 | 7 | 7 | 8 | 8 |
|   | 30 | 1 | 1 | 2 | 2 | 3 | 3 | 4 | 5 | 5 | 6 | 6 | 7 | 7 | 8 | 8 |
|   | 31 | 1 | 1 | 2 | 2 | 3 | 4 | 4 | 5 | 5 | 6 | 7 | 7 | 8 | 8 | 9 |
|   | 32 | 1 | 1 | 2 | 2 | 3 | 4 | 4 | 5 | 6 | 6 | 7 | 7 | 8 | 9 | 9 |
|   | 33 | 1 | 1 | 2 | 3 | 3 | 4 | 5 | 5 | 6 | 6 | 7 | 8 | 8 | 9 | 10 |
|   | 34 | 1 | 1 | 2 | 3 | 3 | 4 | 5 | 5 | 6 | 7 | 7 | 8 | 9 | 9 | 10 |
|   | 35 | 1 | 1 | 2 | 3 | 3 | 4 | 5 | 6 | 6 | 7 | 8 | 8 | 9 | 10 | 10 |
|   | 36 | 1 | 1 | 2 | 3 | 4 | 4 | 5 | 6 | 6 | 7 | 8 | 9 | 9 | 10 | 11 |
|   | 37 | 1 | 2 | 2 | 3 | 4 | 5 | 5 | 6 | 7 | 7 | 8 | 9 | 10 | 10 | 11 |
|   | 38 | 1 | 2 | 2 | 3 | 4 | 5 | 5 | 6 | 7 | 8 | 8 | 9 | 10 | 11 | 11 |
|   | 39 | 1 | 2 | 2 | 3 | 4 | 5 | 6 | 6 | 7 | 8 | 9 | 10 | 10 | 11 | 12 |
|   | 40 | 1 | 2 | 3 | 3 | 4 | 5 | 6 | 7 | 7 | 8 | 9 | 10 | 11 | 11 | 12 |
|   | 41 | 1 | 2 | 3 | 3 | 4 | 5 | 6 | 7 | 8 | 9 | 9 | 10 | 11 | 12 | 13 |
|   | 42 | 1 | 2 | 3 | 4 | 4 | 5 | 6 | 7 | 8 | 9 | 10 | 11 | 11 | 12 | 13 |
|   | 43 | 1 | 2 | 3 | 4 | 5 | 6 | 6 | 7 | 8 | 9 | 10 | 11 | 12 | 13 | 14 |
|   | 44 | 1 | 2 | 3 | 4 | 5 | 6 | 7 | 8 | 9 | 10 | 10 | 11 | 12 | 13 | 14 |
|   | 45 | 1 | 2 | 3 | 4 | 5 | 6 | 7 | 8 | 9 | 10 | 11 | 12 | 13 | 14 | 15 |
|   | 46 | 1 | 2 | 3 | 4 | 5 | 6 | 7 | 8 | 9 | 10 | 11 | 12 | 13 | 14 | 15 |
|   | 47 | 1 | 2 | 3 | 4 | 5 | 6 | 7 | 8 | 10 | 11 | 12 | 13 | 14 | 15 | 16 |
|   | 48 | 1 | 2 | 3 | 4 | 6 | 7 | 8 | 9 | 10 | 11 | 12 | 13 | 14 | 15 | 16 |
|   | 49 | 1 | 2 | 3 | 5 | 6 | 7 | 8 | 9 | 10 | 11 | 12 | 13 | 15 | 16 | 17 |
|   | 50 | 1 | 2 | 4 | 5 | 6 | 7 | 8 | 9 | 11 | 12 | 13 | 14 | 15 | 16 | 17 |
|   | 51 | 1 | 2 | 4 | 5 | 6 | 7 | 9 | 10 | 11 | 12 | 13 | 14 | 16 | 17 | 18 |
|   | 52 | 1 | 3 | 4 | 5 | 6 | 8 | 9 | 10 | 11 | 13 | 14 | 15 | 16 | 17 | 18 |
|   | 53 | 1 | 3 | 4 | 5 | 7 | 8 | 9 | 10 | 12 | 13 | 14 | 15 | 17 | 18 | 19 |
|   | 54 | 1 | 3 | 4 | 5 | 7 | 8 | 10 | 11 | 12 | 13 | 15 | 16 | 17 | 18 | 20 |
|   | 55 | 1 | 3 | 4 | 6 | 7 | 8 | 10 | 11 | 13 | 14 | 15 | 17 | 18 | 19 | 20 |

FIG. 8d1

|   | Angle of approach | 286 | 287 | 288 | 289 | 290 | 291 | 292 | 293 | 294 | 295 | 296 | 297 | 298 | 299 | 300 |
|---|---|---|---|---|---|---|---|---|---|---|---|---|---|---|---|---|
| A | 15 | 4 | 4 | 5 | 5 | 5 | 5 | 6 | 6 | 6 | 6 | 7 | 7 | 7 | 7 | 8 |
| n | 16 | 5 | 5 | 5 | 5 | 6 | 6 | 6 | 6 | 7 | 7 | 7 | 7 | 8 | 8 | 8 |
| g | 17 | 5 | 5 | 5 | 6 | 6 | 6 | 7 | 7 | 7 | 7 | 8 | 8 | 8 | 8 | 9 |
| l | 18 | 5 | 5 | 6 | 6 | 6 | 7 | 7 | 7 | 8 | 8 | 8 | 8 | 9 | 9 | 9 |
| e | 19 | 5 | 6 | 6 | 6 | 7 | 7 | 7 | 8 | 8 | 8 | 9 | 9 | 9 | 9 | 10 |
|   | 20 | 6 | 6 | 6 | 7 | 7 | 7 | 8 | 8 | 8 | 9 | 9 | 9 | 10 | 10 | 10 |
| o | 21 | 6 | 6 | 7 | 7 | 7 | 8 | 8 | 9 | 9 | 9 | 10 | 10 | 10 | 11 | 11 |
| f | 22 | 6 | 7 | 7 | 7 | 8 | 8 | 9 | 9 | 9 | 10 | 10 | 10 | 11 | 11 | 11 |
|   | 23 | 7 | 7 | 7 | 8 | 8 | 9 | 9 | 9 | 10 | 10 | 11 | 11 | 11 | 12 | 12 |
| s | 24 | 7 | 7 | 8 | 8 | 9 | 9 | 9 | 10 | 10 | 11 | 11 | 11 | 12 | 12 | 13 |
| l | 25 | 7 | 8 | 8 | 9 | 9 | 9 | 10 | 10 | 11 | 11 | 12 | 12 | 12 | 13 | 13 |
| o | 26 | 8 | 8 | 9 | 9 | 9 | 10 | 10 | 11 | 11 | 12 | 12 | 12 | 13 | 13 | 14 |
| p | 27 | 8 | 8 | 9 | 9 | 10 | 10 | 11 | 11 | 12 | 12 | 13 | 13 | 13 | 14 | 14 |
| e | 28 | 8 | 9 | 9 | 10 | 10 | 11 | 11 | 12 | 12 | 13 | 13 | 14 | 14 | 14 | 15 |
|   | 29 | 9 | 9 | 10 | 10 | 11 | 11 | 12 | 12 | 13 | 13 | 14 | 14 | 15 | 15 | 15 |
|   | 30 | 9 | 10 | 10 | 11 | 11 | 12 | 12 | 13 | 13 | 14 | 14 | 15 | 15 | 16 | 16 |
|   | 31 | 9 | 10 | 11 | 11 | 12 | 12 | 13 | 13 | 14 | 14 | 15 | 15 | 16 | 16 | 17 |
|   | 32 | 10 | 10 | 11 | 11 | 12 | 13 | 13 | 14 | 14 | 15 | 15 | 16 | 16 | 17 | 17 |
|   | 33 | 10 | 11 | 11 | 12 | 13 | 13 | 14 | 14 | 15 | 15 | 16 | 16 | 17 | 17 | 18 |
|   | 34 | 11 | 11 | 12 | 12 | 13 | 14 | 14 | 15 | 15 | 16 | 16 | 17 | 18 | 18 | 19 |
|   | 35 | 11 | 12 | 12 | 13 | 13 | 14 | 15 | 15 | 16 | 16 | 17 | 18 | 18 | 19 | 19 |
|   | 36 | 11 | 12 | 13 | 13 | 14 | 15 | 15 | 16 | 16 | 17 | 18 | 18 | 19 | 19 | 20 |
|   | 37 | 12 | 12 | 13 | 14 | 14 | 15 | 16 | 16 | 17 | 18 | 18 | 19 | 19 | 20 | 21 |
|   | 38 | 12 | 13 | 14 | 14 | 15 | 16 | 16 | 17 | 18 | 18 | 19 | 20 | 20 | 21 | 21 |
|   | 39 | 13 | 13 | 14 | 15 | 15 | 16 | 17 | 18 | 18 | 19 | 20 | 20 | 21 | 21 | 22 |
|   | 40 | 13 | 14 | 15 | 15 | 16 | 17 | 17 | 18 | 19 | 20 | 20 | 21 | 22 | 22 | 23 |
|   | 41 | 13 | 14 | 15 | 16 | 17 | 17 | 18 | 19 | 19 | 20 | 21 | 22 | 22 | 23 | 23 |
|   | 42 | 14 | 15 | 16 | 16 | 17 | 18 | 19 | 19 | 20 | 21 | 22 | 22 | 23 | 24 | 24 |
|   | 43 | 14 | 15 | 16 | 17 | 18 | 18 | 19 | 20 | 21 | 22 | 22 | 23 | 24 | 24 | 25 |
|   | 44 | 15 | 16 | 17 | 17 | 18 | 19 | 20 | 21 | 21 | 22 | 23 | 24 | 24 | 25 | 26 |
|   | 45 | 15 | 16 | 17 | 18 | 19 | 20 | 21 | 21 | 22 | 23 | 24 | 24 | 25 | 26 | 27 |
|   | 46 | 16 | 17 | 18 | 19 | 20 | 20 | 21 | 22 | 23 | 24 | 24 | 25 | 26 | 27 | 27 |
|   | 47 | 16 | 17 | 18 | 19 | 20 | 21 | 22 | 23 | 24 | 24 | 25 | 26 | 27 | 27 | 28 |
|   | 48 | 17 | 18 | 19 | 20 | 21 | 22 | 23 | 23 | 24 | 25 | 26 | 27 | 28 | 28 | 29 |
|   | 49 | 18 | 19 | 20 | 21 | 21 | 22 | 23 | 24 | 25 | 26 | 27 | 28 | 28 | 29 | 30 |
|   | 50 | 18 | 19 | 20 | 21 | 22 | 23 | 24 | 25 | 26 | 27 | 28 | 28 | 29 | 30 | 31 |
|   | 51 | 19 | 20 | 21 | 22 | 23 | 24 | 25 | 26 | 27 | 28 | 28 | 29 | 30 | 31 | 32 |
|   | 52 | 19 | 21 | 22 | 23 | 24 | 25 | 26 | 27 | 28 | 28 | 29 | 30 | 31 | 32 | 33 |
|   | 53 | 20 | 21 | 22 | 23 | 24 | 25 | 26 | 27 | 28 | 29 | 30 | 31 | 32 | 33 | 34 |
|   | 54 | 21 | 22 | 23 | 24 | 25 | 26 | 27 | 28 | 29 | 30 | 31 | 32 | 33 | 34 | 35 |
|   | 55 | 21 | 23 | 24 | 25 | 26 | 27 | 28 | 29 | 30 | 31 | 32 | 33 | 34 | 35 | 36 |

FIG. 8d2

| | Angle of approach | 301 | 302 | 303 | 304 | 305 | 306 | 307 | 308 | 309 | 310 | 311 | 312 | 313 | 314 | 315 |
|---|---|---|---|---|---|---|---|---|---|---|---|---|---|---|---|---|
| A | 15 | 8 | 8 | 8 | 9 | 9 | 9 | 9 | 9 | 10 | 10 | 10 | 10 | 10 | 11 | 11 |
| n | 16 | 8 | 9 | 9 | 9 | 9 | 10 | 10 | 10 | 10 | 10 | 11 | 11 | 11 | 11 | 11 |
| g | 17 | 9 | 9 | 9 | 10 | 10 | 10 | 10 | 11 | 11 | 11 | 11 | 12 | 12 | 12 | 12 |
| l | 18 | 10 | 10 | 10 | 10 | 11 | 11 | 11 | 11 | 12 | 12 | 12 | 12 | 12 | 13 | 13 |
| e | 19 | 10 | 10 | 11 | 11 | 11 | 11 | 12 | 12 | 12 | 12 | 13 | 13 | 13 | 13 | 14 |
|   | 20 | 11 | 11 | 11 | 12 | 12 | 12 | 12 | 13 | 13 | 13 | 13 | 14 | 14 | 14 | 14 |
| o | 21 | 11 | 11 | 12 | 12 | 12 | 13 | 13 | 13 | 14 | 14 | 14 | 14 | 15 | 15 | 15 |
| f | 22 | 12 | 12 | 12 | 13 | 13 | 13 | 14 | 14 | 14 | 15 | 15 | 15 | 15 | 16 | 16 |
|   | 23 | 12 | 13 | 13 | 13 | 14 | 14 | 14 | 15 | 15 | 15 | 16 | 16 | 16 | 16 | 17 |
| s | 24 | 13 | 13 | 14 | 14 | 14 | 15 | 15 | 15 | 16 | 16 | 16 | 17 | 17 | 17 | 17 |
| l | 25 | 14 | 14 | 14 | 15 | 15 | 15 | 16 | 16 | 16 | 17 | 17 | 17 | 18 | 18 | 18 |
| o | 26 | 14 | 14 | 15 | 15 | 16 | 16 | 16 | 17 | 17 | 17 | 18 | 18 | 18 | 19 | 19 |
| p | 27 | 15 | 15 | 16 | 16 | 16 | 17 | 17 | 17 | 18 | 18 | 18 | 19 | 19 | 19 | 20 |
| e | 28 | 15 | 16 | 16 | 17 | 17 | 17 | 18 | 18 | 19 | 19 | 19 | 20 | 20 | 20 | 21 |
|   | 29 | 16 | 16 | 17 | 17 | 18 | 18 | 18 | 19 | 19 | 20 | 20 | 20 | 21 | 21 | 21 |
|   | 30 | 17 | 17 | 17 | 18 | 18 | 19 | 19 | 20 | 20 | 20 | 21 | 21 | 21 | 22 | 22 |
|   | 31 | 17 | 18 | 18 | 19 | 19 | 19 | 20 | 20 | 21 | 21 | 22 | 22 | 22 | 23 | 23 |
|   | 32 | 18 | 18 | 19 | 19 | 20 | 20 | 21 | 21 | 21 | 22 | 22 | 23 | 23 | 23 | 24 |
|   | 33 | 18 | 19 | 19 | 20 | 20 | 21 | 21 | 22 | 22 | 23 | 23 | 23 | 24 | 24 | 25 |
|   | 34 | 19 | 20 | 20 | 21 | 21 | 22 | 22 | 23 | 23 | 23 | 24 | 24 | 25 | 25 | 25 |
|   | 35 | 20 | 20 | 21 | 21 | 22 | 22 | 23 | 23 | 24 | 24 | 25 | 25 | 26 | 26 | 26 |
|   | 36 | 21 | 21 | 22 | 22 | 23 | 23 | 24 | 24 | 25 | 25 | 25 | 26 | 26 | 27 | 27 |
|   | 37 | 21 | 22 | 22 | 23 | 23 | 24 | 24 | 25 | 25 | 26 | 26 | 27 | 27 | 28 | 28 |
|   | 38 | 22 | 22 | 23 | 24 | 24 | 25 | 25 | 26 | 26 | 27 | 27 | 28 | 28 | 28 | 29 |
|   | 39 | 23 | 23 | 24 | 24 | 25 | 25 | 26 | 26 | 27 | 27 | 28 | 28 | 29 | 29 | 30 |
|   | 40 | 23 | 24 | 25 | 25 | 26 | 26 | 27 | 27 | 28 | 28 | 29 | 29 | 30 | 30 | 31 |
|   | 41 | 24 | 25 | 25 | 26 | 27 | 27 | 28 | 28 | 29 | 29 | 30 | 30 | 31 | 31 | 32 |
|   | 42 | 25 | 26 | 26 | 27 | 27 | 28 | 28 | 29 | 30 | 30 | 31 | 31 | 32 | 32 | 32 |
|   | 43 | 26 | 26 | 27 | 28 | 28 | 29 | 29 | 30 | 30 | 31 | 31 | 32 | 32 | 33 | 33 |
|   | 44 | 26 | 27 | 28 | 28 | 29 | 30 | 30 | 31 | 31 | 32 | 32 | 33 | 33 | 34 | 34 |
|   | 45 | 27 | 28 | 29 | 29 | 30 | 30 | 31 | 32 | 32 | 33 | 33 | 34 | 34 | 35 | 35 |
|   | 46 | 28 | 29 | 29 | 30 | 31 | 31 | 32 | 33 | 33 | 34 | 34 | 35 | 35 | 36 | 36 |
|   | 47 | 29 | 30 | 30 | 31 | 32 | 32 | 33 | 33 | 34 | 35 | 35 | 36 | 36 | 37 | 37 |
|   | 48 | 30 | 30 | 31 | 32 | 32 | 33 | 34 | 34 | 35 | 36 | 36 | 37 | 37 | 38 | 38 |
|   | 49 | 31 | 31 | 32 | 33 | 33 | 34 | 35 | 35 | 36 | 36 | 37 | 38 | 38 | 39 | 39 |
|   | 50 | 32 | 32 | 33 | 34 | 34 | 35 | 36 | 36 | 37 | 37 | 38 | 39 | 39 | 40 | 40 |
|   | 51 | 32 | 33 | 34 | 35 | 35 | 36 | 37 | 37 | 38 | 38 | 39 | 40 | 40 | 41 | 41 |
|   | 52 | 33 | 34 | 35 | 36 | 36 | 37 | 38 | 38 | 39 | 39 | 40 | 41 | 41 | 42 | 42 |
|   | 53 | 34 | 35 | 36 | 37 | 37 | 38 | 39 | 39 | 40 | 40 | 41 | 42 | 42 | 43 | 43 |
|   | 54 | 35 | 36 | 37 | 38 | 38 | 39 | 40 | 40 | 41 | 41 | 42 | 43 | 43 | 44 | 44 |
|   | 55 | 36 | 37 | 38 | 39 | 39 | 40 | 41 | 41 | 42 | 43 | 43 | 44 | 44 | 45 | 45 |

FIG. 8d3

|   | Angle of approach | | | | | | | | | | | | | | | |
|---|---|---|---|---|---|---|---|---|---|---|---|---|---|---|---|---|
|   |    | 316 | 317 | 318 | 319 | 320 | 320 | 322 | 323 | 324 | 325 | 326 | 327 | 328 | 329 | 330 |
| A | 15 | 11 | 11 | 11 | 11 | 12 | 12 | 12 | 12 | 12 | 12 | 13 | 13 | 13 | 13 | 13 |
| n | 16 | 12 | 12 | 12 | 12 | 12 | 13 | 13 | 13 | 13 | 13 | 14 | 14 | 14 | 14 | 14 |
| g | 17 | 12 | 13 | 13 | 13 | 13 | 13 | 14 | 14 | 14 | 14 | 14 | 14 | 15 | 15 | 15 |
| l | 18 | 13 | 13 | 14 | 14 | 14 | 14 | 14 | 15 | 15 | 15 | 15 | 15 | 15 | 16 | 16 |
| e | 19 | 14 | 14 | 14 | 15 | 15 | 15 | 15 | 15 | 16 | 16 | 16 | 16 | 16 | 16 | 17 |
|   | 20 | 15 | 15 | 15 | 15 | 16 | 16 | 16 | 16 | 17 | 17 | 17 | 17 | 17 | 17 | 17 |
| o | 21 | 15 | 16 | 16 | 16 | 16 | 17 | 17 | 17 | 17 | 18 | 18 | 18 | 18 | 18 | 18 |
| f | 22 | 16 | 16 | 17 | 17 | 17 | 17 | 18 | 18 | 18 | 18 | 19 | 19 | 19 | 19 | 19 |
|   | 23 | 17 | 17 | 18 | 18 | 18 | 18 | 18 | 19 | 19 | 19 | 19 | 20 | 20 | 20 | 20 |
| s | 24 | 18 | 18 | 18 | 19 | 19 | 19 | 19 | 20 | 20 | 20 | 20 | 20 | 21 | 21 | 21 |
| l | 25 | 19 | 19 | 19 | 19 | 20 | 20 | 20 | 20 | 21 | 21 | 21 | 21 | 22 | 22 | 22 |
| o | 26 | 19 | 20 | 20 | 20 | 20 | 21 | 21 | 21 | 22 | 22 | 22 | 22 | 22 | 23 | 23 |
| p | 27 | 20 | 20 | 21 | 21 | 21 | 22 | 22 | 22 | 22 | 23 | 23 | 23 | 23 | 24 | 24 |
| e | 28 | 21 | 21 | 22 | 22 | 22 | 22 | 23 | 23 | 23 | 24 | 24 | 24 | 24 | 25 | 25 |
|   | 29 | 22 | 22 | 22 | 23 | 23 | 23 | 24 | 24 | 24 | 25 | 25 | 25 | 25 | 25 | 26 |
|   | 30 | 23 | 23 | 23 | 24 | 24 | 24 | 24 | 25 | 25 | 25 | 26 | 26 | 26 | 26 | 27 |
|   | 31 | 23 | 24 | 24 | 24 | 25 | 25 | 25 | 26 | 26 | 26 | 26 | 27 | 27 | 27 | 27 |
|   | 32 | 24 | 25 | 25 | 25 | 26 | 26 | 26 | 27 | 27 | 27 | 27 | 28 | 28 | 28 | 28 |
|   | 33 | 25 | 25 | 26 | 26 | 26 | 27 | 27 | 27 | 28 | 28 | 28 | 29 | 29 | 29 | 29 |
|   | 34 | 26 | 26 | 27 | 27 | 27 | 28 | 28 | 28 | 29 | 29 | 29 | 29 | 30 | 30 | 30 |
|   | 35 | 27 | 27 | 27 | 28 | 28 | 29 | 29 | 29 | 30 | 30 | 30 | 30 | 31 | 31 | 31 |
|   | 36 | 28 | 28 | 28 | 29 | 29 | 29 | 30 | 30 | 30 | 31 | 31 | 31 | 32 | 32 | 32 |
|   | 37 | 28 | 29 | 29 | 30 | 30 | 30 | 31 | 31 | 31 | 32 | 32 | 32 | 33 | 33 | 33 |
|   | 38 | 29 | 30 | 30 | 31 | 31 | 31 | 32 | 32 | 32 | 33 | 33 | 33 | 34 | 34 | 34 |
|   | 39 | 30 | 31 | 31 | 31 | 32 | 32 | 33 | 33 | 33 | 34 | 34 | 34 | 34 | 35 | 35 |
|   | 40 | 31 | 32 | 32 | 32 | 33 | 33 | 33 | 34 | 34 | 35 | 35 | 35 | 35 | 36 | 36 |
|   | 41 | 32 | 32 | 33 | 33 | 34 | 34 | 34 | 35 | 35 | 35 | 36 | 36 | 36 | 37 | 37 |
|   | 42 | 33 | 33 | 34 | 34 | 35 | 35 | 35 | 36 | 36 | 36 | 37 | 37 | 37 | 38 | 38 |
|   | 43 | 34 | 34 | 35 | 35 | 36 | 36 | 36 | 37 | 37 | 37 | 38 | 38 | 38 | 39 | 39 |
|   | 44 | 35 | 35 | 36 | 36 | 36 | 37 | 37 | 38 | 38 | 38 | 39 | 39 | 39 | 40 | 40 |
|   | 45 | 36 | 36 | 37 | 37 | 37 | 38 | 38 | 39 | 39 | 39 | 40 | 40 | 40 | 41 | 41 |
|   | 46 | 37 | 37 | 38 | 38 | 38 | 39 | 39 | 40 | 40 | 40 | 41 | 41 | 41 | 42 | 42 |
|   | 47 | 38 | 38 | 39 | 39 | 39 | 40 | 40 | 41 | 41 | 41 | 42 | 42 | 42 | 43 | 43 |
|   | 48 | 39 | 39 | 40 | 40 | 40 | 41 | 41 | 42 | 42 | 42 | 43 | 43 | 43 | 44 | 44 |
|   | 49 | 40 | 40 | 41 | 41 | 41 | 42 | 42 | 43 | 43 | 43 | 44 | 44 | 44 | 45 | 45 |
|   | 50 | 41 | 41 | 42 | 42 | 42 | 43 | 43 | 44 | 44 | 44 | 45 | 45 | 45 | 46 | 46 |
|   | 51 | 42 | 42 | 43 | 43 | 43 | 44 | 44 | 45 | 45 | 45 | 46 | 46 | 46 | 47 | 47 |
|   | 52 | 43 | 43 | 44 | 44 | 44 | 45 | 45 | 46 | 46 | 46 | 47 | 47 | 47 | 48 | 48 |
|   | 53 | 44 | 44 | 45 | 45 | 45 | 46 | 46 | 47 | 47 | 47 | 48 | 48 | 48 | 49 | 49 |
|   | 54 | 45 | 45 | 46 | 46 | 47 | 47 | 47 | 48 | 48 | 48 | 49 | 49 | 49 | 50 | 50 |
|   | 55 | 46 | 46 | 47 | 47 | 48 | 48 | 48 | 49 | 49 | 49 | 50 | 50 | 50 | 51 | 51 |

FIG. 8d4

|   | Angle of approach | 331 | 332 | 333 | 334 | 335 | 336 | 337 | 338 | 339 | 340 | 341 | 342 | 343 | 344 | 345 |
|---|---|---|---|---|---|---|---|---|---|---|---|---|---|---|---|---|
| A | 15 | 13 | 13 | 13 | 14 | 14 | 14 | 14 | 14 | 14 | 14 | 14 | 14 | 14 | 14 | 15 |
| n | 16 | 14 | 14 | 14 | 14 | 15 | 15 | 15 | 15 | 15 | 15 | 15 | 15 | 15 | 15 | 15 |
| g | 17 | 15 | 15 | 15 | 15 | 15 | 16 | 16 | 16 | 16 | 16 | 16 | 16 | 16 | 16 | 16 |
| l | 18 | 16 | 16 | 16 | 16 | 16 | 17 | 17 | 17 | 17 | 17 | 17 | 17 | 17 | 17 | 17 |
| e | 19 | 17 | 17 | 17 | 17 | 17 | 17 | 18 | 18 | 18 | 18 | 18 | 18 | 18 | 18 | 18 |
|   | 20 | 18 | 18 | 18 | 18 | 18 | 18 | 19 | 19 | 19 | 19 | 19 | 19 | 19 | 19 | 19 |
| o | 21 | 19 | 19 | 19 | 19 | 19 | 19 | 19 | 20 | 20 | 20 | 20 | 20 | 20 | 20 | 20 |
| f | 22 | 19 | 20 | 20 | 20 | 20 | 20 | 20 | 21 | 21 | 21 | 21 | 21 | 21 | 21 | 21 |
|   | 23 | 20 | 21 | 21 | 21 | 21 | 21 | 21 | 21 | 22 | 22 | 22 | 22 | 22 | 22 | 22 |
| s | 24 | 21 | 21 | 22 | 22 | 22 | 22 | 22 | 22 | 23 | 23 | 23 | 23 | 23 | 23 | 23 |
| l | 25 | 22 | 22 | 23 | 23 | 23 | 23 | 23 | 23 | 24 | 24 | 24 | 24 | 24 | 24 | 24 |
| o | 26 | 23 | 23 | 23 | 24 | 24 | 24 | 24 | 24 | 24 | 25 | 25 | 25 | 25 | 25 | 25 |
| p | 27 | 24 | 24 | 24 | 25 | 25 | 25 | 25 | 25 | 25 | 26 | 26 | 26 | 26 | 26 | 26 |
| e | 28 | 25 | 25 | 25 | 26 | 26 | 26 | 26 | 26 | 26 | 27 | 27 | 27 | 27 | 27 | 27 |
|   | 29 | 26 | 26 | 26 | 26 | 27 | 27 | 27 | 27 | 27 | 28 | 28 | 28 | 28 | 28 | 28 |
|   | 30 | 27 | 27 | 27 | 27 | 28 | 28 | 28 | 28 | 28 | 28 | 29 | 29 | 29 | 29 | 29 |
|   | 31 | 28 | 28 | 28 | 28 | 29 | 29 | 29 | 29 | 29 | 29 | 30 | 30 | 30 | 30 | 30 |
|   | 32 | 29 | 29 | 29 | 29 | 30 | 30 | 30 | 30 | 30 | 30 | 31 | 31 | 31 | 31 | 31 |
|   | 33 | 30 | 30 | 30 | 30 | 30 | 31 | 31 | 31 | 31 | 31 | 32 | 32 | 32 | 32 | 32 |
|   | 34 | 31 | 31 | 31 | 31 | 31 | 32 | 32 | 32 | 32 | 33 | 33 | 33 | 33 | 33 | 33 |
|   | 35 | 31 | 32 | 32 | 32 | 32 | 33 | 33 | 33 | 33 | 33 | 34 | 34 | 34 | 34 | 34 |
|   | 36 | 32 | 33 | 33 | 33 | 33 | 34 | 34 | 34 | 34 | 34 | 34 | 35 | 35 | 35 | 35 |
|   | 37 | 33 | 34 | 34 | 34 | 34 | 35 | 35 | 35 | 35 | 35 | 35 | 36 | 36 | 36 | 36 |
|   | 38 | 34 | 35 | 35 | 35 | 35 | 36 | 36 | 36 | 36 | 36 | 36 | 37 | 37 | 37 | 37 |
|   | 39 | 35 | 36 | 36 | 36 | 36 | 36 | 37 | 37 | 37 | 37 | 37 | 38 | 38 | 38 | 38 |
|   | 40 | 36 | 37 | 37 | 37 | 37 | 37 | 38 | 38 | 38 | 38 | 38 | 39 | 39 | 39 | 39 |
|   | 41 | 37 | 38 | 38 | 38 | 38 | 38 | 39 | 39 | 39 | 39 | 39 | 40 | 40 | 40 | 40 |
|   | 42 | 38 | 38 | 39 | 39 | 39 | 39 | 40 | 40 | 40 | 40 | 40 | 41 | 41 | 41 | 41 |
|   | 43 | 39 | 39 | 40 | 40 | 40 | 40 | 41 | 41 | 41 | 41 | 41 | 42 | 42 | 42 | 42 |
|   | 44 | 40 | 40 | 41 | 41 | 41 | 41 | 42 | 42 | 42 | 42 | 42 | 43 | 43 | 43 | 43 |
|   | 45 | 41 | 41 | 42 | 42 | 42 | 42 | 43 | 43 | 43 | 43 | 43 | 44 | 44 | 44 | 44 |
|   | 46 | 42 | 42 | 43 | 43 | 43 | 43 | 44 | 44 | 44 | 44 | 44 | 45 | 45 | 45 | 45 |
|   | 47 | 43 | 43 | 44 | 44 | 44 | 44 | 45 | 45 | 45 | 45 | 45 | 46 | 46 | 46 | 46 |
|   | 48 | 44 | 44 | 45 | 45 | 45 | 45 | 46 | 46 | 46 | 46 | 46 | 47 | 47 | 47 | 47 |
|   | 49 | 45 | 45 | 46 | 46 | 46 | 46 | 47 | 47 | 47 | 47 | 47 | 48 | 48 | 48 | 48 |
|   | 50 | 46 | 46 | 47 | 47 | 47 | 47 | 48 | 48 | 48 | 48 | 48 | 49 | 49 | 49 | 49 |
|   | 51 | 47 | 47 | 48 | 48 | 48 | 48 | 49 | 49 | 49 | 49 | 49 | 50 | 50 | 50 | 50 |
|   | 52 | 48 | 48 | 49 | 49 | 49 | 49 | 50 | 50 | 50 | 50 | 50 | 51 | 51 | 51 | 51 |
|   | 53 | 49 | 50 | 50 | 50 | 50 | 50 | 51 | 51 | 51 | 51 | 51 | 52 | 52 | 52 | 52 |
|   | 54 | 50 | 51 | 51 | 51 | 51 | 52 | 52 | 52 | 52 | 52 | 52 | 53 | 53 | 53 | 53 |
|   | 55 | 51 | 52 | 52 | 52 | 52 | 53 | 53 | 53 | 53 | 53 | 53 | 54 | 54 | 54 | 54 |

FIG. 8d5

|   | Angle of approach | | | | | | | | | | | | | | |
|---|---|---|---|---|---|---|---|---|---|---|---|---|---|---|---|
|   |   | 346 | 347 | 348 | 349 | 350 | 351 | 352 | 353 | 354 | 355 | 356 | 357 | 358 | 359 |
| A | 15 | 15 | 15 | 15 | 15 | 15 | 15 | 15 | 15 | 15 | 15 | 15 | 15 | 15 | 15 |
| n | 16 | 16 | 16 | 16 | 16 | 16 | 16 | 16 | 16 | 16 | 16 | 16 | 16 | 16 | 16 |
| g | 17 | 17 | 17 | 17 | 17 | 17 | 17 | 17 | 17 | 17 | 17 | 17 | 17 | 17 | 17 |
| l | 18 | 17 | 18 | 18 | 18 | 18 | 18 | 18 | 18 | 18 | 18 | 18 | 18 | 18 | 18 |
| e | 19 | 18 | 19 | 19 | 19 | 19 | 19 | 19 | 19 | 19 | 19 | 19 | 19 | 19 | 19 |
|   | 20 | 19 | 20 | 20 | 20 | 20 | 20 | 20 | 20 | 20 | 20 | 20 | 20 | 20 | 20 |
| o | 21 | 20 | 21 | 21 | 21 | 21 | 21 | 21 | 21 | 21 | 21 | 21 | 21 | 21 | 21 |
| f | 22 | 21 | 21 | 22 | 22 | 22 | 22 | 22 | 22 | 22 | 22 | 22 | 22 | 22 | 22 |
|   | 23 | 22 | 22 | 23 | 23 | 23 | 23 | 23 | 23 | 23 | 23 | 23 | 23 | 23 | 23 |
| s | 24 | 23 | 23 | 24 | 24 | 24 | 24 | 24 | 24 | 24 | 24 | 24 | 24 | 24 | 24 |
| l | 25 | 24 | 24 | 25 | 25 | 25 | 25 | 25 | 25 | 25 | 25 | 25 | 25 | 25 | 25 |
| o | 26 | 25 | 25 | 26 | 26 | 26 | 26 | 26 | 26 | 26 | 26 | 26 | 26 | 26 | 26 |
| p | 27 | 26 | 26 | 26 | 27 | 27 | 27 | 27 | 27 | 27 | 27 | 27 | 27 | 27 | 27 |
| e | 28 | 27 | 27 | 27 | 28 | 28 | 28 | 28 | 28 | 28 | 28 | 28 | 28 | 28 | 28 |
|   | 29 | 28 | 28 | 28 | 29 | 29 | 29 | 29 | 29 | 29 | 29 | 29 | 29 | 29 | 29 |
|   | 30 | 29 | 29 | 29 | 30 | 30 | 30 | 30 | 30 | 30 | 30 | 30 | 30 | 30 | 30 |
|   | 31 | 30 | 30 | 30 | 31 | 31 | 31 | 31 | 31 | 31 | 31 | 31 | 31 | 31 | 31 |
|   | 32 | 31 | 31 | 31 | 32 | 32 | 32 | 32 | 32 | 32 | 32 | 32 | 32 | 32 | 32 |
|   | 33 | 32 | 32 | 32 | 33 | 33 | 33 | 33 | 33 | 33 | 33 | 33 | 33 | 33 | 33 |
|   | 34 | 33 | 33 | 33 | 34 | 34 | 34 | 34 | 34 | 34 | 34 | 34 | 34 | 34 | 34 |
|   | 35 | 34 | 34 | 34 | 35 | 35 | 35 | 35 | 35 | 35 | 35 | 35 | 35 | 35 | 35 |
|   | 36 | 35 | 35 | 35 | 35 | 36 | 36 | 36 | 36 | 36 | 36 | 36 | 36 | 36 | 36 |
|   | 37 | 36 | 36 | 36 | 36 | 37 | 37 | 37 | 37 | 37 | 37 | 37 | 37 | 37 | 37 |
|   | 38 | 37 | 37 | 37 | 37 | 38 | 38 | 38 | 38 | 38 | 38 | 38 | 38 | 38 | 38 |
|   | 39 | 38 | 38 | 38 | 38 | 39 | 39 | 39 | 39 | 39 | 39 | 39 | 39 | 39 | 39 |
|   | 40 | 39 | 39 | 39 | 39 | 40 | 40 | 40 | 40 | 40 | 40 | 40 | 40 | 40 | 40 |
|   | 41 | 40 | 40 | 40 | 40 | 41 | 41 | 41 | 41 | 41 | 41 | 41 | 41 | 41 | 41 |
|   | 42 | 41 | 41 | 41 | 41 | 42 | 42 | 42 | 42 | 42 | 42 | 42 | 42 | 42 | 42 |
|   | 43 | 42 | 42 | 42 | 42 | 43 | 43 | 43 | 43 | 43 | 43 | 43 | 43 | 43 | 43 |
|   | 44 | 43 | 43 | 43 | 43 | 44 | 44 | 44 | 44 | 44 | 44 | 44 | 44 | 44 | 44 |
|   | 45 | 44 | 44 | 44 | 44 | 45 | 45 | 45 | 45 | 45 | 45 | 45 | 45 | 45 | 45 |
|   | 46 | 45 | 45 | 45 | 45 | 46 | 46 | 46 | 46 | 46 | 46 | 46 | 46 | 46 | 46 |
|   | 47 | 46 | 46 | 46 | 46 | 47 | 47 | 47 | 47 | 47 | 47 | 47 | 47 | 47 | 47 |
|   | 48 | 47 | 47 | 47 | 47 | 48 | 48 | 48 | 48 | 48 | 48 | 48 | 48 | 48 | 48 |
|   | 49 | 48 | 48 | 48 | 48 | 49 | 49 | 49 | 49 | 49 | 49 | 49 | 49 | 49 | 49 |
|   | 50 | 49 | 49 | 49 | 49 | 50 | 50 | 50 | 50 | 50 | 50 | 50 | 50 | 50 | 50 |
|   | 51 | 50 | 50 | 50 | 50 | 51 | 51 | 51 | 51 | 51 | 51 | 51 | 51 | 51 | 51 |
|   | 52 | 51 | 51 | 51 | 51 | 52 | 52 | 52 | 52 | 52 | 52 | 52 | 52 | 52 | 52 |
|   | 53 | 52 | 52 | 52 | 52 | 53 | 53 | 53 | 53 | 53 | 53 | 53 | 53 | 53 | 53 |
|   | 54 | 53 | 53 | 53 | 53 | 54 | 54 | 54 | 54 | 54 | 54 | 54 | 54 | 54 | 54 |
|   | 55 | 54 | 54 | 54 | 54 | 55 | 55 | 55 | 55 | 55 | 55 | 55 | 55 | 55 | 55 |

FIG. 8d6

| Preload angle | | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|---|
| | Angle of approach | | | | | | | | | | | | | | | |
| | | 1 | 2 | 3 | 4 | 5 | 6 | 7 | 8 | 9 | 10 | 11 | 12 | 13 | 14 | 15 |
| A | 15 | 14 | 14 | 14 | 14 | 14 | 14 | 14 | 14 | 14 | 13 | 13 | 13 | 13 | 13 | 13 |
| n | 16 | 15 | 15 | 15 | 15 | 15 | 15 | 15 | 15 | 14 | 14 | 14 | 14 | 14 | 14 | 14 |
| g | 17 | 16 | 16 | 16 | 16 | 16 | 16 | 16 | 15 | 15 | 15 | 15 | 15 | 15 | 15 | 15 |
| l | 18 | 17 | 17 | 17 | 17 | 17 | 17 | 17 | 16 | 16 | 16 | 16 | 16 | 16 | 16 | 15 |
| e | 19 | 18 | 18 | 18 | 18 | 18 | 18 | 17 | 17 | 17 | 17 | 17 | 17 | 17 | 16 | 16 |
| | 20 | 19 | 19 | 19 | 19 | 19 | 19 | 18 | 18 | 18 | 18 | 18 | 18 | 17 | 17 | 17 |
| o | 21 | 20 | 20 | 20 | 20 | 20 | 19 | 19 | 19 | 19 | 19 | 19 | 19 | 18 | 18 | 18 |
| f | 22 | 21 | 21 | 21 | 21 | 21 | 20 | 20 | 20 | 20 | 20 | 20 | 19 | 19 | 19 | 19 |
| | 23 | 22 | 22 | 22 | 22 | 21 | 21 | 21 | 21 | 21 | 21 | 21 | 20 | 20 | 20 | 20 |
| s | 24 | 23 | 23 | 23 | 23 | 22 | 22 | 22 | 22 | 22 | 22 | 21 | 21 | 21 | 21 | 21 |
| l | 25 | 24 | 24 | 24 | 24 | 23 | 23 | 23 | 23 | 23 | 23 | 22 | 22 | 22 | 22 | 22 |
| o | 26 | 25 | 25 | 25 | 24 | 24 | 24 | 24 | 24 | 24 | 23 | 23 | 23 | 23 | 23 | 22 |
| p | 27 | 26 | 26 | 26 | 25 | 25 | 25 | 25 | 25 | 25 | 24 | 24 | 24 | 24 | 24 | 23 |
| e | 28 | 27 | 27 | 27 | 26 | 26 | 26 | 26 | 26 | 26 | 25 | 25 | 25 | 25 | 25 | 24 |
| | 29 | 28 | 28 | 28 | 27 | 27 | 27 | 27 | 27 | 26 | 26 | 26 | 26 | 26 | 25 | 25 |
| | 30 | 29 | 29 | 28 | 28 | 28 | 28 | 28 | 28 | 27 | 27 | 27 | 27 | 27 | 26 | 26 |
| | 31 | 30 | 30 | 29 | 29 | 29 | 29 | 29 | 29 | 28 | 28 | 28 | 28 | 27 | 27 | 27 |
| | 32 | 31 | 31 | 30 | 30 | 30 | 30 | 30 | 30 | 29 | 29 | 29 | 29 | 28 | 28 | 28 |
| | 33 | 32 | 32 | 31 | 31 | 31 | 31 | 31 | 30 | 30 | 30 | 30 | 30 | 29 | 29 | 29 |
| | 34 | 33 | 33 | 32 | 32 | 32 | 32 | 32 | 31 | 31 | 31 | 31 | 31 | 30 | 30 | 30 |
| | 35 | 34 | 34 | 33 | 33 | 33 | 33 | 33 | 32 | 32 | 32 | 32 | 31 | 31 | 31 | 31 |
| | 36 | 35 | 34 | 34 | 34 | 34 | 34 | 34 | 33 | 33 | 33 | 33 | 32 | 32 | 32 | 32 |
| | 37 | 36 | 35 | 35 | 35 | 35 | 35 | 35 | 34 | 34 | 34 | 34 | 33 | 33 | 33 | 33 |
| | 38 | 37 | 36 | 36 | 36 | 36 | 36 | 36 | 35 | 35 | 35 | 35 | 34 | 34 | 34 | 34 |
| | 39 | 38 | 37 | 37 | 37 | 37 | 37 | 36 | 36 | 36 | 36 | 36 | 35 | 35 | 35 | 34 |
| | 40 | 39 | 38 | 38 | 38 | 38 | 38 | 37 | 37 | 37 | 37 | 37 | 36 | 36 | 36 | 35 |
| | 41 | 40 | 39 | 39 | 39 | 39 | 39 | 38 | 38 | 38 | 38 | 38 | 37 | 37 | 37 | 36 |
| | 42 | 41 | 40 | 40 | 40 | 40 | 40 | 39 | 39 | 39 | 39 | 38 | 38 | 38 | 38 | 37 |
| | 43 | 42 | 41 | 41 | 41 | 41 | 41 | 40 | 40 | 40 | 40 | 39 | 39 | 39 | 39 | 38 |
| | 44 | 43 | 42 | 42 | 42 | 42 | 42 | 41 | 41 | 41 | 41 | 40 | 40 | 40 | 40 | 39 |
| | 45 | 44 | 43 | 43 | 43 | 43 | 43 | 42 | 42 | 42 | 42 | 41 | 41 | 41 | 41 | 40 |
| | 46 | 45 | 44 | 44 | 44 | 44 | 44 | 43 | 43 | 43 | 43 | 42 | 42 | 42 | 42 | 41 |
| | 47 | 46 | 45 | 45 | 45 | 45 | 45 | 44 | 44 | 44 | 44 | 43 | 43 | 43 | 43 | 42 |
| | 48 | 47 | 46 | 46 | 46 | 46 | 46 | 45 | 45 | 45 | 45 | 44 | 44 | 44 | 44 | 43 |
| | 49 | 48 | 47 | 47 | 47 | 47 | 47 | 46 | 46 | 46 | 46 | 45 | 45 | 45 | 45 | 44 |
| | 50 | 49 | 48 | 48 | 48 | 48 | 48 | 47 | 47 | 47 | 47 | 46 | 46 | 46 | 46 | 45 |
| | 51 | 50 | 49 | 49 | 49 | 49 | 49 | 48 | 48 | 48 | 48 | 47 | 47 | 47 | 47 | 46 |
| | 52 | 51 | 50 | 50 | 50 | 50 | 50 | 49 | 49 | 49 | 49 | 48 | 48 | 48 | 48 | 47 |
| | 53 | 52 | 51 | 51 | 51 | 51 | 51 | 50 | 50 | 50 | 50 | 50 | 49 | 49 | 49 | 48 |
| | 54 | 53 | 52 | 52 | 52 | 52 | 52 | 51 | 51 | 51 | 51 | 50 | 50 | 50 | 50 | 49 |
| | 55 | 54 | 53 | 53 | 53 | 53 | 53 | 52 | 52 | 52 | 52 | 51 | 51 | 51 | 51 | 50 |

FIG. 10a1

| Preload angle | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|
| | Angle of approach | | | | | | | | | | | | | | |
| | | 16 | 17 | 18 | 19 | 20 | 21 | 22 | 23 | 24 | 25 | 26 | 27 | 28 | 29 | 30 |
| A | 15 | 13 | 13 | 12 | 12 | 12 | 12 | 12 | 12 | 11 | 11 | 11 | 11 | 11 | 11 | 10 |
| n | 16 | 14 | 13 | 13 | 13 | 13 | 13 | 13 | 12 | 12 | 12 | 12 | 12 | 11 | 11 | 11 |
| g | 17 | 14 | 14 | 14 | 14 | 14 | 14 | 13 | 13 | 13 | 13 | 12 | 12 | 12 | 12 | 12 |
| l | 18 | 15 | 15 | 15 | 15 | 15 | 14 | 14 | 14 | 14 | 13 | 13 | 13 | 13 | 13 | 12 |
| e | 19 | 16 | 16 | 16 | 16 | 15 | 15 | 15 | 15 | 14 | 14 | 14 | 14 | 13 | 13 | 13 |
| | 20 | 17 | 17 | 17 | 16 | 16 | 16 | 16 | 16 | 15 | 15 | 15 | 15 | 14 | 14 | 14 |
| o | 21 | 18 | 18 | 17 | 17 | 17 | 17 | 17 | 16 | 16 | 16 | 16 | 15 | 15 | 15 | 15 |
| f | 22 | 19 | 19 | 18 | 18 | 18 | 18 | 17 | 17 | 17 | 17 | 16 | 16 | 16 | 16 | 15 |
| | 23 | 20 | 19 | 19 | 19 | 19 | 18 | 18 | 18 | 18 | 18 | 17 | 17 | 17 | 16 | 16 |
| s | 24 | 20 | 20 | 20 | 20 | 20 | 19 | 19 | 19 | 19 | 18 | 18 | 18 | 17 | 17 | 17 |
| l | 25 | 21 | 21 | 21 | 21 | 20 | 20 | 20 | 20 | 19 | 19 | 19 | 19 | 18 | 18 | 18 |
| o | 26 | 22 | 22 | 22 | 22 | 21 | 21 | 21 | 20 | 20 | 20 | 20 | 19 | 19 | 19 | 18 |
| p | 27 | 23 | 23 | 23 | 22 | 22 | 22 | 22 | 21 | 21 | 21 | 20 | 20 | 20 | 19 | 19 |
| e | 28 | 24 | 24 | 24 | 23 | 23 | 23 | 22 | 22 | 22 | 22 | 21 | 21 | 21 | 20 | 20 |
| | 29 | 25 | 25 | 24 | 24 | 24 | 24 | 23 | 23 | 23 | 22 | 22 | 22 | 21 | 21 | 21 |
| | 30 | 26 | 26 | 25 | 25 | 25 | 24 | 24 | 24 | 24 | 23 | 23 | 23 | 22 | 22 | 21 |
| | 31 | 27 | 26 | 26 | 26 | 26 | 25 | 25 | 25 | 24 | 24 | 24 | 23 | 23 | 23 | 22 |
| | 32 | 28 | 27 | 27 | 27 | 27 | 26 | 26 | 26 | 25 | 25 | 25 | 24 | 24 | 23 | 23 |
| | 33 | 29 | 28 | 28 | 28 | 27 | 27 | 27 | 26 | 26 | 26 | 25 | 25 | 25 | 24 | 24 |
| | 34 | 29 | 29 | 29 | 29 | 28 | 28 | 28 | 27 | 27 | 27 | 26 | 26 | 25 | 25 | 25 |
| | 35 | 30 | 30 | 30 | 30 | 29 | 29 | 29 | 28 | 28 | 27 | 27 | 27 | 26 | 26 | 26 |
| | 36 | 31 | 31 | 31 | 30 | 30 | 30 | 29 | 29 | 29 | 28 | 28 | 28 | 27 | 27 | 26 |
| | 37 | 32 | 32 | 32 | 31 | 31 | 31 | 30 | 30 | 30 | 29 | 29 | 28 | 28 | 28 | 27 |
| | 38 | 33 | 33 | 33 | 32 | 32 | 32 | 31 | 31 | 31 | 30 | 30 | 29 | 29 | 28 | 28 |
| | 39 | 34 | 34 | 34 | 33 | 33 | 33 | 32 | 32 | 31 | 31 | 30 | 30 | 29 | 29 | 29 |
| | 40 | 35 | 35 | 35 | 34 | 34 | 33 | 33 | 33 | 32 | 32 | 32 | 31 | 31 | 30 | 30 |
| | 41 | 36 | 36 | 35 | 35 | 35 | 34 | 34 | 34 | 33 | 33 | 32 | 32 | 32 | 31 | 31 |
| | 42 | 37 | 37 | 36 | 36 | 36 | 35 | 35 | 35 | 34 | 34 | 33 | 33 | 32 | 32 | 32 |
| | 43 | 38 | 38 | 37 | 37 | 37 | 36 | 36 | 36 | 35 | 35 | 34 | 34 | 33 | 33 | 32 |
| | 44 | 39 | 39 | 38 | 38 | 38 | 37 | 37 | 36 | 36 | 36 | 35 | 35 | 34 | 34 | 33 |
| | 45 | 40 | 40 | 39 | 39 | 39 | 38 | 38 | 37 | 37 | 37 | 36 | 36 | 35 | 35 | 34 |
| | 46 | 41 | 41 | 40 | 40 | 40 | 39 | 39 | 38 | 38 | 38 | 37 | 37 | 36 | 36 | 35 |
| | 47 | 42 | 42 | 41 | 41 | 41 | 40 | 40 | 39 | 39 | 39 | 38 | 38 | 37 | 37 | 36 |
| | 48 | 43 | 43 | 42 | 42 | 42 | 41 | 41 | 40 | 40 | 40 | 39 | 39 | 38 | 38 | 37 |
| | 49 | 44 | 44 | 43 | 43 | 43 | 42 | 42 | 41 | 41 | 41 | 40 | 40 | 39 | 39 | 38 |
| | 50 | 45 | 45 | 44 | 44 | 44 | 43 | 43 | 42 | 42 | 42 | 41 | 41 | 40 | 40 | 39 |
| | 51 | 46 | 46 | 45 | 45 | 45 | 44 | 44 | 43 | 43 | 43 | 42 | 42 | 41 | 41 | 40 |
| | 52 | 47 | 47 | 46 | 46 | 46 | 45 | 45 | 44 | 44 | 44 | 43 | 43 | 42 | 42 | 41 |
| | 53 | 48 | 48 | 47 | 47 | 47 | 46 | 46 | 45 | 45 | 45 | 44 | 44 | 43 | 43 | 42 |
| | 54 | 49 | 49 | 48 | 48 | 48 | 47 | 47 | 47 | 46 | 46 | 45 | 45 | 44 | 44 | 43 |
| | 55 | 50 | 50 | 49 | 49 | 49 | 48 | 48 | 48 | 47 | 47 | 46 | 46 | 45 | 45 | 44 |

FIG.10a2

| Preload angle | | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|---|
| | Angle of approach | | | | | | | | | | | | | | | |
| | | 31 | 32 | 33 | 34 | 35 | 36 | 37 | 38 | 39 | 40 | 41 | 42 | 43 | 44 | 45 |
| A | 15 | 10 | 10 | 10 | 10 | 9 | 9 | 9 | 9 | 9 | 8 | 8 | 8 | 8 | 7 | 7 |
| n | 16 | 11 | 11 | 10 | 10 | 10 | 10 | 10 | 9 | 9 | 9 | 9 | 8 | 8 | 8 | 8 |
| g | 17 | 12 | 11 | 11 | 11 | 11 | 10 | 10 | 10 | 10 | 9 | 9 | 9 | 9 | 8 | 8 |
| l | 18 | 12 | 12 | 12 | 12 | 11 | 11 | 11 | 11 | 10 | 10 | 10 | 10 | 9 | 9 | 9 |
| e | 19 | 13 | 13 | 12 | 12 | 12 | 12 | 11 | 11 | 11 | 11 | 10 | 10 | 10 | 9 | 9 |
| | 20 | 14 | 13 | 13 | 13 | 13 | 12 | 12 | 12 | 12 | 11 | 11 | 11 | 10 | 10 | 10 |
| o | 21 | 14 | 14 | 14 | 14 | 13 | 13 | 13 | 12 | 12 | 12 | 11 | 11 | 11 | 11 | 10 |
| f | 22 | 15 | 15 | 15 | 14 | 14 | 14 | 13 | 13 | 13 | 12 | 12 | 12 | 11 | 11 | 11 |
| | 23 | 16 | 16 | 15 | 15 | 15 | 14 | 14 | 14 | 13 | 13 | 13 | 12 | 12 | 12 | 11 |
| s | 24 | 17 | 16 | 16 | 16 | 15 | 15 | 15 | 14 | 14 | 14 | 13 | 13 | 13 | 12 | 12 |
| l | 25 | 17 | 17 | 17 | 16 | 16 | 16 | 15 | 15 | 15 | 14 | 14 | 14 | 13 | 13 | 12 |
| o | 26 | 18 | 18 | 17 | 17 | 17 | 16 | 16 | 16 | 15 | 15 | 14 | 14 | 14 | 13 | 13 |
| p | 27 | 19 | 18 | 18 | 18 | 17 | 17 | 17 | 16 | 16 | 16 | 15 | 15 | 14 | 14 | 13 |
| e | 28 | 20 | 19 | 19 | 19 | 18 | 18 | 17 | 17 | 17 | 16 | 16 | 15 | 15 | 14 | 14 |
| | 29 | 20 | 20 | 20 | 19 | 19 | 18 | 18 | 18 | 17 | 17 | 16 | 16 | 15 | 15 | 15 |
| | 30 | 21 | 21 | 20 | 20 | 20 | 19 | 19 | 18 | 18 | 17 | 17 | 17 | 16 | 16 | 15 |
| | 31 | 22 | 22 | 21 | 21 | 20 | 20 | 19 | 19 | 19 | 18 | 18 | 17 | 17 | 16 | 16 |
| | 32 | 23 | 22 | 22 | 21 | 21 | 21 | 20 | 20 | 19 | 19 | 18 | 18 | 17 | 17 | 16 |
| | 33 | 23 | 23 | 23 | 22 | 22 | 21 | 21 | 20 | 20 | 19 | 19 | 18 | 18 | 17 | 17 |
| | 34 | 24 | 24 | 23 | 23 | 23 | 22 | 22 | 21 | 21 | 20 | 20 | 19 | 19 | 18 | 18 |
| | 35 | 25 | 25 | 24 | 24 | 23 | 23 | 22 | 22 | 21 | 21 | 20 | 20 | 19 | 19 | 18 |
| | 36 | 26 | 25 | 25 | 25 | 24 | 24 | 23 | 23 | 22 | 22 | 21 | 21 | 20 | 19 | 19 |
| | 37 | 27 | 26 | 26 | 25 | 25 | 24 | 24 | 23 | 23 | 22 | 22 | 21 | 21 | 20 | 19 |
| | 38 | 28 | 27 | 27 | 26 | 26 | 25 | 25 | 24 | 24 | 23 | 22 | 22 | 21 | 21 | 20 |
| | 39 | 28 | 28 | 27 | 27 | 26 | 26 | 25 | 25 | 24 | 24 | 23 | 23 | 22 | 21 | 21 |
| | 40 | 29 | 29 | 28 | 28 | 27 | 27 | 26 | 26 | 25 | 25 | 24 | 23 | 23 | 22 | 22 |
| | 41 | 30 | 30 | 29 | 29 | 28 | 28 | 27 | 27 | 26 | 25 | 25 | 24 | 23 | 23 | 22 |
| | 42 | 31 | 31 | 30 | 30 | 29 | 28 | 28 | 27 | 27 | 26 | 26 | 25 | 24 | 24 | 23 |
| | 43 | 32 | 31 | 31 | 30 | 30 | 29 | 29 | 28 | 28 | 27 | 26 | 26 | 25 | 24 | 24 |
| | 44 | 33 | 32 | 32 | 31 | 31 | 30 | 30 | 29 | 28 | 28 | 27 | 26 | 26 | 25 | 24 |
| | 45 | 34 | 33 | 33 | 32 | 32 | 31 | 30 | 30 | 29 | 29 | 28 | 27 | 27 | 26 | 25 |
| | 46 | 35 | 34 | 34 | 33 | 33 | 32 | 31 | 31 | 30 | 29 | 29 | 28 | 27 | 27 | 26 |
| | 47 | 36 | 35 | 35 | 34 | 33 | 33 | 32 | 32 | 31 | 30 | 30 | 29 | 28 | 27 | 27 |
| | 48 | 37 | 36 | 36 | 35 | 34 | 34 | 33 | 32 | 32 | 31 | 30 | 30 | 29 | 28 | 28 |
| | 49 | 38 | 37 | 36 | 36 | 35 | 35 | 34 | 33 | 33 | 32 | 31 | 31 | 30 | 29 | 28 |
| | 50 | 39 | 38 | 37 | 37 | 36 | 36 | 35 | 34 | 34 | 33 | 32 | 32 | 31 | 30 | 29 |
| | 51 | 40 | 39 | 38 | 38 | 37 | 37 | 36 | 35 | 35 | 34 | 33 | 32 | 32 | 31 | 30 |
| | 52 | 41 | 40 | 39 | 39 | 38 | 38 | 37 | 36 | 36 | 35 | 34 | 33 | 33 | 32 | 31 |
| | 53 | 42 | 41 | 40 | 40 | 39 | 39 | 38 | 37 | 37 | 36 | 35 | 34 | 34 | 33 | 32 |
| | 54 | 43 | 42 | 41 | 41 | 40 | 40 | 39 | 38 | 38 | 37 | 36 | 35 | 35 | 34 | 33 |
| | 55 | 44 | 43 | 43 | 42 | 41 | 41 | 40 | 39 | 39 | 38 | 37 | 36 | 36 | 35 | 34 |

FIG. 10a3

| Preload angle | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|
| Angle of approach | | | | | | | | | | | | | | | |
| | | 46 | 47 | 48 | 49 | 50 | 51 | 52 | 53 | 54 | 55 | 56 | 57 | 58 | 59 | 60 |
| A  | 15 | 7 | 7 | 6 | 6 | 6 | 6 | 5 | 5 | 5 | 5 | 4 | 4 | 4 | 4 | 3 |
| n  | 16 | 7 | 7 | 7 | 7 | 6 | 6 | 6 | 6 | 5 | 5 | 5 | 5 | 4 | 4 | 4 |
| g  | 17 | 8 | 8 | 7 | 7 | 7 | 7 | 6 | 6 | 6 | 5 | 5 | 5 | 5 | 4 | 4 |
| l  | 18 | 8 | 8 | 8 | 8 | 7 | 7 | 7 | 6 | 6 | 6 | 5 | 5 | 5 | 4 | 4 |
| e  | 19 | 9 | 9 | 8 | 8 | 8 | 7 | 7 | 7 | 6 | 6 | 6 | 5 | 5 | 5 | 4 |
|    | 20 | 9 | 9 | 9 | 8 | 8 | 8 | 7 | 7 | 7 | 6 | 6 | 6 | 5 | 5 | 5 |
| o  | 21 | 10 | 10 | 9 | 9 | 9 | 8 | 8 | 7 | 7 | 7 | 6 | 6 | 6 | 5 | 5 |
| f  | 22 | 10 | 10 | 10 | 9 | 9 | 9 | 8 | 8 | 7 | 7 | 7 | 6 | 6 | 6 | 5 |
|    | 23 | 11 | 11 | 10 | 10 | 9 | 9 | 9 | 8 | 8 | 7 | 7 | 7 | 6 | 6 | 5 |
| s  | 24 | 11 | 11 | 11 | 10 | 10 | 9 | 9 | 9 | 8 | 8 | 7 | 7 | 7 | 6 | 6 |
| l  | 25 | 12 | 12 | 11 | 11 | 10 | 10 | 9 | 9 | 9 | 8 | 8 | 7 | 7 | 6 | 6 |
| o  | 26 | 12 | 12 | 12 | 11 | 11 | 10 | 10 | 9 | 9 | 9 | 8 | 8 | 7 | 7 | 6 |
| p  | 27 | 13 | 13 | 12 | 12 | 11 | 11 | 10 | 10 | 9 | 9 | 8 | 8 | 8 | 7 | 7 |
| e  | 28 | 14 | 13 | 13 | 12 | 12 | 11 | 11 | 10 | 10 | 9 | 9 | 8 | 8 | 7 | 7 |
|    | 29 | 14 | 14 | 13 | 13 | 12 | 12 | 11 | 11 | 10 | 10 | 9 | 9 | 8 | 8 | 7 |
|    | 30 | 15 | 14 | 14 | 13 | 13 | 12 | 12 | 11 | 11 | 10 | 10 | 9 | 8 | 8 | 7 |
|    | 31 | 15 | 15 | 14 | 14 | 13 | 13 | 12 | 12 | 11 | 11 | 10 | 9 | 9 | 8 | 8 |
|    | 32 | 16 | 15 | 15 | 14 | 14 | 13 | 13 | 12 | 11 | 11 | 10 | 10 | 9 | 9 | 8 |
|    | 33 | 16 | 16 | 15 | 15 | 14 | 14 | 13 | 13 | 12 | 11 | 11 | 10 | 10 | 9 | 8 |
|    | 34 | 17 | 16 | 16 | 15 | 15 | 14 | 14 | 13 | 12 | 12 | 11 | 11 | 10 | 9 | 9 |
|    | 35 | 18 | 17 | 16 | 16 | 15 | 15 | 14 | 13 | 13 | 12 | 12 | 11 | 10 | 10 | 9 |
|    | 36 | 18 | 18 | 17 | 16 | 16 | 15 | 15 | 14 | 13 | 13 | 12 | 11 | 11 | 10 | 9 |
|    | 37 | 19 | 18 | 18 | 17 | 16 | 16 | 15 | 14 | 14 | 13 | 12 | 12 | 11 | 10 | 10 |
|    | 38 | 20 | 19 | 18 | 18 | 17 | 16 | 16 | 15 | 14 | 14 | 13 | 12 | 11 | 11 | 10 |
|    | 39 | 20 | 20 | 19 | 18 | 18 | 17 | 16 | 15 | 15 | 14 | 13 | 13 | 12 | 11 | 10 |
|    | 40 | 21 | 20 | 20 | 19 | 18 | 17 | 17 | 16 | 15 | 15 | 14 | 13 | 12 | 11 | 11 |
|    | 41 | 22 | 21 | 20 | 19 | 19 | 18 | 17 | 17 | 16 | 15 | 14 | 13 | 13 | 12 | 11 |
|    | 42 | 22 | 22 | 21 | 20 | 19 | 19 | 18 | 17 | 16 | 16 | 15 | 14 | 13 | 12 | 11 |
|    | 43 | 23 | 22 | 22 | 21 | 20 | 19 | 18 | 18 | 17 | 16 | 15 | 14 | 14 | 13 | 12 |
|    | 44 | 24 | 23 | 22 | 21 | 21 | 20 | 19 | 18 | 17 | 17 | 16 | 15 | 14 | 13 | 12 |
|    | 45 | 24 | 24 | 23 | 22 | 21 | 21 | 20 | 19 | 18 | 17 | 16 | 15 | 15 | 14 | 13 |
|    | 46 | 25 | 24 | 24 | 23 | 22 | 21 | 20 | 20 | 19 | 18 | 17 | 16 | 15 | 14 | 13 |
|    | 47 | 26 | 25 | 24 | 24 | 23 | 22 | 21 | 20 | 19 | 18 | 17 | 16 | 16 | 15 | 14 |
|    | 48 | 27 | 26 | 25 | 24 | 23 | 23 | 22 | 21 | 20 | 19 | 18 | 17 | 16 | 15 | 14 |
|    | 49 | 28 | 27 | 26 | 25 | 24 | 23 | 22 | 21 | 21 | 20 | 19 | 18 | 17 | 16 | 15 |
|    | 50 | 28 | 28 | 27 | 26 | 25 | 24 | 23 | 22 | 21 | 20 | 19 | 18 | 17 | 16 | 15 |
|    | 51 | 29 | 28 | 28 | 27 | 26 | 25 | 24 | 23 | 22 | 21 | 20 | 19 | 18 | 17 | 16 |
|    | 52 | 30 | 29 | 28 | 28 | 27 | 26 | 25 | 24 | 23 | 22 | 21 | 19 | 18 | 17 | 16 |
|    | 53 | 31 | 30 | 29 | 28 | 27 | 26 | 25 | 24 | 23 | 22 | 21 | 20 | 19 | 18 | 17 |
|    | 54 | 32 | 31 | 30 | 29 | 28 | 27 | 26 | 25 | 24 | 23 | 22 | 21 | 20 | 18 | 17 |
|    | 55 | 33 | 32 | 31 | 30 | 29 | 28 | 27 | 26 | 25 | 24 | 23 | 21 | 20 | 19 | 18 |

FIG. 10a4

| Preload angle | | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|---|
| | Angle of approach | | | | | | | | | | | | | | | |
| | | 61 | 62 | 63 | 64 | 65 | 66 | 67 | 68 | 69 | 70 | 71 | 72 | 73 | 74 | 75 |
| A | 15 | 3 | 3 | 3 | 2 | 2 | 2 | 2 | 1 | 1 | 1 | 1 | 0 | 0 | 0 | -1 |
| n | 16 | 3 | 3 | 3 | 3 | 2 | 2 | 2 | 1 | 1 | 1 | 1 | 0 | 0 | 0 | -1 |
| g | 17 | 4 | 3 | 3 | 3 | 2 | 2 | 2 | 2 | 1 | 1 | 1 | 0 | 0 | 0 | -1 |
| l | 18 | 4 | 4 | 3 | 3 | 3 | 2 | 2 | 2 | 1 | 1 | 1 | 0 | 0 | 0 | -1 |
| e | 19 | 4 | 4 | 3 | 3 | 3 | 2 | 2 | 2 | 1 | 1 | 1 | 0 | 0 | 0 | -1 |
| | 20 | 4 | 4 | 4 | 3 | 3 | 3 | 2 | 2 | 1 | 1 | 1 | 0 | 0 | 0 | -1 |
| o | 21 | 5 | 4 | 4 | 3 | 3 | 3 | 2 | 2 | 2 | 1 | 1 | 0 | 0 | 0 | -1 |
| f | 22 | 5 | 4 | 4 | 4 | 3 | 3 | 2 | 2 | 2 | 1 | 1 | 0 | 0 | 0 | -1 |
| | 23 | 5 | 5 | 4 | 4 | 3 | 3 | 3 | 2 | 2 | 1 | 1 | 0 | 0 | 0 | -1 |
| s | 24 | 5 | 5 | 4 | 4 | 4 | 3 | 3 | 2 | 2 | 1 | 1 | 0 | 0 | 0 | -1 |
| l | 25 | 6 | 5 | 5 | 4 | 4 | 3 | 3 | 2 | 2 | 1 | 1 | 0 | 0 | 0 | -1 |
| o | 26 | 6 | 5 | 5 | 4 | 4 | 3 | 3 | 2 | 2 | 1 | 1 | 0 | 0 | 0 | -1 |
| p | 27 | 6 | 6 | 5 | 5 | 4 | 4 | 3 | 3 | 2 | 2 | 1 | 1 | 0 | -1 | -1 |
| e | 28 | 6 | 6 | 5 | 5 | 4 | 4 | 3 | 3 | 2 | 2 | 1 | 1 | 0 | -1 | -1 |
| | 29 | 7 | 6 | 5 | 5 | 4 | 4 | 3 | 3 | 2 | 2 | 1 | 1 | 0 | -1 | -1 |
| | 30 | 7 | 6 | 6 | 5 | 5 | 4 | 3 | 3 | 2 | 2 | 1 | 1 | 0 | -1 | -1 |
| | 31 | 7 | 7 | 6 | 5 | 5 | 4 | 4 | 3 | 2 | 2 | 1 | 1 | 0 | -1 | -1 |
| | 32 | 7 | 7 | 6 | 6 | 5 | 4 | 4 | 3 | 2 | 2 | 1 | 1 | 0 | -1 | -1 |
| | 33 | 8 | 7 | 6 | 6 | 5 | 5 | 4 | 3 | 3 | 2 | 1 | 1 | 0 | -1 | -1 |
| | 34 | 8 | 7 | 7 | 6 | 5 | 5 | 4 | 3 | 3 | 2 | 1 | 1 | 0 | -1 | -1 |
| | 35 | 8 | 8 | 7 | 6 | 6 | 5 | 4 | 3 | 3 | 2 | 1 | 1 | 0 | -1 | -1 |
| | 36 | 9 | 8 | 7 | 6 | 6 | 5 | 4 | 4 | 3 | 2 | 1 | 1 | 0 | -1 | -1 |
| | 37 | 9 | 8 | 7 | 7 | 6 | 5 | 5 | 4 | 3 | 2 | 2 | 1 | 0 | -1 | -2 |
| | 38 | 9 | 8 | 8 | 7 | 6 | 5 | 5 | 4 | 3 | 2 | 2 | 1 | 0 | -1 | -2 |
| | 39 | 10 | 9 | 8 | 7 | 6 | 6 | 5 | 4 | 3 | 2 | 2 | 1 | 0 | -1 | -2 |
| | 40 | 10 | 9 | 8 | 7 | 7 | 6 | 5 | 4 | 3 | 3 | 2 | 1 | 0 | -1 | -2 |
| | 41 | 10 | 9 | 9 | 8 | 7 | 6 | 5 | 4 | 3 | 3 | 2 | 1 | 0 | -1 | -2 |
| | 42 | 11 | 10 | 9 | 8 | 7 | 6 | 5 | 4 | 4 | 3 | 2 | 1 | 0 | -1 | -2 |
| | 43 | 11 | 10 | 9 | 8 | 7 | 6 | 6 | 5 | 4 | 3 | 2 | 1 | 0 | -1 | -2 |
| | 44 | 11 | 10 | 10 | 9 | 8 | 7 | 6 | 5 | 4 | 3 | 2 | 1 | 0 | -1 | -2 |
| | 45 | 12 | 11 | 10 | 9 | 8 | 7 | 6 | 5 | 4 | 3 | 2 | 1 | 0 | -1 | -2 |
| | 46 | 12 | 11 | 10 | 9 | 8 | 7 | 6 | 5 | 4 | 3 | 2 | 1 | 0 | -1 | -2 |
| | 47 | 13 | 12 | 11 | 10 | 8 | 7 | 6 | 5 | 4 | 3 | 2 | 1 | 0 | -1 | -2 |
| | 48 | 13 | 12 | 11 | 10 | 9 | 8 | 7 | 6 | 4 | 3 | 2 | 1 | 0 | -1 | -2 |
| | 49 | 13 | 12 | 11 | 10 | 9 | 8 | 7 | 6 | 5 | 3 | 2 | 1 | 0 | -1 | -2 |
| | 50 | 14 | 13 | 12 | 11 | 9 | 8 | 7 | 6 | 5 | 4 | 2 | 1 | 0 | -1 | -2 |
| | 51 | 14 | 13 | 12 | 11 | 10 | 9 | 7 | 6 | 5 | 4 | 2 | 1 | 0 | -1 | -2 |
| | 52 | 15 | 14 | 13 | 11 | 10 | 9 | 8 | 6 | 5 | 4 | 3 | 1 | 0 | -1 | -3 |
| | 53 | 15 | 14 | 13 | 12 | 10 | 9 | 8 | 7 | 5 | 4 | 3 | 1 | 0 | -1 | -3 |
| | 54 | 16 | 15 | 13 | 12 | 11 | 10 | 8 | 7 | 5 | 4 | 3 | 1 | 0 | -1 | -3 |
| | 55 | 17 | 15 | 14 | 13 | 11 | 10 | 8 | 7 | 6 | 4 | 3 | 1 | 0 | -1 | -3 |

FIG. 10a5

| Preload angle | | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|
| | Angle of approach | | | | | | | | | | | | | | |
| | | 76 | 77 | 78 | 79 | 80 | 81 | 82 | 83 | 84 | 85 | 86 | 87 | 88 | 89 |
| A | 15 | -1 | -1 | -1 | -2 | -2 | -2 | -2 | -3 | -3 | -3 | -3 | -4 | -4 | -4 |
| n | 16 | -1 | -1 | -1 | -2 | -2 | -2 | -3 | -3 | -3 | -3 | -4 | -4 | -4 | -5 |
| g | 17 | -1 | -1 | -2 | -2 | -2 | -2 | -3 | -3 | -3 | -4 | -4 | -4 | -5 | -5 |
| l | 18 | -1 | -1 | -2 | -2 | -2 | -3 | -3 | -3 | -4 | -4 | -4 | -4 | -5 | -5 |
| e | 19 | -1 | -1 | -2 | -2 | -2 | -3 | -3 | -3 | -4 | -4 | -4 | -5 | -5 | -5 |
| | 20 | -1 | -1 | -2 | -2 | -3 | -3 | -3 | -4 | -4 | -4 | -5 | -5 | -5 | -6 |
| o | 21 | -1 | -2 | -2 | -2 | -3 | -3 | -3 | -4 | -4 | -5 | -5 | -5 | -6 | -6 |
| f | 22 | -1 | -2 | -2 | -2 | -3 | -3 | -4 | -4 | -4 | -5 | -5 | -6 | -6 | -6 |
| | 23 | -1 | -2 | -2 | -3 | -3 | -3 | -4 | -4 | -5 | -5 | -5 | -6 | -6 | -7 |
| s | 24 | -1 | -2 | -2 | -3 | -3 | -4 | -4 | -4 | -5 | -5 | -6 | -6 | -7 | -7 |
| l | 25 | -1 | -2 | -2 | -3 | -3 | -4 | -4 | -5 | -5 | -6 | -6 | -6 | -7 | -7 |
| o | 26 | -1 | -2 | -2 | -3 | -3 | -4 | -4 | -5 | -5 | -6 | -6 | -7 | -7 | -8 |
| p | 27 | -2 | -2 | -3 | -3 | -4 | -4 | -5 | -5 | -6 | -6 | -7 | -7 | -8 | -8 |
| e | 28 | -2 | -2 | -3 | -3 | -4 | -4 | -5 | -5 | -6 | -6 | -7 | -7 | -8 | -8 |
| | 29 | -2 | -2 | -3 | -3 | -4 | -4 | -5 | -5 | -6 | -7 | -7 | -8 | -8 | -9 |
| | 30 | -2 | -2 | -3 | -3 | -4 | -5 | -5 | -6 | -6 | -7 | -7 | -8 | -8 | -9 |
| | 31 | -2 | -2 | -3 | -4 | -4 | -5 | -5 | -6 | -7 | -7 | -8 | -8 | -9 | -9 |
| | 32 | -2 | -2 | -3 | -4 | -4 | -5 | -6 | -6 | -7 | -7 | -8 | -9 | -9 | -10 |
| | 33 | -2 | -3 | -3 | -4 | -5 | -5 | -6 | -6 | -7 | -8 | -8 | -9 | -10 | -10 |
| | 34 | -2 | -3 | -3 | -4 | -5 | -5 | -6 | -7 | -7 | -8 | -9 | -9 | -10 | -11 |
| | 35 | -2 | -3 | -3 | -4 | -5 | -6 | -6 | -7 | -8 | -8 | -9 | -10 | -10 | -11 |
| | 36 | -2 | -3 | -4 | -4 | -5 | -6 | -6 | -7 | -8 | -9 | -9 | -10 | -11 | -11 |
| | 37 | -2 | -3 | -4 | -5 | -5 | -6 | -7 | -7 | -8 | -9 | -10 | -10 | -11 | -12 |
| | 38 | -2 | -3 | -4 | -5 | -5 | -6 | -7 | -8 | -8 | -9 | -10 | -11 | -11 | -12 |
| | 39 | -2 | -3 | -4 | -5 | -6 | -6 | -7 | -8 | -9 | -10 | -10 | -11 | -12 | -13 |
| | 40 | -3 | -3 | -4 | -5 | -6 | -7 | -7 | -8 | -9 | -10 | -11 | -11 | -12 | -13 |
| | 41 | -3 | -3 | -4 | -5 | -6 | -7 | -8 | -9 | -9 | -10 | -11 | -12 | -13 | -13 |
| | 42 | -3 | -4 | -4 | -5 | -6 | -7 | -8 | -9 | -10 | -11 | -11 | -12 | -13 | -14 |
| | 43 | -3 | -4 | -5 | -6 | -6 | -7 | -8 | -9 | -10 | -11 | -12 | -13 | -14 | -14 |
| | 44 | -3 | -4 | -5 | -6 | -7 | -8 | -9 | -10 | -10 | -11 | -12 | -13 | -14 | -15 |
| | 45 | -3 | -4 | -5 | -6 | -7 | -8 | -9 | -10 | -11 | -12 | -13 | -14 | -15 | -15 |
| | 46 | -3 | -4 | -5 | -6 | -7 | -8 | -9 | -10 | -11 | -12 | -13 | -14 | -15 | -16 |
| | 47 | -3 | -4 | -5 | -6 | -7 | -8 | -10 | -11 | -12 | -13 | -14 | -15 | -16 | -16 |
| | 48 | -3 | -4 | -6 | -7 | -8 | -9 | -10 | -11 | -12 | -13 | -14 | -15 | -16 | -17 |
| | 49 | -3 | -5 | -6 | -7 | -8 | -9 | -10 | -11 | -12 | -13 | -15 | -16 | -17 | -18 |
| | 50 | -4 | -5 | -6 | -7 | -8 | -9 | -11 | -12 | -13 | -14 | -15 | -16 | -17 | -18 |
| | 51 | -4 | -5 | -6 | -7 | -9 | -10 | -11 | -12 | -13 | -14 | -16 | -17 | -18 | -19 |
| | 52 | -4 | -5 | -6 | -8 | -9 | -10 | -11 | -13 | -14 | -15 | -16 | -17 | -18 | -19 |
| | 53 | -4 | -5 | -7 | -8 | -9 | -10 | -12 | -13 | -14 | -15 | -17 | -18 | -19 | -20 |
| | 54 | -4 | -5 | -7 | -8 | -10 | -11 | -12 | -13 | -15 | -16 | -17 | -18 | -20 | -21 |
| | 55 | -4 | -6 | -7 | -8 | -10 | -11 | -13 | -14 | -15 | -17 | -18 | -19 | -20 | -21 |

FIG.10a6

| Preload angle | | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|---|
| | Angle of approach | | | | | | | | | | | | | | | |
| | | 91 | 92 | 93 | 94 | 95 | 96 | 97 | 98 | 99 | 100 | 101 | 102 | 103 | 104 | 105 |
| A | 15 | -4 | -4 | -4 | -3 | -3 | -3 | -3 | -2 | -2 | -2 | -2 | -1 | -1 | -1 | -1 |
| n | 16 | -5 | -4 | -4 | -4 | -3 | -3 | -3 | -3 | -2 | -2 | -2 | -1 | -1 | -1 | -1 |
| g | 17 | -5 | -5 | -4 | -4 | -4 | -3 | -3 | -3 | -2 | -2 | -2 | -2 | -1 | -1 | -1 |
| l | 18 | -5 | -5 | -4 | -4 | -4 | -4 | -3 | -3 | -3 | -2 | -2 | -2 | -1 | -1 | -1 |
| e | 19 | -5 | -5 | -5 | -4 | -4 | -4 | -3 | -3 | -3 | -2 | -2 | -2 | -1 | -1 | -1 |
| | 20 | -6 | -5 | -5 | -5 | -4 | -4 | -4 | -3 | -3 | -3 | -2 | -2 | -1 | -1 | -1 |
| o | 21 | -6 | -6 | -5 | -5 | -5 | -4 | -4 | -3 | -3 | -3 | -2 | -2 | -2 | -1 | -1 |
| f | 22 | -6 | -6 | -6 | -5 | -5 | -4 | -4 | -4 | -3 | -3 | -2 | -2 | -2 | -1 | -1 |
| | 23 | -7 | -6 | -6 | -5 | -5 | -5 | -4 | -4 | -3 | -3 | -3 | -2 | -2 | -1 | -1 |
| s | 24 | -7 | -7 | -6 | -6 | -5 | -5 | -4 | -4 | -4 | -3 | -3 | -2 | -2 | -1 | -1 |
| l | 25 | -7 | -7 | -6 | -6 | -6 | -5 | -5 | -4 | -4 | -3 | -3 | -2 | -2 | -1 | -1 |
| o | 26 | -8 | -7 | -7 | -6 | -6 | -5 | -5 | -4 | -4 | -3 | -3 | -2 | -2 | -1 | -1 |
| p | 27 | -8 | -8 | -7 | -7 | -6 | -6 | -5 | -5 | -4 | -4 | -3 | -3 | -2 | -2 | -1 |
| e | 28 | -8 | -8 | -7 | -7 | -6 | -6 | -5 | -5 | -4 | -4 | -3 | -3 | -2 | -2 | -1 |
| | 29 | -9 | -8 | -8 | -7 | -7 | -6 | -5 | -5 | -4 | -4 | -3 | -3 | -2 | -2 | -1 |
| | 30 | -9 | -8 | -8 | -7 | -7 | -6 | -6 | -5 | -5 | -4 | -3 | -3 | -2 | -2 | -1 |
| | 31 | -9 | -9 | -8 | -8 | -7 | -7 | -6 | -5 | -5 | -4 | -4 | -3 | -2 | -2 | -1 |
| | 32 | -10 | -9 | -9 | -8 | -7 | -7 | -6 | -6 | -5 | -4 | -4 | -3 | -2 | -2 | -1 |
| | 33 | -10 | -10 | -9 | -8 | -8 | -7 | -6 | -6 | -5 | -5 | -4 | -3 | -3 | -2 | -1 |
| | 34 | -11 | -10 | -9 | -9 | -8 | -7 | -7 | -6 | -5 | -5 | -4 | -3 | -3 | -2 | -1 |
| | 35 | -11 | -10 | -10 | -9 | -8 | -8 | -7 | -6 | -6 | -5 | -4 | -3 | -3 | -2 | -1 |
| | 36 | -11 | -11 | -10 | -9 | -9 | -8 | -7 | -6 | -6 | -5 | -4 | -4 | -3 | -2 | -1 |
| | 37 | -12 | -11 | -10 | -10 | -9 | -8 | -7 | -7 | -6 | -5 | -5 | -4 | -3 | -2 | -2 |
| | 38 | -12 | -11 | -11 | -10 | -9 | -8 | -8 | -7 | -6 | -5 | -5 | -4 | -3 | -2 | -2 |
| | 39 | -13 | -12 | -11 | -10 | -10 | -9 | -8 | -7 | -6 | -6 | -5 | -4 | -3 | -2 | -2 |
| | 40 | -13 | -12 | -11 | -11 | -10 | -9 | -8 | -7 | -7 | -6 | -5 | -4 | -3 | -3 | -2 |
| | 41 | -13 | -13 | -12 | -11 | -10 | -9 | -9 | -8 | -7 | -6 | -5 | -4 | -3 | -3 | -2 |
| | 42 | -14 | -13 | -12 | -11 | -11 | -10 | -9 | -8 | -7 | -6 | -5 | -4 | -4 | -3 | -2 |
| | 43 | -14 | -14 | -13 | -12 | -11 | -10 | -9 | -8 | -7 | -6 | -6 | -5 | -4 | -3 | -2 |
| | 44 | -15 | -14 | -13 | -12 | -11 | -10 | -10 | -9 | -8 | -7 | -6 | -5 | -4 | -3 | -2 |
| | 45 | -15 | -15 | -14 | -13 | -12 | -11 | -10 | -9 | -8 | -7 | -6 | -5 | -4 | -3 | -2 |
| | 46 | -16 | -15 | -14 | -13 | -12 | -11 | -10 | -9 | -8 | -7 | -6 | -5 | -4 | -3 | -2 |
| | 47 | -16 | -16 | -15 | -14 | -13 | -12 | -11 | -10 | -8 | -7 | -6 | -5 | -4 | -3 | -2 |
| | 48 | -17 | -16 | -15 | -14 | -13 | -12 | -11 | -10 | -9 | -8 | -7 | -6 | -4 | -3 | -2 |
| | 49 | -18 | -17 | -16 | -15 | -13 | -12 | -11 | -10 | -9 | -8 | -7 | -6 | -5 | -3 | -2 |
| | 50 | -18 | -17 | -16 | -15 | -14 | -13 | -12 | -11 | -9 | -8 | -7 | -6 | -5 | -4 | -2 |
| | 51 | -19 | -18 | -17 | -16 | -14 | -13 | -12 | -11 | -10 | -9 | -7 | -6 | -5 | -4 | -2 |
| | 52 | -19 | -18 | -17 | -16 | -15 | -14 | -13 | -11 | -10 | -9 | -8 | -6 | -5 | -4 | -3 |
| | 53 | -20 | -19 | -18 | -17 | -15 | -14 | -13 | -12 | -10 | -9 | -8 | -7 | -5 | -4 | -3 |
| | 54 | -21 | -20 | -18 | -17 | -16 | -15 | -13 | -12 | -11 | -10 | -8 | -7 | -5 | -4 | -3 |
| | 55 | -21 | -20 | -19 | -18 | -17 | -15 | -14 | -13 | -11 | -10 | -8 | -7 | -6 | -4 | -3 |

FIG. 10b1

| Preload angle | | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|---|
| | Angle of approach | | | | | | | | | | | | | | | |
| | | 106 | 107 | 108 | 109 | 110 | 111 | 112 | 113 | 114 | 115 | 116 | 117 | 118 | 119 | 120 |
| A | 15 | 0 | 0 | 0 | 1 | 1 | 1 | 1 | 2 | 2 | 2 | 2 | 3 | 3 | 3 | 3 |
| n | 16 | 0 | 0 | 0 | 1 | 1 | 1 | 1 | 2 | 2 | 2 | 3 | 3 | 3 | 3 | 4 |
| g | 17 | 0 | 0 | 0 | 1 | 1 | 1 | 2 | 2 | 2 | 2 | 3 | 3 | 3 | 4 | 4 |
| l | 18 | 0 | 0 | 0 | 1 | 1 | 1 | 2 | 2 | 2 | 3 | 3 | 3 | 4 | 4 | 4 |
| e | 19 | 0 | 0 | 0 | 1 | 1 | 1 | 2 | 2 | 2 | 3 | 3 | 3 | 4 | 4 | 4 |
| | 20 | 0 | 0 | 0 | 1 | 1 | 1 | 2 | 2 | 3 | 3 | 3 | 4 | 4 | 4 | 5 |
| o | 21 | 0 | 0 | 0 | 1 | 1 | 2 | 2 | 2 | 3 | 3 | 3 | 4 | 4 | 5 | 5 |
| f | 22 | 0 | 0 | 0 | 1 | 1 | 2 | 2 | 2 | 3 | 3 | 4 | 4 | 4 | 5 | 5 |
| | 23 | 0 | 0 | 0 | 1 | 1 | 2 | 2 | 3 | 3 | 3 | 4 | 4 | 5 | 5 | 5 |
| s | 24 | 0 | 0 | 0 | 1 | 1 | 2 | 2 | 3 | 3 | 4 | 4 | 4 | 5 | 5 | 6 |
| l | 25 | 0 | 0 | 0 | 1 | 1 | 2 | 2 | 3 | 3 | 4 | 4 | 5 | 5 | 6 | 6 |
| o | 26 | 0 | 0 | 0 | 1 | 1 | 2 | 2 | 3 | 3 | 4 | 4 | 5 | 5 | 6 | 6 |
| p | 27 | -1 | 0 | 1 | 1 | 2 | 2 | 3 | 3 | 4 | 4 | 5 | 5 | 6 | 6 | 7 |
| e | 28 | -1 | 0 | 1 | 1 | 2 | 2 | 3 | 3 | 4 | 4 | 5 | 5 | 6 | 6 | 7 |
| | 29 | -1 | 0 | 1 | 1 | 2 | 2 | 3 | 3 | 4 | 4 | 5 | 5 | 6 | 7 | 7 |
| | 30 | -1 | 0 | 1 | 1 | 2 | 2 | 3 | 3 | 4 | 5 | 5 | 6 | 6 | 7 | 7 |
| | 31 | -1 | 0 | 1 | 1 | 2 | 2 | 3 | 4 | 4 | 5 | 5 | 6 | 7 | 7 | 8 |
| | 32 | -1 | 0 | 1 | 1 | 2 | 2 | 3 | 4 | 4 | 5 | 6 | 6 | 7 | 7 | 8 |
| | 33 | -1 | 0 | 1 | 1 | 2 | 3 | 3 | 4 | 5 | 5 | 6 | 6 | 7 | 8 | 8 |
| | 34 | -1 | 0 | 1 | 1 | 2 | 3 | 3 | 4 | 5 | 5 | 6 | 7 | 7 | 8 | 9 |
| | 35 | -1 | 0 | 1 | 1 | 2 | 3 | 3 | 4 | 5 | 6 | 6 | 7 | 8 | 8 | 9 |
| | 36 | -1 | 0 | 1 | 1 | 2 | 3 | 4 | 4 | 5 | 6 | 6 | 7 | 8 | 9 | 9 |
| | 37 | -1 | 0 | 1 | 2 | 2 | 3 | 4 | 5 | 5 | 6 | 7 | 7 | 8 | 9 | 10 |
| | 38 | -1 | 0 | 1 | 2 | 2 | 3 | 4 | 5 | 5 | 6 | 7 | 8 | 8 | 9 | 10 |
| | 39 | -1 | 0 | 1 | 2 | 2 | 3 | 4 | 5 | 6 | 6 | 7 | 8 | 9 | 10 | 10 |
| | 40 | -1 | 0 | 1 | 2 | 3 | 3 | 4 | 5 | 6 | 7 | 7 | 8 | 9 | 10 | 11 |
| | 41 | -1 | 0 | 1 | 2 | 3 | 3 | 4 | 5 | 6 | 7 | 8 | 9 | 9 | 10 | 11 |
| | 42 | -1 | 0 | 1 | 2 | 3 | 4 | 4 | 5 | 6 | 7 | 8 | 9 | 10 | 11 | 11 |
| | 43 | -1 | 0 | 1 | 2 | 3 | 4 | 5 | 6 | 6 | 7 | 8 | 9 | 10 | 11 | 12 |
| | 44 | -1 | 0 | 1 | 2 | 3 | 4 | 5 | 6 | 7 | 8 | 9 | 10 | 10 | 11 | 12 |
| | 45 | -1 | 0 | 1 | 2 | 3 | 4 | 5 | 6 | 7 | 8 | 9 | 10 | 11 | 12 | 13 |
| | 46 | -1 | 0 | 1 | 2 | 3 | 4 | 5 | 6 | 7 | 8 | 9 | 10 | 11 | 12 | 13 |
| | 47 | -1 | 0 | 1 | 2 | 3 | 4 | 5 | 6 | 7 | 8 | 10 | 11 | 12 | 13 | 14 |
| | 48 | -1 | 0 | 1 | 2 | 3 | 4 | 6 | 7 | 8 | 9 | 10 | 11 | 12 | 13 | 14 |
| | 49 | -1 | 0 | 1 | 2 | 3 | 5 | 6 | 7 | 8 | 9 | 10 | 11 | 12 | 13 | 15 |
| | 50 | -1 | 0 | 1 | 2 | 4 | 5 | 6 | 7 | 8 | 9 | 11 | 12 | 13 | 14 | 15 |
| | 51 | -1 | 0 | 1 | 2 | 4 | 5 | 6 | 7 | 9 | 10 | 11 | 12 | 13 | 14 | 16 |
| | 52 | -1 | 0 | 1 | 3 | 4 | 5 | 6 | 8 | 9 | 10 | 11 | 13 | 14 | 15 | 16 |
| | 53 | -1 | 0 | 1 | 3 | 4 | 5 | 7 | 8 | 9 | 10 | 12 | 13 | 14 | 15 | 17 |
| | 54 | -1 | 0 | 1 | 3 | 4 | 5 | 7 | 8 | 10 | 11 | 12 | 13 | 15 | 16 | 17 |
| | 55 | -1 | 0 | 1 | 3 | 4 | 6 | 7 | 8 | 10 | 11 | 13 | 14 | 15 | 17 | 18 |

FIG.10b2

| Preload angle | | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|---|
| | Angle of approach | | | | | | | | | | | | | | | |
| | | 121 | 122 | 123 | 124 | 125 | 126 | 127 | 128 | 129 | 130 | 131 | 132 | 133 | 134 | 135 |
| A | 15 | 4 | 4 | 4 | 4 | 5 | 5 | 5 | 5 | 6 | 6 | 6 | 6 | 7 | 7 | 7 |
| n | 16 | 4 | 4 | 5 | 5 | 5 | 5 | 6 | 6 | 6 | 6 | 7 | 7 | 7 | 7 | 8 |
| g | 17 | 4 | 5 | 5 | 5 | 5 | 6 | 6 | 6 | 7 | 7 | 7 | 7 | 8 | 8 | 8 |
| l | 18 | 4 | 5 | 5 | 5 | 6 | 6 | 6 | 7 | 7 | 7 | 8 | 8 | 8 | 8 | 9 |
| e | 19 | 5 | 5 | 5 | 6 | 6 | 6 | 7 | 7 | 7 | 8 | 8 | 8 | 9 | 9 | 9 |
| | 20 | 5 | 5 | 6 | 6 | 6 | 7 | 7 | 7 | 8 | 8 | 8 | 9 | 9 | 9 | 10 |
| o | 21 | 5 | 6 | 6 | 6 | 7 | 7 | 7 | 8 | 8 | 9 | 9 | 9 | 10 | 10 | 10 |
| f | 22 | 6 | 6 | 6 | 7 | 7 | 7 | 8 | 8 | 9 | 9 | 9 | 10 | 10 | 10 | 11 |
| | 23 | 6 | 6 | 7 | 7 | 7 | 8 | 8 | 9 | 9 | 9 | 10 | 10 | 11 | 11 | 11 |
| s | 24 | 6 | 7 | 7 | 7 | 8 | 8 | 9 | 9 | 9 | 10 | 10 | 11 | 11 | 11 | 12 |
| l | 25 | 6 | 7 | 7 | 8 | 8 | 9 | 9 | 9 | 10 | 10 | 11 | 11 | 12 | 12 | 12 |
| o | 26 | 7 | 7 | 8 | 8 | 9 | 9 | 9 | 10 | 10 | 11 | 11 | 12 | 12 | 12 | 13 |
| p | 27 | 7 | 8 | 8 | 8 | 9 | 9 | 10 | 10 | 11 | 11 | 12 | 12 | 13 | 13 | 13 |
| e | 28 | 7 | 8 | 8 | 9 | 9 | 10 | 10 | 11 | 11 | 12 | 12 | 13 | 13 | 14 | 14 |
| | 29 | 8 | 8 | 9 | 9 | 10 | 10 | 11 | 11 | 12 | 12 | 13 | 13 | 14 | 14 | 15 |
| | 30 | 8 | 8 | 9 | 10 | 10 | 11 | 11 | 12 | 12 | 13 | 13 | 14 | 14 | 15 | 15 |
| | 31 | 8 | 9 | 9 | 10 | 11 | 11 | 12 | 12 | 13 | 13 | 14 | 14 | 15 | 15 | 16 |
| | 32 | 9 | 9 | 10 | 10 | 11 | 11 | 12 | 13 | 13 | 14 | 14 | 15 | 15 | 16 | 16 |
| | 33 | 9 | 10 | 10 | 11 | 11 | 12 | 13 | 13 | 14 | 14 | 15 | 15 | 16 | 16 | 17 |
| | 34 | 9 | 10 | 11 | 11 | 12 | 12 | 13 | 14 | 14 | 15 | 15 | 16 | 16 | 17 | 18 |
| | 35 | 10 | 10 | 11 | 12 | 12 | 13 | 13 | 14 | 15 | 15 | 16 | 16 | 17 | 18 | 18 |
| | 36 | 10 | 11 | 11 | 12 | 13 | 13 | 14 | 15 | 15 | 16 | 16 | 17 | 18 | 18 | 19 |
| | 37 | 10 | 11 | 12 | 12 | 13 | 14 | 14 | 15 | 16 | 16 | 17 | 18 | 18 | 19 | 19 |
| | 38 | 11 | 11 | 12 | 13 | 14 | 14 | 15 | 16 | 16 | 17 | 18 | 18 | 19 | 20 | 20 |
| | 39 | 11 | 12 | 13 | 13 | 14 | 15 | 15 | 16 | 17 | 18 | 18 | 19 | 20 | 20 | 21 |
| | 40 | 11 | 12 | 13 | 14 | 15 | 15 | 16 | 17 | 17 | 18 | 19 | 20 | 20 | 21 | 22 |
| | 41 | 12 | 13 | 13 | 14 | 15 | 16 | 17 | 17 | 18 | 19 | 19 | 20 | 21 | 22 | 22 |
| | 42 | 12 | 13 | 14 | 15 | 16 | 16 | 17 | 18 | 19 | 19 | 20 | 21 | 22 | 22 | 23 |
| | 43 | 13 | 14 | 14 | 15 | 16 | 17 | 18 | 18 | 19 | 20 | 21 | 22 | 22 | 23 | 24 |
| | 44 | 13 | 14 | 15 | 16 | 17 | 17 | 18 | 19 | 20 | 21 | 21 | 22 | 23 | 24 | 24 |
| | 45 | 14 | 15 | 15 | 16 | 17 | 18 | 19 | 20 | 21 | 21 | 22 | 23 | 24 | 24 | 25 |
| | 46 | 14 | 15 | 16 | 17 | 18 | 19 | 20 | 20 | 21 | 22 | 23 | 24 | 24 | 25 | 26 |
| | 47 | 15 | 16 | 16 | 17 | 18 | 19 | 20 | 21 | 22 | 23 | 24 | 24 | 25 | 26 | 27 |
| | 48 | 15 | 16 | 17 | 18 | 19 | 20 | 21 | 22 | 23 | 23 | 24 | 25 | 26 | 27 | 28 |
| | 49 | 16 | 17 | 18 | 19 | 20 | 21 | 21 | 22 | 23 | 24 | 25 | 26 | 27 | 28 | 28 |
| | 50 | 16 | 17 | 18 | 19 | 20 | 21 | 22 | 23 | 24 | 25 | 26 | 27 | 28 | 28 | 29 |
| | 51 | 17 | 18 | 19 | 20 | 21 | 22 | 23 | 24 | 25 | 26 | 27 | 28 | 28 | 29 | 30 |
| | 52 | 17 | 18 | 19 | 21 | 22 | 23 | 24 | 25 | 26 | 27 | 28 | 28 | 29 | 30 | 31 |
| | 53 | 18 | 19 | 20 | 21 | 22 | 23 | 24 | 25 | 26 | 27 | 28 | 29 | 30 | 31 | 32 |
| | 54 | 18 | 20 | 21 | 22 | 23 | 24 | 25 | 26 | 27 | 28 | 29 | 30 | 31 | 32 | 33 |
| | 55 | 19 | 20 | 21 | 23 | 24 | 25 | 26 | 27 | 28 | 29 | 30 | 31 | 32 | 33 | 34 |

FIG. 10b3

| Preload angle | | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|---|
| | Angle of approach | | | | | | | | | | | | | | | |
| | | 136 | 137 | 138 | 139 | 140 | 141 | 142 | 143 | 144 | 145 | 146 | 147 | 148 | 149 | 150 |
| A | 15 | 7 | 8 | 8 | 8 | 8 | 9 | 9 | 9 | 9 | 9 | 10 | 10 | 10 | 10 | 10 |
| n | 16 | 8 | 8 | 8 | 9 | 9 | 9 | 9 | 10 | 10 | 10 | 10 | 10 | 11 | 11 | 11 |
| g | 17 | 8 | 9 | 9 | 9 | 9 | 10 | 10 | 10 | 10 | 11 | 11 | 11 | 11 | 12 | 12 |
| l | 18 | 9 | 9 | 10 | 10 | 10 | 10 | 11 | 11 | 11 | 11 | 12 | 12 | 12 | 12 | 12 |
| e | 19 | 9 | 10 | 10 | 10 | 11 | 11 | 11 | 11 | 12 | 12 | 12 | 12 | 13 | 13 | 13 |
| | 20 | 10 | 10 | 11 | 11 | 11 | 12 | 12 | 12 | 12 | 13 | 13 | 13 | 13 | 14 | 14 |
| o | 21 | 11 | 11 | 11 | 11 | 12 | 12 | 12 | 13 | 13 | 13 | 14 | 14 | 14 | 14 | 15 |
| f | 22 | 11 | 11 | 12 | 12 | 12 | 13 | 13 | 13 | 14 | 14 | 14 | 15 | 15 | 15 | 15 |
| | 23 | 12 | 12 | 12 | 13 | 13 | 13 | 14 | 14 | 14 | 15 | 15 | 15 | 16 | 16 | 16 |
| s | 24 | 12 | 13 | 13 | 13 | 14 | 14 | 14 | 15 | 15 | 15 | 16 | 16 | 16 | 17 | 17 |
| l | 25 | 13 | 13 | 14 | 14 | 14 | 15 | 15 | 15 | 16 | 16 | 16 | 17 | 17 | 17 | 18 |
| o | 26 | 13 | 14 | 14 | 14 | 15 | 15 | 16 | 16 | 16 | 17 | 17 | 17 | 18 | 18 | 18 |
| p | 27 | 14 | 14 | 15 | 15 | 16 | 16 | 16 | 17 | 17 | 17 | 18 | 18 | 18 | 19 | 19 |
| e | 28 | 14 | 15 | 15 | 16 | 16 | 17 | 17 | 17 | 18 | 18 | 19 | 19 | 19 | 20 | 20 |
| | 29 | 15 | 15 | 16 | 16 | 17 | 17 | 18 | 18 | 18 | 19 | 19 | 20 | 20 | 20 | 21 |
| | 30 | 16 | 16 | 17 | 17 | 17 | 18 | 18 | 19 | 19 | 20 | 20 | 20 | 21 | 21 | 21 |
| | 31 | 16 | 17 | 17 | 18 | 18 | 19 | 19 | 19 | 20 | 20 | 21 | 21 | 22 | 22 | 22 |
| | 32 | 17 | 17 | 18 | 18 | 19 | 19 | 20 | 20 | 21 | 21 | 21 | 22 | 22 | 23 | 23 |
| | 33 | 17 | 18 | 18 | 19 | 19 | 20 | 20 | 21 | 21 | 22 | 22 | 23 | 23 | 23 | 24 |
| | 34 | 18 | 19 | 19 | 20 | 20 | 21 | 21 | 22 | 22 | 23 | 23 | 23 | 24 | 24 | 25 |
| | 35 | 19 | 19 | 20 | 20 | 21 | 21 | 22 | 22 | 23 | 23 | 24 | 24 | 25 | 25 | 26 |
| | 36 | 19 | 20 | 21 | 21 | 22 | 22 | 23 | 23 | 24 | 24 | 25 | 25 | 25 | 26 | 26 |
| | 37 | 20 | 21 | 21 | 22 | 22 | 23 | 23 | 24 | 24 | 25 | 25 | 26 | 26 | 27 | 27 |
| | 38 | 21 | 21 | 22 | 22 | 23 | 24 | 24 | 25 | 25 | 26 | 26 | 27 | 27 | 28 | 28 |
| | 39 | 21 | 22 | 23 | 23 | 24 | 24 | 25 | 25 | 26 | 26 | 27 | 27 | 28 | 28 | 29 |
| | 40 | 22 | 23 | 23 | 24 | 25 | 25 | 26 | 26 | 27 | 27 | 28 | 28 | 29 | 29 | 30 |
| | 41 | 23 | 23 | 24 | 25 | 25 | 26 | 27 | 27 | 28 | 28 | 29 | 29 | 30 | 30 | 31 |
| | 42 | 24 | 24 | 25 | 26 | 26 | 27 | 27 | 28 | 28 | 29 | 30 | 30 | 31 | 31 | 32 |
| | 43 | 24 | 25 | 26 | 26 | 27 | 28 | 28 | 29 | 29 | 30 | 30 | 31 | 31 | 32 | 32 |
| | 44 | 25 | 26 | 26 | 27 | 28 | 28 | 29 | 30 | 30 | 31 | 31 | 32 | 32 | 33 | 33 |
| | 45 | 26 | 27 | 27 | 28 | 29 | 29 | 30 | 30 | 31 | 32 | 32 | 33 | 33 | 34 | 34 |
| | 46 | 27 | 27 | 28 | 29 | 29 | 30 | 31 | 31 | 32 | 33 | 33 | 34 | 34 | 35 | 35 |
| | 47 | 27 | 28 | 29 | 30 | 30 | 31 | 32 | 32 | 33 | 33 | 34 | 35 | 35 | 36 | 36 |
| | 48 | 28 | 29 | 30 | 30 | 31 | 32 | 32 | 33 | 34 | 34 | 35 | 36 | 36 | 37 | 37 |
| | 49 | 29 | 30 | 31 | 31 | 32 | 33 | 33 | 34 | 35 | 35 | 36 | 36 | 37 | 38 | 38 |
| | 50 | 30 | 31 | 32 | 32 | 33 | 34 | 34 | 35 | 36 | 36 | 37 | 37 | 38 | 39 | 39 |
| | 51 | 31 | 32 | 32 | 33 | 34 | 35 | 35 | 36 | 37 | 37 | 38 | 38 | 39 | 40 | 40 |
| | 52 | 32 | 33 | 33 | 34 | 35 | 36 | 36 | 37 | 38 | 38 | 39 | 39 | 40 | 41 | 41 |
| | 53 | 33 | 34 | 34 | 35 | 36 | 37 | 37 | 38 | 39 | 39 | 40 | 40 | 41 | 42 | 42 |
| | 54 | 34 | 35 | 35 | 36 | 37 | 38 | 38 | 39 | 40 | 40 | 41 | 41 | 42 | 43 | 43 |
| | 55 | 35 | 36 | 36 | 37 | 38 | 39 | 39 | 40 | 41 | 41 | 42 | 43 | 43 | 44 | 44 |

FIG. 10b4

| Preload angle | | -17 | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|---|
| | Angle of approach | | | | | | | | | | | | | | | |
| | | 151 | 152 | 153 | 154 | 155 | 156 | 157 | 158 | 159 | 160 | 161 | 162 | 163 | 164 | 165 |
| A | 15 | 11 | 11 | 11 | 11 | 11 | 11 | 12 | 12 | 12 | 12 | 12 | 12 | 13 | 13 | 13 |
| n | 16 | 11 | 11 | 12 | 12 | 12 | 12 | 12 | 13 | 13 | 13 | 13 | 13 | 13 | 14 | 14 |
| g | 17 | 12 | 12 | 12 | 13 | 13 | 13 | 13 | 13 | 14 | 14 | 14 | 14 | 14 | 14 | 15 |
| l | 18 | 13 | 13 | 13 | 13 | 14 | 14 | 14 | 14 | 15 | 15 | 15 | 15 | 15 | 15 | 15 |
| e | 19 | 13 | 14 | 14 | 14 | 14 | 15 | 15 | 15 | 15 | 16 | 16 | 16 | 16 | 16 | 16 |
| | 20 | 14 | 14 | 15 | 15 | 15 | 15 | 16 | 16 | 16 | 16 | 16 | 17 | 17 | 17 | 17 |
| o | 21 | 15 | 15 | 15 | 16 | 16 | 16 | 16 | 17 | 17 | 17 | 17 | 17 | 18 | 18 | 18 |
| f | 22 | 16 | 16 | 16 | 16 | 17 | 17 | 17 | 18 | 18 | 18 | 18 | 19 | 19 | 19 | 19 |
| | 23 | 16 | 17 | 17 | 17 | 18 | 18 | 18 | 18 | 18 | 19 | 19 | 19 | 19 | 20 | 20 |
| s | 24 | 17 | 17 | 18 | 18 | 18 | 19 | 19 | 19 | 19 | 20 | 20 | 20 | 20 | 20 | 21 |
| l | 25 | 18 | 18 | 19 | 19 | 19 | 19 | 20 | 20 | 20 | 20 | 21 | 21 | 21 | 21 | 22 |
| o | 26 | 19 | 19 | 19 | 20 | 20 | 20 | 20 | 21 | 21 | 21 | 22 | 22 | 22 | 22 | 22 |
| p | 27 | 19 | 20 | 20 | 20 | 21 | 21 | 21 | 22 | 22 | 22 | 22 | 23 | 23 | 23 | 23 |
| e | 28 | 20 | 21 | 21 | 21 | 22 | 22 | 22 | 22 | 23 | 23 | 23 | 24 | 24 | 24 | 24 |
| | 29 | 21 | 21 | 22 | 22 | 22 | 23 | 23 | 23 | 24 | 24 | 24 | 24 | 25 | 25 | 25 |
| | 30 | 22 | 22 | 23 | 23 | 23 | 24 | 24 | 24 | 24 | 25 | 25 | 25 | 26 | 26 | 26 |
| | 31 | 23 | 23 | 23 | 24 | 24 | 24 | 25 | 25 | 25 | 26 | 26 | 26 | 26 | 27 | 27 |
| | 32 | 23 | 24 | 24 | 25 | 25 | 25 | 26 | 26 | 26 | 27 | 27 | 27 | 27 | 28 | 28 |
| | 33 | 24 | 25 | 25 | 25 | 26 | 26 | 26 | 27 | 27 | 27 | 28 | 28 | 28 | 29 | 29 |
| | 34 | 25 | 25 | 26 | 26 | 27 | 27 | 27 | 28 | 28 | 28 | 29 | 29 | 29 | 29 | 30 |
| | 35 | 26 | 26 | 27 | 27 | 27 | 28 | 28 | 29 | 29 | 29 | 30 | 30 | 30 | 30 | 31 |
| | 36 | 27 | 27 | 28 | 28 | 28 | 29 | 29 | 29 | 30 | 30 | 30 | 31 | 31 | 31 | 32 |
| | 37 | 28 | 28 | 28 | 29 | 29 | 30 | 30 | 30 | 31 | 31 | 31 | 32 | 32 | 32 | 33 |
| | 38 | 28 | 29 | 29 | 30 | 30 | 31 | 31 | 31 | 32 | 32 | 32 | 33 | 33 | 33 | 34 |
| | 39 | 29 | 30 | 30 | 31 | 31 | 31 | 32 | 32 | 33 | 33 | 33 | 34 | 34 | 34 | 34 |
| | 40 | 30 | 31 | 31 | 32 | 32 | 32 | 33 | 33 | 33 | 34 | 34 | 35 | 35 | 35 | 35 |
| | 41 | 31 | 32 | 32 | 32 | 33 | 33 | 34 | 34 | 34 | 35 | 35 | 35 | 36 | 36 | 36 |
| | 42 | 32 | 32 | 33 | 33 | 34 | 34 | 35 | 35 | 35 | 36 | 36 | 36 | 37 | 37 | 37 |
| | 43 | 33 | 33 | 34 | 34 | 35 | 35 | 36 | 36 | 36 | 37 | 37 | 37 | 38 | 38 | 38 |
| | 44 | 34 | 34 | 35 | 35 | 36 | 36 | 36 | 37 | 37 | 38 | 38 | 38 | 39 | 39 | 39 |
| | 45 | 35 | 35 | 36 | 36 | 37 | 37 | 37 | 38 | 38 | 39 | 39 | 39 | 40 | 40 | 40 |
| | 46 | 36 | 36 | 37 | 37 | 38 | 38 | 38 | 39 | 39 | 40 | 40 | 40 | 41 | 41 | 41 |
| | 47 | 37 | 37 | 38 | 38 | 39 | 39 | 39 | 40 | 40 | 41 | 41 | 41 | 42 | 42 | 42 |
| | 48 | 38 | 38 | 39 | 39 | 40 | 40 | 40 | 41 | 41 | 42 | 42 | 42 | 43 | 43 | 43 |
| | 49 | 39 | 39 | 40 | 40 | 41 | 41 | 41 | 42 | 42 | 43 | 43 | 43 | 44 | 44 | 44 |
| | 50 | 40 | 40 | 41 | 41 | 42 | 42 | 42 | 43 | 43 | 44 | 44 | 44 | 45 | 45 | 45 |
| | 51 | 41 | 41 | 42 | 42 | 43 | 43 | 43 | 44 | 44 | 45 | 45 | 45 | 46 | 46 | 46 |
| | 52 | 42 | 42 | 43 | 43 | 44 | 44 | 44 | 45 | 45 | 46 | 46 | 46 | 47 | 47 | 47 |
| | 53 | 43 | 43 | 44 | 44 | 45 | 45 | 45 | 46 | 46 | 47 | 47 | 47 | 48 | 48 | 48 |
| | 54 | 44 | 44 | 45 | 45 | 46 | 46 | 47 | 47 | 47 | 48 | 48 | 48 | 49 | 49 | 49 |
| | 55 | 45 | 45 | 46 | 46 | 47 | 47 | 48 | 48 | 48 | 49 | 49 | 49 | 50 | 50 | 50 |

FIG. 10b5

| Preload angle | | -17 | -17 | -17 | -17 | -17 | -17 | -17 | -17 | -17 | -17 | -17 | -17 | -17 | -17 |
|---|---|---|---|---|---|---|---|---|---|---|---|---|---|---|---|
| Angle of approach | | | | | | | | | | | | | | | |
| | | 166 | 167 | 168 | 169 | 170 | 171 | 172 | 173 | 174 | 175 | 176 | 177 | 178 | 179 |
| A | 15 | 13 | 13 | 13 | 13 | 13 | 14 | 14 | 14 | 14 | 14 | 14 | 14 | 14 | 14 |
| n | 16 | 14 | 14 | 14 | 14 | 14 | 14 | 15 | 15 | 15 | 15 | 15 | 15 | 15 | 15 |
| g | 17 | 15 | 15 | 15 | 15 | 15 | 15 | 15 | 16 | 16 | 16 | 16 | 16 | 16 | 16 |
| l | 18 | 16 | 16 | 16 | 16 | 16 | 16 | 16 | 17 | 17 | 17 | 17 | 17 | 17 | 17 |
| e | 19 | 16 | 17 | 17 | 17 | 17 | 17 | 17 | 17 | 18 | 18 | 18 | 18 | 18 | 18 |
| | 20 | 17 | 17 | 18 | 18 | 18 | 18 | 18 | 18 | 19 | 19 | 19 | 19 | 19 | 19 |
| o | 21 | 18 | 18 | 19 | 19 | 19 | 19 | 19 | 19 | 19 | 20 | 20 | 20 | 20 | 20 |
| f | 22 | 19 | 19 | 19 | 20 | 20 | 20 | 20 | 20 | 20 | 21 | 21 | 21 | 21 | 21 |
| | 23 | 20 | 20 | 20 | 21 | 21 | 21 | 21 | 21 | 21 | 22 | 22 | 22 | 22 | 22 |
| s | 24 | 21 | 21 | 21 | 21 | 22 | 22 | 22 | 22 | 22 | 22 | 23 | 23 | 23 | 23 |
| l | 25 | 22 | 22 | 22 | 22 | 23 | 23 | 23 | 23 | 23 | 23 | 24 | 24 | 24 | 24 |
| o | 26 | 23 | 23 | 23 | 23 | 23 | 24 | 24 | 24 | 24 | 24 | 25 | 25 | 25 | 25 |
| p | 27 | 24 | 24 | 24 | 24 | 24 | 25 | 25 | 25 | 25 | 25 | 25 | 26 | 26 | 26 |
| e | 28 | 25 | 25 | 25 | 25 | 25 | 26 | 26 | 26 | 26 | 26 | 26 | 27 | 27 | 27 |
| | 29 | 25 | 26 | 26 | 26 | 26 | 26 | 27 | 27 | 27 | 27 | 27 | 28 | 28 | 28 |
| | 30 | 26 | 27 | 27 | 27 | 27 | 27 | 28 | 28 | 28 | 28 | 28 | 28 | 29 | 29 |
| | 31 | 27 | 27 | 28 | 28 | 28 | 28 | 29 | 29 | 29 | 29 | 29 | 29 | 30 | 30 |
| | 32 | 28 | 28 | 29 | 29 | 29 | 29 | 30 | 30 | 30 | 30 | 30 | 30 | 31 | 31 |
| | 33 | 29 | 29 | 30 | 30 | 30 | 30 | 30 | 31 | 31 | 31 | 31 | 31 | 32 | 32 |
| | 34 | 30 | 30 | 31 | 31 | 31 | 31 | 31 | 32 | 32 | 32 | 32 | 32 | 33 | 33 |
| | 35 | 31 | 31 | 31 | 32 | 32 | 32 | 32 | 33 | 33 | 33 | 33 | 33 | 34 | 34 |
| | 36 | 32 | 32 | 32 | 33 | 33 | 33 | 33 | 34 | 34 | 34 | 34 | 34 | 34 | 35 |
| | 37 | 33 | 33 | 33 | 34 | 34 | 34 | 34 | 35 | 35 | 35 | 35 | 35 | 35 | 36 |
| | 38 | 34 | 34 | 34 | 35 | 35 | 35 | 35 | 36 | 36 | 36 | 36 | 36 | 36 | 37 |
| | 39 | 35 | 35 | 35 | 36 | 36 | 36 | 36 | 36 | 37 | 37 | 37 | 37 | 37 | 38 |
| | 40 | 36 | 36 | 36 | 37 | 37 | 37 | 37 | 37 | 38 | 38 | 38 | 38 | 38 | 39 |
| | 41 | 37 | 37 | 37 | 38 | 38 | 38 | 38 | 38 | 39 | 39 | 39 | 39 | 39 | 40 |
| | 42 | 38 | 38 | 38 | 38 | 39 | 39 | 39 | 39 | 40 | 40 | 40 | 40 | 40 | 41 |
| | 43 | 39 | 39 | 39 | 39 | 40 | 40 | 40 | 40 | 41 | 41 | 41 | 41 | 41 | 42 |
| | 44 | 40 | 40 | 40 | 40 | 41 | 41 | 41 | 41 | 42 | 42 | 42 | 42 | 42 | 43 |
| | 45 | 41 | 41 | 41 | 41 | 42 | 42 | 42 | 42 | 43 | 43 | 43 | 43 | 43 | 44 |
| | 46 | 42 | 42 | 42 | 42 | 43 | 43 | 43 | 43 | 44 | 44 | 44 | 44 | 44 | 45 |
| | 47 | 43 | 43 | 43 | 43 | 44 | 44 | 44 | 44 | 45 | 45 | 45 | 45 | 45 | 46 |
| | 48 | 44 | 44 | 44 | 44 | 45 | 45 | 45 | 45 | 46 | 46 | 46 | 46 | 46 | 47 |
| | 49 | 45 | 45 | 45 | 45 | 46 | 46 | 46 | 47 | 47 | 47 | 47 | 47 | 47 | 48 |
| | 50 | 46 | 46 | 46 | 46 | 47 | 47 | 47 | 47 | 48 | 48 | 48 | 48 | 48 | 49 |
| | 51 | 47 | 47 | 47 | 47 | 48 | 48 | 48 | 48 | 49 | 49 | 49 | 49 | 49 | 50 |
| | 52 | 48 | 48 | 48 | 48 | 49 | 49 | 49 | 49 | 50 | 50 | 50 | 50 | 50 | 51 |
| | 53 | 49 | 49 | 49 | 50 | 50 | 50 | 50 | 50 | 51 | 51 | 51 | 51 | 51 | 52 |
| | 54 | 50 | 50 | 50 | 51 | 51 | 51 | 51 | 52 | 52 | 52 | 52 | 52 | 52 | 53 |
| | 55 | 51 | 51 | 51 | 52 | 52 | 52 | 52 | 53 | 53 | 53 | 53 | 53 | 53 | 54 |

FIG. 10b6

| Preload angle | 17 | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|
| Angle of departure | | | | | | | | | | | | | | | | |
| | | 180 | 181 | 182 | 183 | 184 | 185 | 186 | 187 | 188 | 189 | 190 | 191 | 192 | 193 | 194 | 195 |
| A | 15 | 14 | 14 | 15 | 15 | 15 | 15 | 15 | 15 | 15 | 15 | 15 | 15 | 15 | 15 | 15 | 15 |
| n | 16 | 15 | 15 | 15 | 16 | 16 | 16 | 16 | 16 | 16 | 16 | 16 | 16 | 16 | 16 | 16 | 16 |
| | 17 | 16 | 16 | 16 | 17 | 17 | 17 | 17 | 17 | 17 | 17 | 17 | 17 | 17 | 17 | 17 | 17 |
| l | 18 | 17 | 17 | 17 | 17 | 18 | 18 | 18 | 18 | 18 | 18 | 18 | 18 | 18 | 18 | 18 | 18 |
| e | 19 | 18 | 18 | 18 | 18 | 19 | 19 | 19 | 19 | 19 | 19 | 19 | 19 | 19 | 19 | 19 | 19 |
| | 20 | 19 | 19 | 19 | 19 | 20 | 20 | 20 | 20 | 20 | 20 | 20 | 20 | 20 | 20 | 20 | 20 |
| o | 21 | 20 | 20 | 20 | 20 | 21 | 21 | 21 | 21 | 21 | 21 | 21 | 21 | 21 | 21 | 21 | 21 |
| f | 22 | 21 | 21 | 21 | 21 | 21 | 22 | 22 | 22 | 22 | 22 | 22 | 22 | 22 | 22 | 22 | 22 |
| | 23 | 22 | 22 | 22 | 22 | 22 | 23 | 23 | 23 | 23 | 23 | 23 | 23 | 23 | 23 | 23 | 23 |
| s | 24 | 23 | 23 | 23 | 23 | 23 | 24 | 24 | 24 | 24 | 24 | 24 | 24 | 24 | 24 | 24 | 24 |
| l | 25 | 24 | 24 | 24 | 24 | 24 | 25 | 25 | 25 | 25 | 25 | 25 | 25 | 25 | 25 | 25 | 25 |
| o | 26 | 25 | 25 | 25 | 25 | 25 | 26 | 26 | 26 | 26 | 26 | 26 | 26 | 26 | 26 | 26 | 26 |
| p | 27 | 26 | 26 | 26 | 26 | 26 | 26 | 27 | 27 | 27 | 27 | 27 | 27 | 27 | 27 | 27 | 27 |
| e | 28 | 27 | 27 | 27 | 27 | 27 | 27 | 28 | 28 | 28 | 28 | 28 | 28 | 28 | 28 | 28 | 28 |
| | 29 | 28 | 28 | 28 | 28 | 28 | 28 | 29 | 29 | 29 | 29 | 29 | 29 | 29 | 29 | 29 | 29 |
| | 30 | 29 | 29 | 29 | 29 | 29 | 29 | 30 | 30 | 30 | 30 | 30 | 30 | 30 | 30 | 30 | 30 |
| | 31 | 30 | 30 | 30 | 30 | 30 | 30 | 31 | 31 | 31 | 31 | 31 | 31 | 31 | 31 | 31 | 31 |
| | 32 | 31 | 31 | 31 | 31 | 31 | 31 | 32 | 32 | 32 | 32 | 32 | 32 | 32 | 32 | 32 | 32 |
| | 33 | 32 | 32 | 32 | 32 | 32 | 32 | 33 | 33 | 33 | 33 | 33 | 33 | 33 | 33 | 33 | 33 |
| | 34 | 33 | 33 | 33 | 33 | 33 | 33 | 34 | 34 | 34 | 34 | 34 | 34 | 34 | 34 | 34 | 34 |
| | 35 | 34 | 34 | 34 | 34 | 34 | 34 | 35 | 35 | 35 | 35 | 35 | 35 | 35 | 35 | 35 | 35 |
| | 36 | 35 | 35 | 35 | 35 | 35 | 35 | 35 | 36 | 36 | 36 | 36 | 36 | 36 | 36 | 36 | 36 |
| | 37 | 36 | 36 | 36 | 36 | 36 | 36 | 36 | 37 | 37 | 37 | 37 | 37 | 37 | 37 | 37 | 37 |
| | 38 | 37 | 37 | 37 | 37 | 37 | 37 | 37 | 38 | 38 | 38 | 38 | 38 | 38 | 38 | 38 | 38 |
| | 39 | 38 | 38 | 38 | 38 | 38 | 38 | 38 | 39 | 39 | 39 | 39 | 39 | 39 | 39 | 39 | 39 |
| | 40 | 39 | 39 | 39 | 39 | 39 | 39 | 39 | 40 | 40 | 40 | 40 | 40 | 40 | 40 | 40 | 40 |
| | 41 | 40 | 40 | 40 | 40 | 40 | 40 | 40 | 41 | 41 | 41 | 41 | 41 | 41 | 41 | 41 | 41 |
| | 42 | 41 | 41 | 41 | 41 | 41 | 41 | 41 | 42 | 42 | 42 | 42 | 42 | 42 | 42 | 42 | 42 |
| | 43 | 42 | 42 | 42 | 42 | 42 | 42 | 42 | 43 | 43 | 43 | 43 | 43 | 43 | 43 | 43 | 43 |
| | 44 | 43 | 43 | 43 | 43 | 43 | 43 | 43 | 44 | 44 | 44 | 44 | 44 | 44 | 44 | 44 | 44 |
| | 45 | 44 | 44 | 44 | 44 | 44 | 44 | 44 | 45 | 45 | 45 | 45 | 45 | 45 | 45 | 45 | 45 |
| | 46 | 45 | 45 | 45 | 45 | 45 | 45 | 45 | 46 | 46 | 46 | 46 | 46 | 46 | 46 | 46 | 46 |
| | 47 | 46 | 46 | 46 | 46 | 46 | 46 | 46 | 47 | 47 | 47 | 47 | 47 | 47 | 47 | 47 | 47 |
| | 48 | 47 | 47 | 47 | 47 | 47 | 47 | 47 | 48 | 48 | 48 | 48 | 48 | 48 | 48 | 48 | 48 |
| | 49 | 48 | 48 | 48 | 48 | 48 | 48 | 48 | 49 | 49 | 49 | 49 | 49 | 49 | 49 | 49 | 49 |
| | 50 | 49 | 49 | 49 | 49 | 49 | 49 | 49 | 50 | 50 | 50 | 50 | 50 | 50 | 50 | 50 | 50 |
| | 51 | 50 | 50 | 50 | 50 | 50 | 50 | 50 | 51 | 51 | 51 | 51 | 51 | 51 | 51 | 51 | 51 |
| | 52 | 51 | 51 | 51 | 51 | 51 | 51 | 51 | 52 | 52 | 52 | 52 | 52 | 52 | 52 | 52 | 52 |
| | 53 | 52 | 52 | 52 | 52 | 52 | 52 | 52 | 53 | 53 | 53 | 53 | 53 | 53 | 53 | 53 | 53 |
| | 54 | 53 | 53 | 53 | 53 | 53 | 53 | 53 | 54 | 54 | 54 | 54 | 54 | 54 | 54 | 54 | 54 |
| | 55 | 54 | 54 | 54 | 54 | 54 | 54 | 54 | 55 | 55 | 55 | 55 | 55 | 55 | 55 | 55 | 55 |

FIG. 10c1

| Preload angle | | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|
| Angle of departure | | | | | | | | | | | | | | | | |
| | | 196 | 197 | 198 | 199 | 200 | 201 | 202 | 203 | 204 | 205 | 206 | 207 | 208 | 209 | 210 |
| A | 15 | 15 | 15 | 15 | 15 | 15 | 15 | 15 | 15 | 15 | 15 | 15 | 15 | 15 | 15 | 15 |
| n | 16 | 16 | 16 | 16 | 16 | 16 | 16 | 16 | 16 | 16 | 16 | 16 | 16 | 16 | 16 | 16 |
| g | 17 | 17 | 17 | 17 | 17 | 17 | 17 | 17 | 17 | 17 | 17 | 17 | 17 | 17 | 17 | 17 |
| l | 18 | 18 | 18 | 18 | 18 | 18 | 18 | 18 | 18 | 18 | 18 | 18 | 18 | 18 | 18 | 18 |
| e | 19 | 19 | 19 | 19 | 19 | 19 | 19 | 19 | 19 | 19 | 19 | 19 | 19 | 19 | 19 | 19 |
|  | 20 | 20 | 20 | 20 | 20 | 20 | 20 | 20 | 20 | 20 | 20 | 20 | 20 | 20 | 20 | 20 |
| o | 21 | 21 | 21 | 21 | 21 | 21 | 21 | 21 | 21 | 21 | 21 | 21 | 21 | 21 | 21 | 21 |
| f | 22 | 22 | 22 | 22 | 22 | 22 | 22 | 22 | 22 | 22 | 22 | 22 | 22 | 22 | 22 | 21 |
|  | 23 | 23 | 23 | 23 | 23 | 23 | 23 | 23 | 23 | 23 | 23 | 23 | 23 | 23 | 23 | 22 |
| s | 24 | 24 | 24 | 24 | 24 | 24 | 24 | 24 | 24 | 24 | 24 | 24 | 24 | 24 | 24 | 23 |
| l | 25 | 25 | 25 | 25 | 25 | 25 | 25 | 25 | 25 | 25 | 25 | 25 | 25 | 25 | 25 | 24 |
| o | 26 | 26 | 26 | 26 | 26 | 26 | 26 | 26 | 26 | 26 | 26 | 26 | 26 | 26 | 26 | 25 |
| p | 27 | 27 | 27 | 27 | 27 | 27 | 27 | 27 | 27 | 27 | 27 | 27 | 27 | 27 | 26 | 26 |
| e | 28 | 28 | 28 | 28 | 28 | 28 | 28 | 28 | 28 | 28 | 28 | 28 | 28 | 28 | 27 | 27 |
|  | 29 | 29 | 29 | 29 | 29 | 29 | 29 | 29 | 29 | 29 | 29 | 29 | 29 | 29 | 28 | 28 |
|  | 30 | 30 | 30 | 30 | 30 | 30 | 30 | 30 | 30 | 30 | 30 | 30 | 30 | 30 | 29 | 29 |
|  | 31 | 31 | 31 | 31 | 31 | 31 | 31 | 31 | 31 | 31 | 31 | 31 | 31 | 31 | 30 | 30 |
|  | 32 | 32 | 32 | 32 | 32 | 32 | 32 | 32 | 32 | 32 | 32 | 32 | 32 | 32 | 31 | 31 |
|  | 33 | 33 | 33 | 33 | 33 | 33 | 33 | 33 | 33 | 33 | 33 | 33 | 33 | 33 | 32 | 32 |
|  | 34 | 34 | 34 | 34 | 34 | 34 | 34 | 34 | 34 | 34 | 34 | 34 | 34 | 34 | 33 | 33 |
|  | 35 | 35 | 35 | 35 | 35 | 35 | 35 | 35 | 35 | 35 | 35 | 35 | 35 | 35 | 34 | 34 |
|  | 36 | 36 | 36 | 36 | 36 | 36 | 36 | 36 | 36 | 36 | 36 | 36 | 36 | 35 | 35 | 35 |
|  | 37 | 37 | 37 | 37 | 37 | 37 | 37 | 37 | 37 | 37 | 37 | 37 | 37 | 36 | 36 | 36 |
|  | 38 | 38 | 38 | 38 | 38 | 38 | 38 | 38 | 38 | 38 | 38 | 38 | 38 | 37 | 37 | 37 |
|  | 39 | 39 | 39 | 39 | 39 | 39 | 39 | 39 | 39 | 39 | 39 | 39 | 39 | 38 | 38 | 38 |
|  | 40 | 40 | 40 | 40 | 40 | 40 | 40 | 40 | 40 | 40 | 40 | 40 | 40 | 39 | 39 | 39 |
|  | 41 | 41 | 41 | 41 | 41 | 41 | 41 | 41 | 41 | 41 | 41 | 41 | 41 | 40 | 40 | 40 |
|  | 42 | 42 | 42 | 42 | 42 | 42 | 42 | 42 | 42 | 42 | 42 | 42 | 42 | 41 | 41 | 41 |
|  | 43 | 43 | 43 | 43 | 43 | 43 | 43 | 43 | 43 | 43 | 43 | 43 | 43 | 42 | 42 | 42 |
|  | 44 | 44 | 44 | 44 | 44 | 44 | 44 | 44 | 44 | 44 | 44 | 44 | 44 | 43 | 43 | 43 |
|  | 45 | 45 | 45 | 45 | 45 | 45 | 45 | 45 | 45 | 45 | 45 | 45 | 45 | 44 | 44 | 44 |
|  | 46 | 46 | 46 | 46 | 46 | 46 | 46 | 46 | 46 | 46 | 46 | 46 | 46 | 45 | 45 | 45 |
|  | 47 | 47 | 47 | 47 | 47 | 47 | 47 | 47 | 47 | 47 | 47 | 47 | 47 | 46 | 46 | 46 |
|  | 48 | 48 | 48 | 48 | 48 | 48 | 48 | 48 | 48 | 48 | 48 | 48 | 48 | 47 | 47 | 47 |
|  | 49 | 49 | 49 | 49 | 49 | 49 | 49 | 49 | 49 | 49 | 49 | 49 | 49 | 48 | 48 | 48 |
|  | 50 | 50 | 50 | 50 | 50 | 50 | 50 | 50 | 50 | 50 | 50 | 50 | 50 | 49 | 49 | 49 |
|  | 51 | 51 | 51 | 51 | 51 | 51 | 51 | 51 | 51 | 51 | 51 | 51 | 51 | 50 | 50 | 50 |
|  | 52 | 52 | 52 | 52 | 52 | 52 | 52 | 52 | 52 | 52 | 52 | 52 | 52 | 51 | 51 | 51 |
|  | 53 | 53 | 53 | 53 | 53 | 53 | 53 | 53 | 53 | 53 | 53 | 53 | 53 | 52 | 52 | 52 |
|  | 54 | 54 | 54 | 54 | 54 | 54 | 54 | 54 | 54 | 54 | 54 | 54 | 54 | 53 | 53 | 53 |
|  | 55 | 55 | 55 | 55 | 55 | 55 | 55 | 55 | 55 | 55 | 55 | 55 | 55 | 54 | 54 | 54 |

FIG.10c2

| Preload angle | | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|
| Angle of departure | | | | | | | | | | | | | | | | |
| | | 211 | 212 | 213 | 214 | 215 | 216 | 217 | 218 | 219 | 220 | 221 | 222 | 223 | 224 | 225 |
| A | 15 | 15 | 15 | 14 | 14 | 14 | 14 | 14 | 14 | 14 | 14 | 14 | 14 | 14 | 13 | 13 |
| n | 16 | 16 | 15 | 15 | 15 | 15 | 15 | 15 | 15 | 15 | 15 | 15 | 15 | 14 | 14 | 14 |
| g | 17 | 17 | 16 | 16 | 16 | 16 | 16 | 16 | 16 | 16 | 16 | 16 | 15 | 15 | 15 | 15 |
| l | 18 | 17 | 17 | 17 | 17 | 17 | 17 | 17 | 17 | 17 | 17 | 17 | 16 | 16 | 16 | 16 |
| e | 19 | 18 | 18 | 18 | 18 | 18 | 18 | 18 | 18 | 18 | 18 | 17 | 17 | 17 | 17 | 17 |
| | 20 | 19 | 19 | 19 | 19 | 19 | 19 | 19 | 19 | 19 | 19 | 18 | 18 | 18 | 18 | 18 |
| o | 21 | 20 | 20 | 20 | 20 | 20 | 20 | 20 | 20 | 20 | 19 | 19 | 19 | 19 | 19 | 19 |
| f | 22 | 21 | 21 | 21 | 21 | 21 | 21 | 21 | 21 | 20 | 20 | 20 | 20 | 20 | 20 | 20 |
| | 23 | 22 | 22 | 22 | 22 | 22 | 22 | 22 | 22 | 21 | 21 | 21 | 21 | 21 | 21 | 21 |
| s | 24 | 23 | 23 | 23 | 23 | 23 | 23 | 23 | 23 | 22 | 22 | 22 | 22 | 22 | 22 | 21 |
| l | 25 | 24 | 24 | 24 | 24 | 24 | 24 | 24 | 23 | 23 | 23 | 23 | 23 | 23 | 23 | 22 |
| o | 26 | 25 | 25 | 25 | 25 | 25 | 25 | 25 | 24 | 24 | 24 | 24 | 24 | 24 | 23 | 23 |
| p | 27 | 26 | 26 | 26 | 26 | 26 | 26 | 26 | 25 | 25 | 25 | 25 | 25 | 25 | 24 | 24 |
| e | 28 | 27 | 27 | 27 | 27 | 27 | 27 | 27 | 26 | 26 | 26 | 26 | 26 | 26 | 25 | 25 |
| | 29 | 28 | 28 | 28 | 28 | 28 | 28 | 28 | 27 | 27 | 27 | 27 | 27 | 26 | 26 | 26 |
| | 30 | 29 | 29 | 29 | 29 | 29 | 29 | 28 | 28 | 28 | 28 | 28 | 28 | 27 | 27 | 27 |
| | 31 | 30 | 30 | 30 | 30 | 30 | 30 | 29 | 29 | 29 | 29 | 29 | 29 | 28 | 28 | 28 |
| | 32 | 31 | 31 | 31 | 31 | 31 | 31 | 30 | 30 | 30 | 30 | 30 | 30 | 29 | 29 | 29 |
| | 33 | 32 | 32 | 32 | 32 | 32 | 32 | 31 | 31 | 31 | 31 | 31 | 30 | 30 | 30 | 30 |
| | 34 | 33 | 33 | 33 | 33 | 33 | 33 | 32 | 32 | 32 | 32 | 32 | 31 | 31 | 31 | 31 |
| | 35 | 34 | 34 | 34 | 34 | 34 | 34 | 33 | 33 | 33 | 33 | 33 | 32 | 32 | 32 | 32 |
| | 36 | 35 | 35 | 35 | 35 | 35 | 34 | 34 | 34 | 34 | 34 | 34 | 33 | 33 | 33 | 33 |
| | 37 | 36 | 36 | 36 | 36 | 36 | 35 | 35 | 35 | 35 | 35 | 35 | 34 | 34 | 34 | 34 |
| | 38 | 37 | 37 | 37 | 37 | 37 | 36 | 36 | 36 | 36 | 36 | 36 | 35 | 35 | 35 | 35 |
| | 39 | 38 | 38 | 38 | 38 | 38 | 37 | 37 | 37 | 37 | 37 | 36 | 36 | 36 | 36 | 36 |
| | 40 | 39 | 39 | 39 | 39 | 39 | 38 | 38 | 38 | 38 | 38 | 37 | 37 | 37 | 37 | 37 |
| | 41 | 40 | 40 | 40 | 40 | 40 | 39 | 39 | 39 | 39 | 39 | 38 | 38 | 38 | 38 | 38 |
| | 42 | 41 | 41 | 41 | 41 | 41 | 40 | 40 | 40 | 40 | 40 | 39 | 39 | 39 | 39 | 38 |
| | 43 | 42 | 42 | 42 | 42 | 42 | 41 | 41 | 41 | 41 | 41 | 40 | 40 | 40 | 40 | 39 |
| | 44 | 43 | 43 | 43 | 43 | 43 | 42 | 42 | 42 | 42 | 42 | 41 | 41 | 41 | 41 | 40 |
| | 45 | 44 | 44 | 44 | 44 | 44 | 43 | 43 | 43 | 43 | 42 | 42 | 42 | 42 | 42 | 41 |
| | 46 | 45 | 45 | 45 | 45 | 45 | 44 | 44 | 44 | 44 | 43 | 43 | 43 | 43 | 43 | 42 |
| | 47 | 46 | 46 | 46 | 46 | 46 | 45 | 45 | 45 | 45 | 44 | 44 | 44 | 44 | 44 | 43 |
| | 48 | 47 | 47 | 47 | 47 | 47 | 46 | 46 | 46 | 46 | 45 | 45 | 45 | 45 | 45 | 44 |
| | 49 | 48 | 48 | 48 | 48 | 48 | 47 | 47 | 47 | 47 | 46 | 46 | 46 | 46 | 46 | 45 |
| | 50 | 49 | 49 | 49 | 49 | 49 | 48 | 48 | 48 | 48 | 47 | 47 | 47 | 47 | 47 | 46 |
| | 51 | 50 | 50 | 50 | 50 | 50 | 49 | 49 | 49 | 49 | 48 | 48 | 48 | 48 | 48 | 47 |
| | 52 | 51 | 51 | 51 | 51 | 51 | 50 | 50 | 50 | 50 | 50 | 49 | 49 | 49 | 49 | 48 |
| | 53 | 52 | 52 | 52 | 52 | 52 | 51 | 51 | 51 | 51 | 51 | 50 | 50 | 50 | 50 | 50 |
| | 54 | 53 | 53 | 53 | 53 | 53 | 52 | 52 | 52 | 52 | 52 | 51 | 51 | 51 | 51 | 51 |
| | 55 | 54 | 54 | 54 | 54 | 54 | 53 | 53 | 53 | 53 | 53 | 52 | 52 | 52 | 52 | 52 |

FIG. 10c3

| Preload angle | | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|
| | Angle of departure | | | | | | | | | | | | | | | |
| | | 226 | 227 | 228 | 229 | 230 | 231 | 232 | 233 | 234 | 235 | 236 | 237 | 238 | 239 | 240 |
| A | 15 | 13 | 13 | 13 | 13 | 13 | 13 | 12 | 12 | 12 | 12 | 12 | 12 | 11 | 11 | 11 |
| n | 16 | 14 | 14 | 14 | 14 | 14 | 13 | 13 | 13 | 13 | 13 | 13 | 12 | 12 | 12 | 12 |
| g | 17 | 15 | 15 | 15 | 15 | 14 | 14 | 14 | 14 | 14 | 14 | 13 | 13 | 13 | 13 | 13 |
| l | 18 | 16 | 16 | 16 | 15 | 15 | 15 | 15 | 15 | 15 | 14 | 14 | 14 | 14 | 14 | 13 |
| e | 19 | 17 | 17 | 16 | 16 | 16 | 16 | 16 | 16 | 15 | 15 | 15 | 15 | 15 | 14 | 14 |
| | 20 | 18 | 17 | 17 | 17 | 17 | 17 | 17 | 16 | 16 | 16 | 16 | 16 | 15 | 15 | 15 |
| o | 21 | 19 | 18 | 18 | 18 | 18 | 18 | 17 | 17 | 17 | 17 | 17 | 16 | 16 | 16 | 16 |
| f | 22 | 19 | 19 | 19 | 19 | 19 | 19 | 18 | 18 | 18 | 18 | 17 | 17 | 17 | 17 | 16 |
| | 23 | 20 | 20 | 20 | 20 | 20 | 19 | 19 | 19 | 19 | 18 | 18 | 18 | 18 | 18 | 17 |
| s | 24 | 21 | 21 | 21 | 21 | 20 | 20 | 20 | 20 | 20 | 19 | 19 | 19 | 19 | 18 | 18 |
| l | 25 | 22 | 22 | 22 | 22 | 21 | 21 | 21 | 21 | 20 | 20 | 20 | 20 | 19 | 19 | 19 |
| o | 26 | 23 | 23 | 23 | 22 | 22 | 22 | 22 | 22 | 21 | 21 | 21 | 20 | 20 | 20 | 20 |
| p | 27 | 24 | 24 | 24 | 23 | 23 | 23 | 23 | 22 | 22 | 22 | 22 | 21 | 21 | 21 | 20 |
| e | 28 | 25 | 25 | 25 | 24 | 24 | 24 | 24 | 23 | 23 | 23 | 22 | 22 | 22 | 22 | 21 |
| | 29 | 26 | 26 | 25 | 25 | 25 | 25 | 24 | 24 | 24 | 24 | 23 | 23 | 23 | 22 | 22 |
| | 30 | 27 | 27 | 26 | 26 | 26 | 26 | 25 | 25 | 25 | 24 | 24 | 24 | 24 | 23 | 23 |
| | 31 | 28 | 27 | 27 | 27 | 27 | 26 | 26 | 26 | 26 | 25 | 25 | 25 | 24 | 24 | 24 |
| | 32 | 29 | 28 | 28 | 28 | 28 | 27 | 27 | 27 | 27 | 26 | 26 | 26 | 25 | 25 | 25 |
| | 33 | 30 | 29 | 29 | 29 | 29 | 28 | 28 | 28 | 27 | 27 | 27 | 26 | 26 | 26 | 25 |
| | 34 | 31 | 30 | 30 | 30 | 29 | 29 | 29 | 29 | 28 | 28 | 28 | 27 | 27 | 27 | 26 |
| | 35 | 31 | 31 | 31 | 31 | 30 | 30 | 30 | 30 | 29 | 29 | 29 | 28 | 28 | 27 | 27 |
| | 36 | 32 | 32 | 32 | 32 | 31 | 31 | 31 | 30 | 30 | 30 | 29 | 29 | 29 | 28 | 28 |
| | 37 | 33 | 33 | 33 | 33 | 32 | 32 | 32 | 31 | 31 | 31 | 30 | 30 | 30 | 29 | 29 |
| | 38 | 34 | 34 | 34 | 34 | 33 | 33 | 33 | 32 | 32 | 32 | 31 | 31 | 31 | 30 | 30 |
| | 39 | 35 | 35 | 35 | 34 | 34 | 34 | 34 | 33 | 33 | 33 | 32 | 32 | 31 | 31 | 31 |
| | 40 | 36 | 36 | 36 | 35 | 35 | 35 | 35 | 34 | 34 | 33 | 33 | 33 | 32 | 32 | 32 |
| | 41 | 37 | 37 | 37 | 36 | 36 | 36 | 35 | 35 | 35 | 34 | 34 | 34 | 33 | 33 | 32 |
| | 42 | 38 | 38 | 38 | 37 | 37 | 37 | 36 | 36 | 36 | 35 | 35 | 35 | 34 | 34 | 33 |
| | 43 | 39 | 39 | 39 | 38 | 38 | 38 | 37 | 37 | 37 | 36 | 36 | 36 | 35 | 35 | 34 |
| | 44 | 40 | 40 | 40 | 39 | 39 | 39 | 38 | 38 | 38 | 37 | 37 | 36 | 36 | 36 | 35 |
| | 45 | 41 | 41 | 41 | 40 | 40 | 40 | 39 | 39 | 39 | 38 | 38 | 37 | 37 | 37 | 36 |
| | 46 | 42 | 42 | 42 | 41 | 41 | 41 | 40 | 40 | 40 | 39 | 39 | 38 | 38 | 38 | 37 |
| | 47 | 43 | 43 | 43 | 42 | 42 | 42 | 41 | 41 | 41 | 40 | 40 | 39 | 39 | 39 | 38 |
| | 48 | 44 | 44 | 44 | 43 | 43 | 43 | 42 | 42 | 42 | 41 | 41 | 40 | 40 | 40 | 39 |
| | 49 | 45 | 45 | 45 | 44 | 44 | 44 | 43 | 43 | 43 | 42 | 42 | 41 | 41 | 41 | 40 |
| | 50 | 46 | 46 | 46 | 45 | 45 | 45 | 44 | 44 | 44 | 43 | 43 | 42 | 42 | 42 | 41 |
| | 51 | 47 | 47 | 47 | 46 | 46 | 46 | 45 | 45 | 45 | 44 | 44 | 43 | 43 | 43 | 42 |
| | 52 | 48 | 48 | 48 | 47 | 47 | 47 | 46 | 46 | 46 | 45 | 45 | 44 | 44 | 44 | 43 |
| | 53 | 49 | 49 | 49 | 48 | 48 | 48 | 47 | 47 | 47 | 46 | 46 | 45 | 45 | 45 | 44 |
| | 54 | 50 | 50 | 50 | 49 | 49 | 49 | 48 | 48 | 48 | 47 | 47 | 46 | 46 | 46 | 45 |
| | 55 | 51 | 51 | 51 | 50 | 50 | 50 | 49 | 49 | 49 | 48 | 48 | 47 | 47 | 47 | 46 |

FIG. 10c4

| Preload angle | | | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|---|
| | Angle of departure | | | | | | | | | | | | | | | | |
| | | | 241 | 242 | 243 | 244 | 245 | 246 | 247 | 248 | 249 | 250 | 251 | 252 | 253 | 254 | 255 |
| A | 15 | | 11 | 11 | 11 | 10 | 10 | 10 | 10 | 10 | 9 | 9 | 9 | 9 | 9 | 8 | 8 |
| n | 16 | | 12 | 11 | 11 | 11 | 11 | 11 | 10 | 10 | 10 | 10 | 10 | 9 | 9 | 9 | 9 |
| g | 17 | | 12 | 12 | 12 | 12 | 12 | 11 | 11 | 11 | 10 | 10 | 10 | 10 | 10 | 9 | 9 |
| l | 18 | | 13 | 13 | 13 | 12 | 12 | 12 | 12 | 12 | 11 | 11 | 11 | 11 | 10 | 10 | 10 |
| e | 19 | | 14 | 14 | 13 | 13 | 13 | 13 | 12 | 12 | 12 | 12 | 11 | 11 | 11 | 11 | 10 |
| | 20 | | 15 | 14 | 14 | 14 | 14 | 13 | 13 | 13 | 13 | 12 | 12 | 12 | 12 | 11 | 11 |
| o | 21 | | 15 | 15 | 15 | 15 | 14 | 14 | 14 | 14 | 13 | 13 | 13 | 12 | 12 | 12 | 11 |
| f | 22 | | 16 | 16 | 16 | 15 | 15 | 15 | 15 | 14 | 14 | 14 | 13 | 13 | 13 | 12 | 12 |
| | 23 | | 17 | 17 | 16 | 16 | 16 | 16 | 15 | 15 | 15 | 14 | 14 | 14 | 13 | 13 | 13 |
| s | 24 | | 18 | 17 | 17 | 17 | 17 | 16 | 16 | 16 | 15 | 15 | 15 | 14 | 14 | 14 | 13 |
| l | 25 | | 19 | 18 | 18 | 18 | 17 | 17 | 17 | 16 | 16 | 16 | 15 | 15 | 15 | 14 | 14 |
| o | 26 | | 19 | 19 | 19 | 18 | 18 | 18 | 17 | 17 | 17 | 16 | 16 | 16 | 15 | 15 | 14 |
| p | 27 | | 20 | 20 | 19 | 19 | 19 | 18 | 18 | 18 | 17 | 17 | 17 | 16 | 16 | 16 | 15 |
| e | 28 | | 21 | 21 | 20 | 20 | 20 | 19 | 19 | 19 | 18 | 18 | 17 | 17 | 17 | 16 | 16 |
| | 29 | | 22 | 21 | 21 | 21 | 20 | 20 | 20 | 19 | 19 | 18 | 18 | 18 | 17 | 17 | 16 |
| | 30 | | 23 | 22 | 22 | 21 | 21 | 21 | 20 | 20 | 20 | 19 | 19 | 18 | 18 | 17 | 17 |
| | 31 | | 23 | 23 | 23 | 22 | 22 | 22 | 21 | 21 | 20 | 20 | 19 | 19 | 19 | 18 | 18 |
| | 32 | | 24 | 24 | 23 | 23 | 23 | 22 | 22 | 21 | 21 | 20 | 20 | 19 | 19 | 18 |
| | 33 | | 25 | 25 | 24 | 24 | 23 | 23 | 23 | 22 | 22 | 21 | 21 | 20 | 20 | 19 | 19 |
| | 34 | | 26 | 25 | 25 | 25 | 24 | 24 | 23 | 23 | 23 | 22 | 22 | 21 | 21 | 20 | 20 |
| | 35 | | 27 | 26 | 26 | 26 | 25 | 25 | 24 | 24 | 23 | 23 | 22 | 22 | 21 | 21 | 20 |
| | 36 | | 28 | 27 | 27 | 26 | 26 | 25 | 25 | 25 | 24 | 24 | 23 | 23 | 22 | 22 | 21 |
| | 37 | | 28 | 28 | 28 | 27 | 27 | 26 | 26 | 25 | 25 | 24 | 24 | 23 | 23 | 22 | 22 |
| | 38 | | 29 | 29 | 28 | 28 | 28 | 27 | 27 | 26 | 26 | 25 | 25 | 24 | 24 | 23 | 22 |
| | 39 | | 30 | 30 | 29 | 29 | 28 | 28 | 27 | 27 | 26 | 26 | 25 | 25 | 24 | 24 | 23 |
| | 40 | | 31 | 31 | 30 | 30 | 29 | 29 | 28 | 28 | 27 | 27 | 26 | 26 | 25 | 25 | 24 |
| | 41 | | 32 | 32 | 31 | 31 | 30 | 30 | 29 | 29 | 28 | 28 | 27 | 27 | 26 | 25 | 25 |
| | 42 | | 33 | 32 | 32 | 32 | 31 | 31 | 30 | 30 | 29 | 28 | 28 | 27 | 27 | 26 | 26 |
| | 43 | | 34 | 33 | 33 | 32 | 32 | 31 | 31 | 30 | 30 | 29 | 29 | 28 | 28 | 27 | 26 |
| | 44 | | 35 | 34 | 34 | 33 | 33 | 32 | 32 | 31 | 31 | 30 | 30 | 29 | 28 | 28 | 27 |
| | 45 | | 36 | 35 | 35 | 34 | 34 | 33 | 33 | 32 | 32 | 31 | 30 | 30 | 29 | 29 | 28 |
| | 46 | | 37 | 36 | 36 | 35 | 35 | 34 | 34 | 33 | 33 | 32 | 31 | 31 | 30 | 29 | 29 |
| | 47 | | 38 | 37 | 37 | 36 | 36 | 35 | 35 | 34 | 33 | 33 | 32 | 32 | 31 | 30 | 30 |
| | 48 | | 39 | 38 | 38 | 37 | 37 | 36 | 36 | 35 | 34 | 34 | 33 | 32 | 32 | 31 | 30 |
| | 49 | | 40 | 39 | 39 | 38 | 38 | 37 | 36 | 36 | 35 | 35 | 34 | 33 | 33 | 32 | 31 |
| | 50 | | 41 | 40 | 40 | 39 | 39 | 38 | 37 | 37 | 36 | 36 | 35 | 34 | 34 | 33 | 32 |
| | 51 | | 42 | 41 | 41 | 40 | 40 | 39 | 38 | 38 | 37 | 37 | 36 | 35 | 35 | 34 | 33 |
| | 52 | | 43 | 42 | 42 | 41 | 41 | 40 | 39 | 39 | 38 | 38 | 37 | 36 | 36 | 35 | 34 |
| | 53 | | 44 | 43 | 43 | 42 | 42 | 41 | 40 | 40 | 39 | 39 | 38 | 37 | 37 | 36 | 35 |
| | 54 | | 45 | 44 | 44 | 43 | 43 | 42 | 41 | 41 | 40 | 40 | 39 | 38 | 38 | 37 | 36 |
| | 55 | | 46 | 45 | 45 | 44 | 44 | 43 | 43 | 42 | 41 | 41 | 40 | 39 | 39 | 38 | 37 |

FIG. 10c5

| Preload angle | 17 | 17 | 17 | 17 | 17 | 17 | 17 | 17 | 17 | 17 | 17 | 17 | 17 | 17 |
|---|---|---|---|---|---|---|---|---|---|---|---|---|---|---|
| Angle of departure | | | | | | | | | | | | | | |
| | | 256 | 257 | 258 | 259 | 260 | 261 | 262 | 263 | 264 | 265 | 266 | 267 | 268 | 269 |
| A | 15 | 8 | 8 | 7 | 7 | 7 | 7 | 6 | 6 | 6 | 6 | 5 | 5 | 5 | 5 |
| n | 16 | 8 | 8 | 8 | 8 | 7 | 7 | 7 | 7 | 6 | 6 | 6 | 6 | 5 | 5 |
| g | 17 | 9 | 9 | 8 | 8 | 8 | 8 | 7 | 7 | 7 | 7 | 6 | 6 | 6 | 5 |
| l | 18 | 10 | 9 | 9 | 9 | 8 | 8 | 8 | 8 | 7 | 7 | 7 | 6 | 6 | 6 |
| e | 19 | 10 | 10 | 9 | 9 | 9 | 9 | 8 | 8 | 8 | 7 | 7 | 7 | 6 | 6 |
|  | 20 | 11 | 10 | 10 | 10 | 9 | 9 | 9 | 8 | 8 | 8 | 7 | 7 | 7 | 6 |
| o | 21 | 11 | 11 | 11 | 10 | 10 | 10 | 9 | 9 | 9 | 8 | 8 | 7 | 7 | 7 |
| f | 22 | 12 | 11 | 11 | 11 | 10 | 10 | 10 | 9 | 9 | 9 | 8 | 8 | 7 | 7 |
|  | 23 | 12 | 12 | 12 | 11 | 11 | 11 | 10 | 10 | 9 | 9 | 9 | 8 | 8 | 7 |
| s | 24 | 13 | 13 | 12 | 12 | 11 | 11 | 11 | 10 | 10 | 9 | 9 | 9 | 8 | 8 |
| l | 25 | 14 | 13 | 13 | 12 | 12 | 12 | 11 | 11 | 10 | 10 | 9 | 9 | 9 | 8 |
| o | 26 | 14 | 14 | 13 | 13 | 12 | 12 | 12 | 11 | 11 | 10 | 10 | 9 | 9 | 9 |
| p | 27 | 15 | 14 | 14 | 13 | 13 | 13 | 12 | 12 | 11 | 11 | 10 | 10 | 9 | 9 |
| e | 28 | 15 | 15 | 14 | 14 | 14 | 13 | 13 | 12 | 12 | 11 | 11 | 10 | 10 | 9 |
|  | 29 | 16 | 15 | 15 | 15 | 14 | 14 | 13 | 13 | 12 | 12 | 11 | 11 | 10 | 10 |
|  | 30 | 17 | 16 | 16 | 15 | 15 | 14 | 14 | 13 | 13 | 12 | 12 | 11 | 11 | 10 |
|  | 31 | 17 | 17 | 16 | 16 | 15 | 15 | 14 | 14 | 13 | 13 | 12 | 12 | 11 | 11 |
|  | 32 | 18 | 17 | 17 | 16 | 16 | 15 | 15 | 14 | 14 | 13 | 13 | 12 | 11 | 11 |
|  | 33 | 18 | 18 | 17 | 17 | 16 | 16 | 15 | 15 | 14 | 14 | 13 | 13 | 12 | 11 |
|  | 34 | 19 | 19 | 18 | 18 | 17 | 16 | 16 | 15 | 15 | 14 | 14 | 13 | 12 | 12 |
|  | 35 | 20 | 19 | 19 | 18 | 18 | 17 | 16 | 16 | 15 | 15 | 14 | 13 | 13 | 12 |
|  | 36 | 21 | 20 | 19 | 19 | 18 | 18 | 17 | 16 | 16 | 15 | 15 | 14 | 13 | 13 |
|  | 37 | 21 | 21 | 20 | 19 | 19 | 18 | 18 | 17 | 16 | 16 | 15 | 14 | 14 | 13 |
|  | 38 | 22 | 21 | 21 | 20 | 20 | 19 | 18 | 18 | 17 | 16 | 16 | 15 | 14 | 14 |
|  | 39 | 23 | 22 | 21 | 21 | 20 | 20 | 19 | 18 | 18 | 17 | 16 | 15 | 15 | 14 |
|  | 40 | 23 | 23 | 22 | 22 | 21 | 20 | 20 | 19 | 18 | 17 | 17 | 16 | 15 | 15 |
|  | 41 | 24 | 23 | 23 | 22 | 22 | 21 | 20 | 19 | 19 | 18 | 17 | 17 | 16 | 15 |
|  | 42 | 25 | 24 | 24 | 23 | 22 | 22 | 21 | 20 | 19 | 19 | 18 | 17 | 16 | 16 |
|  | 43 | 26 | 25 | 24 | 24 | 23 | 22 | 22 | 21 | 20 | 19 | 18 | 18 | 17 | 16 |
|  | 44 | 26 | 26 | 25 | 24 | 24 | 23 | 22 | 21 | 21 | 20 | 19 | 18 | 17 | 17 |
|  | 45 | 27 | 27 | 26 | 25 | 24 | 24 | 23 | 22 | 21 | 21 | 20 | 19 | 18 | 17 |
|  | 46 | 28 | 27 | 27 | 26 | 25 | 24 | 24 | 23 | 22 | 21 | 20 | 20 | 19 | 18 |
|  | 47 | 29 | 28 | 27 | 27 | 26 | 25 | 24 | 24 | 23 | 22 | 21 | 20 | 19 | 18 |
|  | 48 | 30 | 29 | 28 | 28 | 27 | 26 | 25 | 24 | 23 | 23 | 22 | 21 | 20 | 19 |
|  | 49 | 31 | 30 | 29 | 28 | 28 | 27 | 26 | 25 | 24 | 23 | 22 | 21 | 21 | 20 |
|  | 50 | 32 | 31 | 30 | 29 | 28 | 28 | 27 | 26 | 25 | 24 | 23 | 22 | 21 | 20 |
|  | 51 | 32 | 32 | 31 | 30 | 29 | 28 | 28 | 27 | 26 | 25 | 24 | 23 | 22 | 21 |
|  | 52 | 33 | 33 | 32 | 31 | 30 | 29 | 28 | 28 | 27 | 26 | 25 | 24 | 23 | 22 |
|  | 53 | 34 | 34 | 33 | 32 | 31 | 30 | 29 | 28 | 27 | 26 | 25 | 24 | 23 | 22 |
|  | 54 | 35 | 35 | 34 | 33 | 32 | 31 | 30 | 29 | 28 | 27 | 26 | 25 | 24 | 23 |
|  | 55 | 36 | 36 | 35 | 34 | 33 | 32 | 31 | 30 | 29 | 28 | 27 | 26 | 25 | 24 |

FIG.10c6

| Preload angle | | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|
| | Angle of departure | | | | | | | | | | | | | | | |
| | | 271 | 272 | 273 | 274 | 275 | 276 | 277 | 278 | 279 | 280 | 281 | 282 | 283 | 284 | 285 |
| A | 15 | 5 | 5 | 5 | 5 | 6 | 6 | 6 | 6 | 7 | 7 | 7 | 7 | 8 | 8 | 8 |
| n | 16 | 5 | 5 | 6 | 6 | 6 | 6 | 7 | 7 | 7 | 7 | 8 | 8 | 8 | 8 | 9 |
| g | 17 | 5 | 6 | 6 | 6 | 7 | 7 | 7 | 7 | 8 | 8 | 8 | 8 | 9 | 9 | 9 |
| l | 18 | 6 | 6 | 6 | 7 | 7 | 7 | 8 | 8 | 8 | 8 | 9 | 9 | 9 | 10 | 10 |
| e | 19 | 6 | 6 | 7 | 7 | 7 | 8 | 8 | 8 | 9 | 9 | 9 | 9 | 10 | 10 | 10 |
| | 20 | 6 | 7 | 7 | 7 | 8 | 8 | 8 | 9 | 9 | 9 | 10 | 10 | 10 | 11 | 11 |
| o | 21 | 7 | 7 | 7 | 8 | 8 | 9 | 9 | 9 | 10 | 10 | 10 | 11 | 11 | 11 | 11 |
| f | 22 | 7 | 7 | 8 | 8 | 9 | 9 | 9 | 10 | 10 | 10 | 11 | 11 | 11 | 12 | 12 |
| | 23 | 7 | 8 | 8 | 9 | 9 | 9 | 10 | 10 | 11 | 11 | 11 | 12 | 12 | 12 | 13 |
| s | 24 | 8 | 8 | 9 | 9 | 9 | 10 | 10 | 11 | 11 | 11 | 12 | 12 | 13 | 13 | 13 |
| l | 25 | 8 | 9 | 9 | 9 | 10 | 10 | 11 | 11 | 12 | 12 | 12 | 13 | 13 | 14 | 14 |
| o | 26 | 9 | 9 | 9 | 10 | 10 | 11 | 11 | 12 | 12 | 12 | 13 | 13 | 14 | 14 | 14 |
| p | 27 | 9 | 9 | 10 | 10 | 11 | 11 | 12 | 12 | 13 | 13 | 13 | 14 | 14 | 15 | 15 |
| e | 28 | 9 | 10 | 10 | 11 | 11 | 12 | 12 | 13 | 13 | 14 | 14 | 14 | 15 | 15 | 16 |
| | 29 | 10 | 10 | 11 | 11 | 12 | 12 | 13 | 13 | 14 | 14 | 15 | 15 | 15 | 16 | 16 |
| | 30 | 10 | 11 | 11 | 12 | 12 | 13 | 13 | 14 | 14 | 15 | 15 | 16 | 16 | 17 | 17 |
| | 31 | 11 | 11 | 12 | 12 | 13 | 13 | 14 | 14 | 15 | 15 | 16 | 16 | 17 | 17 | 18 |
| | 32 | 11 | 11 | 12 | 13 | 13 | 14 | 14 | 15 | 15 | 16 | 16 | 17 | 17 | 18 | 18 |
| | 33 | 11 | 12 | 13 | 13 | 14 | 14 | 15 | 15 | 16 | 16 | 17 | 17 | 18 | 18 | 19 |
| | 34 | 12 | 12 | 13 | 14 | 14 | 15 | 15 | 16 | 16 | 17 | 18 | 18 | 19 | 19 | 20 |
| | 35 | 12 | 13 | 13 | 14 | 15 | 15 | 16 | 16 | 17 | 18 | 18 | 19 | 19 | 20 | 20 |
| | 36 | 13 | 13 | 14 | 15 | 15 | 16 | 16 | 17 | 18 | 18 | 19 | 19 | 20 | 21 | 21 |
| | 37 | 13 | 14 | 14 | 15 | 16 | 16 | 17 | 18 | 18 | 19 | 19 | 20 | 21 | 21 | 22 |
| | 38 | 14 | 14 | 15 | 16 | 16 | 17 | 18 | 18 | 19 | 20 | 20 | 21 | 21 | 22 | 22 |
| | 39 | 14 | 15 | 15 | 16 | 17 | 18 | 18 | 19 | 20 | 20 | 21 | 21 | 22 | 23 | 23 |
| | 40 | 15 | 15 | 16 | 17 | 17 | 18 | 19 | 20 | 20 | 21 | 22 | 22 | 23 | 23 | 24 |
| | 41 | 15 | 16 | 17 | 17 | 18 | 19 | 19 | 20 | 21 | 22 | 22 | 23 | 23 | 24 | 25 |
| | 42 | 16 | 16 | 17 | 18 | 19 | 19 | 20 | 21 | 22 | 22 | 23 | 24 | 24 | 25 | 26 |
| | 43 | 16 | 17 | 18 | 18 | 19 | 20 | 21 | 22 | 22 | 23 | 24 | 24 | 25 | 26 | 26 |
| | 44 | 17 | 17 | 18 | 19 | 20 | 21 | 21 | 22 | 23 | 24 | 24 | 25 | 26 | 26 | 27 |
| | 45 | 17 | 18 | 19 | 20 | 21 | 21 | 22 | 23 | 24 | 24 | 25 | 26 | 27 | 27 | 28 |
| | 46 | 18 | 19 | 20 | 20 | 21 | 22 | 23 | 24 | 24 | 25 | 26 | 27 | 27 | 28 | 29 |
| | 47 | 18 | 19 | 20 | 21 | 22 | 23 | 24 | 24 | 25 | 26 | 27 | 27 | 28 | 29 | 30 |
| | 48 | 19 | 20 | 21 | 22 | 23 | 23 | 24 | 25 | 26 | 27 | 28 | 28 | 29 | 30 | 30 |
| | 49 | 20 | 21 | 21 | 22 | 23 | 24 | 25 | 26 | 27 | 28 | 28 | 29 | 30 | 31 | 31 |
| | 50 | 20 | 21 | 22 | 23 | 24 | 25 | 26 | 27 | 28 | 28 | 29 | 30 | 31 | 32 | 32 |
| | 51 | 21 | 22 | 23 | 24 | 25 | 26 | 27 | 28 | 28 | 29 | 30 | 31 | 32 | 32 | 33 |
| | 52 | 22 | 23 | 24 | 25 | 26 | 27 | 28 | 28 | 29 | 30 | 31 | 32 | 33 | 33 | 34 |
| | 53 | 22 | 23 | 24 | 25 | 26 | 27 | 28 | 29 | 30 | 31 | 32 | 33 | 34 | 34 | 35 |
| | 54 | 23 | 24 | 25 | 26 | 27 | 28 | 29 | 30 | 31 | 32 | 33 | 34 | 35 | 35 | 36 |
| | 55 | 24 | 25 | 26 | 27 | 28 | 29 | 30 | 31 | 32 | 33 | 34 | 35 | 36 | 36 | 37 |

FIG. 10d1

| Preload angle | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|
| Angle of departure | | | | | | | | | | | | | | | |
| | | 286 | 287 | 288 | 289 | 290 | 291 | 292 | 293 | 294 | 295 | 296 | 297 | 298 | 299 | 300 |
| A | 15 | 8 | 9 | 9 | 9 | 9 | 9 | 10 | 10 | 10 | 10 | 10 | 11 | 11 | 11 | 11 |
| n | 16 | 9 | 9 | 9 | 10 | 10 | 10 | 10 | 10 | 11 | 11 | 11 | 11 | 11 | 12 | 12 |
| g | 17 | 9 | 10 | 10 | 10 | 10 | 11 | 11 | 11 | 11 | 12 | 12 | 12 | 12 | 12 | 13 |
| l | 18 | 10 | 10 | 11 | 11 | 11 | 11 | 12 | 12 | 12 | 12 | 13 | 13 | 13 | 13 | 13 |
| e | 19 | 11 | 11 | 11 | 11 | 12 | 12 | 12 | 12 | 13 | 13 | 13 | 13 | 14 | 14 | 14 |
|   | 20 | 11 | 12 | 12 | 12 | 12 | 13 | 13 | 13 | 13 | 14 | 14 | 14 | 14 | 15 | 15 |
| o | 21 | 12 | 12 | 12 | 13 | 13 | 13 | 14 | 14 | 14 | 14 | 15 | 15 | 15 | 15 | 16 |
| f | 22 | 12 | 13 | 13 | 13 | 14 | 14 | 14 | 15 | 15 | 15 | 15 | 16 | 16 | 16 | 16 |
|   | 23 | 13 | 13 | 14 | 14 | 14 | 15 | 15 | 15 | 16 | 16 | 16 | 16 | 17 | 17 | 17 |
| s | 24 | 14 | 14 | 14 | 15 | 15 | 15 | 16 | 16 | 16 | 17 | 17 | 17 | 17 | 18 | 18 |
| l | 25 | 14 | 15 | 15 | 15 | 16 | 16 | 16 | 17 | 17 | 17 | 18 | 18 | 18 | 19 | 19 |
| o | 26 | 15 | 15 | 16 | 16 | 16 | 17 | 17 | 17 | 18 | 18 | 18 | 19 | 19 | 19 | 20 |
| p | 27 | 16 | 16 | 16 | 17 | 17 | 17 | 18 | 18 | 18 | 19 | 19 | 19 | 20 | 20 | 20 |
| e | 28 | 16 | 17 | 17 | 17 | 18 | 18 | 19 | 19 | 19 | 20 | 20 | 20 | 21 | 21 | 21 |
|   | 29 | 17 | 17 | 18 | 18 | 18 | 19 | 19 | 20 | 20 | 20 | 21 | 21 | 21 | 22 | 22 |
|   | 30 | 17 | 18 | 18 | 19 | 19 | 20 | 20 | 20 | 21 | 21 | 21 | 22 | 22 | 23 | 23 |
|   | 31 | 18 | 19 | 19 | 19 | 20 | 20 | 21 | 21 | 22 | 22 | 22 | 23 | 23 | 23 | 24 |
|   | 32 | 19 | 19 | 20 | 20 | 21 | 21 | 21 | 22 | 22 | 23 | 23 | 23 | 24 | 24 | 25 |
|   | 33 | 19 | 20 | 20 | 21 | 21 | 22 | 22 | 23 | 23 | 23 | 24 | 24 | 25 | 25 | 25 |
|   | 34 | 20 | 21 | 21 | 22 | 22 | 23 | 23 | 23 | 24 | 24 | 25 | 25 | 25 | 26 | 26 |
|   | 35 | 21 | 21 | 22 | 22 | 23 | 23 | 24 | 24 | 25 | 25 | 26 | 26 | 26 | 27 | 27 |
|   | 36 | 22 | 22 | 23 | 23 | 24 | 24 | 25 | 25 | 25 | 26 | 26 | 27 | 27 | 28 | 28 |
|   | 37 | 22 | 23 | 23 | 24 | 24 | 25 | 25 | 26 | 26 | 27 | 27 | 28 | 28 | 28 | 29 |
|   | 38 | 23 | 24 | 24 | 25 | 25 | 26 | 26 | 27 | 27 | 28 | 28 | 28 | 29 | 29 | 30 |
|   | 39 | 24 | 24 | 25 | 25 | 26 | 26 | 27 | 27 | 28 | 28 | 29 | 29 | 30 | 30 | 31 |
|   | 40 | 25 | 25 | 26 | 26 | 27 | 27 | 28 | 28 | 29 | 29 | 30 | 30 | 31 | 31 | 32 |
|   | 41 | 25 | 26 | 27 | 27 | 28 | 28 | 29 | 29 | 30 | 30 | 31 | 31 | 32 | 32 | 32 |
|   | 42 | 26 | 27 | 27 | 28 | 28 | 29 | 30 | 30 | 31 | 31 | 32 | 32 | 32 | 33 | 33 |
|   | 43 | 27 | 28 | 28 | 29 | 29 | 30 | 30 | 31 | 31 | 32 | 32 | 33 | 33 | 34 | 34 |
|   | 44 | 28 | 28 | 29 | 30 | 30 | 31 | 31 | 32 | 32 | 33 | 33 | 34 | 34 | 35 | 35 |
|   | 45 | 29 | 29 | 30 | 30 | 31 | 32 | 32 | 33 | 33 | 34 | 34 | 35 | 35 | 36 | 36 |
|   | 46 | 29 | 30 | 31 | 31 | 32 | 33 | 33 | 34 | 34 | 35 | 35 | 36 | 36 | 37 | 37 |
|   | 47 | 30 | 31 | 32 | 32 | 33 | 33 | 34 | 35 | 35 | 36 | 36 | 37 | 37 | 38 | 38 |
|   | 48 | 31 | 32 | 32 | 33 | 34 | 34 | 35 | 36 | 36 | 37 | 37 | 38 | 38 | 39 | 39 |
|   | 49 | 32 | 33 | 33 | 34 | 35 | 35 | 36 | 36 | 37 | 38 | 38 | 39 | 39 | 40 | 40 |
|   | 50 | 33 | 34 | 34 | 35 | 36 | 36 | 37 | 37 | 38 | 39 | 39 | 40 | 40 | 41 | 41 |
|   | 51 | 34 | 35 | 35 | 36 | 37 | 37 | 38 | 38 | 39 | 40 | 40 | 41 | 41 | 42 | 42 |
|   | 52 | 35 | 36 | 36 | 37 | 38 | 38 | 39 | 39 | 40 | 41 | 41 | 42 | 42 | 43 | 43 |
|   | 53 | 36 | 37 | 37 | 38 | 39 | 39 | 40 | 40 | 41 | 42 | 42 | 43 | 43 | 44 | 44 |
|   | 54 | 37 | 38 | 38 | 39 | 40 | 40 | 41 | 41 | 42 | 43 | 43 | 44 | 44 | 45 | 45 |
|   | 55 | 38 | 39 | 39 | 40 | 41 | 41 | 42 | 43 | 43 | 44 | 44 | 45 | 45 | 46 | 46 |

FIG.10d2

| Preload angle | | | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|---|
| | Angle of departure | | | | | | | | | | | | | | | | |
| | | | 301 | 302 | 303 | 304 | 305 | 306 | 307 | 308 | 309 | 310 | 311 | 312 | 313 | 314 | 315 |
| A | 15 | | 11 | 11 | 12 | 12 | 12 | 12 | 12 | 12 | 13 | 13 | 13 | 13 | 13 | 13 | 13 |
| n | 16 | | 12 | 12 | 12 | 13 | 13 | 13 | 13 | 13 | 13 | 14 | 14 | 14 | 14 | 14 | 14 |
| g | 17 | | 13 | 13 | 13 | 13 | 14 | 14 | 14 | 14 | 14 | 15 | 15 | 15 | 15 | 15 | 15 |
| l | 18 | | 14 | 14 | 14 | 14 | 14 | 15 | 15 | 15 | 15 | 15 | 16 | 16 | 16 | 16 | 16 |
| e | 19 | | 14 | 15 | 15 | 15 | 15 | 15 | 16 | 16 | 16 | 16 | 16 | 17 | 17 | 17 | 17 |
| | 20 | | 15 | 15 | 16 | 16 | 16 | 16 | 16 | 17 | 17 | 17 | 17 | 17 | 17 | 18 | 18 |
| o | 21 | | 16 | 16 | 16 | 17 | 17 | 17 | 17 | 17 | 18 | 18 | 18 | 18 | 18 | 19 | 19 |
| f | 22 | | 17 | 17 | 17 | 17 | 18 | 18 | 18 | 18 | 19 | 19 | 19 | 19 | 19 | 19 | 20 |
| | 23 | | 18 | 18 | 18 | 18 | 18 | 19 | 19 | 19 | 19 | 20 | 20 | 20 | 20 | 20 | 21 |
| s | 24 | | 18 | 19 | 19 | 19 | 19 | 20 | 20 | 20 | 20 | 20 | 21 | 21 | 21 | 21 | 21 |
| l | 25 | | 19 | 19 | 20 | 20 | 20 | 20 | 21 | 21 | 21 | 21 | 22 | 22 | 22 | 22 | 22 |
| o | 26 | | 20 | 20 | 20 | 21 | 21 | 21 | 22 | 22 | 22 | 22 | 22 | 23 | 23 | 23 | 23 |
| p | 27 | | 21 | 21 | 21 | 22 | 22 | 22 | 22 | 23 | 23 | 23 | 23 | 24 | 24 | 24 | 24 |
| e | 28 | | 22 | 22 | 22 | 22 | 23 | 23 | 23 | 24 | 24 | 24 | 24 | 25 | 25 | 25 | 25 |
| | 29 | | 22 | 23 | 23 | 23 | 24 | 24 | 24 | 24 | 25 | 25 | 25 | 25 | 26 | 26 | 26 |
| | 30 | | 23 | 24 | 24 | 24 | 24 | 25 | 25 | 25 | 26 | 26 | 26 | 26 | 27 | 27 | 27 |
| | 31 | | 24 | 24 | 25 | 25 | 25 | 26 | 26 | 26 | 26 | 27 | 27 | 27 | 27 | 28 | 28 |
| | 32 | | 25 | 25 | 26 | 26 | 26 | 27 | 27 | 27 | 28 | 28 | 28 | 28 | 29 | 29 | 29 |
| | 33 | | 26 | 26 | 26 | 27 | 27 | 27 | 28 | 28 | 28 | 29 | 29 | 29 | 29 | 30 | 30 |
| | 34 | | 27 | 27 | 27 | 28 | 28 | 28 | 29 | 29 | 29 | 29 | 30 | 30 | 30 | 31 | 31 |
| | 35 | | 27 | 28 | 28 | 29 | 29 | 29 | 30 | 30 | 30 | 30 | 31 | 31 | 31 | 31 | 32 |
| | 36 | | 28 | 29 | 29 | 29 | 30 | 30 | 30 | 31 | 31 | 31 | 32 | 32 | 32 | 32 | 33 |
| | 37 | | 29 | 30 | 30 | 30 | 31 | 31 | 31 | 32 | 32 | 32 | 33 | 33 | 33 | 33 | 34 |
| | 38 | | 30 | 31 | 31 | 31 | 32 | 32 | 32 | 33 | 33 | 33 | 34 | 34 | 34 | 34 | 35 |
| | 39 | | 31 | 31 | 32 | 32 | 33 | 33 | 33 | 34 | 34 | 34 | 34 | 35 | 35 | 35 | 36 |
| | 40 | | 32 | 32 | 33 | 33 | 33 | 34 | 34 | 35 | 35 | 35 | 35 | 36 | 36 | 36 | 37 |
| | 41 | | 33 | 33 | 34 | 34 | 34 | 35 | 35 | 35 | 36 | 36 | 36 | 37 | 37 | 37 | 38 |
| | 42 | | 34 | 34 | 35 | 35 | 35 | 36 | 36 | 36 | 37 | 37 | 37 | 38 | 38 | 38 | 38 |
| | 43 | | 35 | 35 | 36 | 36 | 36 | 37 | 37 | 37 | 38 | 38 | 38 | 39 | 39 | 39 | 39 |
| | 44 | | 36 | 36 | 36 | 37 | 37 | 38 | 38 | 38 | 39 | 39 | 39 | 40 | 40 | 40 | 40 |
| | 45 | | 37 | 37 | 37 | 38 | 38 | 39 | 39 | 39 | 40 | 40 | 40 | 41 | 41 | 41 | 41 |
| | 46 | | 38 | 38 | 38 | 39 | 39 | 40 | 40 | 40 | 41 | 41 | 41 | 42 | 42 | 42 | 42 |
| | 47 | | 39 | 39 | 39 | 40 | 40 | 41 | 41 | 41 | 42 | 42 | 42 | 43 | 43 | 43 | 43 |
| | 48 | | 40 | 40 | 40 | 41 | 41 | 42 | 42 | 42 | 43 | 43 | 43 | 44 | 44 | 44 | 44 |
| | 49 | | 41 | 41 | 41 | 42 | 42 | 43 | 43 | 43 | 44 | 44 | 44 | 45 | 45 | 45 | 45 |
| | 50 | | 42 | 42 | 42 | 43 | 43 | 44 | 44 | 44 | 45 | 45 | 45 | 46 | 46 | 46 | 46 |
| | 51 | | 43 | 43 | 43 | 44 | 44 | 45 | 45 | 45 | 46 | 46 | 46 | 47 | 47 | 47 | 47 |
| | 52 | | 44 | 44 | 44 | 45 | 45 | 46 | 46 | 46 | 47 | 47 | 47 | 48 | 48 | 48 | 48 |
| | 53 | | 45 | 45 | 45 | 46 | 46 | 47 | 47 | 47 | 48 | 48 | 48 | 49 | 49 | 49 | 50 |
| | 54 | | 46 | 46 | 47 | 47 | 47 | 48 | 48 | 48 | 49 | 49 | 49 | 50 | 50 | 50 | 51 |
| | 55 | | 47 | 47 | 48 | 48 | 48 | 49 | 49 | 49 | 50 | 50 | 50 | 51 | 51 | 51 | 52 |

FIG. 10d3

| Preload angle | | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|
| | Angle of departure | | | | | | | | | | | | | | | |
| | | 316 | 317 | 318 | 319 | 320 | 320 | 322 | 323 | 324 | 325 | 326 | 327 | 328 | 329 | 330 |
| A | 15 | 13 | 14 | 14 | 14 | 14 | 14 | 14 | 14 | 14 | 14 | 14 | 14 | 15 | 15 | 15 |
| n | 16 | 14 | 14 | 15 | 15 | 15 | 15 | 15 | 15 | 15 | 15 | 15 | 15 | 15 | 16 | 16 |
| g | 17 | 15 | 15 | 15 | 16 | 16 | 16 | 16 | 16 | 16 | 16 | 16 | 16 | 16 | 17 | 17 |
| l | 18 | 16 | 16 | 16 | 17 | 17 | 17 | 17 | 17 | 17 | 17 | 17 | 17 | 17 | 17 | 18 |
| e | 19 | 17 | 17 | 17 | 17 | 18 | 18 | 18 | 18 | 18 | 18 | 18 | 18 | 18 | 18 | 19 |
| | 20 | 18 | 18 | 18 | 18 | 19 | 19 | 19 | 19 | 19 | 19 | 19 | 19 | 19 | 19 | 20 |
| o | 21 | 19 | 19 | 19 | 19 | 19 | 20 | 20 | 20 | 20 | 20 | 20 | 20 | 20 | 20 | 21 |
| f | 22 | 20 | 20 | 20 | 20 | 20 | 21 | 21 | 21 | 21 | 21 | 21 | 21 | 21 | 21 | 21 |
| | 23 | 21 | 21 | 21 | 21 | 21 | 21 | 22 | 22 | 22 | 22 | 22 | 22 | 22 | 22 | 22 |
| s | 24 | 22 | 22 | 22 | 22 | 22 | 22 | 23 | 23 | 23 | 23 | 23 | 23 | 23 | 23 | 23 |
| l | 25 | 23 | 23 | 23 | 23 | 23 | 23 | 24 | 24 | 24 | 24 | 24 | 24 | 24 | 24 | 24 |
| o | 26 | 23 | 24 | 24 | 24 | 24 | 24 | 24 | 25 | 25 | 25 | 25 | 25 | 25 | 25 | 25 |
| p | 27 | 24 | 25 | 25 | 25 | 25 | 25 | 25 | 26 | 26 | 26 | 26 | 26 | 26 | 26 | 26 |
| e | 28 | 25 | 26 | 26 | 26 | 26 | 26 | 26 | 27 | 27 | 27 | 27 | 27 | 27 | 27 | 27 |
| | 29 | 26 | 26 | 27 | 27 | 27 | 27 | 27 | 28 | 28 | 28 | 28 | 28 | 28 | 28 | 28 |
| | 30 | 27 | 27 | 28 | 28 | 28 | 28 | 28 | 28 | 29 | 29 | 29 | 29 | 29 | 29 | 29 |
| | 31 | 28 | 28 | 29 | 29 | 29 | 29 | 29 | 29 | 30 | 30 | 30 | 30 | 30 | 30 | 30 |
| | 32 | 29 | 29 | 30 | 30 | 30 | 30 | 30 | 30 | 31 | 31 | 31 | 31 | 31 | 31 | 31 |
| | 33 | 30 | 30 | 30 | 31 | 31 | 31 | 31 | 31 | 32 | 32 | 32 | 32 | 32 | 32 | 32 |
| | 34 | 31 | 31 | 31 | 32 | 32 | 32 | 32 | 32 | 33 | 33 | 33 | 33 | 33 | 33 | 33 |
| | 35 | 32 | 32 | 32 | 33 | 33 | 33 | 33 | 33 | 34 | 34 | 34 | 34 | 34 | 34 | 34 |
| | 36 | 33 | 33 | 33 | 34 | 34 | 34 | 34 | 34 | 34 | 35 | 35 | 35 | 35 | 35 | 35 |
| | 37 | 34 | 34 | 34 | 35 | 35 | 35 | 35 | 35 | 35 | 36 | 36 | 36 | 36 | 36 | 36 |
| | 38 | 35 | 35 | 35 | 36 | 36 | 36 | 36 | 36 | 36 | 37 | 37 | 37 | 37 | 37 | 37 |
| | 39 | 36 | 36 | 36 | 36 | 37 | 37 | 37 | 37 | 37 | 38 | 38 | 38 | 38 | 38 | 38 |
| | 40 | 37 | 37 | 37 | 37 | 38 | 38 | 38 | 38 | 38 | 39 | 39 | 39 | 39 | 39 | 39 |
| | 41 | 38 | 38 | 38 | 38 | 39 | 39 | 39 | 39 | 39 | 40 | 40 | 40 | 40 | 40 | 40 |
| | 42 | 39 | 39 | 39 | 39 | 40 | 40 | 40 | 40 | 40 | 41 | 41 | 41 | 41 | 41 | 41 |
| | 43 | 40 | 40 | 40 | 40 | 41 | 41 | 41 | 41 | 41 | 42 | 42 | 42 | 42 | 42 | 42 |
| | 44 | 41 | 41 | 41 | 41 | 42 | 42 | 42 | 42 | 42 | 43 | 43 | 43 | 43 | 43 | 43 |
| | 45 | 42 | 42 | 42 | 42 | 43 | 43 | 43 | 43 | 43 | 44 | 44 | 44 | 44 | 44 | 44 |
| | 46 | 43 | 43 | 43 | 43 | 44 | 44 | 44 | 44 | 44 | 45 | 45 | 45 | 45 | 45 | 45 |
| | 47 | 44 | 44 | 44 | 44 | 45 | 45 | 45 | 45 | 45 | 46 | 46 | 46 | 46 | 46 | 46 |
| | 48 | 45 | 45 | 45 | 45 | 46 | 46 | 46 | 46 | 46 | 47 | 47 | 47 | 47 | 47 | 47 |
| | 49 | 46 | 46 | 46 | 46 | 47 | 47 | 47 | 47 | 47 | 48 | 48 | 48 | 48 | 48 | 48 |
| | 50 | 47 | 47 | 47 | 47 | 48 | 48 | 48 | 48 | 48 | 49 | 49 | 49 | 49 | 49 | 49 |
| | 51 | 48 | 48 | 48 | 48 | 49 | 49 | 49 | 49 | 49 | 50 | 50 | 50 | 50 | 50 | 50 |
| | 52 | 49 | 49 | 49 | 49 | 50 | 50 | 50 | 50 | 50 | 51 | 51 | 51 | 51 | 51 | 51 |
| | 53 | 50 | 50 | 50 | 50 | 51 | 51 | 51 | 51 | 51 | 52 | 52 | 52 | 52 | 52 | 52 |
| | 54 | 51 | 51 | 51 | 52 | 52 | 52 | 52 | 52 | 52 | 53 | 53 | 53 | 53 | 53 | 53 |
| | 55 | 52 | 52 | 52 | 53 | 53 | 53 | 53 | 53 | 53 | 54 | 54 | 54 | 54 | 54 | 54 |

FIG. 10d4

| Preload angle | | 17 | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|---|
| | Angle of departure | | | | | | | | | | | | | | | |
| | | 331 | 332 | 333 | 334 | 335 | 336 | 337 | 338 | 339 | 340 | 341 | 342 | 343 | 344 | 345 |
| A | 15 | 15 | 15 | 15 | 15 | 15 | 15 | 15 | 15 | 15 | 15 | 15 | 15 | 15 | 15 | 15 |
| n | 16 | 16 | 16 | 16 | 16 | 16 | 16 | 16 | 16 | 16 | 16 | 16 | 16 | 16 | 16 | 16 |
| g | 17 | 17 | 17 | 17 | 17 | 17 | 17 | 17 | 17 | 17 | 17 | 17 | 17 | 17 | 17 | 17 |
| l | 18 | 18 | 18 | 18 | 18 | 18 | 18 | 18 | 18 | 18 | 18 | 18 | 18 | 18 | 18 | 18 |
| e | 19 | 19 | 19 | 19 | 19 | 19 | 19 | 19 | 19 | 19 | 19 | 19 | 19 | 19 | 19 | 19 |
| | 20 | 20 | 20 | 20 | 20 | 20 | 20 | 20 | 20 | 20 | 20 | 20 | 20 | 20 | 20 | 20 |
| o | 21 | 21 | 21 | 21 | 21 | 21 | 21 | 21 | 21 | 21 | 21 | 21 | 21 | 21 | 21 | 21 |
| f | 22 | 22 | 22 | 22 | 22 | 22 | 22 | 22 | 22 | 22 | 22 | 22 | 22 | 22 | 22 | 22 |
| | 23 | 23 | 23 | 23 | 23 | 23 | 23 | 23 | 23 | 23 | 23 | 23 | 23 | 23 | 23 | 23 |
| s | 24 | 24 | 24 | 24 | 24 | 24 | 24 | 24 | 24 | 24 | 24 | 24 | 24 | 24 | 24 | 24 |
| l | 25 | 25 | 25 | 25 | 25 | 25 | 25 | 25 | 25 | 25 | 25 | 25 | 25 | 25 | 25 | 25 |
| o | 26 | 26 | 26 | 26 | 26 | 26 | 26 | 26 | 26 | 26 | 26 | 26 | 26 | 26 | 26 | 26 |
| p | 27 | 26 | 27 | 27 | 27 | 27 | 27 | 27 | 27 | 27 | 27 | 27 | 27 | 27 | 27 | 27 |
| e | 28 | 27 | 28 | 28 | 28 | 28 | 28 | 28 | 28 | 28 | 28 | 28 | 28 | 28 | 28 | 28 |
| | 29 | 28 | 29 | 29 | 29 | 29 | 29 | 29 | 29 | 29 | 29 | 29 | 29 | 29 | 29 | 29 |
| | 30 | 29 | 30 | 30 | 30 | 30 | 30 | 30 | 30 | 30 | 30 | 30 | 30 | 30 | 30 | 30 |
| | 31 | 30 | 31 | 31 | 31 | 31 | 31 | 31 | 31 | 31 | 31 | 31 | 31 | 31 | 31 | 31 |
| | 32 | 31 | 32 | 32 | 32 | 32 | 32 | 32 | 32 | 32 | 32 | 32 | 32 | 32 | 32 | 32 |
| | 33 | 32 | 33 | 33 | 33 | 33 | 33 | 33 | 33 | 33 | 33 | 33 | 33 | 33 | 33 | 33 |
| | 34 | 33 | 34 | 34 | 34 | 34 | 34 | 34 | 34 | 34 | 34 | 34 | 34 | 34 | 34 | 34 |
| | 35 | 34 | 35 | 35 | 35 | 35 | 35 | 35 | 35 | 35 | 35 | 35 | 35 | 35 | 35 | 35 |
| | 36 | 35 | 35 | 36 | 36 | 36 | 36 | 36 | 36 | 36 | 36 | 36 | 36 | 36 | 36 | 36 |
| | 37 | 36 | 36 | 37 | 37 | 37 | 37 | 37 | 37 | 37 | 37 | 37 | 37 | 37 | 37 | 37 |
| | 38 | 37 | 37 | 38 | 38 | 38 | 38 | 38 | 38 | 38 | 38 | 38 | 38 | 38 | 38 | 38 |
| | 39 | 38 | 38 | 39 | 39 | 39 | 39 | 39 | 39 | 39 | 39 | 39 | 39 | 39 | 39 | 39 |
| | 40 | 39 | 39 | 40 | 40 | 40 | 40 | 40 | 40 | 40 | 40 | 40 | 40 | 40 | 40 | 40 |
| | 41 | 40 | 40 | 41 | 41 | 41 | 41 | 41 | 41 | 41 | 41 | 41 | 41 | 41 | 41 | 41 |
| | 42 | 41 | 41 | 42 | 42 | 42 | 42 | 42 | 42 | 42 | 42 | 42 | 42 | 42 | 42 | 42 |
| | 43 | 42 | 42 | 43 | 43 | 43 | 43 | 43 | 43 | 43 | 43 | 43 | 43 | 43 | 43 | 43 |
| | 44 | 43 | 43 | 44 | 44 | 44 | 44 | 44 | 44 | 44 | 44 | 44 | 44 | 44 | 44 | 44 |
| | 45 | 44 | 44 | 45 | 45 | 45 | 45 | 45 | 45 | 45 | 45 | 45 | 45 | 45 | 45 | 45 |
| | 46 | 45 | 45 | 46 | 46 | 46 | 46 | 46 | 46 | 46 | 46 | 46 | 46 | 46 | 46 | 46 |
| | 47 | 46 | 46 | 47 | 47 | 47 | 47 | 47 | 47 | 47 | 47 | 47 | 47 | 47 | 47 | 47 |
| | 48 | 47 | 47 | 48 | 48 | 48 | 48 | 48 | 48 | 48 | 48 | 48 | 48 | 48 | 48 | 48 |
| | 49 | 48 | 48 | 49 | 49 | 49 | 49 | 49 | 49 | 49 | 49 | 49 | 49 | 49 | 49 | 49 |
| | 50 | 49 | 49 | 50 | 50 | 50 | 50 | 50 | 50 | 50 | 50 | 50 | 50 | 50 | 50 | 50 |
| | 51 | 50 | 50 | 51 | 51 | 51 | 51 | 51 | 51 | 51 | 51 | 51 | 51 | 51 | 51 | 51 |
| | 52 | 51 | 51 | 52 | 52 | 52 | 52 | 52 | 52 | 52 | 52 | 52 | 52 | 52 | 52 | 52 |
| | 53 | 52 | 52 | 53 | 53 | 53 | 53 | 53 | 53 | 53 | 53 | 53 | 53 | 53 | 53 | 53 |
| | 54 | 53 | 53 | 54 | 54 | 54 | 54 | 54 | 54 | 54 | 54 | 54 | 54 | 54 | 54 | 54 |
| | 55 | 54 | 54 | 55 | 55 | 55 | 55 | 55 | 55 | 55 | 55 | 55 | 55 | 55 | 55 | 55 |

FIG. 10d5

| Preload angle | | 17 | 17 | 17 | 17 | 17 | 17 | 17 | 17 | 17 | 17 | 17 | 17 | 17 | 17 |
|---|---|---|---|---|---|---|---|---|---|---|---|---|---|---|---|
| Angle of departure | | | | | | | | | | | | | | | |
| | | 346 | 347 | 348 | 349 | 350 | 351 | 352 | 353 | 354 | 355 | 356 | 357 | 358 | 359 |
| A | 15 | 15 | 15 | 15 | 15 | 15 | 15 | 15 | 15 | 15 | 15 | 15 | 15 | 15 | 14 |
| n | 16 | 16 | 16 | 16 | 16 | 16 | 16 | 16 | 16 | 16 | 16 | 16 | 16 | 15 | 15 |
| g | 17 | 17 | 17 | 17 | 17 | 17 | 17 | 17 | 17 | 17 | 17 | 17 | 17 | 16 | 16 |
| l | 18 | 18 | 18 | 18 | 18 | 18 | 18 | 18 | 18 | 18 | 18 | 18 | 18 | 17 | 17 |
| e | 19 | 19 | 19 | 19 | 19 | 19 | 19 | 19 | 19 | 19 | 19 | 19 | 18 | 18 | 18 |
| | 20 | 20 | 20 | 20 | 20 | 20 | 20 | 20 | 20 | 20 | 20 | 20 | 19 | 19 | 19 |
| o | 21 | 21 | 21 | 21 | 21 | 21 | 21 | 21 | 21 | 21 | 21 | 20 | 20 | 20 | 20 |
| f | 22 | 22 | 22 | 22 | 22 | 22 | 22 | 22 | 22 | 22 | 22 | 21 | 21 | 21 | 21 |
| | 23 | 23 | 23 | 23 | 23 | 23 | 23 | 23 | 23 | 23 | 23 | 22 | 22 | 22 | 22 |
| s | 24 | 24 | 24 | 24 | 24 | 24 | 24 | 24 | 24 | 24 | 23 | 23 | 23 | 23 | 23 |
| l | 25 | 25 | 25 | 25 | 25 | 25 | 25 | 25 | 25 | 25 | 24 | 24 | 24 | 24 | 24 |
| o | 26 | 26 | 26 | 26 | 26 | 26 | 26 | 26 | 26 | 26 | 25 | 25 | 25 | 25 | 25 |
| p | 27 | 27 | 27 | 27 | 27 | 27 | 27 | 27 | 27 | 26 | 26 | 26 | 26 | 26 | 26 |
| e | 28 | 28 | 28 | 28 | 28 | 28 | 28 | 28 | 28 | 27 | 27 | 27 | 27 | 27 | 27 |
| | 29 | 29 | 29 | 29 | 29 | 29 | 29 | 29 | 29 | 28 | 28 | 28 | 28 | 28 | 28 |
| | 30 | 30 | 30 | 30 | 30 | 30 | 30 | 30 | 30 | 29 | 29 | 29 | 29 | 29 | 29 |
| | 31 | 31 | 31 | 31 | 31 | 31 | 31 | 31 | 31 | 30 | 30 | 30 | 30 | 30 | 30 |
| | 32 | 32 | 32 | 32 | 32 | 32 | 32 | 32 | 32 | 31 | 31 | 31 | 31 | 31 | 31 |
| | 33 | 33 | 33 | 33 | 33 | 33 | 33 | 33 | 33 | 32 | 32 | 32 | 32 | 32 | 32 |
| | 34 | 34 | 34 | 34 | 34 | 34 | 34 | 34 | 34 | 33 | 33 | 33 | 33 | 33 | 33 |
| | 35 | 35 | 35 | 35 | 35 | 35 | 35 | 35 | 35 | 34 | 34 | 34 | 34 | 34 | 34 |
| | 36 | 36 | 36 | 36 | 36 | 36 | 36 | 36 | 35 | 35 | 35 | 35 | 35 | 35 | 35 |
| | 37 | 37 | 37 | 37 | 37 | 37 | 37 | 37 | 36 | 36 | 36 | 36 | 36 | 36 | 36 |
| | 38 | 38 | 38 | 38 | 38 | 38 | 38 | 38 | 37 | 37 | 37 | 37 | 37 | 37 | 37 |
| | 39 | 39 | 39 | 39 | 39 | 39 | 39 | 39 | 38 | 38 | 38 | 38 | 38 | 38 | 38 |
| | 40 | 40 | 40 | 40 | 40 | 40 | 40 | 40 | 39 | 39 | 39 | 39 | 39 | 39 | 39 |
| | 41 | 41 | 41 | 41 | 41 | 41 | 41 | 41 | 40 | 40 | 40 | 40 | 40 | 40 | 40 |
| | 42 | 42 | 42 | 42 | 42 | 42 | 42 | 42 | 41 | 41 | 41 | 41 | 41 | 41 | 41 |
| | 43 | 43 | 43 | 43 | 43 | 43 | 43 | 43 | 42 | 42 | 42 | 42 | 42 | 42 | 42 |
| | 44 | 44 | 44 | 44 | 44 | 44 | 44 | 44 | 43 | 43 | 43 | 43 | 43 | 43 | 43 |
| | 45 | 45 | 45 | 45 | 45 | 45 | 45 | 45 | 44 | 44 | 44 | 44 | 44 | 44 | 44 |
| | 46 | 46 | 46 | 46 | 46 | 46 | 46 | 46 | 45 | 45 | 45 | 45 | 45 | 45 | 45 |
| | 47 | 47 | 47 | 47 | 47 | 47 | 47 | 47 | 46 | 46 | 46 | 46 | 46 | 46 | 46 |
| | 48 | 48 | 48 | 48 | 48 | 48 | 48 | 48 | 47 | 47 | 47 | 47 | 47 | 47 | 47 |
| | 49 | 49 | 49 | 49 | 49 | 49 | 49 | 49 | 48 | 48 | 48 | 48 | 48 | 48 | 48 |
| | 50 | 50 | 50 | 50 | 50 | 50 | 50 | 50 | 49 | 49 | 49 | 49 | 49 | 49 | 49 |
| | 51 | 51 | 51 | 51 | 51 | 51 | 51 | 51 | 50 | 50 | 50 | 50 | 50 | 50 | 50 |
| | 52 | 52 | 52 | 52 | 52 | 52 | 52 | 52 | 51 | 51 | 51 | 51 | 51 | 51 | 51 |
| | 53 | 53 | 53 | 53 | 53 | 53 | 53 | 53 | 52 | 52 | 52 | 52 | 52 | 52 | 52 |
| | 54 | 54 | 54 | 54 | 54 | 54 | 54 | 54 | 53 | 53 | 53 | 53 | 53 | 53 | 53 |
| | 55 | 55 | 55 | 55 | 55 | 55 | 55 | 55 | 54 | 54 | 54 | 54 | 54 | 54 | 54 |

OMNIDIRECTIONAL ANGLE INDICATOR

BACKGROUND OF THE INVENTION

This invention relates to a level indicator for vehicles and, more particularly, to an indicator which readily displays to a vehicle occupant whether the vehicle is at an unsafe inclination relative to a plurality of predetermined unsafe inclinations.

Various devices have been proposed which display to a vehicle operator the degree of inclination of the vehicle. However, the information presented by such devices is not readily discernable by the vehicle driver. Thus, although the vehicle may be at an undesirable inclination, such condition is not readily apparent to the vehicle occupant. Moreover, such devices did not consider various factors which may affect the inclination and rollover of the vehicle, including the wheelbase configuration of the vehicle, the slope of the underlying surface and the course of the vehicle relative to a straight line path up or down the sloped surface.

In response thereto I have invented an omnidirectional level indicator having a readily discernable map indicative of a zone of safe vehicle inclinations thereon. A perimeter of the map encompasses a predetermined zone of various predetermined safe vehicle inclinations. The appearance of a bubble level adjacent the map perimeter readily indicates to the vehicle driver the onset of an unsafe vehicle inclination so that corrective actions can be taken. I provide one method of constructing this map which takes into consideration various preselected factors, inclusive of the front, side and rear balance angles of the vehicle, the slopes of the surface underlying the vehicle and the angle that the vehicle is travelling up or down the sloped surface relative to a straight line path thereon.

It is therefore a general object of this invention to provide an indicator for a vehicle which displays a safe or unsafe inclination of a vehicle.

Another object of this invention is to provide an indicator, as aforesaid, wherein the safe or unsafe inclinations of the vehicle are readily apparent to a vehicle occupant.

It is a particular object of this invention to provide an indicator, as aforesaid, having a vehicle specific map thereon encompassing a zone of safe inclinations for the vehicle relative to predetermined, safe angles of the vehicle.

Another particular object of this invention is to provide an indicator, as aforesaid, wherein various factors are taken to construct the aforesaid map, including the angles of slope of the road surface, the relative path of the vehicle up or down the road surface, the predetermined balance angles of the vehicle and the wheelbase configuration of the vehicle.

Another object of this invention is to provide a method by which the aforesaid map can be constructed.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIGS. 8a1–8a6 is a table with angles of approach of 1–89° along the topside thereof and the angles of slope of 15–55° down the vertical left side thereof with the resulting angles of inclination of the vehicle therein;

FIGS. 8b1–8b6 is a table as in FIGS. 8a1–8a6 having angles of approach of 91° through 179° along the topside thereof and slope angles of 15–55° down the left side thereof with resulting angles of vehicle inclination therein;

FIGS. 8c1–8c6 is a table, as in FIGS. 8a1–8a6, 8b1–8b6, having angles of departure, i.e., the vehicle is traveling down the hill, of 181° through 269° along the topside thereof and the slope angles of 15–55° along the left side thereof with resulting angles of vehicle inclination therein;

FIG. 8d1–8d6 is a table, as in FIGS. 8a1–8c6, wherein the angles of departure along the topside thereof are between 271° and 359° and slope angles of 15–550° along the left side thereof with resulting angles of vehicle inclination therein;

FIGS. 10a1–10d6 are tables similar to the tables of FIGS. 8a1–8d6 having a preload angle of 17° factored therein;

DESCRIPTION OF THE PREFERRED EMBODIMENT

Figure 13:
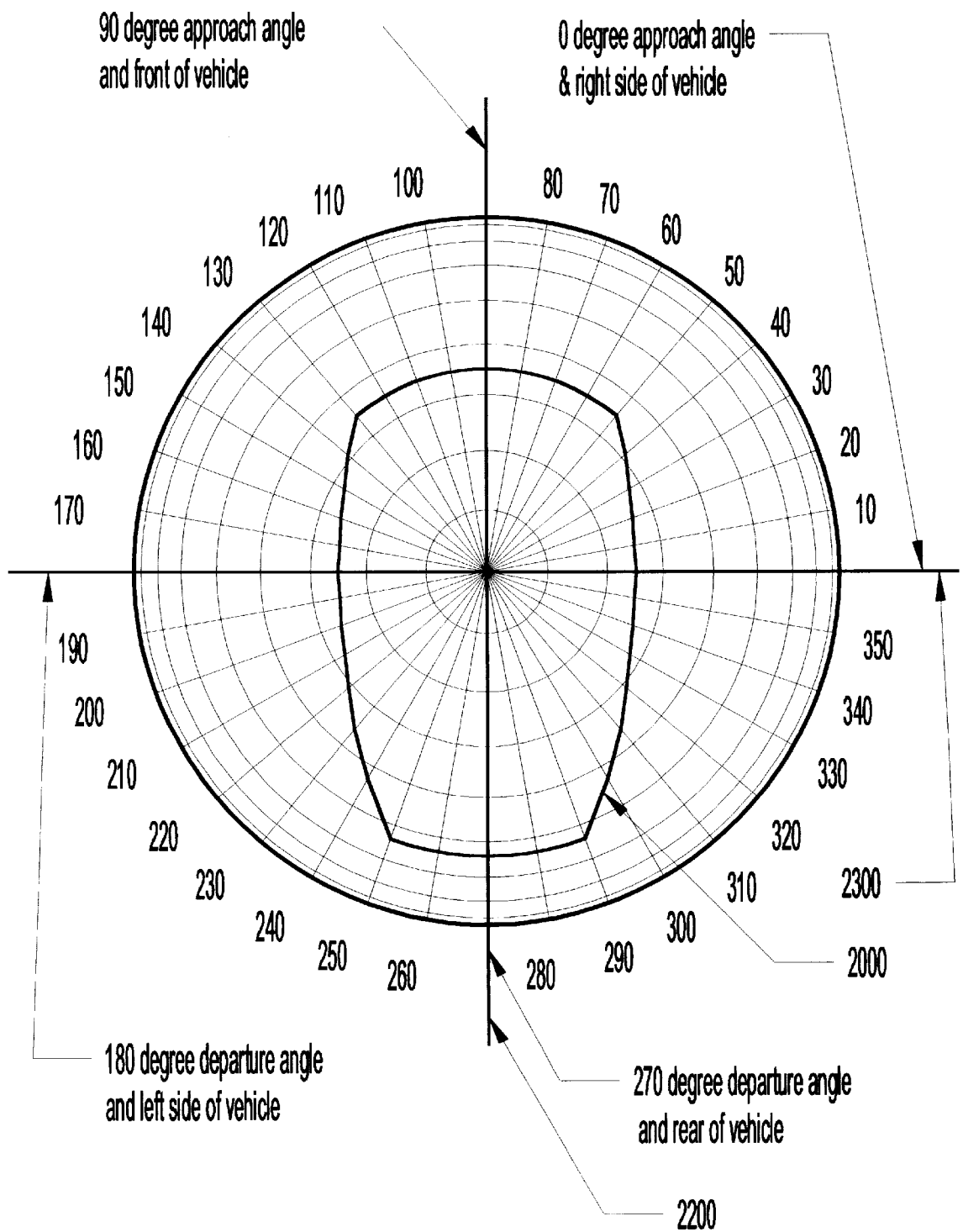
FIG. 13 is the graph of FIG. 11 with a map drawn thereon.
Figure 14:
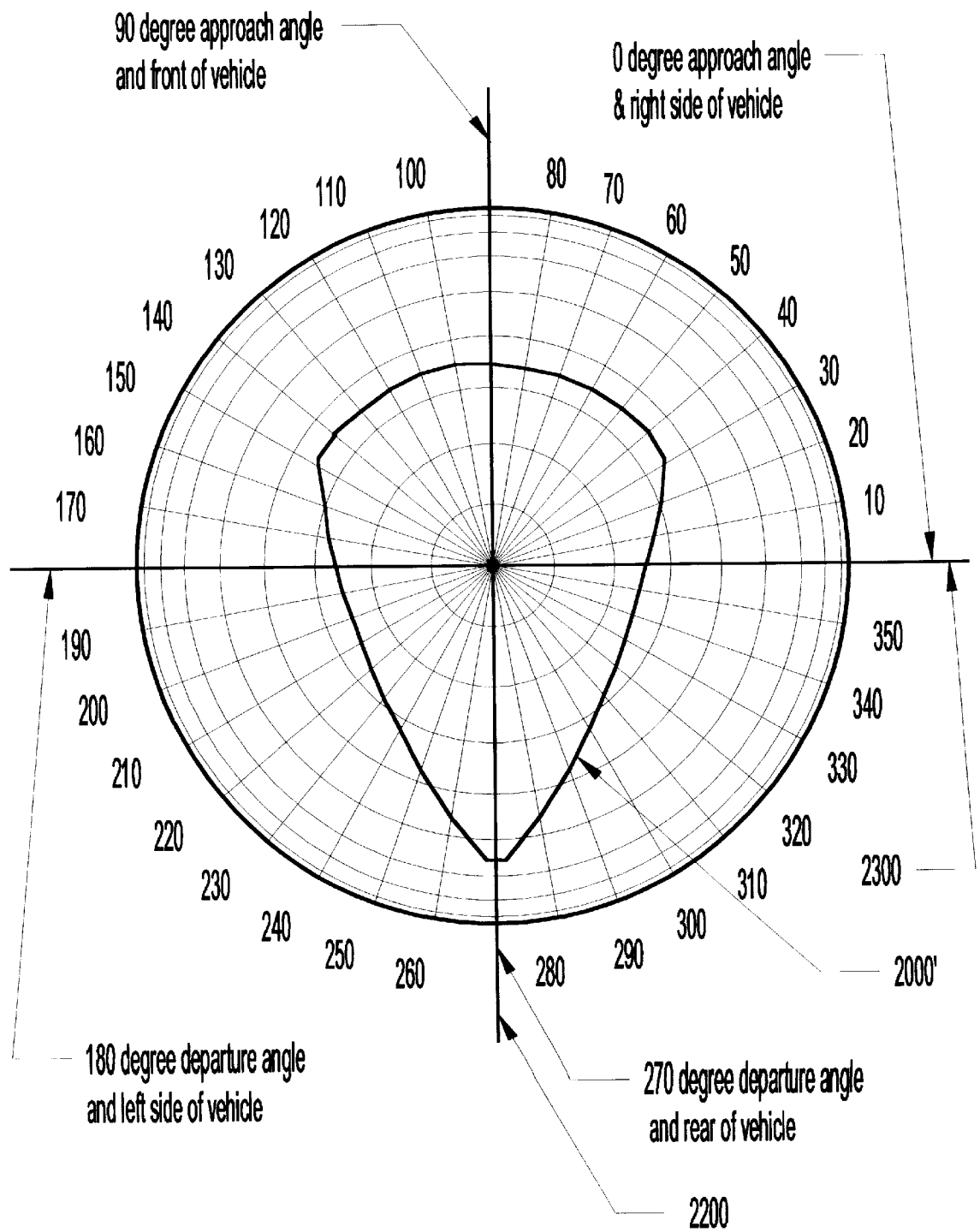
FIG. 14 is a graph of another map of the vehicle with a 17° preload angle incorporated therein.
Figure 15:
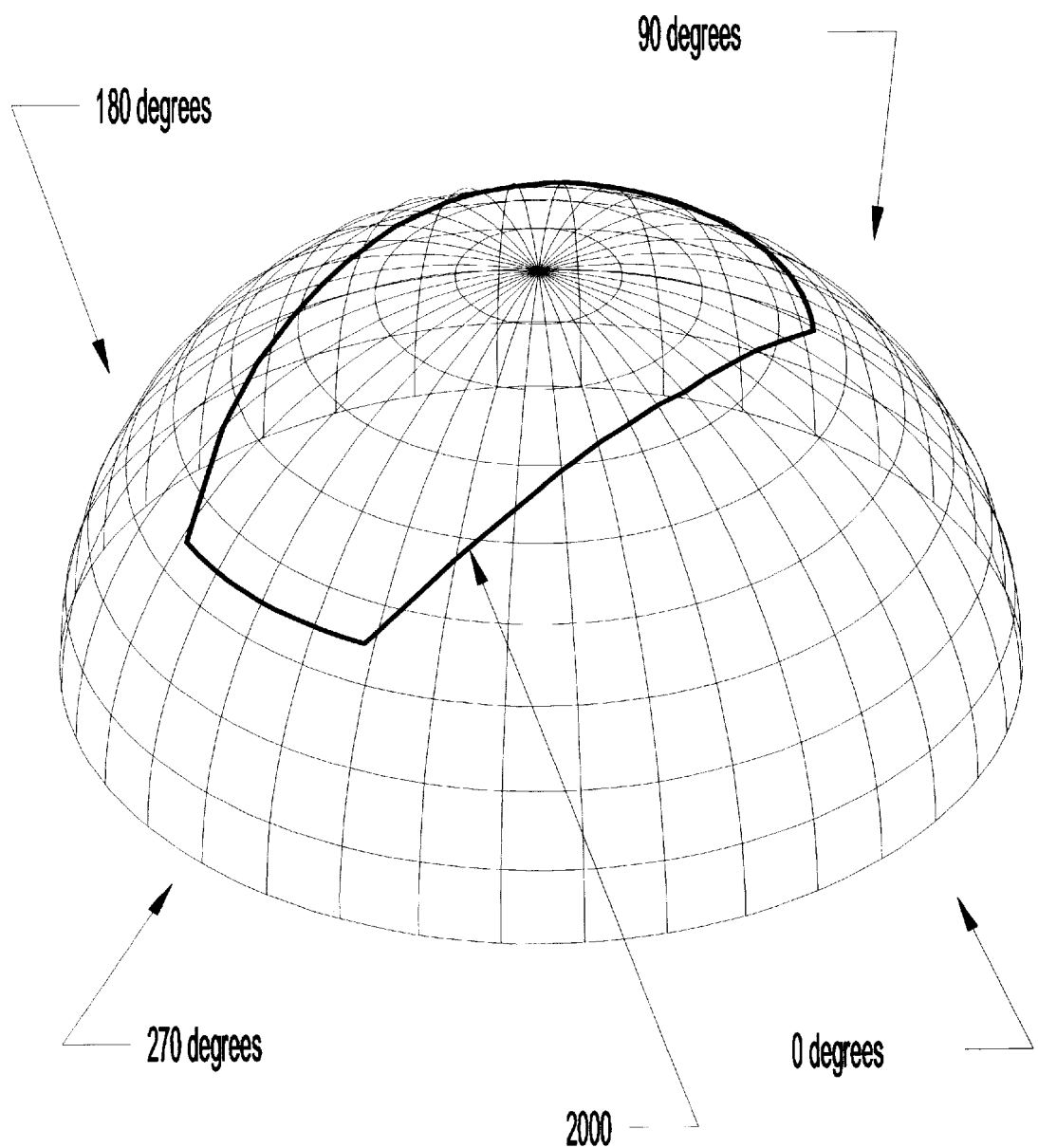
FIG. 15 is a three-dimensional perspective view showing the dome indicator with the FIG. 13 map thereon.
Figure 16:
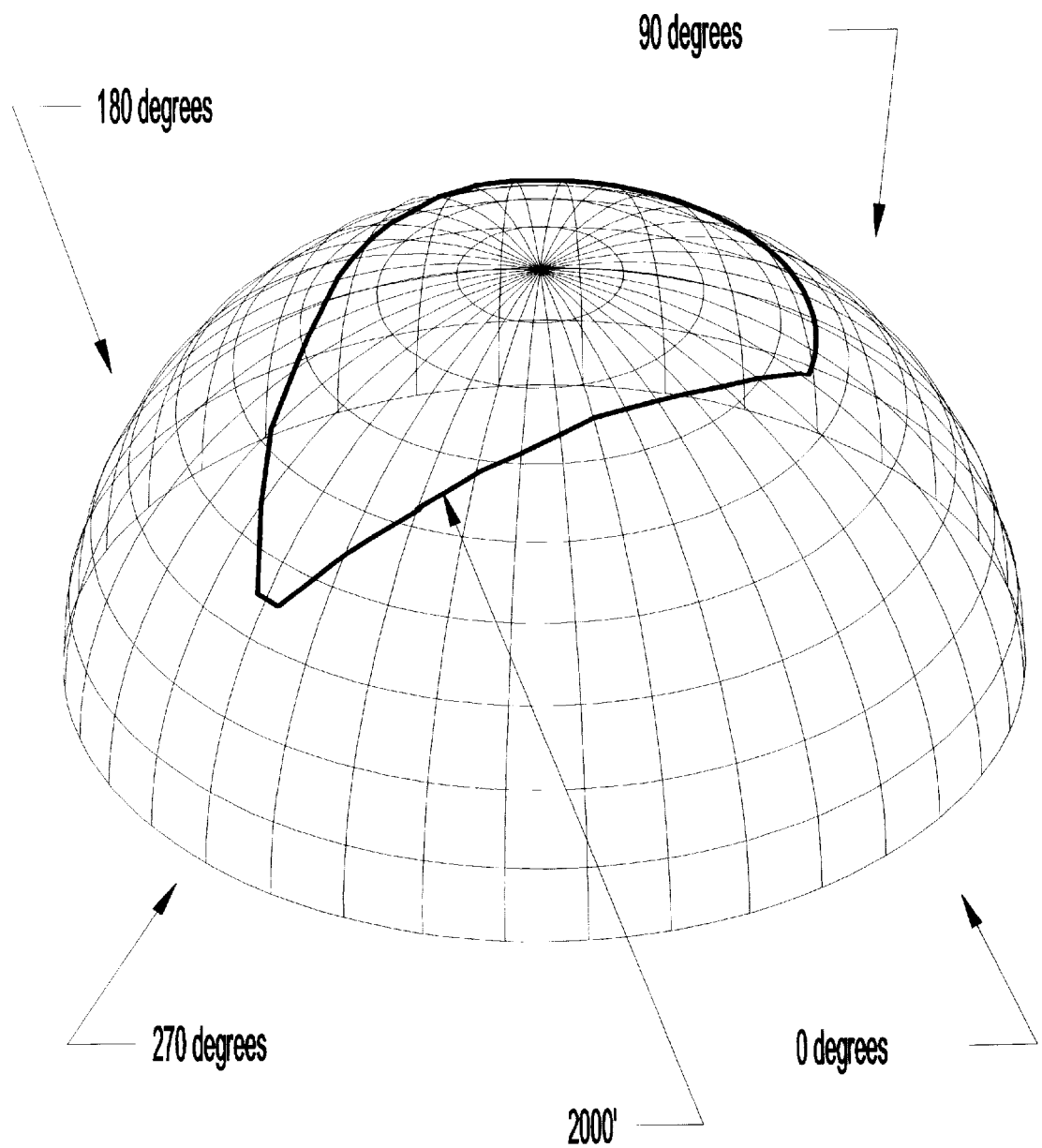
FIG. 16 is a three-dimensional perspective view showing the dome indicator with the FIG. 14 map thereon.

Turning more particularly to the drawings, enlarged top views of the maps for placement on the dome-like devices (FIGS. 15–16) are shown in FIGS. 13, 14. The dome-like chamber (FIGS. 15, 16) encases a fluid which present an air bubble therein for use as a level index/pointer therein. The dome is mounted within the vehicle such that the longitudinal axis 2200 is aligned with a longitudinal axis of the vehicle and the lateral axis 2300 is aligned with a lateral axis of a vehicle having parallel pivot axes. If the longitudinal axes are not parallel lateral axes 2300 needs to be aligned with the true lateral rollover axes. The position of the bubble within the perimeter of the map 2000 indicates to the driver a safe inclination of the vehicle. Although the interior of the map 2000 is shown as transparent, the map may be shaded such that the bubble is visible only when outside the map 2000 perimeter. (Alternatively, the area surrounding the map may be shaded so that the bubble is visible only when inside the map 2000.) If the bubble is without the map 2000, the vehicle is at a predetermined unsafe inclination. It is noted that the map should have a margin of safety incorporated therein such that when the bubble is adjacent the map perimeter the vehicle is not instantly at a rollover position. As such, the bubble/map 2000 combination instantly identifies to the driver an unsafe vehicle inclination so that corrective action can be taken when the bubble is adjacent the perimeter of the map.

To arrive at the map 2000 certain definitions have been assumed.

1. Pivot Axis—An axis of vehicle rotation about a point, the point being formed by the intersection of two imaginary axes extending through the vehicle. The chosen vehicle axes extend between the rear and front wheels of the vehicles in lateral and longitudinal directions. These lateral and longitudinal axes, or axes parallel thereto, intersect with a horizontal line or plane indicative of a horizontal road surface upon inclination of the vehicle to form left, right, front and rear angles.

2. Approach/Departure Angle—This angle is defined by the intersection of a longitudinal axis of a vehicle and a line that is perpendicular to the imaginary longitudinal centerline of the road surface which defines a straight line path. Thus, one leg of the angle is the course of the vehicle up or down the hill as defined by the central longitudinal axis of the vehicle or an axis parallel thereto. The other leg of the angle is a defined 0° line which is normal to the longitudinal centerline which goes straight up or down the hill. If a vehicle travels straight up the hill, the approach angle is 90°. If the vehicle travels straight down the hill, the departure angle is 270°. A vehicle traveling straight across the hill to the right presents an angle of 0° and to the left is at an angle of 180°. The uphill angle of approach increases in a counterclockwise direction between 0° and 180° with the downhill angle of departure then increasing between 180° and 360°.

3. Preload Angle—This angle results from vehicles having a wheelbase configuration presenting different widths between the front and rear wheels. The difference presents nonparallel longitudinal axes extending between the front and rear wheels. As such, the axis of rollover of a vehicle will not be along a lateral axis normal to the longitudinal axis in case of a lateral rollover or a longitudinal axis normal to a lateral axis of the vehicle in case of a front or back rollover. This angle is taken into consideration in constructing a map of safe inclinations for such a vehicle as to be subsequently described. Thus, this angle is added to or subtracted from approach/departure angles to compensate for the nonparallel pivot axes.

4. Balance Angles—This is the angle of longitudinal or lateral pivot axes of the vehicle, as measured from the horizontal, at which the weight of the vehicle is positioned over a pivot point. The balance angles are determined relative to the front, rear and sides of the vehicle as defined by the intersection of the longitudinal and lateral axes with a horizontal line/plane indicative of a body surface that is normally level when the vehicle is on a level road surface. Thus, left, right, front and rear balance angles are utilized. The balance angles are measured with a line representative of a normally level line/plane in the vehicle when the vehicle is on a road surface. This line/normally level plane in the vehicle is used rather than the level road surface as the compression/extension of the springs in the suspension system may introduce variances in the angle. Thus, it is understood that the measured balance angle utilizing a line/plane in the vehicle is not necessarily the same as an angle formed with a horizontal road surface.

5. Side Hill Tilt Angle—This angle is the amount of downhill tilt experienced by a vehicle during an ascent or descent of a hill.

Figure 1:
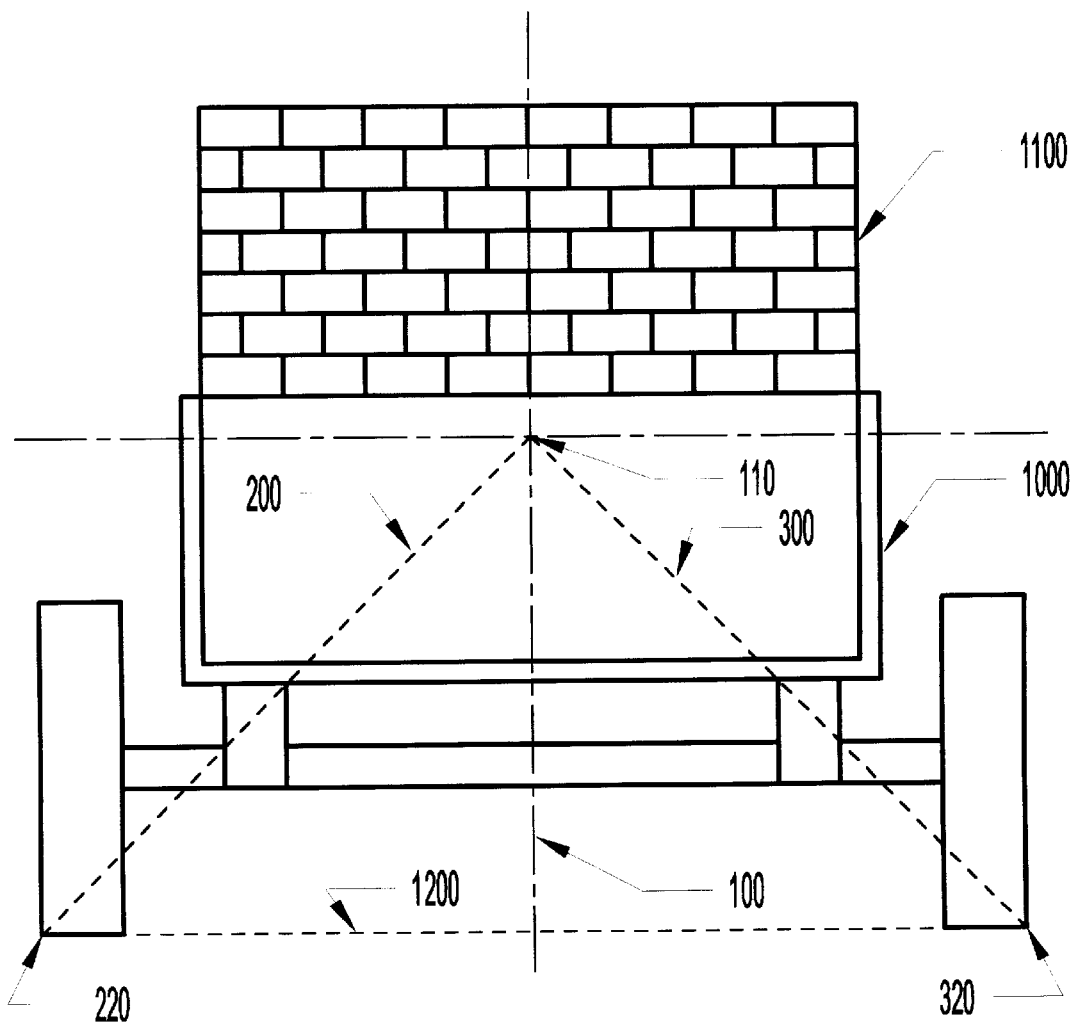
FIG. 1 is a rear diagrammatic view of a fully loaded vehicle illustrating thereon an imaginary centerline of gravity as well as the legs of a balance triangle of the vehicle extending therefrom.

In FIG. 1 a vehicle 1000 with a maximum load is shown. The vehicle 1000 is shown as loaded with bricks 1100 for purposes of illustration only. A centerline of the load 100 is normal to the underlying horizontal road surface 1200. Lines 200, 300 extend from the center of gravity 110 to the outside of the vehicle points 220, 320. Lines 200, 300 form a balance triangle with the base 1200 coinciding with the underlying horizontal road surface 1200.

FIG. 2 diagrammatically illustrates the vehicle 1000 at three separate inclinations relative to the underlying road surface 1200. The base of the balance triangle is represented as 1200a.

Figure 2A:
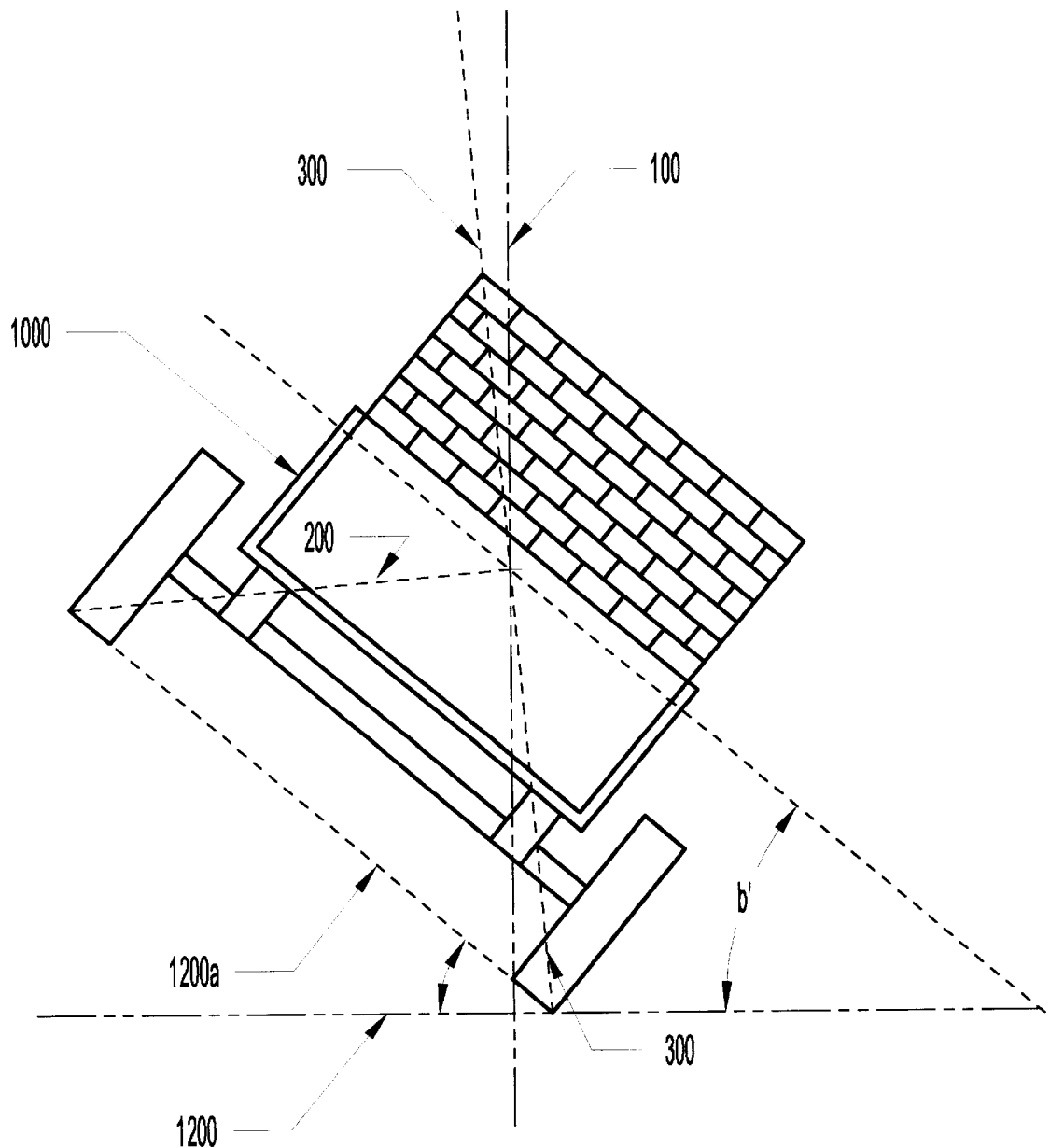
FIGS. 2a–2c illustrate diagrammatic views A, B, C of a vehicle at a safe inclined position (2A), an inclined balanced position (2B) and an unsafe rollover position (2C)

In FIG. 2a the vehicle is inclined in a clockwise direction. The leg 300 of the balance triangle vehicle has not rotated into alignment with the load centerline 100. Thus, the vehicle tends to rotate about pivot axes 600 in a counterclockwise direction towards the underlying road surface 1200. This position is considered a safe position as the angle b' is less than the balance angle b in FIG. 2B. Angle b' is formed by lateral axis 1200a and horizontal line 1200.

Figure 2B:
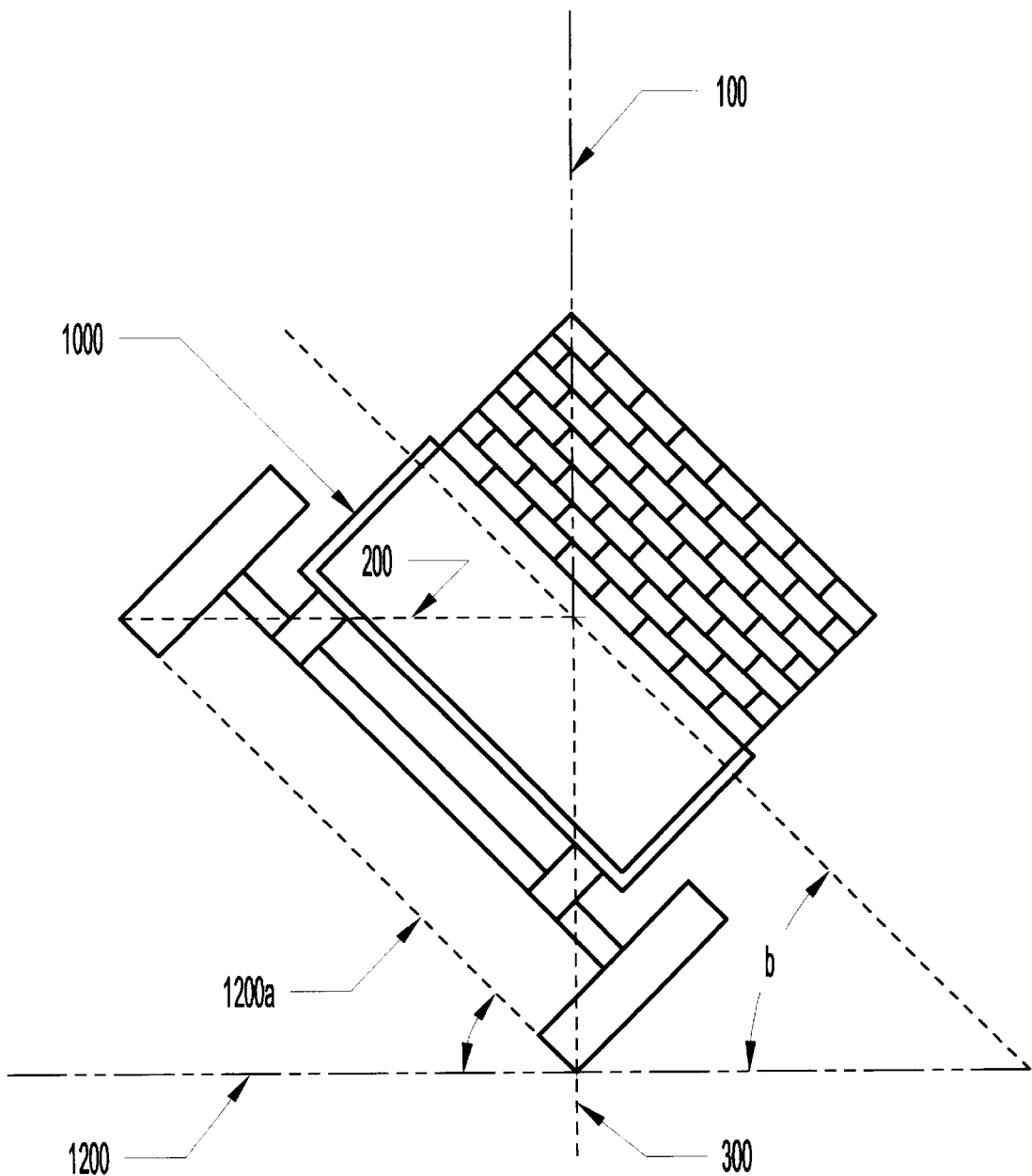
Figure 2C:
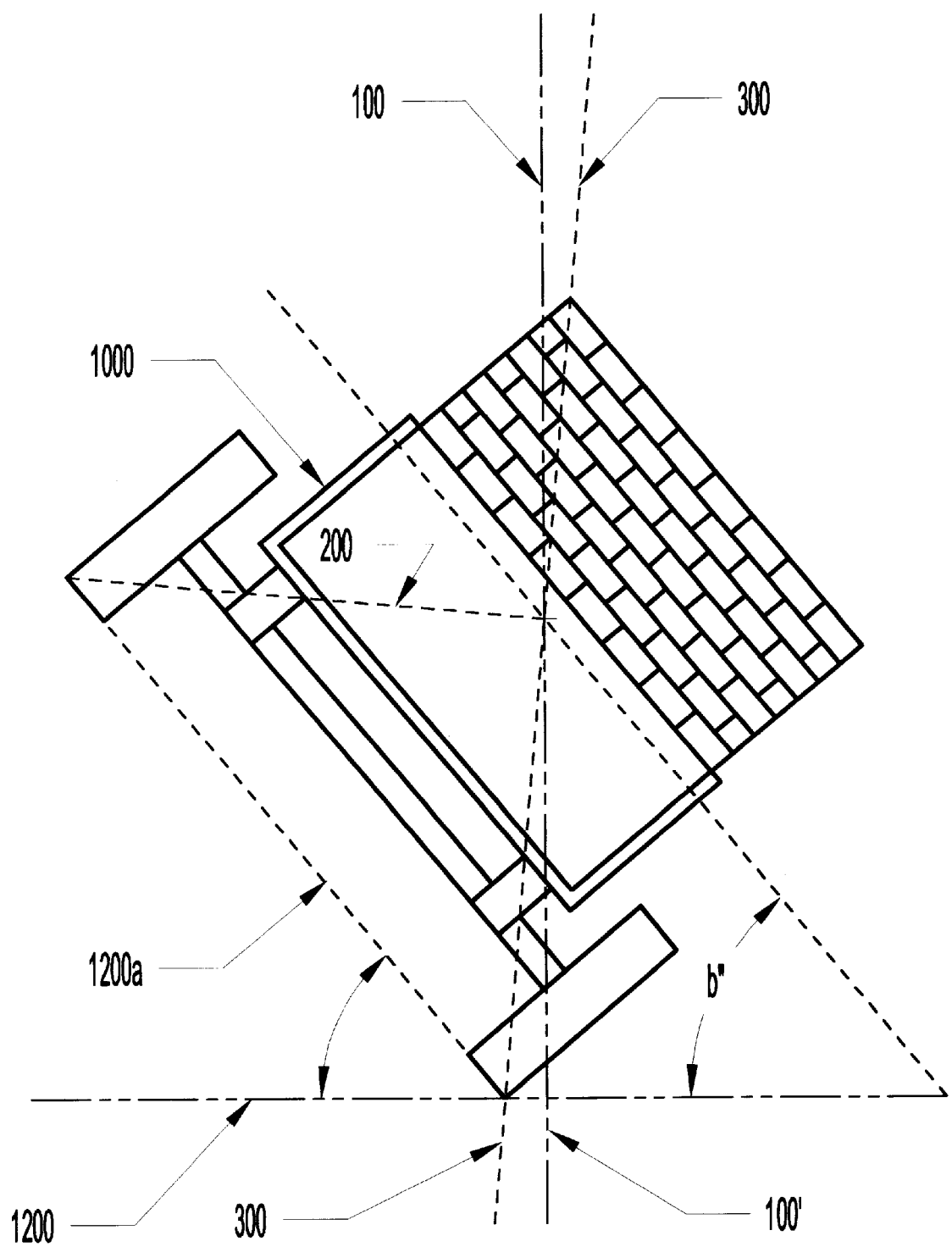
Figure 12A:
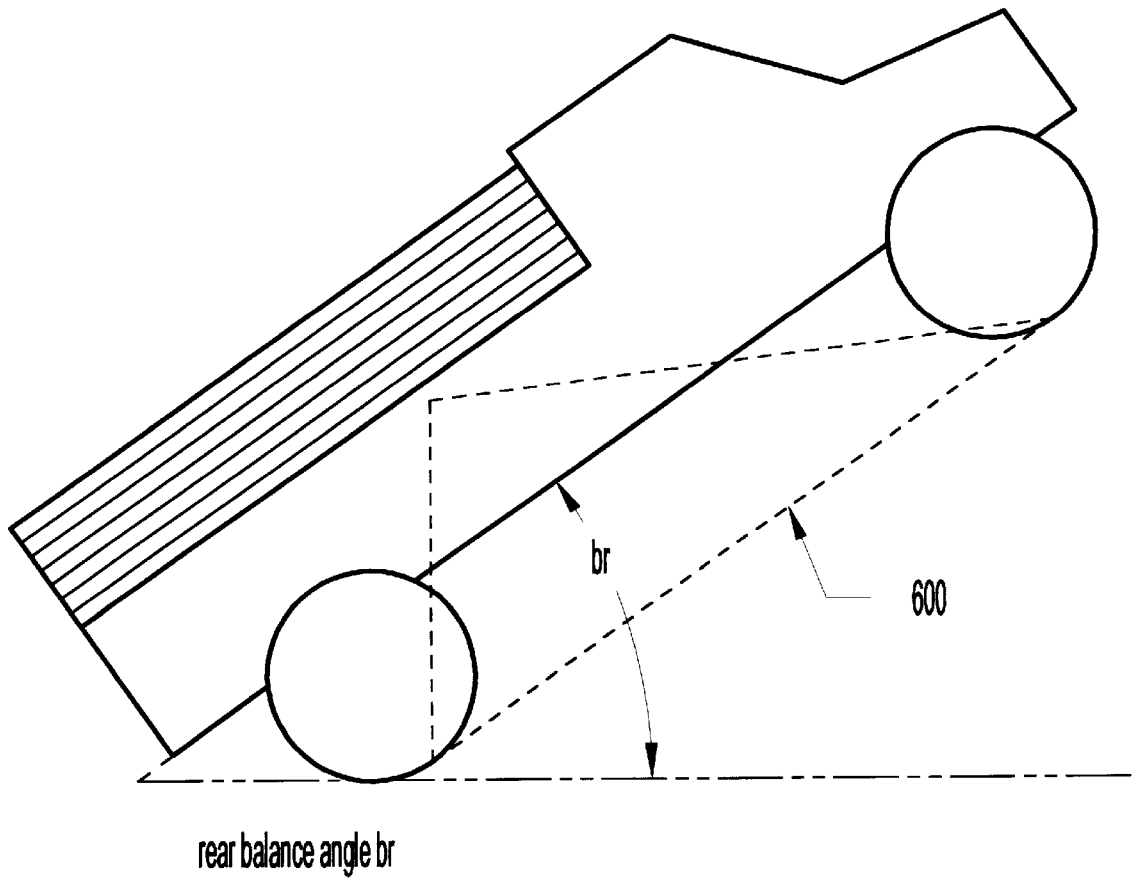
FIGS. 12a, 12b are diagrammatic views respectively showing the rear br and front bf balance angles of the vehicle as presented by a longitudinal axis of the vehicle and a horizontal line/plane as above described.
Figure 12B:
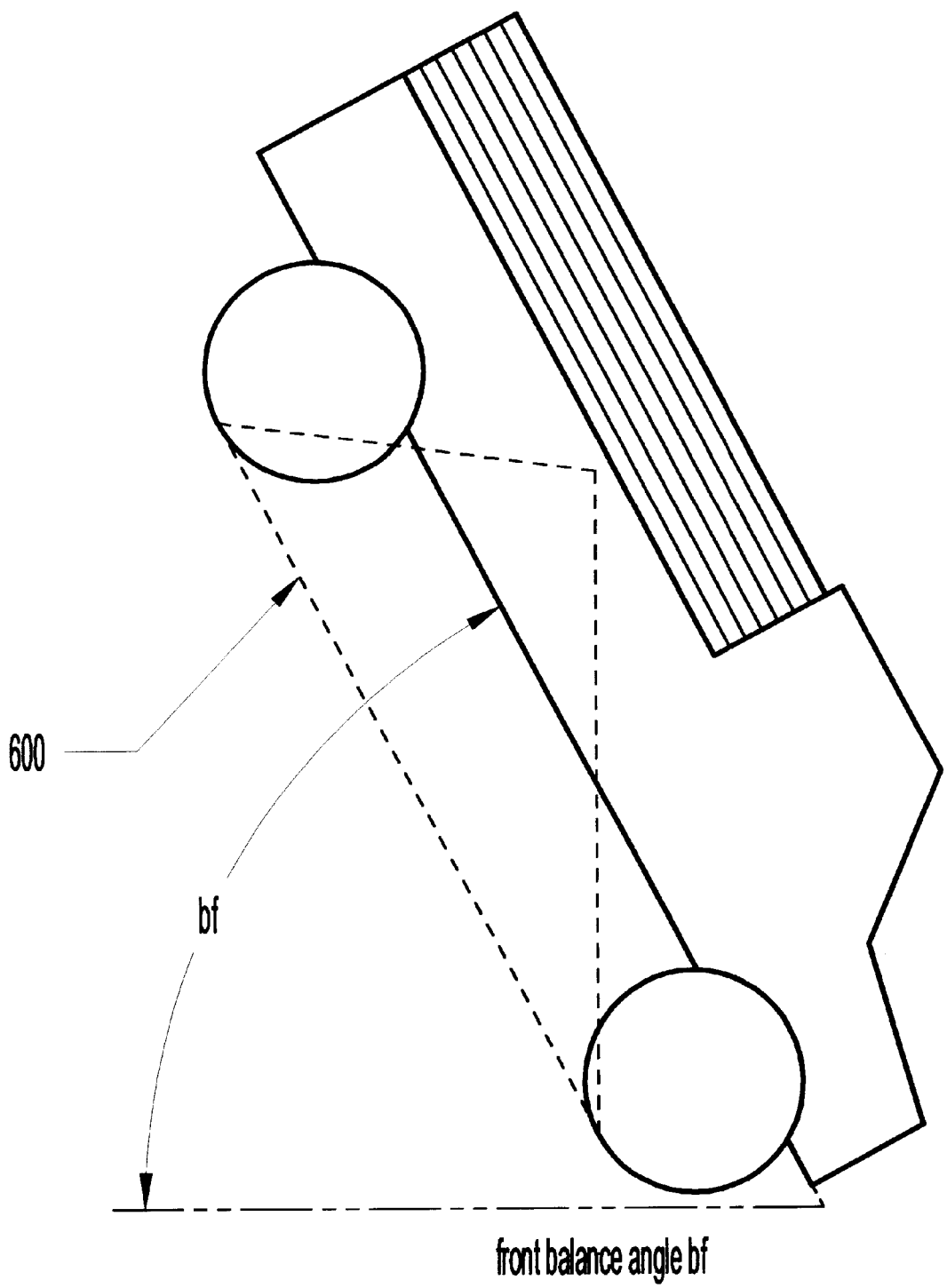

In FIG. 2b the leg 300 coincides with the centerline 100. At this position the vehicle is in balance as the weight of the vehicle, i.e., the load centerline 100, is positioned at a point of balance over the pivot point defined by the intersection of the lateral axis 1200a and horizontal line 1200. This results in a right balance angle b. Outside forces may cause a further clockwise rotation of the vehicle which will rotate the leg 300 to a FIG. 2c over center position. At this FIG. 2C position the load centerline is beyond the balance point. Angle b" is greater than the balance angle b of FIG. 2b. Thus, the vehicle will rotate about pivot axes 600 in a clockwise direction causing a rollover. It is the lateral balance angle b of FIG. 2b which is of concern as it cannot be exceeded. All balance angles must be measured. Here the left balance angle is equal to the right balance angle. The rear (br) and front (bf) balance angles are shown in FIG. 12, which are formed by the intersection of longitudinal axis and a horizontal line indicative of a level plane in the vehicle when on a horizontal road surface.

Figure 3:
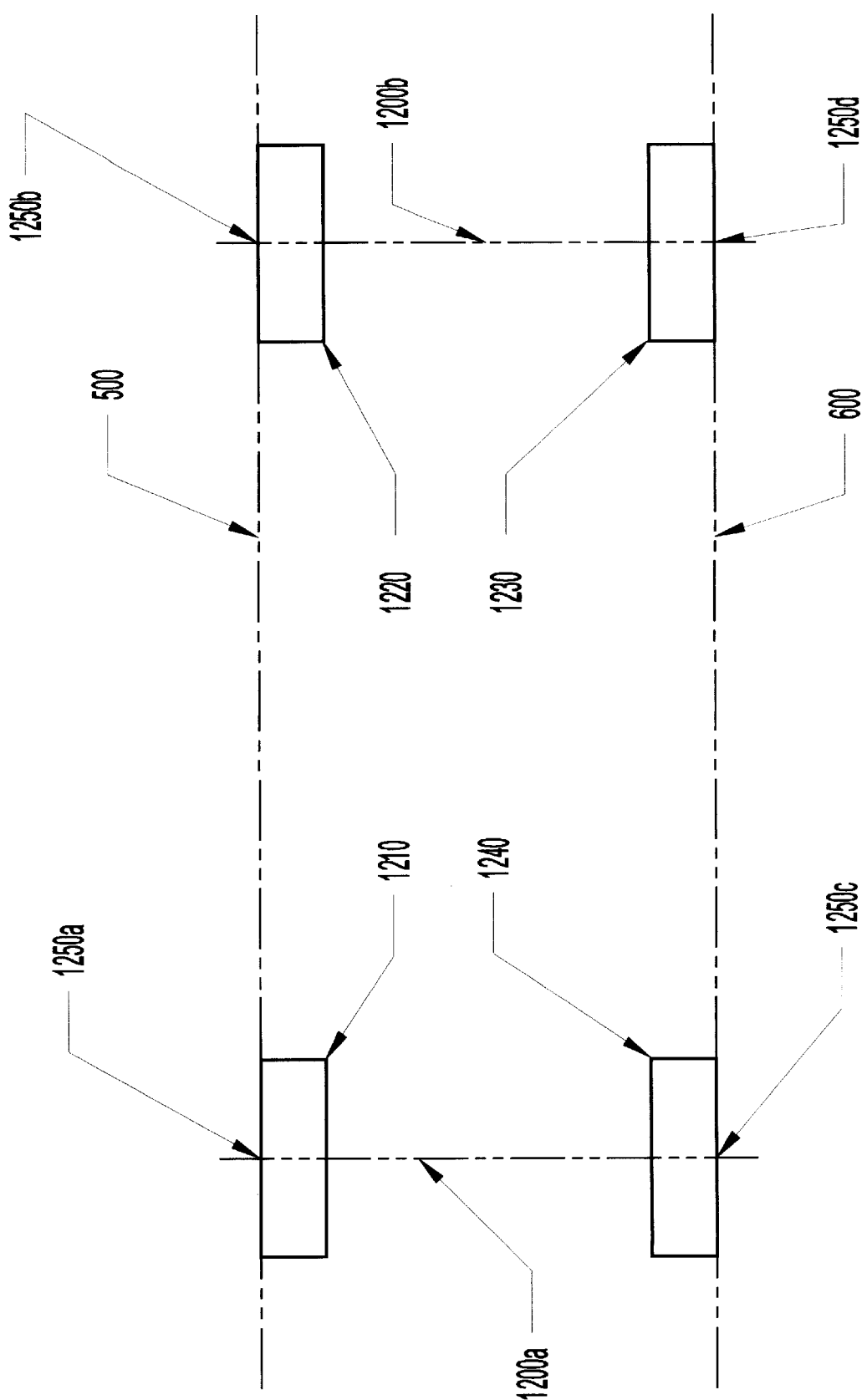
FIG. 3 is a diagrammatic top view of a wheelbase configuration having parallel lateral and longitudinal axes extending between the vehicle wheels.

In FIG. 3 transverse lateral axes 1200a, 1200b, extending between the wheels 1210, 1220, 1230, 1240, are shown. Axis 1200a extends between the rear wheels 1210, 1240 and axis 1200b extends between the front wheels 1220, 1230 of the vehicle. The intersection of these axes with a horizontal axis indicative of a horizontal surface defines pivot points 1250a, 1250b, 1250c, 1250d in lateral directions. The intersection of the longitudinal axes 500, 600 with the horizontal axes defines pivot point in longitudinal directions (FIG. 12).

Figure 4:
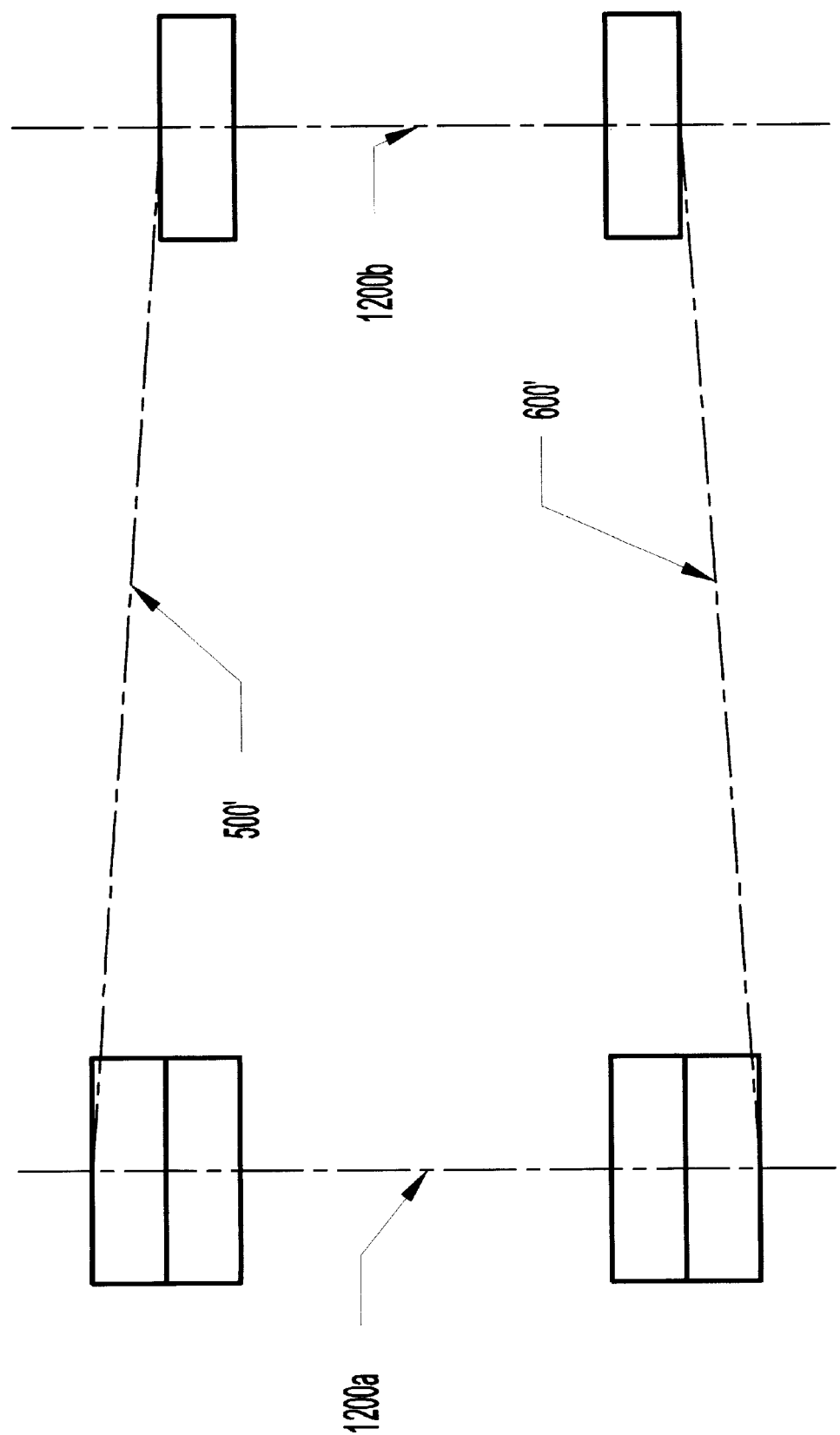
FIG. 4 is a diagrammatic top view of a wheelbase configuration having parallel lateral axes and nonparallel longitudinal axes relative to the vehicle wheels.
Figure 9:
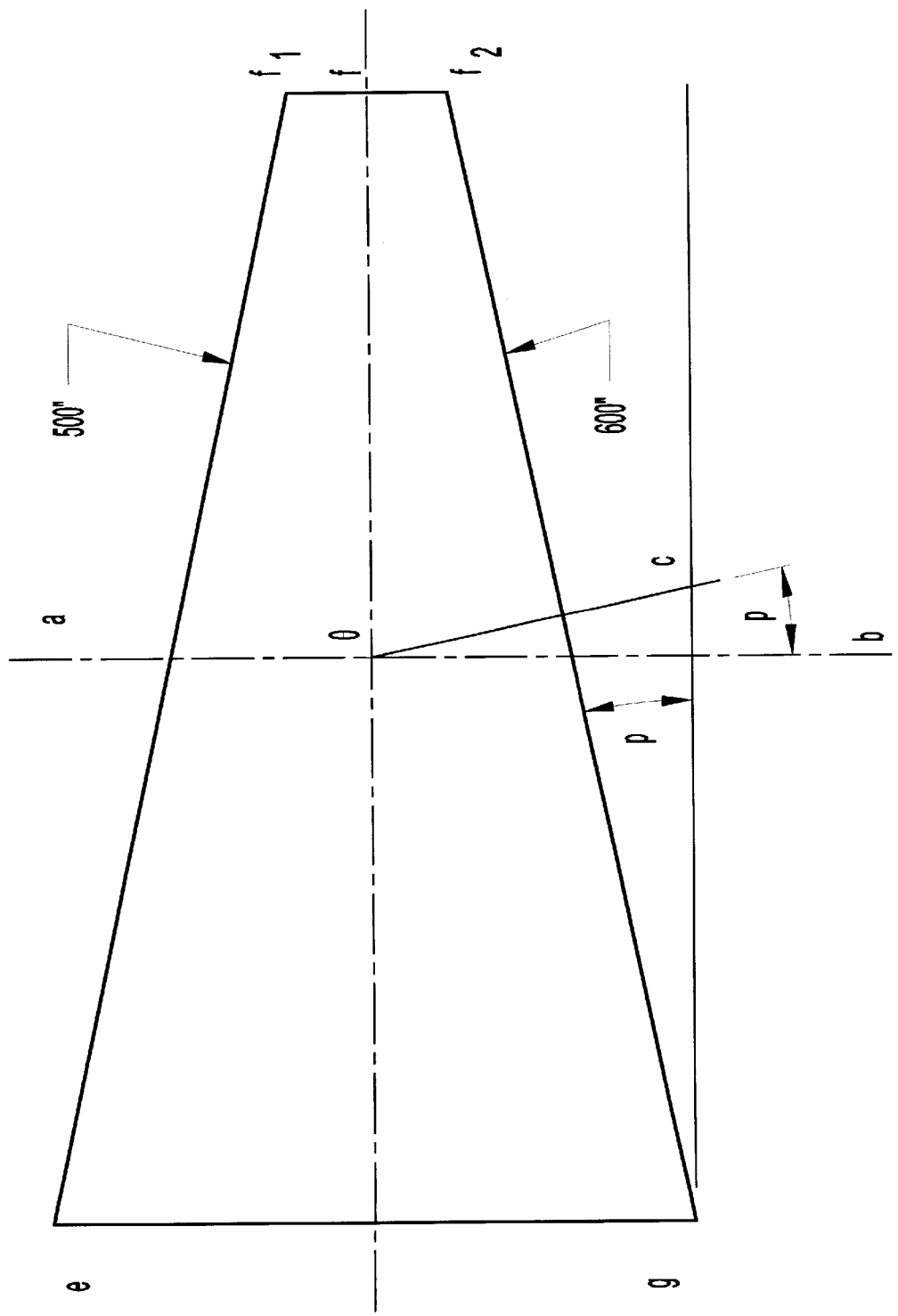
FIG. 9 diagrammatically shows a vehicle having nonparallel longitudinal axes and the resulting preload angle P.

FIG. 4 is similar to FIG. 3 but the longitudinal axes 500', 600' are not parallel. As shown in FIG. 9 the nonparallel axis diverts the axes of vehicle rollover from Line ab to a line oc. The resulting angle p is the preload angle as above discussed which is added to or subtracted from an approach or departure angle of a vehicle to compensate for these nonparallel pivot axes. This preload angle equals the arctangent (((rear wheel width-front wheel width) divided by 2) divided by the wheelbase).

Figure 5:
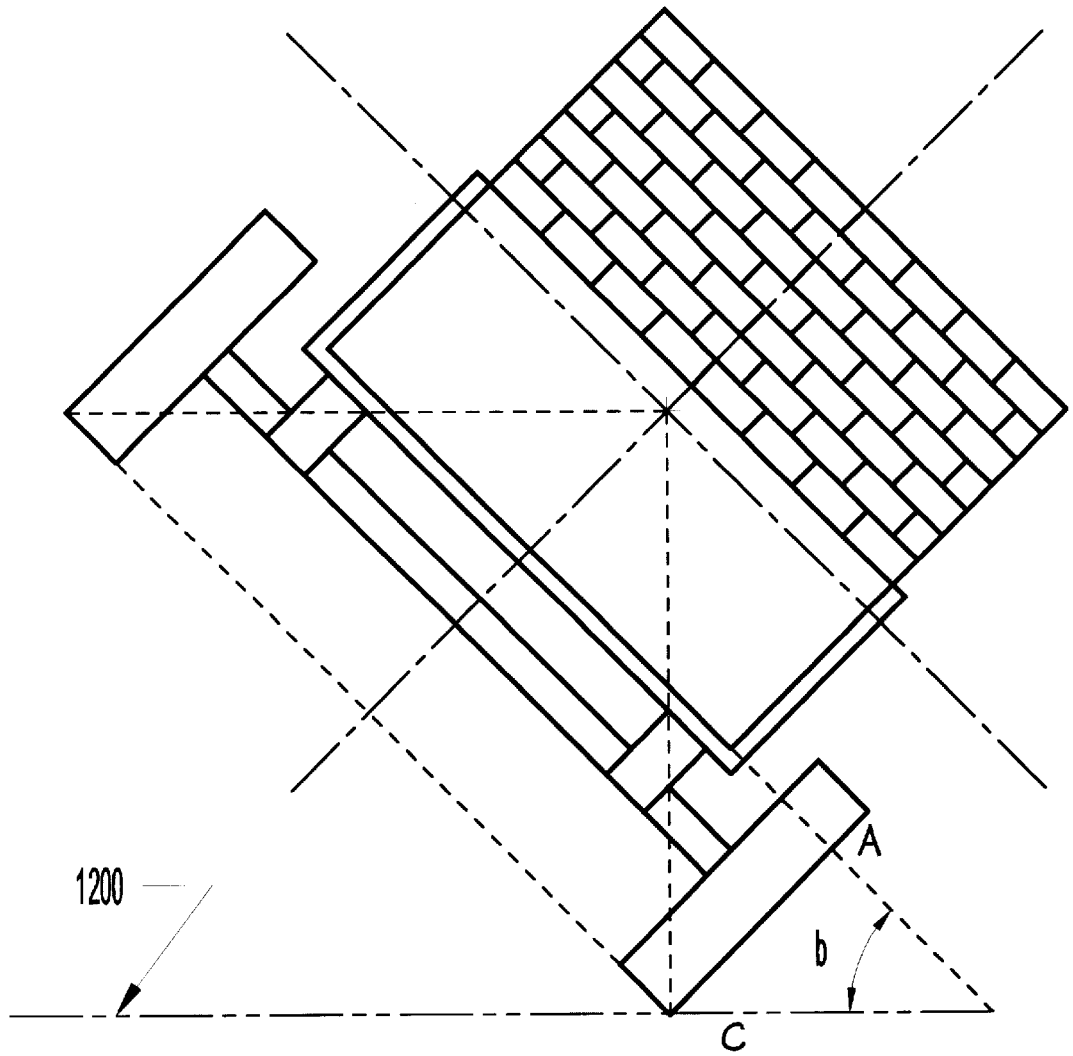
FIG. 5 is a rear diagrammatic view of an inclined vehicle showing a right balance angle ABC as measured by a lateral axis a passing through the vehicle and a horizontal line or plane, in the vehicle when the vehicle is on a horizontal surface.

Each map is preferably specific for the vehicle type. Thus, balance angles for the particular vehicle at the maximum load are first determined. In FIGS. 5 and 12 the balance angle is determined at each wheel relative to a horizontal surface 1200. The intersection of the lateral axis within a normally level, horizontal plane of the vehicle with a horizontal surface 1200 or horizontal lines parallel thereto forms the balance angles in the left and right directions. The intersection of the vehicle longitudinal axes with a horizontal surface forms front and rear balance angles. The right lateral balance angle b is shown in FIG. 5 with the left balance angle measured as being equal thereto. The rear balance angle br and front balance angle bf are shown in FIG. 12. Any additional outside forces in left, right, rear or front directions will incline the vehicle beyond the balance angle causing a rollover of the vehicle in those directions. The balance angles are measured for a maximum load so that the center of gravity of the vehicle is at a maximum relative to the underlying road surface.

As described above the angle approach/departure is the angle of a course of a vehicle up or down a hill deviating from a zero line that is normal to an imaginary line that extends from the bottom of the hill to the top of the hill. As such the approach angle straight up the hill is 90° and the descent angle straight down the hill is 270°. The angle increases from the zero line in a counterclockwise direction.

Figure 6:
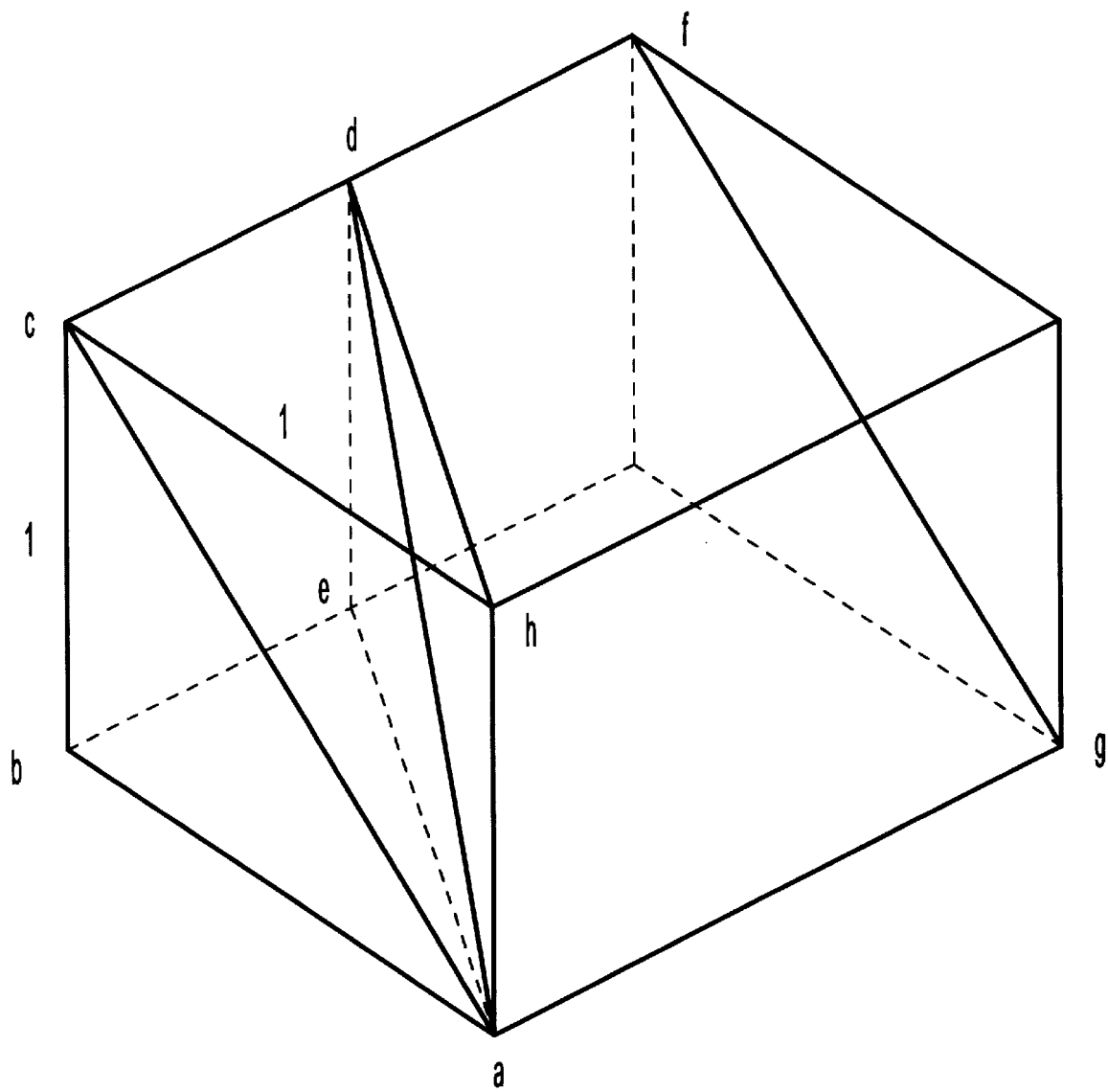
FIG. 6 is a diagrammatic view of a sloped surface a, c, f, g contained within a cube.
Figure 7:
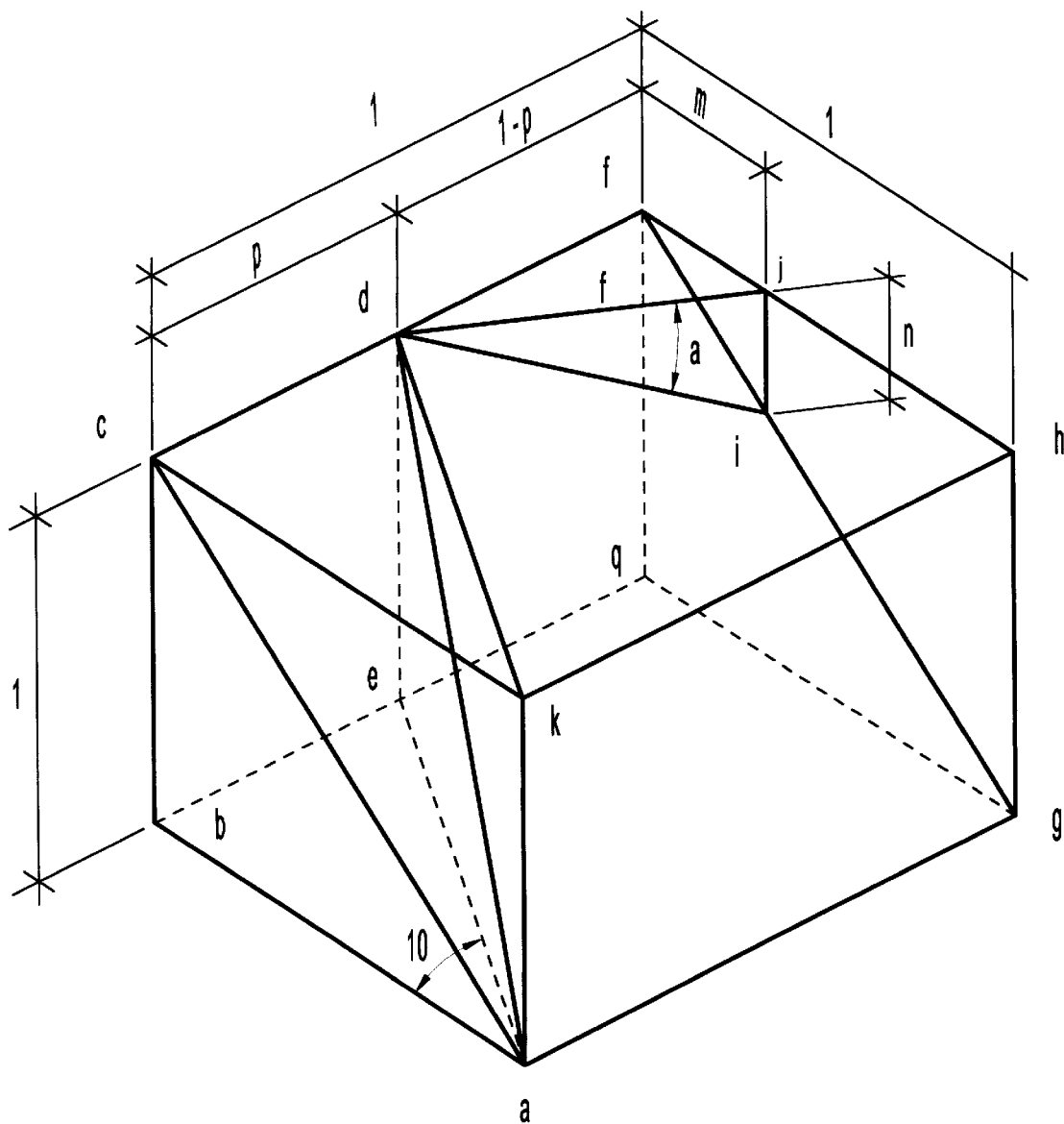
FIG. 7 is a diagrammatic view showing the various angles utilized in determining a side hill tilt angle of a vehicle on a sloped surface relative to the horizontal plane hkcf, said angles being utilized in one method for constructing a map for the indicator.

To determine the side hill tilt angle the plane a, c, f, g in FIGS. 6, 7 represents a slope surface. The angle of approach is calculated relative to the top or bottom planes of a cube which contains the sloped plane. Ad is the approach line. As the vehicle ascends or descends the hill other than straight up or down the hill one front and rear wheel will be higher than the other. Thus, the vehicle has a downhill lean. There are 90 different side hill angles one for each degree of approach angle between 0° and 90°. Due to symmetry these angles repeat in the quadrants between 90° and 180°, 180° and 270°, 270° and 360°.

FIG. 7 shows a cube containing the sloped plane (a, c, f, g). The line ac is the line straight up the hill which is projected as line kc in the top plane. The approach up the sloped plane is line ad which is projected as line kd in the top plane. Thus, in the top plane an approach angle results (h, k, d). Line segment (k, d) represents the course of the vehicle up the hill or the central longitudinal axis of the vehicle which is parallel to a longitudinal pivot axis of the vehicle. Line segment d, j is perpendicular to the line segment k, d and represents a lateral axis of the vehicle upon which rollover in a left or right direction will occur. Thus, the side hill tilt angle a can be measured in the plane represented by triangle j, d, i and is angle d. Angle f, d, j equals the complement to the approach angle h, k, d. Below are shown the formulas, as well as an example, in which an approach angle of 80° and a slope angle of 20° is assumed.

| 90 - the number of degrees between the approach angle (hiked) and the 0/180 degree line = Angle (c, k, d) = 90−80 = 10 | |
|---|---|
| Sin angle (c, k, d) = p and | line segments (c, f) − (c, d) = 1 − p = (d, f) |
| Sin 10 = p | 1 − .1736 = .8264 = (d, f) |
| .1736 = p | .8264 = (d, f) |
| Tan angle (f, d, j) × 1 − p = m | tan angle (h, f, g) × m = n |
| Tan 10 × 1 − p = (m) | tan 20 × m = n |
| .1763 × .8264 = .1457 | .3639 × .1457 = n |
| .1457 = m | .053 = n |
| 1 − p/Cos angle (f, d, j) = line seg (d, j) | n/Line segment (d, j) = acrtan angle (j, d, i) |
| .8265/cos 10 = line seg (d, j) | .053/.8391 = arctan (j, d, i) |
| .8264/.9848 = line seg (d, j) | .06316 = acrtan (j, d, i) |
| .8391 = (d, j) | 3.61 degrees = (j, d, i) |

Thus 3.61° is the angle of inclination of the vehicle along the axis dj. The angle of inclination can be calculated for each degree of slope of surface acfg and angle of approach/departure up or down the surface for all #quadrants. FIGS. 8*a*1–8*a*6 are spreadsheets that show approach angles across the top and slope angles down the side. Within these tables are the calculated side hill tilt angles for vehicles with parallel pivot axes for each approach/departure angle and angle of slope combination. FIGS. 10*a*1–10*d*6 is a spreadsheet that shows approach angles across the top and slope angles down the side with the above-discussed preload angle factored therein.

The indicator is a fluid-full dome presenting an air bubble index, preferably ⅛ inch in diameter. The dome may be laid out with radial lines of longitude corresponding to approach/departure angles and circles of latitude corresponding to the angles of the sloped surface. The resulting grid is not necessary once the map is in place.

Figure 11:
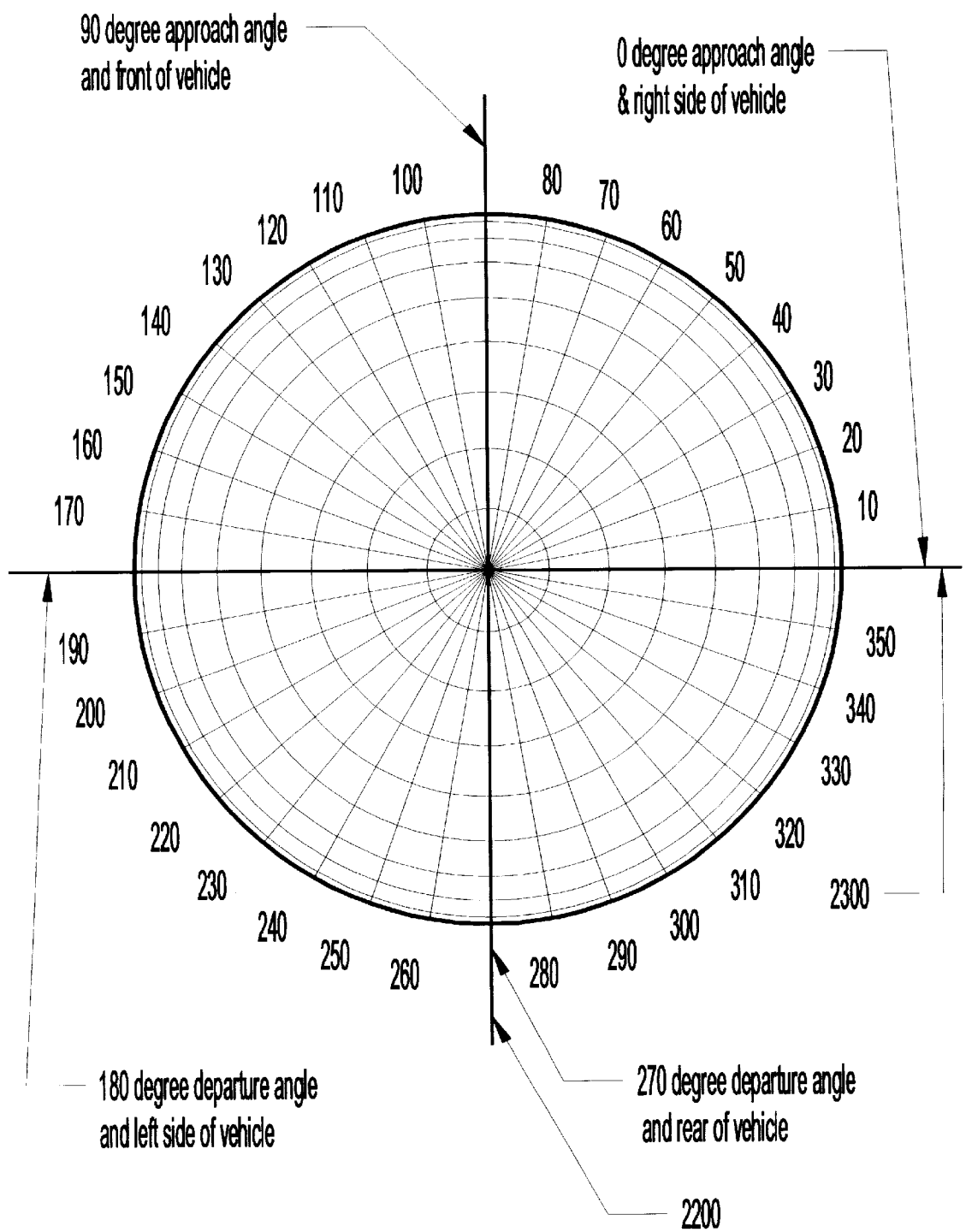
FIG. 11 is a top view of the graph utilized in constructing the map, the graph depicting the approach/departure angles as radii emanating from the center point and the degree of the sloped surface as concentric circles relative to the center point.

FIG. 11 shows the top view of the indicator with the radii being spaced at 10°. The zero line is the right radius of a diameter aligned with a lateral axis of the vehicle and includes two radii. The right side radius is the zero line with the left side radius forming the 180° angle. A second diameter normal thereto lies along the central longitudinal vehicle axis. The front radius forms the 90° angle with the rear radius forming the 270° angle.

About the center point are a plurality of concentric circles corresponding to slope angles in 10° increments. Circles corresponding to slopes between 0° and 900 are shown. The tables utilizing the angle of approach along the top and the angle of slope along the side. A cross-index results in an angle of vehicle inclination within the table. Comparisons of these resulting angles of inclination with the predetermined balance angles of the vehicle are then made. If the resulting angle of inclination is greater than a balance angle of the vehicle, the vehicle should avoid that slope and angle of approach. This point should be outside the map as an unsafe condition. Safe points/conditions will fall inside the map perimeter. Thus, the map perimeter, as determined on the FIG. 11 graph, will be reflected in the FIGS. 15, 16 dome indicators.

Assuming a vehicle has predetermined left and right balance angles of 25°, a front balance angle of 55° and a rear balance angle of 35°, the map is constructed as follows:

In vehicles with parallel axes, the maximum respective angles of inclination of the vehicle cannot be greater than the balance angles at the 0°, 90°, 180° and 270° directions by definition (less any predetermined safety margins subtracted from the measured balance angles). Thus a 250° left and right balance angles are marked between the second and third circles on the 0° and 180° lines. Note that the left balance angle is on the 0° line and the right balance angle on the 180° line. The rear balance angle of 35° is marked on the 90° line and the front balance angle of 55° is marked on the 270° line. Note that the left balance angles are to be used in the 0°90° quadrant and the right balance angles are in the 90°–180° quadrant even though the vehicle will be leaning toward the right in the 0°–90° quadrant and to the left in the 90°–180° approach quadrant. This is because the bubble in the indicator will appear in the 90°–180° quadrant when the vehicle is going up a hill in the 0°–90° quadrant. Likewise, the bubble is in the 0°–90° quadrant when the angle of approach is between 90°–180°. The same reversal applies for the departure angles. Thus, the map is plotted in a reverse relationship relative to the actual angle of inclination of the vehicle.

Starting with an approach angle of 10° (as measured from the 0° line), the top of table 8a1 is read to locate this approach angle. One then follows the depending column until a left vehicle inclination balance angle of 25° is found. At this point the horizontal row is followed to the left which reads a slope angle of 25°. Thus, at a 10° approach angle the vehicle will reach a predetermined maximum angle of inclination of 25° once the vehicle is on a 25° slope. An angle of slope greater than 25° will subject the vehicle to rollover as the resulting angles of inclination in the table are greater than the balance angle of 25°. This 25° slope point is thus plotted on the 10° angle line (FIG. 13). The process is repeated for the 20° approach angle. A 25° angle of inclination shows a corresponding angle of slope as 26° which is plotted on the 20° radius line in FIG. 13. The 30° approach angle/25° angle of inclination gives a 28° angle of slope which is plotted on the 30° radius. At a 40° approach/ 25° angle of inclination a 31° angle of slope results and is plotted on the 40° radius. At a 50° approach angle and 25° angle of inclination a 36° angle of slope results. However, this angle of slope is greater than the 35° rear balance angle which may result in vehicle rollover. Thus, the 50° approach angle/25° angle of inclination is outside the safety zone and should not be mapped. One must decrease the approach angle degree by degree until an angle of slope corresponding to the rear balance angle or less is found. In this case a 49° approach angle and 25° angle of inclination has a 35° angle of slope. This point is then mapped at the 49° radius. From this 49° angle to the 90° line each radius approach angle must be mapped to reflect a 35° angle of slope as all subsequent approach angles/25° vehicle inclination combinations will result in an angle of slope greater than the 35°. Thus, the vehicle cannot travel up slopes greater than 35° at such approach angles irrespective of whether an angle of inclination of 25° is not achieved. Otherwise, the rear balance angle of 35° is exceeded by a vehicle traveling uphill and rollover may result.

To find the angle beyond 90° at which the slope angle is below 35° the table 8a1–8b6 is used. This angle is 131°. (As both the left and right balance angles are 25° the map will be symmetrical about the 90° line.) Using table 8b1–8b6 the 35° slope angle is located and followed until the right balance angle of 25 is found. The angle of approach is 131°. The 131° approach angle 35° angle of slope is mapped. Thus, the map can be constructed angle by angle using the 25° right balance angle until the 180° angle is reached.

Beyond 180° departure angles are utilized in the #tables 8c1–8d6. The following tables 8c1–8d6 are utilized to find the appropriate values as follows: Using table 8C one establishes and maps the following points

| Departure angle | RBA | Latitude |
| --- | --- | --- |
| 190 | 25 | 25 |
| 200 | 25 | 26 |
| 210 | 25 | 28 |
| 220 | 25 | 31 |
| 230 | 25 | 36 |
| 240 | 25 | 43 |
| 250 | 25 | 54 |
| *251 | 25 | 55 |
| *260 | 25 | 55 |

Using table 8D one establishes and maps the remaining points

| Departure angle | LBA | Latitude |
| --- | --- | --- |
| *280 | 25 | 55 |
| *289 | 25 | 55 |
| 290 | 25 | 54 |
| 300 | 25 | 43 |
| 310 | 25 | 36 |
| 320 | 25 | 31 |
| 330 | 25 | 28 |
| 340 | 25 | 26 |
| 350 | 25 | 25 |

Note that at 251°/25° right balance angle of inclination that an angle of slope of 55° is reached. Beyond this point a 25° angle of inclination will result in an angle of slope greater than 55° which is greater than the front balance angle of the vehicle. A vehicle travelling down slopes greater than 55° may result in vehicle rollover. Thus, as before, the map points for angles 262°–270° must be plotted at the 55° angle of slope. This is also true for angles of departure at 271°–289°. Thus, the angles of slope on the left-hand side of the tables need only be between the range defined by the rear and front balance angles.

Upon connecting the plotted points a map 2000 results. As long as the bubble is within the confines of the map 2000 the vehicle inclination is at most a position equal to or below the predetermined balance angles. When the bubble is adjacent to or touching the perimeter of map 2000 the vehicle inclination is extremely close to one of the predetermined balance angles. Thus, the vehicle is in a potential rollover position. Corrective action should be taken by the driver to place the bubble towards the center of the map 2000 and away from the perimeter by adjusting the angle of approach/departure up/down the hill.

Tables 10a1–10d6 incorporate the above-discussed preload angle chosen as 17°. This preload angle adjusts the rollover axes. Thus, the 0/180 degree line is now shifted to a line extending between the 17° (0°+17°) and 163° (180°–17°) radii. The maximum inclination at these degrees would be the 25° right and left balance angles. This preload angle also maps on the 343° radius (360°–17°) and the 197° radius (180°+17°). As a further explanation, FIG. 9 shows the base triangle of a narrow front tractor having rear wheels at E and G with front wheels at F. It has right pivot axis 600" and left pivot axis 500" and rear pivot axis (e, g). The front pivot axis is at F and is perpendicular to the longitudinal axis. Right and left balance angles are 25°, the front balance angle is 55° and the rear balance is 35°. The preload angle has been determined to be 17°. If this tractor were ascending a hill on a 90° approach angle in order for it to rollover it would have to fall uphill. This condition would remain the same, at different approach angles, with varying amounts of upward side hill tilt until a pivot axis aligns with the 90° approach angle of the hill (straight up path). When the pivot axis and straight up path align there would be a side hill tilt of 0°. This condition happens when the tractor is at an approach angle of 17° less, or greater than 90° depending on which pivot axis is aligned. This is the point in which we begin calculating the downward side tilt angles. In order to do this we adjust the formula for calculating the side hill tilt angles by preloading the 17° into the approach angle.

The first calculation for parallel pivot axis is:

This is the first quadrant only

90−approach angle (h, k, d)=angle (c, k, d)

The adjustment below is used for nonparallel pivot axes

90−(approach angle+preload angle)=(c, k, d)

For all quadrants the "approach angle" is the "number of degrees between the approach angle and the 0, 180-degree line"

The preload angle +/− will be the same in quadrants 1 and 4 and the opposite sign in quadrants 2 and 3, depending whether the front wheels are wider or narrow.

This adjustment causes the side tilt angle to be 0 degrees when the pivot axis is aligned with the straight up path on the hill. The following points are then determined and plotted.

Table 10$a$1–10$a$6 establishes and maps these points

| Approach angle | LBA | Latitude |
|---|---|---|
| 10 | 25 | 28 |
| 20 | 25 | 30 |
| 30 | 25 | 34 |
| 31 | 25 | 35 |
| 40 | 25 | 35 |
| 50 | 25 | 35 |
| 60 | 25 | 35 |
| 70 | 25 | 35 |
| 80 | 25 | 35 |

Table 10$b$1–10$b$6 establishes and maps the remaining points

| Approach angle | RBA | Latitude |
|---|---|---|
| 100 | 25 | 35 |
| 110 | 25 | 35 |
| 120 | 25 | 35 |
| 130 | 25 | 35 |
| 140 | 25 | 35 |
| 149 | 25 | 35 |
| 150 | 25 | 34 |
| 160 | 25 | 30 |
| 170 | 25 | 28 |
| 180 | 25 | 26 |

Table 10$c$1–10$c$6 establishes and maps the following points

| Departure angle | RBA | Latitude |
|---|---|---|
| 190 | 25 | 25 |
| 200 | 25 | 25 |
| 210 | 25 | 25 |
| 220 | 25 | 27 |
| 230 | 25 | 29 |
| 240 | 25 | 32 |
| 250 | 25 | 38 |

-continued

| Departure angle | RBA | Latitude |
|---|---|---|
| 260 | 25 | 46 |
| 268 | 25 | 55 |

Using table 10$d$1–10$d$6 we establish and map the remaining points

| Departure angle | LBA | Latitude |
|---|---|---|
| 272 | 25 | 55 |
| 280 | 25 | 46 |
| 290 | 25 | 38 |
| 300 | 25 | 32 |
| 310 | 25 | 29 |
| 320 | 2S | 27 |
| 330 | 25 | 26 |
| 340 | 25 | 25 |
| 350 | 25 | 25 |
| 0 | 25 | 25 |

Accordingly, it can be seen that utilizing the above formula or formulas similar thereto that a vehicle specific map can be placed on the level device which provides a readily identifiable visual indication to the vehicle driver that the vehicle is at a predetermined unsafe inclination. Although I have utilized specific formulas to arrive at the FIGS. 8 and 10 tables and inclinations therein, other formulas may be utilized. It is also understood that the maps will change according to the chosen vehicle as the left, right, front and rear balance angles will change. Also, the chosen balance angle need not be the actual balance angles. The chosen angles may be less than the balance angles so as to provide an additional safety margin. Also, other angles may be chosen other than the left, right, front and rear balance angles. Finally, the values in the tables have been rounded to the next whole number.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A level indicator for a vehicle comprising:
   a fluid chamber presenting an index therein adapted for movement responsive to a vehicle inclination from a horizontal plane, said chamber having a surface for viewing said index therethrough;
   a center point on said chamber surface, said index being aligned with said center point upon the vehicle being at a horizontal position and being progressively displaced away from the center point upon an increase in slope of the support surface of the vehicle;
   a map on said chamber surface presenting a perimeter surrounding said center point, said map defining a plurality of positions for said index corresponding to predetermined safe inclinations of said vehicle, wherein an appearance of said index within said map indicates one of said predetermined safe inclinations of the vehicle.

2. The device as claimed in claim 1 wherein said map positions correspond to a slope of the vehicle support surface and the course of the vehicle along the support surface relative to a predetermined path thereon.

3. The device as claimed in claim 2 wherein said predetermined path is presented by an imaginary longitudinal axis extending along the path.

4. The device as claimed in claim 1 wherein the predetermined inclinations of the vehicle comprise an angle formed by an intersection of an imaginary longitudinal axis passing through the vehicle with a horizontal line representative of a horizontal vehicle support surface.

5. The device as claimed in claim 1 wherein the predetermined inclinations of the vehicle comprise an angle formed by an intersection of an imaginary lateral axis passing through the vehicle with a horizontal line passing through representative of a vehicle horizontal support surface.

6. The device as claimed in claim 1 further comprising a series of concentric circles on said chamber surface relative to said center point, each circle representing a predetermined degree of slope of the support surface from a horizontal plane.

7. The device as claimed in claim 2 further comprising a series of radii on said chamber surface extending from said center point, said radii indicative of said course of the vehicle.

8. A level indicator for a vehicle comprising:

a chamber;

an index within said chamber adapted for movement responsive to a vehicle inclination from a horizontal plane, said chamber having a surface for viewing said index therethrough;

a reference point on said chamber surface, said index being at a predetermined position relative to said reference point upon the vehicle being at a horizontal position, said index being progressively movable away from the reference point upon an increase in slope of the underlying support surface of the vehicle;

a map presenting a perimeter on said chamber surface surrounding said reference point, said map encompassing a plurality of safe inclinations of said vehicle, said index within said map indicative of predetermined safe inclinations of the vehicle at a predetermined slope of the underlying support surface.

9. The device as claimed in claim 8 wherein said inclinations are based on a degree of slope of the underlying support surface and a course of travel relative to a straight line path up and down the support surface.

10. The device as claimed in claim 9 further comprising a series of concentric circles on said chamber surface relative to said reference point, each circle representing a predetermined degree of slope of the support surface from a horizontal plane.

11. The device as claimed in claim 9 further comprising a series of radii extending from said reference point, said radii indicative of said course of travel of the vehicle up or down the support surface.

12. A method of constructing a map for use on a leveling device of a vehicle including a bubble level therein indicative of the slope of a vehicle support surface, said map including safe points of inclination of the vehicle on the support surface comprising the steps of:

choosing a center point;

positioning a first diameter comprising first and second radii through said center point, said first diameter indicative of a longitudinal axis of the vehicle;

positioning a second diameter comprising first and second radii normal to said first diameter and indicative of a lateral axis of the vehicle, said first radius of said second diameter establishing a zero reference line relative to said radii of said first and second diameters;

positioning a plurality of radii extending from said center point, each radii defining an angle with said zero line between zero and 360°;

determining a desired maximum angle of inclination of a lateral axis of the vehicle in left and right lateral directions relative to a horizontal plane;

plotting said maximum angle of lateral inclination in said right direction on one of said first or second radii of said second diameter;

plotting said maximum angle of lateral inclination in said left direction on the other of said first or second radii of said second diameter;

determining a desired maximum angle of inclination of a longitudinal axis of the vehicle in front and rear directions relative to the horizontal plane;

plotting said maximum angle of a longitudinal inclination of the vehicle in a rear direction along the first radius of said first diameter displaced 90° from said zero line;

plotting said maximum angle of inclination of the vehicle in a front direction along the second radius of said first diameter displaced 270° from said zero line;

selecting a relative course of travel along each of said radii relative to said zero line;

calculating a maximum slope of the underlying surface able to be taken by the vehicle upon a selected course of travel along each of said selected radii, said maximum slope positioning the vehicle at an angle of inclination less than said longitudinal and lateral angles of inclination;

plotting said maximum slope on each selected radii;

connecting said points on each radii in a sequential manner among adjacent radii to form a closed boundary, said closed boundary presenting a map, a position of the bubble level within the boundary of said map indicative of a safe inclination of the vehicle.

\* \* \* \* \*

UNITED STATES PATENT AND TRADEMARK OFFICE
CERTIFICATE OF CORRECTION

PATENT NO.    : 6,212,785 B1
DATED         : April 10, 2001
INVENTOR(S)   : Craig A. Cox Page 1 of 1

It is certified that error appears in the above-identified patent and that said Letters Patent is hereby corrected as shown below:

<u>Column 6,</u>
Line 14, delete ".8265" and substitute -- .8264 --.
Line 21, delete "#quadrants." and substitute -- quadrants. --.

<u>Column 7,</u>
Line 56, delete "8a1" and substitute -- 8b1 --.
Line 64, delete "#tables" and substitute -- tables --.

Signed and Sealed this

Sixteenth Day of October, 2001

Attest:

NICHOLAS P. GODICI
Attesting Officer    Acting Director of the United States Patent and Trademark Office